United States Patent
Iguchi et al.

(10) Patent No.: US 12,289,469 B2
(45) Date of Patent: Apr. 29, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP);
Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/218,313

(22) Filed: Jul. 5, 2023

(65) Prior Publication Data
US 2023/0353782 A1    Nov. 2, 2023

Related U.S. Application Data

(63) Continuation of application No. 17/342,944, filed on Jun. 9, 2021, now Pat. No. 11,743,497, which is a
(Continued)

(51) Int. Cl.
*H04N 19/597* (2014.01)
*H04N 19/124* (2014.01)
(Continued)

(52) U.S. Cl.
CPC ......... *H04N 19/597* (2014.11); *H04N 19/124* (2014.11); *H04N 19/146* (2014.11); *H04N 19/184* (2014.11)

(58) Field of Classification Search
CPC .... H04N 19/00; H04N 19/597; H04N 19/124; H04N 19/146; H04N 19/184
See application file for complete search history.

(56) References Cited

U.S. PATENT DOCUMENTS

| | | |
|---|---|---|
| 2014/0375638 A1 | 12/2014 | Tomaru et al. |
| 2018/0268570 A1 | 9/2018 | Budagavi |
| 2022/0038517 A1 | 2/2022 | Takahashi |

FOREIGN PATENT DOCUMENTS

| | | |
|---|---|---|
| WO | 2014/020663 | 2/2014 |
| WO | 2018/181252 | 10/2018 |

OTHER PUBLICATIONS

International Search Report (ISR) issued on Feb. 4, 2020 in International (PCT) Application No. PCT/JP2019/051277.
(Continued)

*Primary Examiner* — Kyle M Lotfi
(74) *Attorney, Agent, or Firm* — Wenderoth, Lind & Ponack, L.L.P.

(57) ABSTRACT

A three-dimensional data encoding method includes: encoding pieces of attribute information of respective three-dimensional points, using parameters; and generating a bitstream including the pieces of attribute information encoded, control information, and pieces of first attribute control information. The control information corresponds to the pieces of attribute information and includes pieces of type information each indicating a type of different attribute information, the pieces of first attribute control information correspond one-to-one with the pieces of attribute information, and each of the pieces of first attribute control information includes first identification information indicating that the first attribute control information is associated with one of the pieces of type information.

4 Claims, 108 Drawing Sheets

Related U.S. Application Data continuation of application No. PCT/JP2019/051277, filed on Dec. 26, 2019.

(60) Provisional application No. 62/784,998, filed on Dec. 26, 2018.

(51) Int. Cl.
*H04N 19/146* (2014.01)
*H04N 19/184* (2014.01)

(56) References Cited

OTHER PUBLICATIONS

George P. Gerdan, et al., "Transforming Cartesian coordinates X,Y,Z to Geographical coordinates φ, λ, h", The Australian Surveyor, vol. 44, No. 1, Jun. 1999.
Extended European Search Report issued Feb. 11, 2022 in corresponding European Patent Application No. 19905498.2.
Khaled Mammou et al., "Working draft of Point Cloud Coding for Category 2 (Draft 1)", ISO/IEC JTC1/SC29/WG11, No. N17534, Apr. 2018.
Y-K Wang et al., "[PCC] On V-PCC high-level syntax", ISO/IEC JTC1/SC29/WG11, MPEG2018/M44051, Oct. 2018.
Office Action issued Aug. 29, 2024 in Russian Patent Application No. 2024106296, with English-language Translation.

|  | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

| ftyp | moov | mdat |

FIG. 39

```
EXAMPLES OF SEMANTICS OF pcc_nal_unit_type
(1) if pcc_codec_type == Codec 1
      0:Codec1 Goemetry
      1:Codec1 AttributeX
      2:Codec1 AttributeY
      3:Codec1 Geom. PS
      4:Codec1 AttrX. PS
      5:Codec1 AttrX. PS
      6:Codec1 Geometry Sequence PS
      7:Codec1 AttributeX Sequence PS
      8:Codec1 AttributeY Sequence PS
      9:Codec1 AU Header
      10:Codec1 GOF Header
   11 ~ :Codec1 reserved for future use (2) if pcc_codec_type == Codec 2
      0:Codec2 DataA
      1:Codec2 MetaDataA
      2:Codec2 MetaDataB
    3 ~ :Codec2 reserved for future use
```

FIG. 69

```
TileMetaData{
    type_of_divide  1:top_view, 2:other
    if(type_of_divide == 1){  //top_view
        topview_shape    //1: square, 2:circle
        tile_overlap_flag  //1:true, 2:false
        if(tile_overlap_flag){
            type_of_overlap
        }
        independent_tile_height_flag
        if(independent_tile_height_flag){
            tile_height //1: road, flyover
        } tile_number for(tile_number){
            global_position or relative_position
            if(independent_tile_height_flag){
                tile_height
            }
        }
    }
}
```

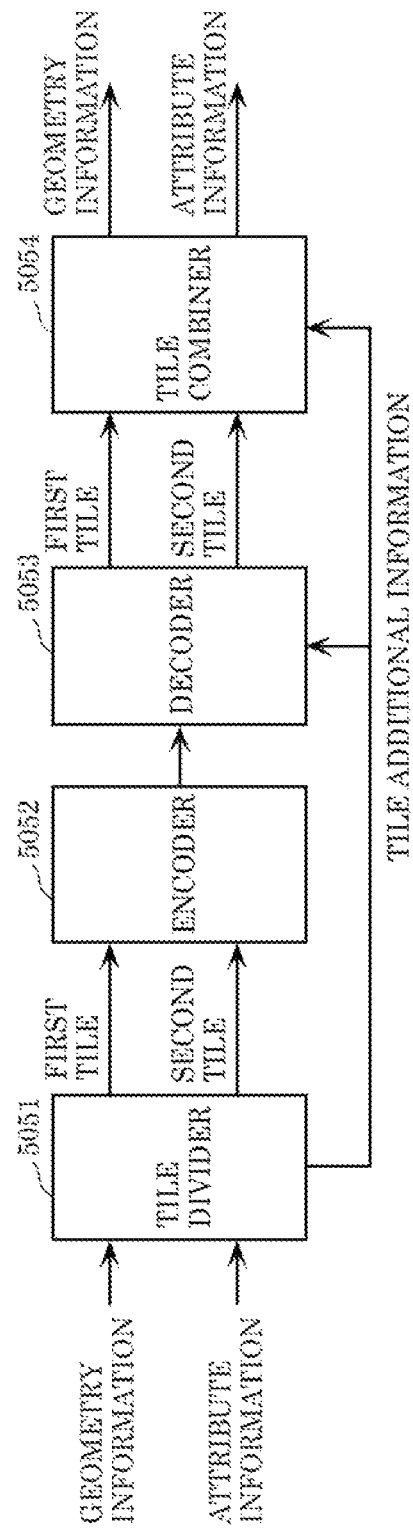

FIG. 71

```
SliceMetaData{
    type_of_divide   1:object, 2:other
    if(type_of_divide == 1) {  //object
        slice_overlap_flag   //1:true, 2:false
        if(slice_overlap_flag){
            type_of_overlap
        } slice_number for(slice_number){
            global_position or relative_position
            slice_bounding_box_size
        }
    }
}
```

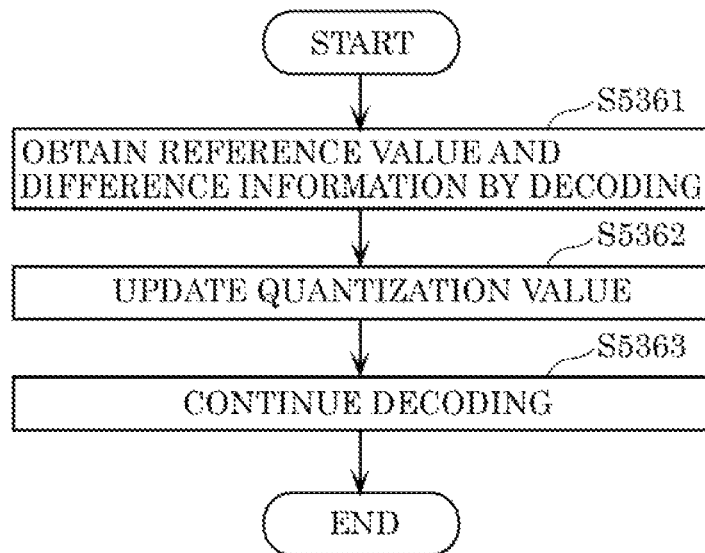

FIG. 113

```
APS(){
    aps_idx ..PCC frame Number
    gps_idx ..PCC frame Number num_of_attribute
    for(num_of_attribute){
        attribute_type  //color, reflectance
        aps_information()

tile_slice_num  //0..no divide
        for(tile_slice_num){
            tile_idx
            slice_idx
            QP_delta_Attribute_to_Geometry
            if(attribute_type==color){
                QP_delta_Cb_to_Y
                QP_delta_Cr_to_Y
            }
            aps_slice_tile_information()
        }
    }
}
```

FIG. 114

```
Geometry_header(){
    gps_idx
    offset
    QP_delta_data_to_frame
    if(tile){
        tile_type
        tile_idx
    }
    if(slice){
        slice_type
        slice_idx
    }
}
```

FIG. 115

```
Attribute_header0{
   aps_idx
   offset
    attribute_type
   QP_delta_data_to_frame
   if(attribute_type==color){
      QP_delta_Cb_to_frame
      QP_delta_Cr_to_frame
   }
   if(tile){
      tile_type
      tile_idx
   }
   if(slice){
      slice_type
      slice_idx
   }
}
```

FIG. 125

```
APS(){
  aps_idx
  sps_idx num_of_attribute
  for(int i=0;i>num_of_attribute ; i++){
    attribute_type //color, reflectance
    aps_information()
                                                          6701
    if(attribute_type==color){
      QP_value_Luma
      QP_delta_Cb_to_Luma
      QP_delta_Cr_to_Luma
      data_QP_delta_present_flag
    }else if(attribute_type==refrectance){
      QP_value
      data_QP_delta_present_flag
    }else{
      //No QP value
    }
  }
}
```

```
Atrribute_header(){
  aps_idx
  sps_idx
  geom_data_id
  offset
  attribute_type
                                                          6702
  if(data_QP_delta_present_flag){
    if(attribute_type==color){
      QP_delta_data_to_frame
      QP_delta_Cb_to_frame
      QP_delta_Cr_to_frame
    }elseif(attribute_type==refrectance){
      QP_delta_data_to_frame
    }else{
      //No QP value
    }
  }
}
```

FIG. 126

```
APS(){
  aps_idx
  sps_idx aps_information()
     QP_value
     QP_delta1
     QP_delta2
     data_QP_delta_present_flag
  }
}
```

FIG. 127

```
Attribute_header(){
  aps_idx
  sps_idx
  geom_data_id
  offset
  if(data_QP_delta_present_flag){
     QP_delta_data_to_frame
     QP_delta1_to_frame
     QP_delta2_to_frame
  }
}
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a continuation of U.S. application Ser. No. 17/342,944, filed Jun. 9, 2021, which is a U.S. continuation application of PCT International Patent Application Number PCT/JP2019/051277 filed on Dec. 26, 2019, claiming the benefit of priority of U.S. Provisional Patent Application No. 62/784,998 filed on Dec. 26, 2018, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Furthermore, a technique for searching for and displaying a facility located in the surroundings of the vehicle by using three-dimensional map data is known (for example, see International Publication WO 2014/020663).

SUMMARY

There has been a demand for decoding attribute information of a three-dimensional point correctly in a three-dimensional data encoding and a three-dimensional data decoding process.

The present disclosure has an object to provide a three-dimensional data encoding method, a three-dimensional data decoding method, a three-dimensional data encoding device, or a three-dimensional data decoding device that is capable of decoding attribute information of a three-dimensional point correctly.

A three-dimensional data encoding method according to one aspect of the present disclosure includes: encoding pieces of attribute information of respective three-dimensional points, using parameters; and generating a bitstream including the pieces of attribute information encoded, control information, and pieces of first attribute control information. The control information corresponds to the pieces of attribute information and includes pieces of type information each indicating a type of different attribute information, the pieces of first attribute control information correspond one-to-one with the pieces of attribute information, and each of the pieces of first attribute control information includes first identification information indicating that the first attribute control information is associated with one of the pieces of type information.

A three-dimensional data decoding method according to one aspect of the present disclosure includes: obtaining pieces of attribute information encoded and parameters from a bitstream; and decoding the pieces of attribute information encoded using the parameters, to generate pieces of attribute information of respective three-dimensional points. The bitstream includes control information and pieces of first attribute control information, the control information corresponds to the pieces of attribute information and includes pieces of type information each indicating a type of different attribute information, the pieces of first attribute control information correspond one-to-one with the pieces of attribute information, and each of the pieces of first attribute control information includes first identification information indicating that the first attribute control information is associated with one of the pieces of type information.

The present disclosure provides a three-dimensional data encoding method, a three-dimensional data decoding method, a three-dimensional data encoding device, or a three-dimensional data decoding device that is capable of decoding attribute information of a three-dimensional point correctly.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 39 is a diagram illustrating a semantics example of pcc_nal_unit_type according to Embodiment 4;

FIG. 69 is a diagram illustrating an example of syntax of tile additional information according to Embodiment 6;

FIG. 70 is a block diagram of an encoding and decoding system according to Embodiment 6;

FIG. 71 is a diagram illustrating an example of syntax of slice additional information according to Embodiment 6;

FIG. 111 is a flowchart illustrating an example of a process of obtaining QP values and decoding a QP value for a slice or tile according to Embodiment 8;

FIG. 112 is a diagram illustrating a syntax example of GPS according to Embodiment 8;

FIG. 113 is a diagram illustrating a syntax example of APS according to Embodiment 8;

FIG. 114 is a diagram illustrating a syntax example of a header of geometry information according to Embodiment 8;

FIG. 115 is a diagram illustrating a syntax example of a header of attribute information according to Embodiment 8;

FIG. 119 is a diagram for describing an example of control of a QP value according to Embodiment 8;

FIG. 120 is a flowchart illustrating an example of a method of determining a QP value based on the quality of an object according to Embodiment 8;

FIG. 121 is a flowchart illustrating an example of a method of determining a QP value based on a rate control according to Embodiment 8;

FIG. 122 is a flowchart illustrating an encoding process according to Embodiment 8;

FIG. 123 is a flowchart illustrating a decoding process according to Embodiment 8;

FIG. 124 is a diagram for illustrating an example of a quantization parameter transmission method according to Embodiment 9;

FIG. 125 is a diagram showing a first example of a syntax of APS and a syntax of a header of attribute information according to Embodiment 9;

FIG. 126 is a diagram showing a second example of the syntax of APS according to Embodiment 9;

FIG. 127 is a diagram showing a second example of the syntax of the header of attribute information according to Embodiment 9;

FIG. 128 is a diagram showing a relationship between SPS, APS, and the header of attribute information according to Embodiment 9;

FIG. 129 is a flowchart of an encoding process according to Embodiment 9; and

FIG. 130 is a flowchart of a decoding process according to Embodiment 9.

DETAILED DESCRIPTION OF THE EMBODIMENTS

Figure 1:
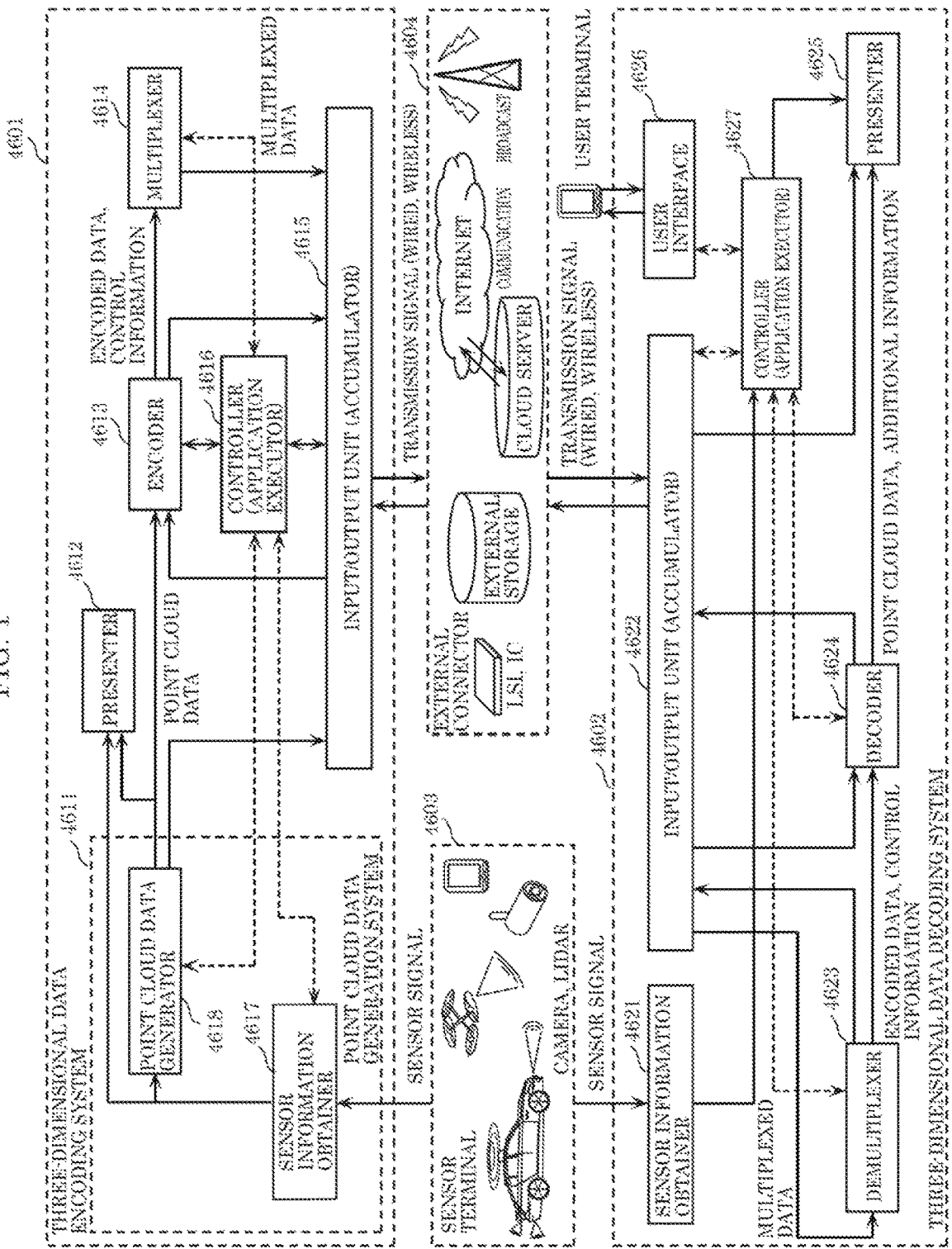
FIG. 1 is a diagram illustrating a configuration of a three-dimensional data encoding and decoding system according to Embodiment 1.

A three-dimensional data encoding method according to one aspect of the present disclosure includes: encoding pieces of attribute information of respective three-dimensional points, using parameters; and generating a bitstream including the pieces of attribute information encoded, control information, and pieces of first attribute control information. The control information corresponds to the pieces of attribute information and includes pieces of type information each indicating a type of different attribute information, the pieces of first attribute control information correspond one-to-one with the pieces of attribute information, and each of the pieces of first attribute control information includes first identification information indicating that the first attribute control information is associated with one of the pieces of type information.

With such a configuration, since a bitstream including the first identification information for identifying the type of the attribute information to which the first attribute control information corresponds is generated, the three-dimensional data decoding device having received the bitstream can correctly and efficiently decode attribute information on a three-dimensional point.

For example, the pieces of type information may be stored in the control information in a predetermined sequence, and the first identification information may indicate that first attribute control information including the first identification information is associated with one of the pieces of type information that has an order in the predetermined sequence.

With such a configuration, since type information is indicated in a predetermined sequence without information indicating the type information, the amount of data of the bitstream can be reduced, and the amount of the transmitted bitstream can be reduced.

For example, the bitstream may further include pieces of second attribute control information corresponding to the pieces of attribute information, and each of the pieces of second attribute control information may include a reference value of a parameter used for encoding a corresponding one of the pieces of attribute information.

With such a configuration, since each of a plurality of pieces of second attribute control information includes a reference value of a parameter, the attribute information to which the second attribute control information corresponds can be encoded using the reference value.

For example, each of the pieces of first attribute control information may include difference information that is a difference from the reference value of the parameter.

With such a configuration, the coding efficiency can be improved.

For example, the bitstream may further include pieces of second attribute control information corresponding to the pieces of attribute information, and each of the pieces of second attribute control information may include second identification information indicating that the second attribute control information is associated with one of the pieces of type information.

With such a configuration, since a bitstream including the second identification information for identifying the type of the attribute information to which the second attribute control information corresponds is generated, it is possible to generate the bitstream that can correctly and efficiently decode attribute information on a three-dimensional point.

For example, each of the pieces of first attribute control information may include N fields in which N parameters are stored, N being greater than or equal to 2, and in specific first attribute control information among the pieces of first attribute control information, one of the N fields may include a value indicating invalidity, the specific first attribute control information corresponding to a specific type of an attribute.

With such a configuration, since the three-dimensional data decoding device having received the bitstream can identify the type of the first attribute information using the first identification information and omit the decoding process in the case of specific first attribute control information, the three-dimensional data decoding device can correctly and efficiently decode attribute information on a three-dimensional point.

For example, in the encoding, the pieces of attribute information may be quantized using quantization parameters as the parameters.

With such a configuration, since a parameter is expressed using a difference from a reference value, it is possible to improve coding efficiency for quantization.

A three-dimensional data decoding method according to one aspect of the present disclosure includes: obtaining pieces of attribute information encoded and parameters from a bitstream; and decoding the pieces of attribute information encoded using the parameters, to generate pieces of attribute information of respective three-dimensional points. The bitstream includes control information and pieces of first attribute control information, the control information corresponds to the pieces of attribute information and includes pieces of type information each indicating a type of different attribute information, the pieces of first attribute control information correspond one-to-one with the pieces of attribute information, and each of the pieces of first attribute control information includes first identification information indicating that the first attribute control information is associated with one of the pieces of type information.

With such a configuration, since it is possible to identify the type of the attribute information corresponding to the first attribute control information using the first identification information, it is possible to correctly and efficiently decode attribute information on a three-dimensional point.

For example, the pieces of type information may be stored in the control information in a predetermined sequence, and the first identification information may indicate that first attribute control information including the first identification information is associated with one of the pieces of type information that has an order in the predetermined sequence.

With such a configuration, since type information is indicated in a predetermined sequence without information indicating the type information, the amount of data of the bitstream can be reduced, and the amount of the transmitted bitstream can be reduced.

For example, the bitstream may further include pieces of second attribute control information corresponding to the pieces of attribute information, and each of the pieces of second attribute control information may include a reference value of a parameter used for encoding a corresponding one of the pieces of attribute information.

With such a configuration, since it is possible to decode the attribute information corresponding to the second attribute control information using a reference value, it is possible to correctly and efficiently decode attribute information on a three-dimensional point.

For example, each of the pieces of first attribute control information may include difference information that is a difference from the reference value of the parameter.

With such a configuration, since it is possible to decode attribute information using a reference value and difference information, it is possible to correctly and efficiently decode attribute information on a three-dimensional point.

For example, the bitstream may further include pieces of second attribute control information corresponding to the pieces of attribute information, and each of the pieces of second attribute control information may include second identification information indicating that the second attribute control information is associated with one of the pieces of type information.

With such a configuration, since it is possible to identify the type of the attribute information corresponding to the second attribute control information using the second identification information, it is possible to correctly and efficiently decode attribute information on a three-dimensional point.

For example, ach of the pieces of first attribute control information may include fields in which parameters are stored, and in the decoding, a parameter stored in a specific field among the fields of specific first attribute control information among the pieces of first attribute control information may be ignored, the specific first attribute control information corresponding to a specific type of an attribute.

With such a configuration, since it is possible to identify the type of the first attribute information using the first identification information and omit the decoding process in the case of specific first attribute control information, it is possible to correctly and efficiently decode attribute information on a three-dimensional point.

For example, in the decoding, the pieces of attribute information encoded may be inverse quantized using quantization parameters as the parameters.

With such a configuration, it is possible to correctly decode attribute information on a three-dimensional point.

A three-dimensional data encoding device according to one aspect of the present disclosure includes a processor and memory. Using the memory, the processor: encodes pieces of attribute information of respective three-dimensional points, using parameters; and generates a bitstream including the pieces of attribute information encoded, control information, and pieces of first attribute control information. The control information corresponds to the pieces of attribute information and includes pieces of type information each indicating a type of different attribute information, and each of the pieces of first attribute control information includes first identification information indicating that the first attribute control information corresponds to a different one of the pieces of attribute information and is associated with one of the pieces of type information.

With such a configuration, since a bitstream including the first identification information for identifying the type of the attribute information to which the first attribute control information corresponds is generated, it is possible to generate the bitstream that can correctly and efficiently decode attribute information on a three-dimensional point.

A three-dimensional data decoding device according to one aspect of the present disclosure includes a processor and memory. Using the memory, the processor: obtains pieces of attribute information encoded and parameters from a bitstream; and decodes the pieces of attribute information encoded using the parameters, to generate pieces of attribute information of respective three-dimensional points. The bitstream includes control information and pieces of first attribute control information, the control information corresponds to the pieces of attribute information and includes pieces of type information each indicating a type of different attribute information, and each of the pieces of first attribute control information includes first identification information indicating that the first attribute control information corresponds to a different one of the pieces of attribute information and is associated with one of the pieces of type information.

With such a configuration, since it is possible to identify the type of the attribute information corresponding to the first attribute control information using the first identification information, it is possible to correctly and efficiently decode attribute information on a three-dimensional point.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure.

Of the structural components described in the following embodiments, structural components not recited in any one of the independent claims that indicate the broadest concepts will be described as optional structural components.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LIDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
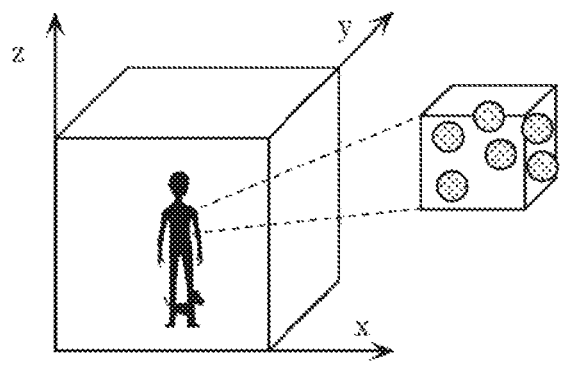
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One piece of attribute information may be associated with one piece of geometry information, or attribute information on a plurality of different types of attributes may be associated with one piece of geometry information. Alternatively, a plurality of pieces of attribute information on the same type of attribute may be associated with one piece of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
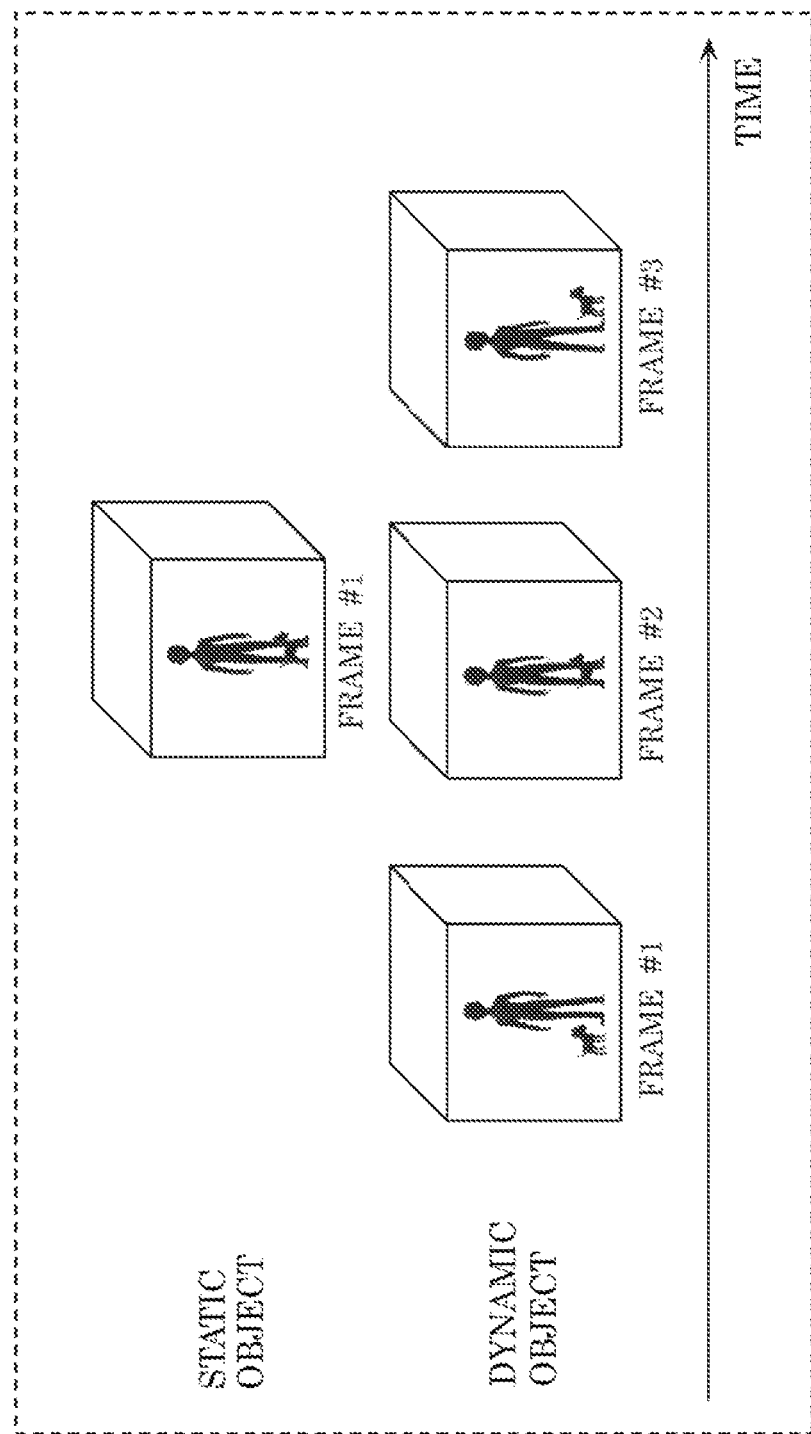
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LIDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
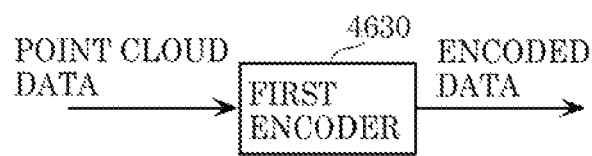
FIG. 5 is a diagram illustrating a structure of a first encoder according to Embodiment 1.
Figure 6:
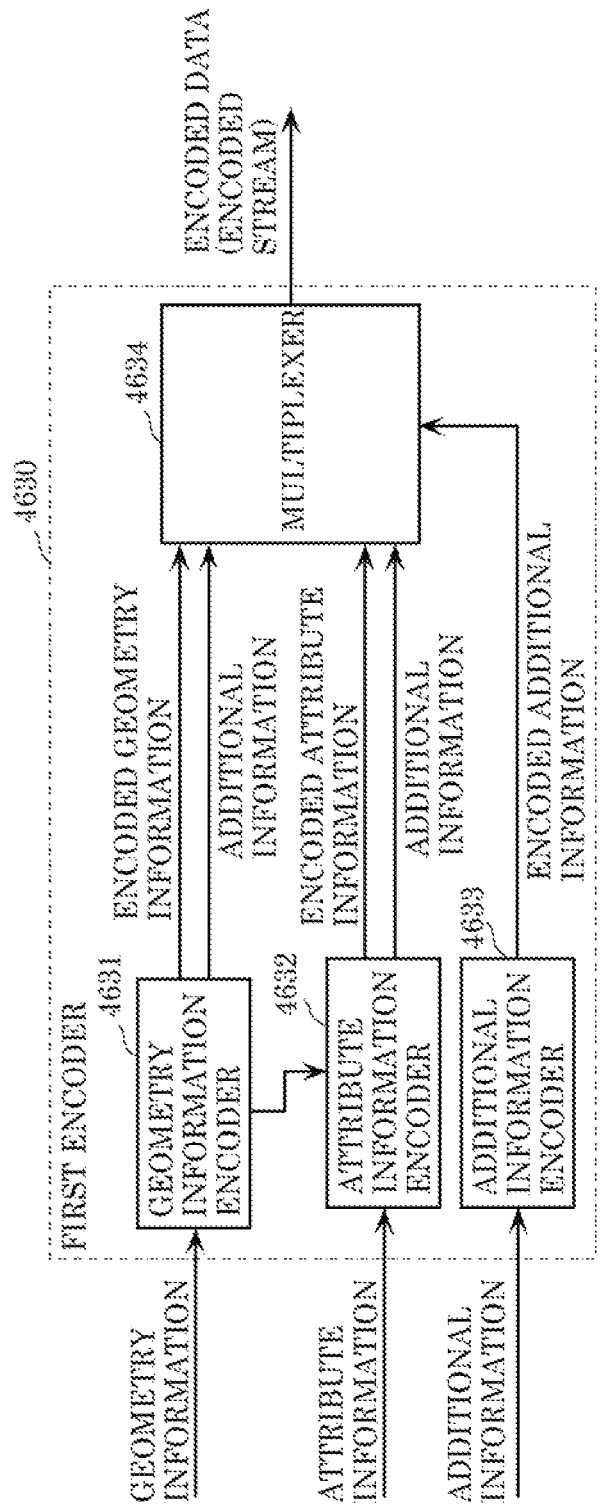
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (current node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
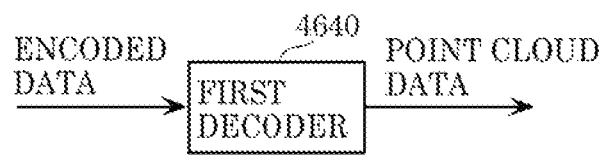
FIG. 7 is a diagram illustrating a structure of a first decoder according to Embodiment 1.
Figure 8:
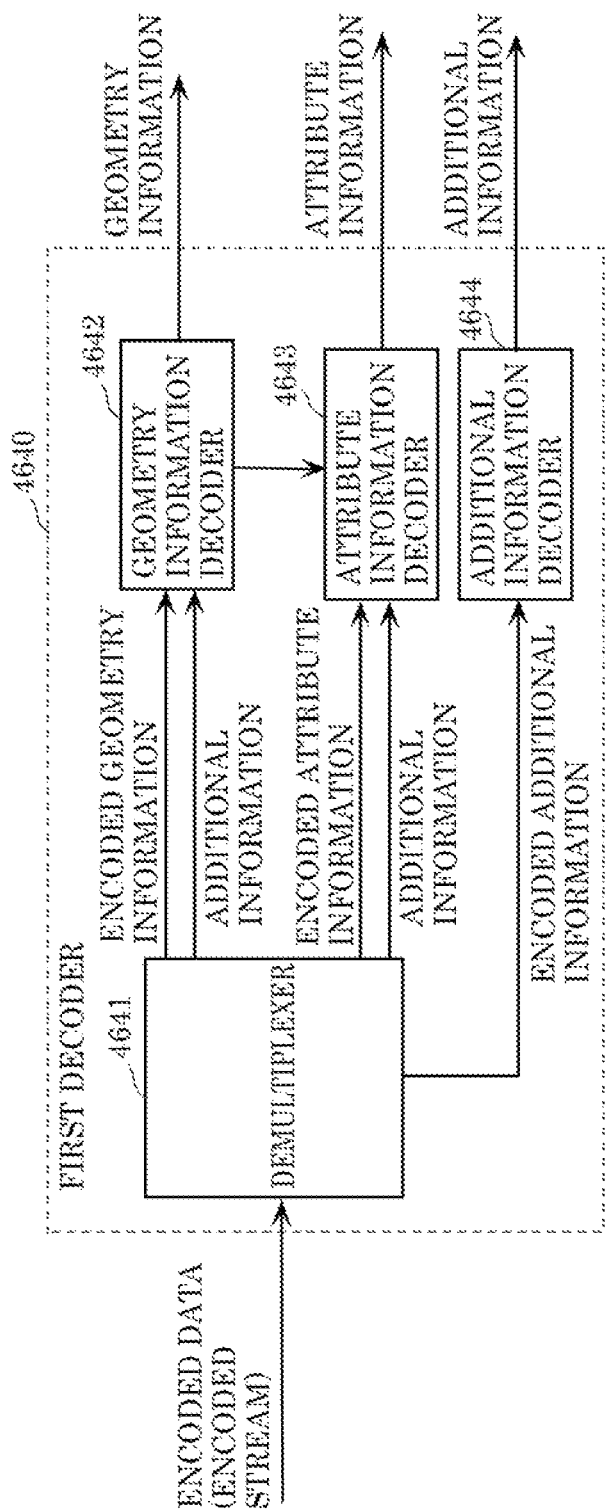
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
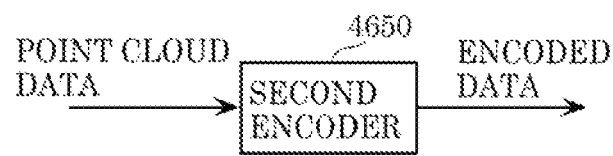
FIG. 9 is a diagram illustrating a structure of a second encoder according to Embodiment 1.
Figure 10:
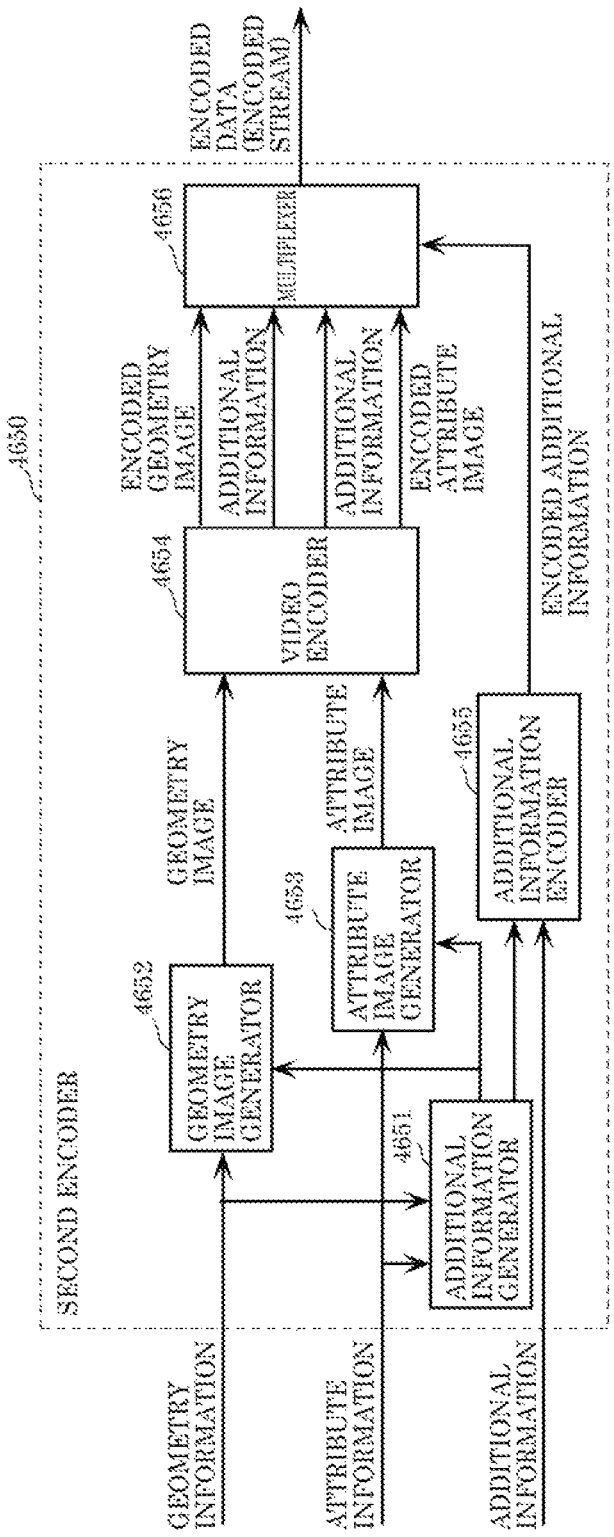
FIG. 10 is a block diagram illustrating the second encoder according to Embodiment 1.

Next, second encoder 4650, which is an example of encoder 4613 that performs encoding in the second encoding method, will be described. FIG. 9 is a diagram showing a configuration of second encoder 4650. FIG. 10 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 11:
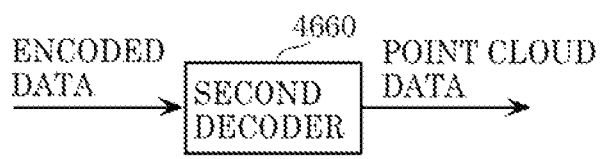
FIG. 11 is a diagram illustrating a structure of a second decoder according to Embodiment 1.
Figure 12:
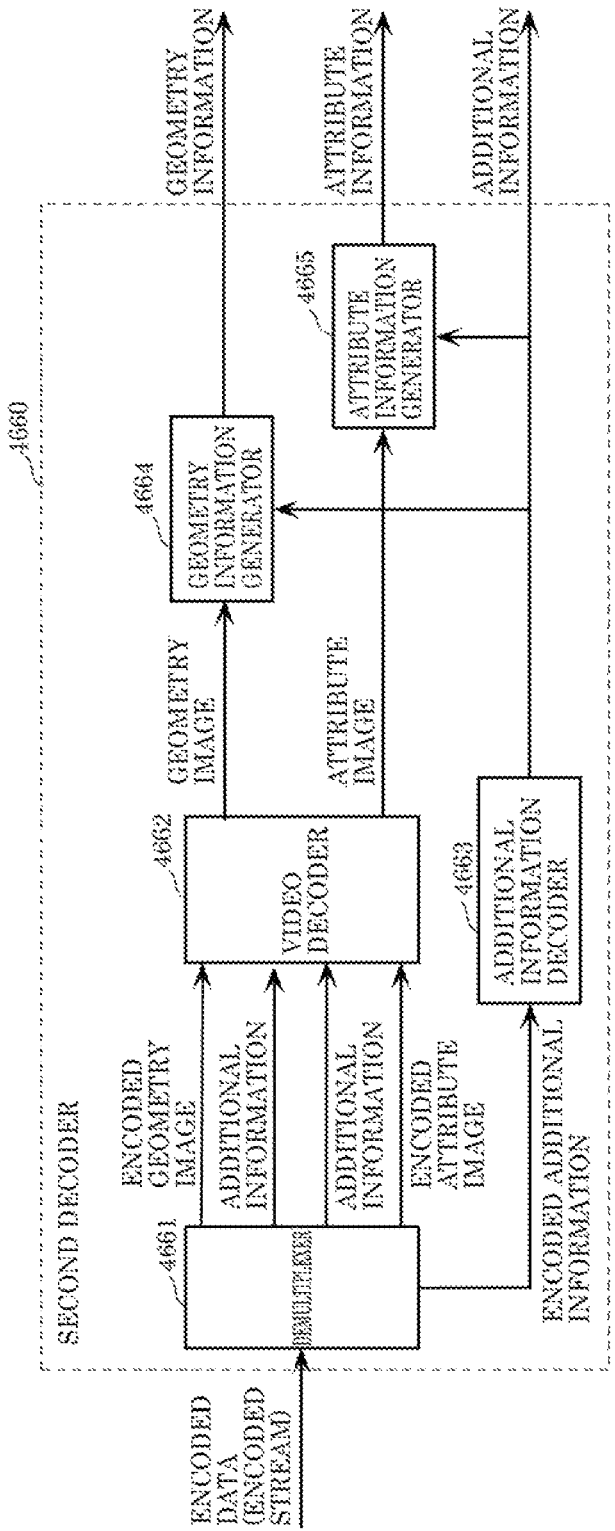
FIG. 12 is a block diagram illustrating the second decoder according to Embodiment 1.

Next, second decoder 4660, which is an example of decoder 4624 that performs decoding in the second encoding method, will be described. FIG. 11 is a diagram showing a configuration of second decoder 4660. FIG. 12 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 13:
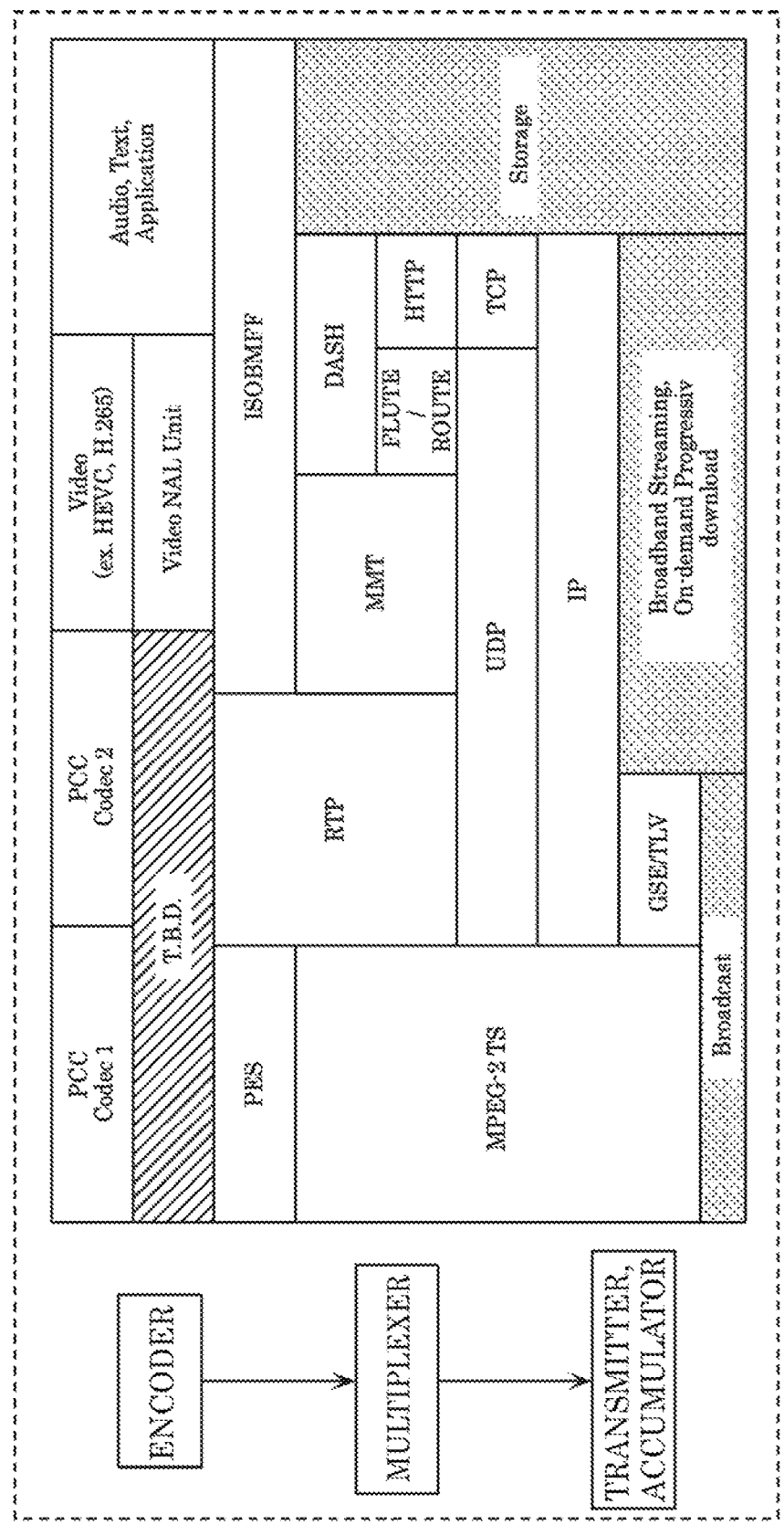
FIG. 13 is a diagram illustrating a protocol stack related to PCC encoded data according to Embodiment 1.

In the following, a problem with the PCC encoding scheme will be described. FIG. 13 is a diagram showing a protocol stack relating to PCC-encoded data. FIG. 13 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

In the following, a way of defining a NAL unit according to this embodiment will be described. For example, with a conventional codec, such as HEVC, a NAL unit in one format is defined for one codec. However, there has been no method that supports a format that involves two codecs, that is, the first encoding method and the second encoding method, such as PCC (such a codec will be referred to as a PCC codec, hereinafter).

First, encoder 4670 having the functions of both first encoder 4630 and second encoder 4650 described above and decoder 4680 having the functions of both first decoder 4640 and second decoder 4660 described above will be described.

Figure 14:
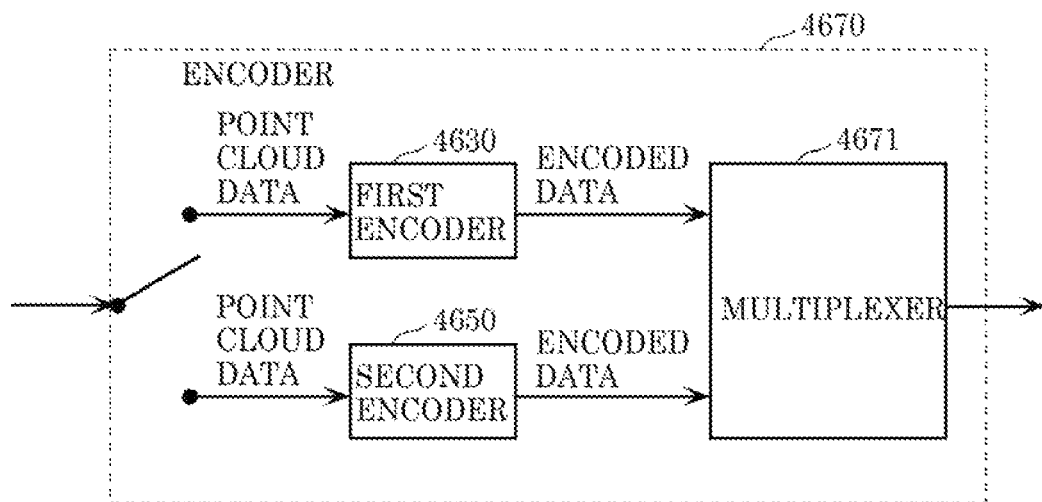
FIG. 14 is a block diagram of an encoder according to Embodiment 1.

FIG. 14 is a block diagram showing encoder 4670 according to this embodiment. Encoder 4670 includes first encoder 4630 and second encoder 4650 described above and multiplexer 4671. Multiplexer 4671 multiplexes encoded data generated by first encoder 4630 and encoded data generated by second encoder 4650, and outputs the resulting encoded data.

Figure 15:
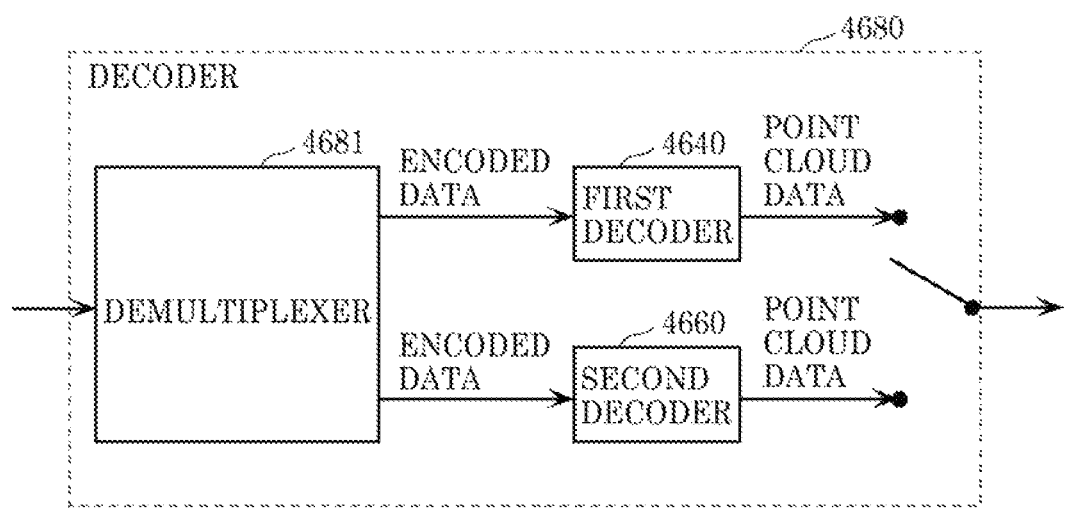
FIG. 15 is a block diagram of a decoder according to Embodiment 1.

FIG. 15 is a block diagram showing decoder 4680 according to this embodiment. Decoder 4680 includes first decoder 4640 and second decoder 4660 described above and demultiplexer 4681. Demultiplexer 4681 extracts encoded data generated using the first encoding method and encoded data generated using second encoding method from the input encoded data. Demultiplexer 4681 outputs the encoded data generated using the first encoding method to first decoder 4640, and outputs the encoded data generated using the second encoding method to second decoder 4660.

With the configuration described above, encoder 4670 can encode point cloud data by selectively using the first encoding method or the second encoding method. Decoder 4680 can decode encoded data encoded using the first encoding method, encoded data using the second encoding method, and encoded data encoded using both the first encoding method and the second encoding method.

For example, encoder 4670 may change the encoding method (between the first encoding method and the second encoding method) on a point-cloud-data basis or on a frame basis. Alternatively, encoder 4670 may change the encoding method on the basis of an encodable unit.

For example, encoder 4670 generates encoded data (encoded stream) including the identification information for a PCC codec.

Demultiplexer 4681 in decoder 4680 identifies data using the identification information for a PCC codec, for example. When the data is data encoded in the first encoding method, demultiplexer 4681 outputs the data to first decoder 4640. When the data is data encoded in the second encoding method, demultiplexer 4681 outputs the data to second decoder 4660.

Encoder 4670 may transmit, as the control information, information indicating whether both the encoding methods are used or any one of the encoding methods is used, in addition to the identification information for the PCC codec.

Figure 16:
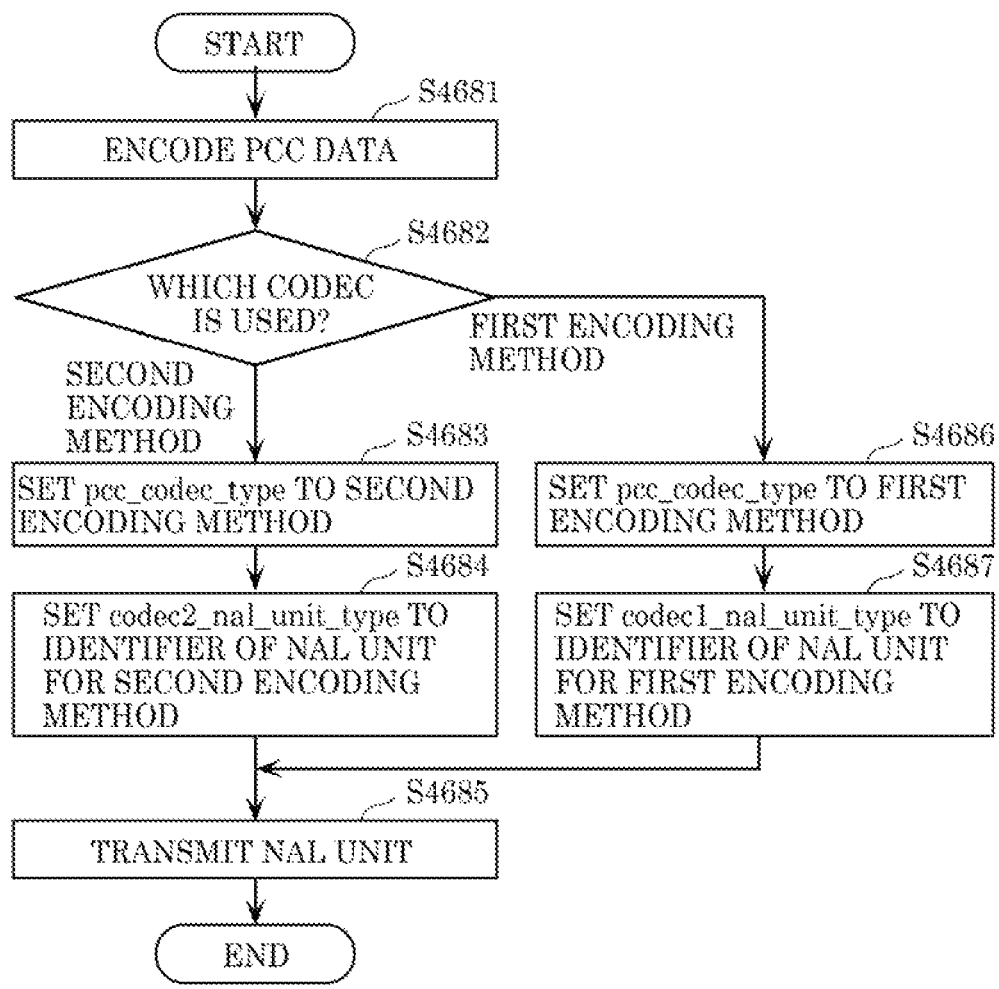
FIG. 16 is a flowchart of encoding processing according to Embodiment 1.

Next, an encoding process according to this embodiment will be described. FIG. 16 is a flowchart showing an encoding process according to this embodiment. Using the identification information for a PCC codec allows an encoding process ready for a plurality of codecs.

First, encoder 4670 encodes PCC data in both or one of the codecs, that is, the first encoding method and the second encoding method (S4681).

When the codec used is the second encoding method (if "second encoding method" in S4682), encoder 4670 sets pec_codec_type in the NAL unit header to a value that indicates that data included in the payload of the NAL unit is data encoded in the second encoding method (S4683). Encoder 4670 then sets pcc_nal_unit_type in the NAL unit header to the identifier of the NAL unit for the second encoding method (S4684). Encoder 4670 then generates a NAL unit having the set NAL unit header and including the encoded data in the payload. Encoder 4670 then transmits the generated NAL unit (S4685).

On the other hand, when the codec used is the first encoding method (if "first encoding method" in S4682), encoder 4670 sets pcc_codec_type in the NAL unit header to a value that indicates that data included in the payload of the NAL unit is data encoded in the first encoding method (S4686). Encoder 4670 then sets pcc_nal_unit_type in the NAL unit header to the identifier of the NAL unit for the first encoding method (S4687). Encoder 4670 then generates a NAL unit having the set NAL unit header and including the encoded data in the payload. Encoder 4670 then transmits the generated NAL unit (S4685).

Figure 17:
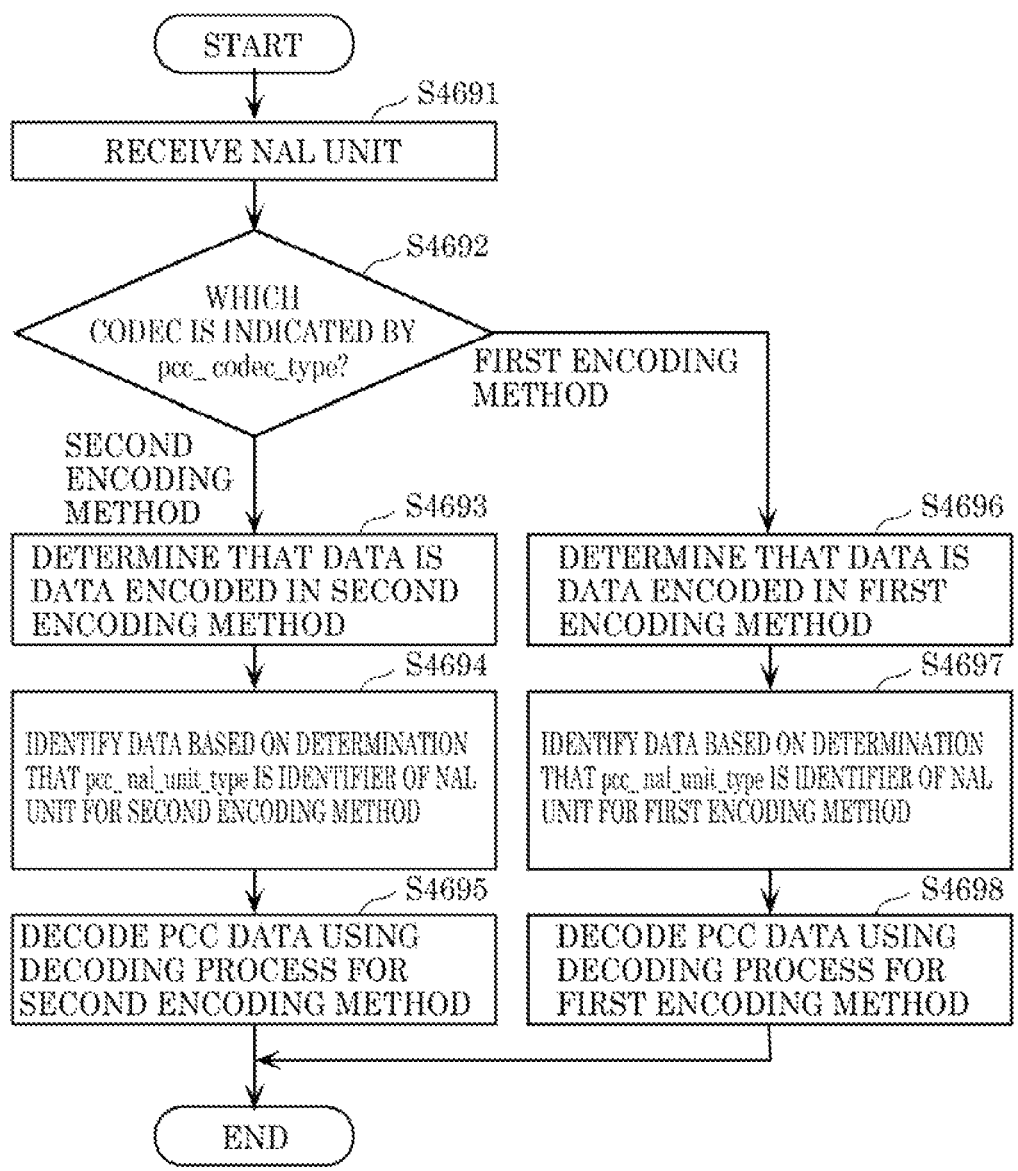
FIG. 17 is a flowchart of decoding processing according to Embodiment 1.

Next, a decoding process according to this embodiment will be described. FIG. 17 is a flowchart showing a decoding process according to this embodiment. Using the identification information for a PCC codec allows a decoding process ready for a plurality of codecs.

First, decoder 4680 receives a NAL unit (S4691). For example, the NAL unit is the NAL unit generated in the process by encoder 4670 described above. Decoder 4680 then determines whether pcc_codec_type in the NAL unit header indicates the first encoding method or the second encoding method (S4692).

When pec_codec_type indicates the second encoding method (if "second encoding method" in S4692), decoder 4680 determines that the data included in the payload of the NAL unit is data encoded in the second encoding method (S4693). Decoder 4680 then identifies the data based on the determination that pcc_nal_unit_type in the NAL unit header is the identifier of the NAL unit for the second encoding method (S4694). Decoder 4680 then decodes the PCC data in a decoding process for the second encoding method (S4695).

On the other hand, when pcc_codec_type indicates the first encoding method (if "first encoding method" in S4692), decoder 4680 determines that the data included in the payload of the NAL unit is data encoded in the first encoding method (S4696). Decoder 4680 then identifies the data based on the determination that pcc_nal_unit_type in the NAL unit header is the identifier of the NAL unit for the first encoding method (S4697). Decoder 4680 then decodes the PCC data in a decoding process for the first encoding method (S4698).

As described above, the three-dimensional data encoding device according to an aspect of the present disclosure generates an encoded stream by encoding three-dimensional data (point cloud data, for example), and stores information indicating the encoding method used for the encoding among the first encoding method and the second encoding method (identification information for the codec, for example) in the control information (a parameter set, for example) for the encoded stream.

With such a configuration, the three-dimensional data decoding device can determine the encoding method used for the encoding from the information stored in the control information, when decoding the encoded stream generated by the three-dimensional data encoding device. Therefore, the three-dimensional data decoding device can correctly decode the encoded stream even when a plurality of encoding methods are used.

The three-dimensional data includes geometry information, for example. In the encoding described above, the three-dimensional data encoding device encodes the geometry information. In the storage described above, the three-dimensional data encoding device stores the information indicating the encoding method used for the encoding of the geometry information among the first encoding method and the second encoding method in the control information for the geometry information.

The three-dimensional data includes geometry information and attribute information, for example. In the encoding described above, the three-dimensional data encoding device encodes the geometry information and the attribute information. In the storage described above, the three-dimensional data encoding device stores the information indicating the encoding method used for the encoding of the geometry information among the first encoding method and the second encoding method in the control information for the geometry information, and stores the information indicating the encoding method used for the encoding of the attribute information among the first encoding method and the second encoding method in the control information for the attribute information.

With such a configuration, different encoding methods can be used for the geometry information and the attribute information, and therefore, the coding efficiency can be improved.

For example, the three-dimensional data encoding method further includes storing the encoded stream in one or more units (NAL units, for example).

For example, the unit includes information (pcc_nal_unit_type, for example) indicating the type of data included in the unit that has a format that is common to the first encoding method and the second encoding method and is independently defined for the first encoding method and the second encoding method.

For example, the unit includes information (codec1_nal_unit_type or codec2_nal_unit_type, for example) indicating the type of data included in the unit that has different formats for the first encoding method and the second encoding method and is independently defined for the first encoding method and the second encoding method.

For example, the unit includes information (pcc_nal_unit_type, for example) indicating the type of data included in the unit that has a format that is common to the first encoding method and the second encoding method and is commonly defined for the first encoding method and the second encoding method.

For example, the three-dimensional data encoding device includes a processor and a memory, and the processor performs the processes described above using the memory.

The three-dimensional data decoding device according to this embodiment determines the encoding method used for encoding of an encoded stream obtained by encoding of three-dimensional data based on the information indicating the encoding method used for the encoding of the three-dimensional data among the first encoding method and the second encoding method (identification information for the codec, for example) included in the control information (a parameter set, for example) for the encoded stream, and decodes the encoded stream using the determined encoding method.

With such a configuration, the three-dimensional data decoding device can determine the encoding method used for the encoding from the information stored in the control information, when decoding the encoded stream. Therefore, the three-dimensional data decoding device can correctly decode the encoded stream even when a plurality of encoding methods are used.

The three-dimensional data includes geometry information, and the encoded stream includes encoded data of the geometry information, for example. In the determination described above, the three-dimensional data decoding device determines the encoding method used for the encoding of the geometry information based on the information indicating the encoding method used for the encoding of the geometry information among the first encoding method and the second encoding method included in the control information for the geometry information included in the encoded stream. In the decoding described above, the three-dimensional data decoding device decodes the encoded data of the geometry information using the determined encoding method used for the encoding of the geometry information.

The three-dimensional data includes geometry information and attribute information, and the encoded stream includes encoded data of the geometry information and encoded data of the attribute information, for example. In the determination described above, the three-dimensional data decoding device determines the encoding method used for the encoding of the geometry information based on the information indicating the encoding method used for the encoding of the geometry information among the first encoding method and the second encoding method included in the control information for the geometry information included in the encoded stream, and determines the encoding method used for the encoding of the attribute information based on the information indicating the encoding method used for the encoding of the attribute information among the first encoding method and the second encoding method included in the control information for the attribute information included in the encoded stream. In the decoding described above, the three-dimensional data decoding device decodes the encoded data of the geometry information using the determined encoding method used for the encoding of the geometry information, and decodes the encoded data of the attribute information using the determined encoding method used for the encoding of the attribute information.

With such a configuration, different encoding methods can be used for the geometry information and the attribute information, and therefore, the coding efficiency can be improved.

For example, the encoded stream is stored in one or more units (NAL units, for example), and the three-dimensional data decoding device further obtains the encoded stream from the one or more units.

For example, the unit includes information (pcc_nal_unit_type, for example) indicating the type of data included in the unit that has a format that is common to the first encoding method and the second encoding method and is independently defined for the first encoding method and the second encoding method.

For example, the unit includes information (codec1_nal_unit_type or codec2_nal_unit_type, for example) indicating the type of data included in the unit that has different formats for the first encoding method and the second encoding method and is independently defined for the first encoding method and the second encoding method.

For example, the unit includes information (pcc_nal_unit_type, for example) indicating the type of data included in the unit that has a format that is common to the first encoding method and the second encoding method and is commonly defined for the first encoding method and the second encoding method.

For example, the three-dimensional data decoding device includes a processor and a memory, and the processor performs the processes described above using the memory.

Embodiment 2

In Embodiment 2, a method of storing the NAL unit in an ISOBMFF file will be described.

ISOBMFF is a file format standard prescribed in ISO/IEC14496-12. ISOBMFF is a standard that does not depend on any medium, and prescribes a format that allows various media, such as a video, an audio, and a text, to be multiplexed and stored.

A basic structure (file) of ISOBMFF will be described. A basic unit of ISOBMFF is a box. A box is formed by type, length, and data, and a file is a set of various types of boxes.

Figures 18, 19:
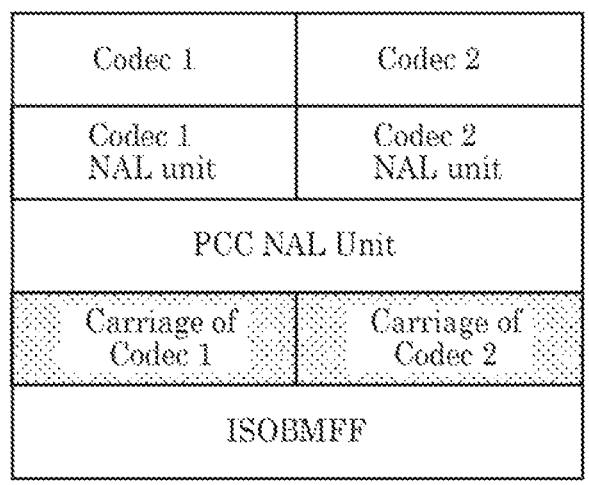
FIG. 18 is a diagram illustrating a basic structure of ISOBMFF according to Embodiment 2.
FIG. 19 is a diagram illustrating a protocol stack according to Embodiment 2.

FIG. 18 is a diagram showing a basic structure (file) of ISOBMFF. A file in ISOBMFF includes boxes, such as ftyp that indicates the brand of the file by four-character code (4CC), moov that stores metadata, such as control information (signaling information), and mdat that stores data.

A method for storing each medium in the ISOBMFF file is separately prescribed. For example, a method of storing an AVC video or an HEVC video is prescribed in ISO/IEC14496-15. Here, it can be contemplated to expand the functionality of ISOBMFF and use ISOBMFF to accumulate or transmit PCC-encoded data. However, there has been no convention for storing PCC-encoded data in an ISOBMFF file. In this embodiment, a method of storing PCC-encoded data in an ISOBMFF file will be described.

FIG. 19 is a diagram showing a protocol stack in a case where a common PCC codec NAL unit in an ISOBMFF file. Here, a common PCC codec NAL unit is stored in an ISOBMFF file. Although the NAL unit is common to PCC codecs, a storage method for each codec (Carriage of Codec1, Carriage of Codec2) is desirably prescribed, since a plurality of PCC codecs are stored in the NAL unit.

Figure 20:
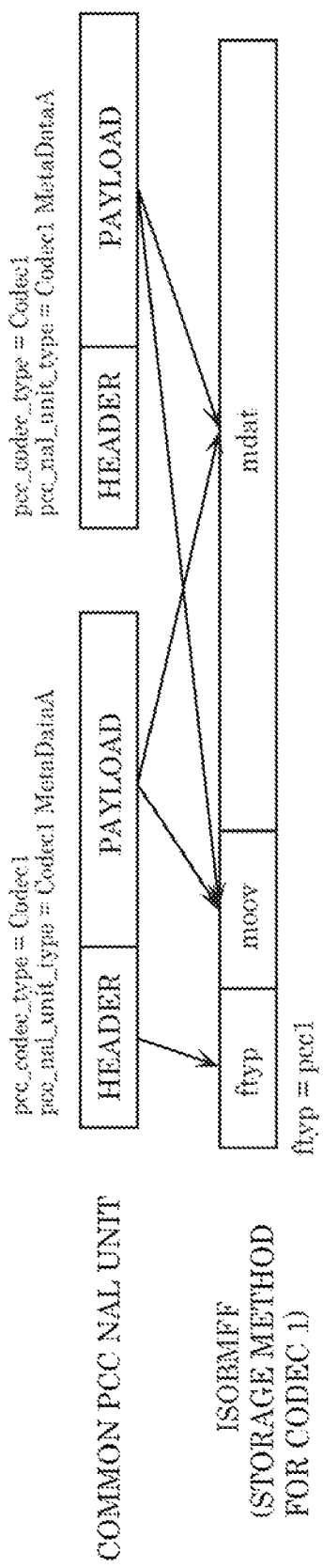
FIG. 20 is a diagram illustrating an example where a NAL unit is stored in a file for codec 1 according to Embodiment 2.
Figure 21:
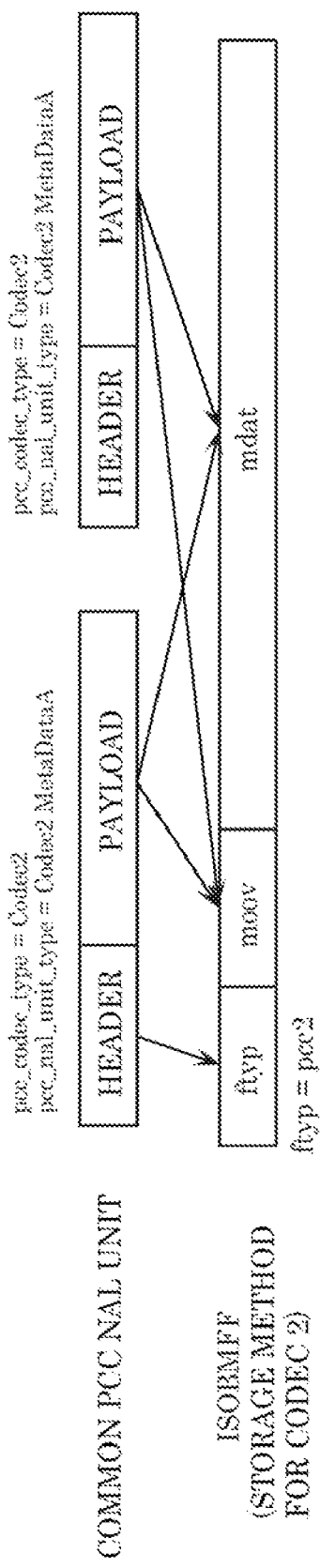
FIG. 21 is a diagram illustrating an example where a NAL unit is stored in a file for codec 2 according to Embodiment 2.

Next, a method of storing a common PCC NAL unit that supports a plurality of PCC codecs in an ISOBMFF file will be described. FIG. 20 is a diagram showing an example in which a common PCC NAL unit is stored in an ISOBMFF file for the storage method for codec 1 (Carriage of Codec1). FIG. 21 is a diagram showing an example in which a common PCC NAL unit is stored in an ISOBMFF file for the storage method for codec 2 (Carriage of Codec2).

Here, ftyp is information that is important for identification of the file format, and a different identifier of ftyp is defined for each codec. When PCC-encoded data encoded in the first encoding method (encoding scheme) is stored in the file, ftyp is set to pcc1. When PCC-encoded data encoded in the second encoding method is stored in the file, ftyp is set to pcc2.

Here, pcc1 indicates that PCC codec 1 (first encoding method) is used. pcc2 indicates that PCC codec2 (second encoding method) is used. That is, pcc1 and pcc2 indicate that the data is PCC (encoded three-dimensional data (point cloud data)), and indicate the PCC codec (first encoding method or second encoding method).

In the following, a method of storing a NAL unit in an ISOBMFF file will be described. The multiplexer analyzes the NAL unit header, and describes pcc1 in ftyp of ISOBMFF if pcc_codec_type=Codec1.

The multiplexer analyzes the NAL unit header, and describes pcc2 in ftyp of ISOBMFF if pcc_codec_type=Codec2.

If pcc_nal_unit_type is metadata, the multiplexer stores the NAL unit in moov or mdat in a predetermined manner, for example. If pcc_nal_unit_type is data, the multiplexer stores the NAL unit in moov or mdat in a predetermined manner, for example.

For example, the multiplexer may store the NAL unit size in the NAL unit, as with HEVC.

According to this storage method, the demultiplexer (a system layer) can determine whether the PCC-encoded data is encoded in the first encoding method or the second encoding method by analyzing ftyp included in the file. Furthermore, as described above, by determining whether the PCC-encoded data is encoded in the first encoding method or the second encoding method, the encoded data encoded in any one of the encoding methods can be extracted from the data including both the encoded data encoded in the encoding methods. Therefore, when transmitting the encoded data, the amount of data transmitted can be reduced. In addition, according to this storage method, different data (file) formats do not need to be set for the first encoding method and the second encoding method, and a common data format can be used for the first encoding method and the second encoding method.

Note that, when the identification information for the codec, such as ftyp of ISOBMFF, is indicated in the metadata of the system layer, the multiplexer can store a NAL unit without pcc_nal_unit_type in the ISOBMFF file.

Next, configurations and operations of the multiplexer of the three-dimensional data encoding system (three-dimensional data encoding device) according to this embodiment and the demultiplexer of the three-dimensional data decoding system (three-dimensional data decoding device) according to this embodiment will be described.

Figure 22:
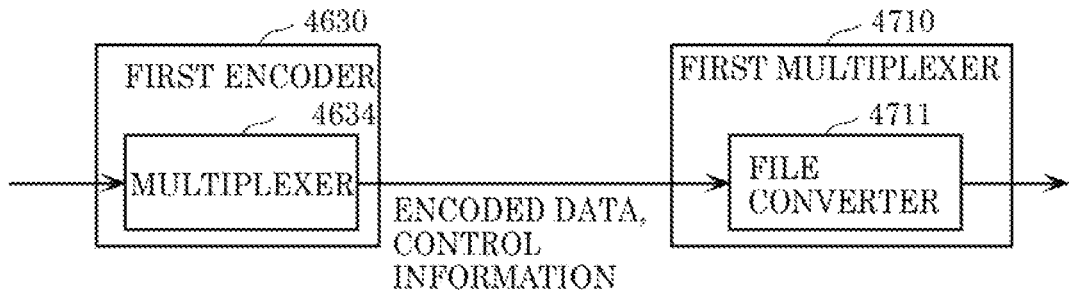
FIG. 22 is a diagram illustrating a structure of a first multiplexer according to Embodiment 2.

FIG. 22 is a diagram showing a configuration of first multiplexer 4710. First multiplexer 4710 includes file converter 4711 that generates multiplexed data (file) by storing encoded data generated by first encoder 4630 and control information (NAL unit) in an ISOBMFF file. First multiplexer 4710 is included in multiplexer 4614 shown in FIG. 1, for example.

Figure 23:
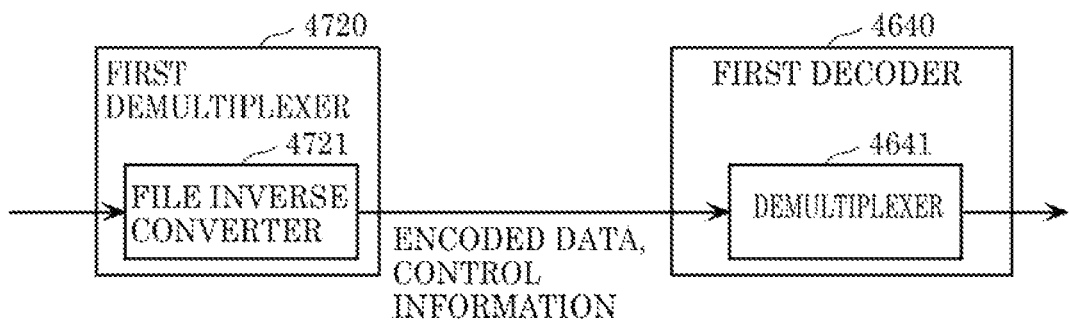
FIG. 23 is a diagram illustrating a structure of a first demultiplexer according to Embodiment 2.

FIG. 23 is a diagram showing a configuration of first demultiplexer 4720. First demultiplexer 4720 includes file inverse converter 4721 that obtains encoded data and control information (NAL unit) from multiplexed data (file) and outputs the obtained encoded data and control information to first decoder 4640. First demultiplexer 4720 is included in demultiplexer 4623 shown in FIG. 1, for example.

Figure 24:
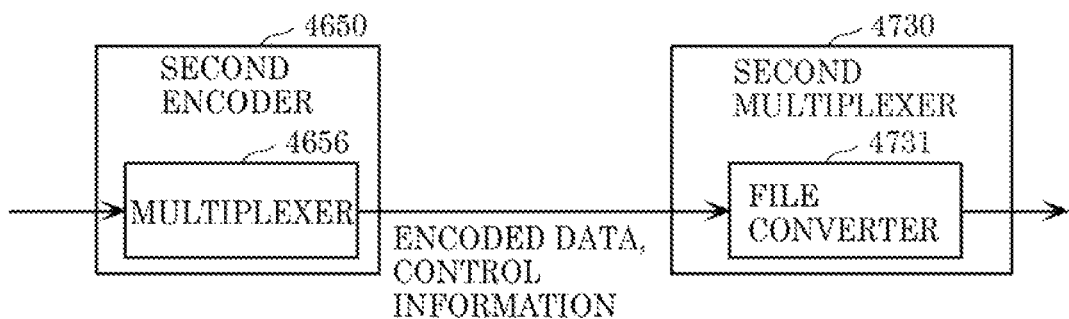
FIG. 24 is a diagram illustrating a structure of a second multiplexer according to Embodiment 2.

FIG. 24 is a diagram showing a configuration of second multiplexer 4730. Second multiplexer 4730 includes file converter 4731 that generates multiplexed data (file) by storing encoded data generated by second encoder 4650 and control information (NAL unit) in an ISOBMFF file. Second multiplexer 4730 is included in multiplexer 4614 shown in FIG. 1, for example.

Figure 25:
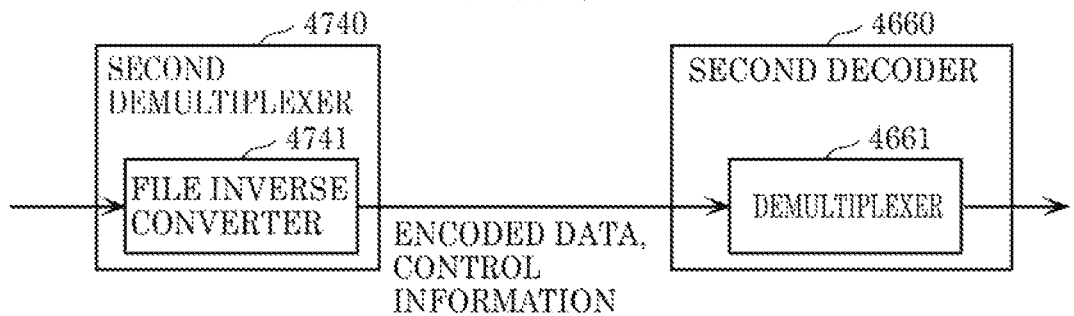
FIG. 25 is a diagram illustrating a structure of a second demultiplexer according to Embodiment 2.

FIG. 25 is a diagram showing a configuration of second demultiplexer 4740. Second demultiplexer 4740 includes file inverse converter 4741 that obtains encoded data and control information (NAL unit) from multiplexed data (file) and outputs the obtained encoded data and control information to second decoder 4660. Second demultiplexer 4740 is included in demultiplexer 4623 shown in FIG. 1, for example.

Figure 26:
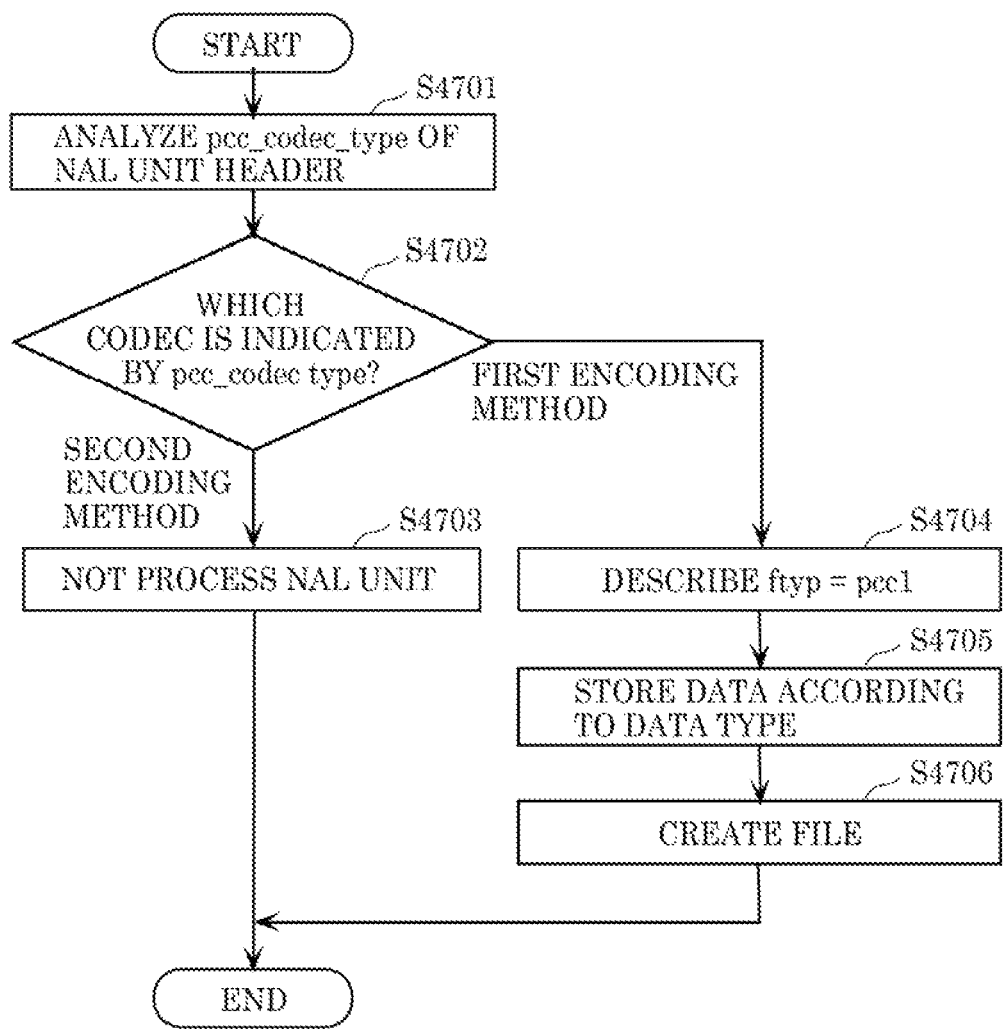
FIG. 26 is a flowchart of processing performed by the first multiplexer according to Embodiment 2.

FIG. 26 is a flowchart showing a multiplexing process by first multiplexer 4710. First, first multiplexer 4710 analyzes pec_codec_type in the NAL unit header, thereby determining whether the codec used is the first encoding method or the second encoding method (S4701).

When pec_codec_type represents the second encoding method (if "second encoding method" in S4702), first multiplexer 4710 does not process the NAL unit (54703).

On the other hand, when pcc_codec_type represents the first encoding method (if "first encoding method" in S4702), first multiplexer 4710 describes pcc1 in ftyp (54704). That is, first multiplexer 4710 describes information indicating that data encoded in the first encoding method is stored in the file in ftyp.

First multiplexer 4710 then analyzes pcc_nal_unit_type in the NAL unit header, and stores the data in a box (moov or mdat, for example) in a predetermined manner suitable for the data type represented by pcc_nal_unit_type (54705). First multiplexer 4710 then creates an ISOBMFF file including the ftyp described above and the box described above (S4706).

Figure 27:
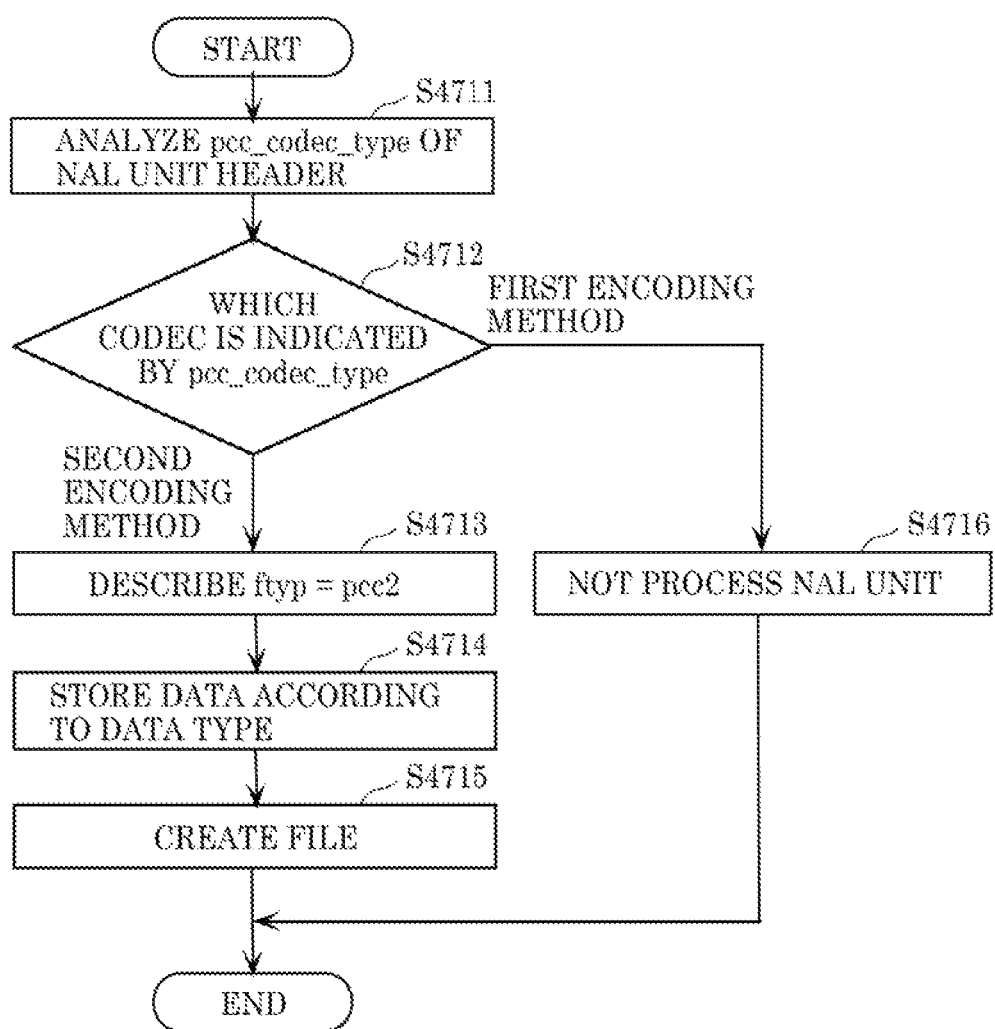
FIG. 27 is a flowchart of processing performed by the second multiplexer according to Embodiment 2.

FIG. 27 is a flowchart showing a multiplexing process by second multiplexer 4730. First, second multiplexer 4730 analyzes pcc_codec_type in the NAL unit header, thereby determining whether the codec used is the first encoding method or the second encoding method (S4711).

When pcc_codec_type represents the second encoding method (if "second encoding method" in S4712), second multiplexer 4730 describes pcc2 in ftyp (S4713). That is, second multiplexer 4730 describes information indicating that data encoded in the second encoding method is stored in the file in ftyp.

Second multiplexer 4730 then analyzes pcc_nal_unit_type in the NAL unit header, and stores the data in a box (moov or mdat, for example) in a predetermined manner suitable for the data type represented by pcc_nal_unit_type (S4714). Second multiplexer 4730 then creates an ISOBMFF file including the ftyp described above and the box described above (S4715).

On the other hand, when pec_codec_type represents the first encoding method (if "first encoding method" in S4712), second multiplexer 4730 does not process the NAL unit (S4716).

Note that the process described above is an example in which PCC data is encoded in any one of the first encoding method and the second encoding method. First multiplexer 4710 and second multiplexer 4730 store a desired NAL unit in a file by identifying the codec type of the NAL unit. Note that, when the identification information for the PCC codec is included in a location other than the NAL unit header, first multiplexer 4710 and second multiplexer 4730 may identify the codec type (first encoding method or second encoding method) based on the identification information for the PCC codec included in the location other than the NAL unit header in step S4701 or S4711.

When storing data in a file in step S4706 or S4714, first multiplexer 4710 and second multiplexer 4730 may store the data in the file after deleting pcc_nal_unit_type from the NAL unit header.

Figure 28:
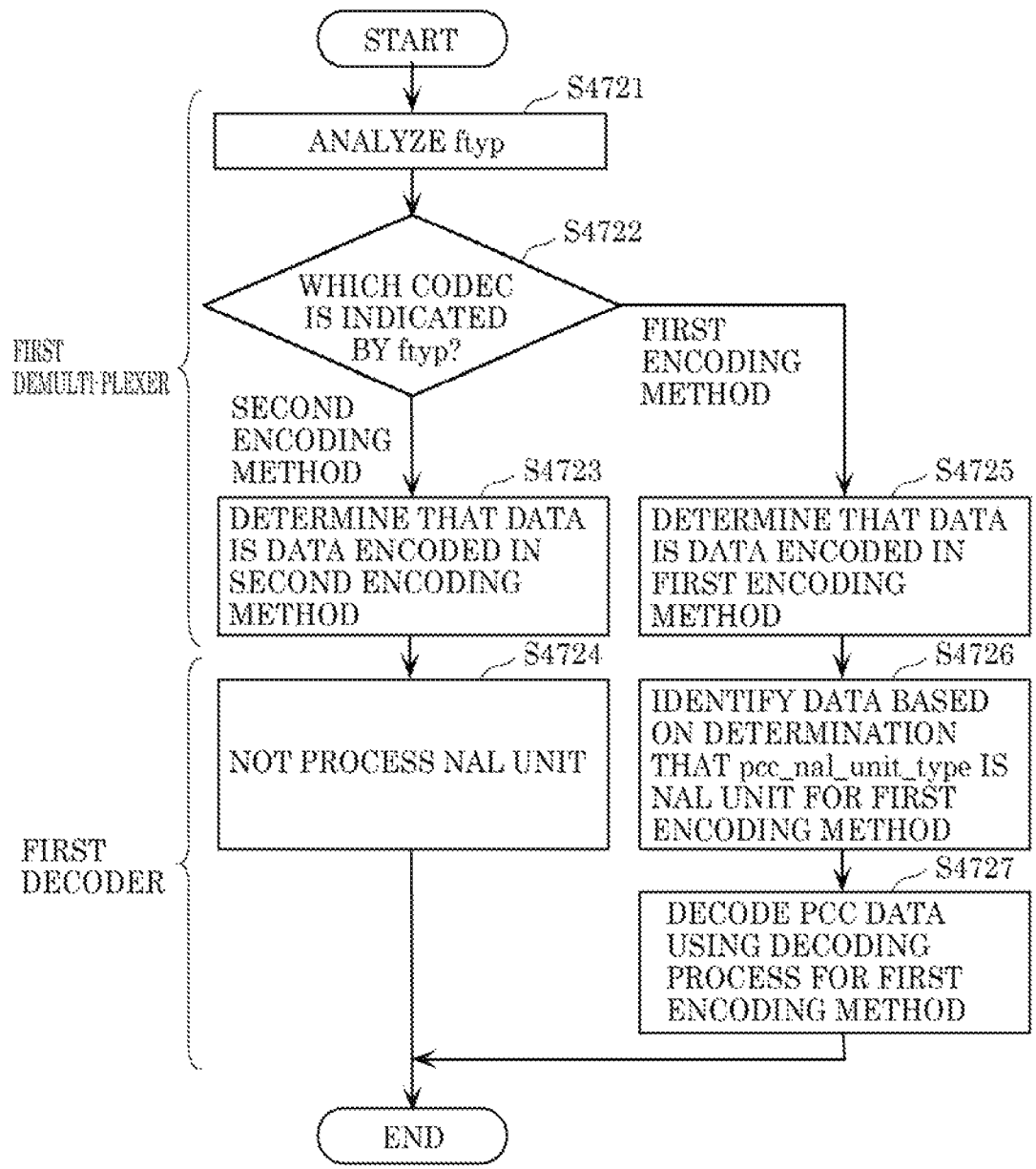
FIG. 28 is a flowchart of processing performed by the first demultiplexer and the first decoder according to Embodiment 2.

FIG. 28 is a flowchart showing a process performed by first demultiplexer 4720 and first decoder 4640. First, first demultiplexer 4720 analyzes ftyp in an ISOBMFF file (S4721). When the codec represented by ftyp is the second encoding method (pcc2) (if "second encoding method" in S4722), first demultiplexer 4720 determines that the data included in the payload of the NAL unit is data encoded in the second encoding method (S4723). First demultiplexer 4720 also transmits the result of the determination to first decoder 4640. First decoder 4640 does not process the NAL unit (S4724).

On the other hand, when the codec represented by ftyp is the first encoding method (pcc1) (if "first encoding method" in S4722), first demultiplexer 4720 determines that the data included in the payload of the NAL unit is data encoded in the first encoding method (S4725). First demultiplexer 4720 also transmits the result of the determination to first decoder 4640.

First decoder 4640 identifies the data based on the determination that pcc_nal_unit_type in the NAL unit header is the identifier of the NAL unit for the first encoding method (S4726). First decoder 4640 then decodes the PCC data using a decoding process for the first encoding method (S4727).

Figure 29:
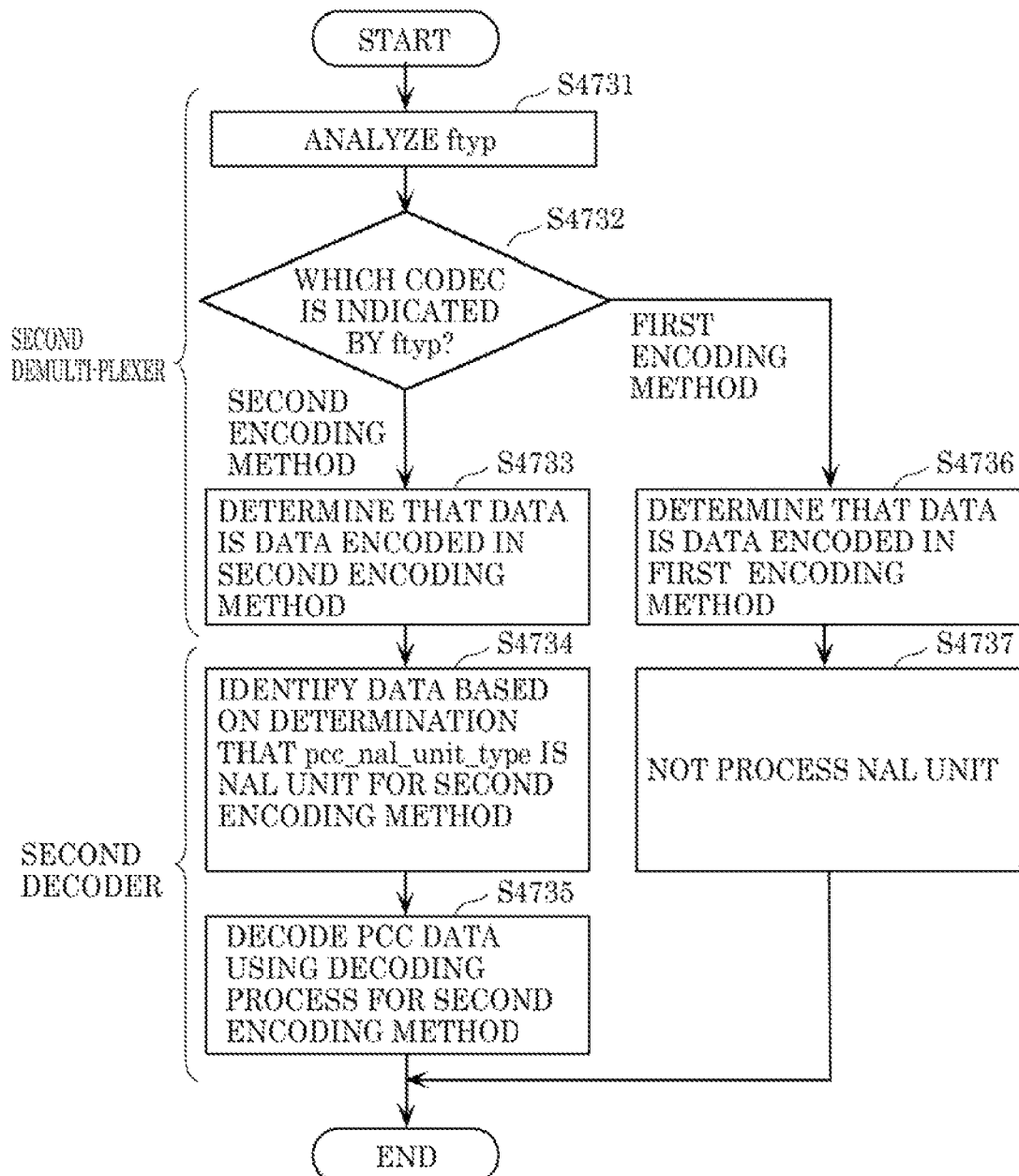
FIG. 29 is a flowchart of processing performed by the second demultiplexer and the second decoder according to Embodiment 2.

FIG. 29 is a flowchart showing a process performed by second demultiplexer 4740 and second decoder 4660. First, second demultiplexer 4740 analyzes ftyp in an ISOBMFF file (S4731). When the codec represented by ftyp is the second encoding method (pcc2) (if "second encoding method" in S4732), second demultiplexer 4740 determines that the data included in the payload of the NAL unit is data encoded in the second encoding method (S4733). Second demultiplexer 4740 also transmits the result of the determination to second decoder 4660.

Second decoder 4660 identifies the data based on the determination that pcc_nal_unit_type in the NAL unit header is the identifier of the NAL unit for the second encoding method (S4734). Second decoder 4660 then decodes the PCC data using a decoding process for the second encoding method (S4735).

On the other hand, when the codec represented by ftyp is the first encoding method (pcc1) (if "first encoding method" in S4732), second demultiplexer 4740 determines that the data included in the payload of the NAL unit is data encoded in the first encoding method (S4736). Second demultiplexer 4740 also transmits the result of the determination to second decoder 4660. Second decoder 4660 does not process the NAL unit (S4737).

As described above, for example, since the codec type of the NAL unit is identified in first demultiplexer 4720 or second demultiplexer 4740, the codec type can be identified in an early stage. Furthermore, a desired NAL unit can be input to first decoder 4640 or second decoder 4660, and an unwanted NAL unit can be removed. In this case, the process of first decoder 4640 or second decoder 4660 analyzing the identification information for the codec may be unnecessary. Note that a process of referring to the NAL unit type again and analyzing the identification information for the codec may be performed by first decoder 4640 or second decoder 4660.

Furthermore, if pcc_nal_unit_type is deleted from the NAL unit header by first multiplexer 4710 or second multiplexer 4730, first demultiplexer 4720 or second demultiplexer 4740 can output the NAL unit to first decoder 4640 or second decoder 4660 after adding pcc_nal_unit_type to the NAL unit.

Embodiment 3

Figure 30:
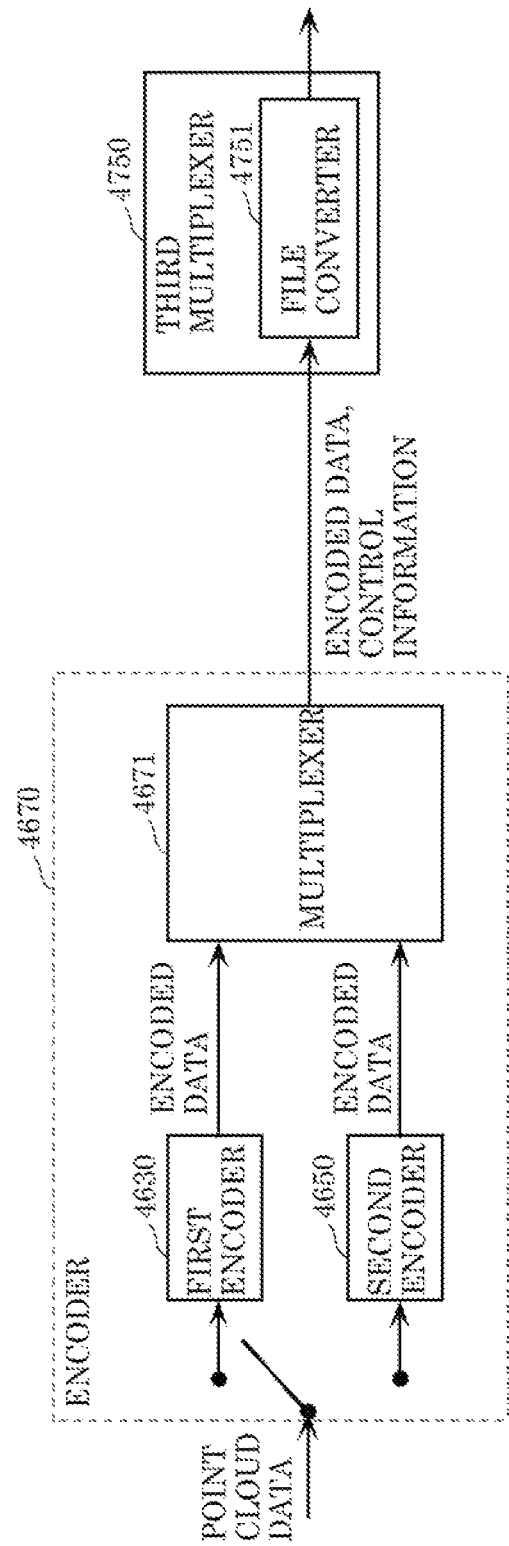
FIG. 30 is a diagram illustrating structures of an encoder and a third multiplexer according to Embodiment 3.

In Embodiment 3, a multiplexer and a demultiplexer that correspond to encoder 4670 and decoder 4680 ready for a plurality of codecs described above with regard to Embodiment 1 will be described. FIG. 30 is a diagram showing configurations of encoder 4670 and third multiplexer 4750 according to this embodiment.

Encoder 4670 encodes point cloud data in both or one of the first encoding method and the second encoding method. Encoder 4670 may change the encoding method (between the first encoding method and the second encoding method) on a point-cloud-data basis or on a frame basis. Alternatively, encoder 4670 may change the encoding method on the basis of an encodable unit.

Encoder 4670 generates encoded data (encoded stream) including the identification information for a PCC codec.

Third multiplexer 4750 includes file converter 4751. File converter 4751 converts a NAL unit output from encoder 4670 into a PCC data file. File converter 4751 analyzes the codec identification information included in the NAL unit header, and determines whether the PCC-encoded data is data encoded in the first encoding method, data encoded in the second encoding method, or data encoded in both the encoding methods. File converter 4751 describes a brand name that allows codec identification in ftyp. For example, when indicating the data is encoded in both the encoding methods, pcc3 is described in ftyp.

Note that, when encoder 4670 describes the PCC codec identification information in a location other than the NAL unit, file converter 4751 may determine the PCC codec (encoding method) based on the identification information.

Figure 31:
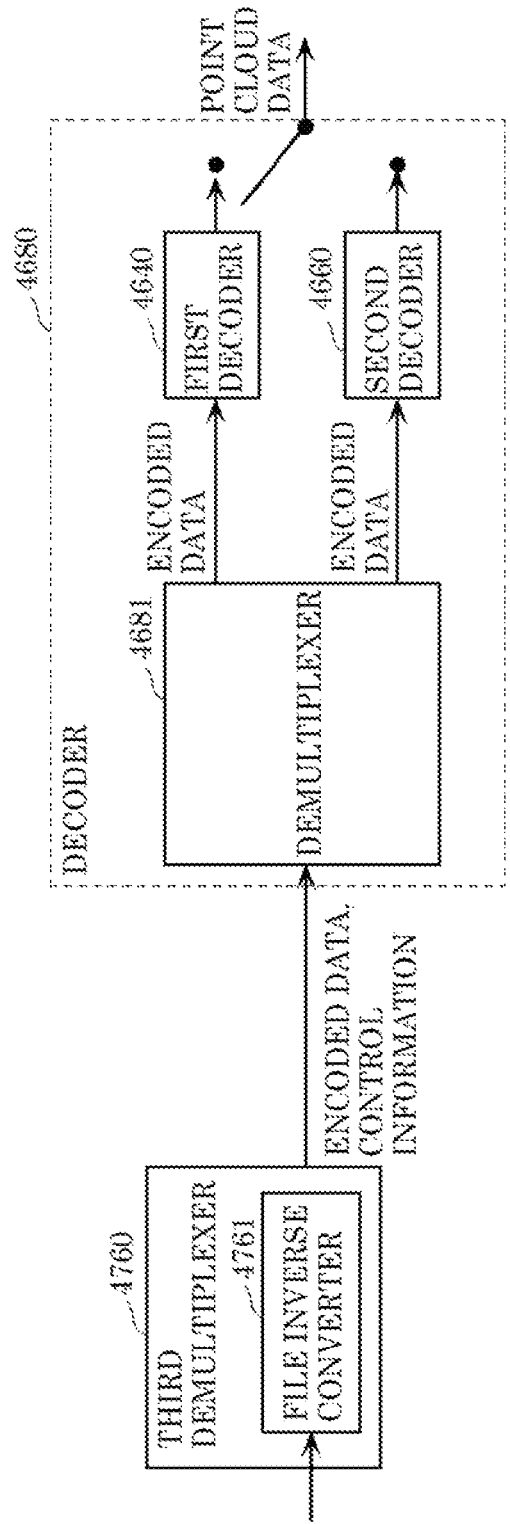
FIG. 31 is a diagram illustrating structures of a third demultiplexer and a decoder according to Embodiment 3.

FIG. 31 is a diagram showing configurations of third demultiplexer 4760 and decoder 4680 according to this embodiment.

Third demultiplexer 4760 includes file inverse converter 4761. File inverse converter 4761 analyzes ftyp included in a file, and determines whether the PCC-encoded data is data encoded in the first encoding method, data encoded in the second encoding method, or data encoded in both the encoding methods.

When the PCC-encoded data is data encoded in any one of the encoding methods, the data is input to an appropriate one of first decoder 4640 and second decoder 4660, and is not input to the other decoder. When the PCC-encoded data is data encoded in both the encoding methods, the data is input to decoder 4680 ready for both the encoding methods.

Decoder 4680 decodes the PCC-encoded data in both or one of the first encoding method and the second encoding method.

Figure 32:
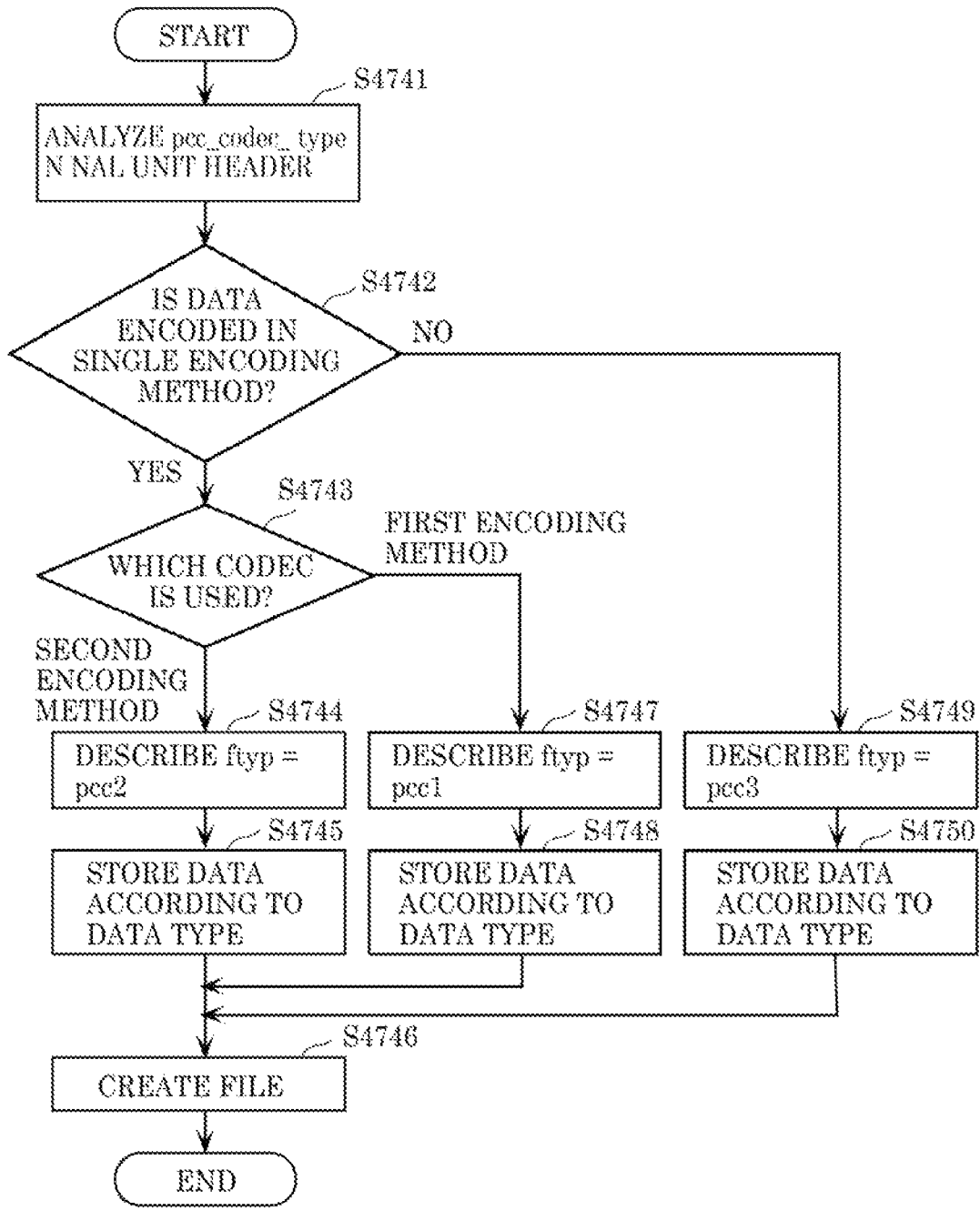
FIG. 32 is a flowchart of processing performed by the third multiplexer according to Embodiment 3.

FIG. 32 is a flowchart showing a process performed by third multiplexer 4750 according to this embodiment.

First, third multiplexer 4750 analyzes pcc_codec_type in the NAL unit header, thereby determining whether the codec(s) used is the first encoding method, the second encoding method, or both the first encoding method and the second encoding method (S4741).

When the second encoding method is used (if Yes in S4742 and "second encoding method" in S4743), third multiplexer 4750 describes pcc2 in ftyp (S4744). That is, third multiplexer 4750 describes information indicating that data encoded in the second encoding method is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4745). Third multiplexer 4750 then creates an ISOBMFF file including the ftyp described above and the box described above (S4746).

When the first encoding method is used (if Yes in S4742 and "first encoding method" in S4743), third multiplexer 4750 describes pcc1 in ftyp (S4747). That is, third multiplexer 4750 describes information indicating that data encoded in the first encoding method is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4748). Third multiplexer 4750 then creates an ISOBMFF file including the ftyp described above and the box described above (S4746).

When both the first encoding method and the second encoding method are used (if No in S4742), third multiplexer 4750 describes pcc3 in ftyp (S4749). That is, third multiplexer 4750 describes information indicating that data encoded in both the encoding methods is stored in the file in ftyp.

Third multiplexer 4750 then analyzes pcc_nal_unit_type in the NAL unit header, and stores the data in a box (moov or mdat, for example) in a predetermined manner suitable for the data type represented by pec_nal_unit_type (S4750). Third multiplexer 4750 then creates an ISOBMFF file including the ftyp described above and the box described above (S4746).

Figure 33:
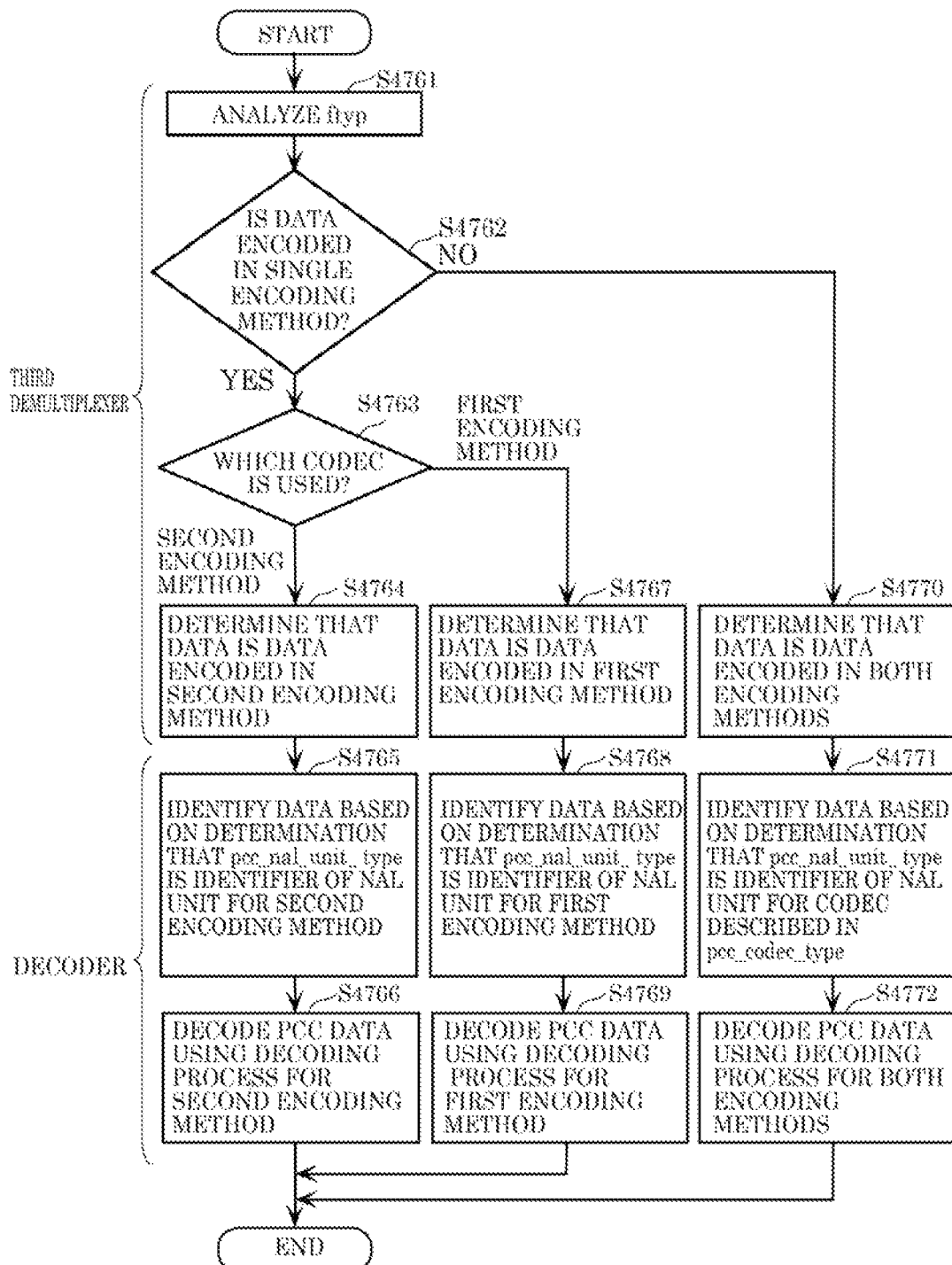
FIG. 33 is a flowchart of processing performed by the third demultiplexer and the decoder according to Embodiment 3.

FIG. 33 is a flowchart showing a process performed by third demultiplexer 4760 and decoder 4680. First, third demultiplexer 4760 analyzes ftyp included in an ISOBMFF file (S4761). When the codec represented by ftyp is the second encoding method (pcc2) (if Yes in S4762 and "second encoding method" in S4763), third demultiplexer 4760 determines that the data included in the payload of the NAL unit is data encoded in the second encoding method (S4764). Third demultiplexer 4760 also transmits the result of the determination to decoder 4680.

Decoder 4680 identifies the data based on the determination that pcc_nal_unit_type in the NAL unit header is the identifier of the NAL unit for the second encoding method (S4765). Decoder 4680 then decodes the PCC data using a decoding process for the second encoding method (S4766).

When the codec represented by ftyp is the first encoding method (pcc1) (if Yes in S4762 and "first encoding method" in S4763), third demultiplexer 4760 determines that the data included in the payload of the NAL unit is data encoded in the first encoding method (S4767). Third demultiplexer 4760 also transmits the result of the determination to decoder 4680.

Decoder 4680 identifies the data based on the determination that pcc_nal_unit_type in the NAL unit header is the identifier of the NAL unit for the first encoding method (S4768). Decoder 4680 then decodes the PCC data using a decoding process for the first encoding method (S4769).

When ftyp indicates that both the encoding methods are used (pcc3) (if No in S4762), third demultiplexer 4760 determines that the data included in the payload of the NAL unit is data encoded in both the first encoding method and the second encoding method (S4770). Third demultiplexer 4760 also transmits the result of the determination to decoder 4680.

Decoder 4680 identifies the data based on the determination that pcc_nal_unit_type in the NAL unit header is the identifier of the NAL unit for the codecs described in pec_codec_type (S4771). Decoder 4680 then decodes the PCC data using decoding processes for both the encoding methods (S4772). That is, decoder 4680 decodes the data encoded in the first encoding method using a decoding process for the first encoding method, and decodes the data encoded in the second encoding method using a decoding process for the second encoding method.

In the following, variations of this embodiment will be described. As types of brands represented by ftyp, the types described below can be indicated by the identification information. Furthermore, a combination of a plurality of the types described below can also be indicated by the identification information.

The identification information may indicate whether the original data object yet to be PCC-encoded is a point cloud whose range is limited or a large point cloud whose range is not limited, such as map information.

The identification information may indicate whether the original data yet to be PCC-encoded is a static object or a dynamic object.

As described above, the identification information may indicate whether the PCC-encoded data is data encoded in the first encoding method or data encoded in the second encoding method.

The identification information may indicate an algorithm used in the PCC encoding. Here, the "algorithm" means an encoding method that can be used in the first encoding method or the second encoding method, for example.

The identification information may indicate a differentiation between methods of storing the PCC-encoded data into an ISOBMFF file. For example, the identification information may indicate whether the storage method used is a storage method for accumulation or a storage method for real-time transmission, such as dynamic streaming.

Although an example in which ISOBMFF is used as a file format has been described in Embodiments 2 and 3, other formats can also be used. For example, the method according to this embodiment can also be used when PCC-encoded data is stored in MPEG-2 TS Systems, MPEG-DASH, MMT, or RMP.

Although an example in which metadata, such as the identification information, is stored in ftyp has been shown above, metadata can also be stored in a location other than ftyp. For example, the metadata may be stored in moov.

Figure 34:
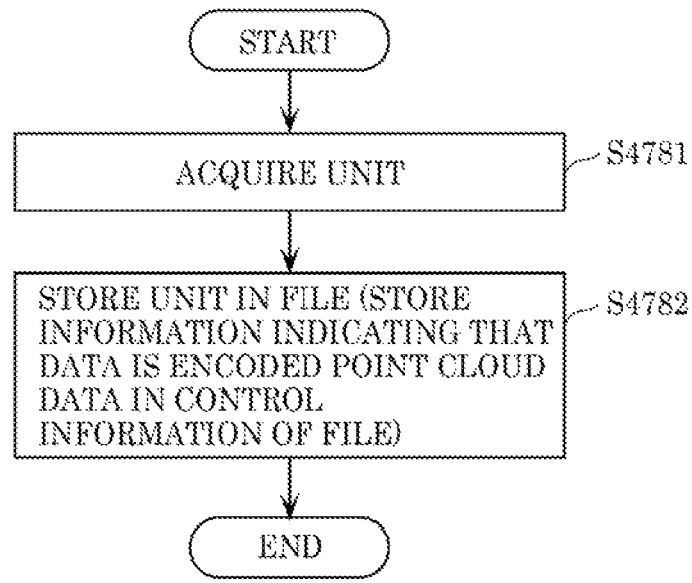
FIG. 34 is a flowchart of processing performed by a three-dimensional data storage device according to Embodiment 3.

As described above, a three-dimensional data storing device (or three-dimensional data multiplexing device or three-dimensional data encoding device) performs the process shown in FIG. 34.

First, the three-dimensional data storing device (which includes first multiplexer 4710, second multiplexer 4730 or third multiplexer 4750, for example) acquires one or more units (NAL units, for example) that store an encoded stream, which is encoded point cloud data (S4781). The three-dimensional data storing device then stores the one or more units in a file (an ISOBMFF file, for example) (S4782). In the storage (S4782), the three-dimensional data storing device also stores information indicating that the data stored in the file is encoded point cloud data (pcc1, pcc2, or pcc3, for example) in the control information (ftyp, for example) (referred to also as signaling information) for the file.

With such a configuration, a device that processes the file generated by the three-dimensional data storing device can quickly determine whether the data stored in the file is encoded point cloud data or not by referring to the control information for the file. Therefore, the processing amount of the device can be reduced, or the processing speed of the device can be increased.

For example, the information indicates the encoding method used for the encoding of the point cloud data among the first encoding method and the second encoding method. Note that the fact that the data stored in the file is encoded point cloud data and the encoding method used for the encoding of the point cloud data among the first encoding method and the second encoding method may be indicated by a single piece of information or different pieces of information.

With such a configuration, a device that processes the file generated by the three-dimensional data storing device can quickly determine the codec used for the data stored in the file by referring to the control information for the file. Therefore, the processing amount of the device can be reduced, or the processing speed of the device can be increased.

For example, the first encoding method is a method (GPCC) that encodes geometry information that represents the position of point cloud data as an N-ary tree (N represents an integer equal to or greater than 2) and encodes attribute information using the geometry information, and the second encoding method is a method (VPCC) that generates a two-dimensional image from point cloud data and encodes the two-dimensional image in a video encoding method.

For example, the file described above is in conformity with ISOBMFF (ISO-based media file format).

For example, the three-dimensional data storing device includes a processor and a memory, and the processor performs the processes described above using the memory.

Figure 35:
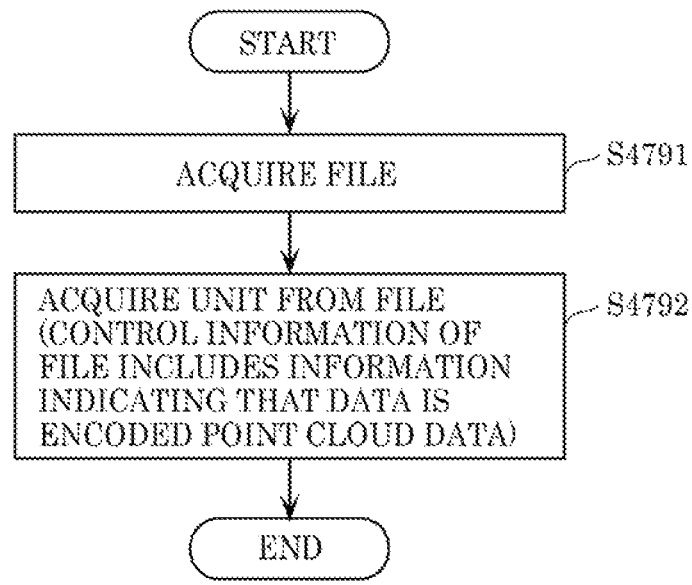
FIG. 35 is a flowchart of processing performed by a three-dimensional data acquisition device according to Embodiment 3.

As described above, a three-dimensional data acquisition device (or three-dimensional data demultiplexing device or three-dimensional data decoding device) performs the process shown in FIG. 35.

The three-dimensional data acquisition device (which includes first demultiplexer 4720, second demultiplexer 4740, or third demultiplexer 4760, for example) acquires a file (an ISOBMFF file, for example) that stores one or more units (NAL units, for example) that store an encoded stream, which is encoded point cloud data (S4791). The three-dimensional data acquisition device acquires the one or more units from the file (S4792). The control information (ftyp, for example) for the file includes information indicating that the data stored in the file is encoded point cloud data (pcc1, pcc2, or pcc3, for example).

For example, the three-dimensional data acquisition device determines whether the data stored in the file is encoded point cloud data or not by referring to the information. When the three-dimensional data acquisition device determines that the data stored in the file is encoded point cloud data, the three-dimensional data acquisition device generates point cloud data by decoding the encoded point cloud data included in the one or more units. Alternatively, when the three-dimensional data acquisition device determines that the data stored in the file is encoded point cloud data, the three-dimensional data acquisition device outputs information indicating that the data included in the one or more units is encoded point cloud data to a processor in a subsequent stage (first decoder 4640, second decoder 4660, or decoder 4680, for example) (or notifies a processor in a subsequent stage that the data included in the one or more units is encoded point cloud data).

With such a configuration, the three-dimensional data acquisition device can quickly determine whether the data stored in the file is encoded point cloud data or not by referring to the control information for the file. Therefore, the processing amount of the three-dimensional data acquisition device or a device in a subsequent stage can be reduced, or the processing speed of the three-dimensional data acquisition device or a device in a subsequent stage can be increased.

For example, the information represents the encoding method used for the encoding among the first encoding method and the second encoding method. Note that the fact that the data stored in the file is encoded point cloud data and the encoding method used for the encoding of the point cloud data among the first encoding method and the second encoding method may be indicated by a single piece of information or different pieces of information.

With such a configuration, the three-dimensional data acquisition device can quickly determine the codec used for the data stored in the file by referring to the control information for the file. Therefore, the processing amount of the three-dimensional data acquisition device or a device in a subsequent stage can be reduced, or the processing speed of the three-dimensional data acquisition device or a device in a subsequent stage can be increased.

For example, based on the information, the three-dimensional data acquisition device acquires the data encoded in any one of the first encoding method and the second encoding method from the encoded point cloud data including the data encoded in the first encoding method and the data encoded in the second encoding method.

For example, the first encoding method is a method (GPCC) that encodes geometry information that represents the position of point cloud data as an N-ary tree (N represents an integer equal to or greater than 2) and encodes attribute information using the geometry information, and the second encoding method is a method (VPCC) that generates a two-dimensional image from point cloud data and encodes the two-dimensional image in a video encoding method.

For example, the file described above is in conformity with ISOBMFF (ISO-based media file format).

For example, the three-dimensional data acquisition device includes a processor and a memory, and the processor performs the processes described above using the memory.

Embodiment 4

In Embodiment 4, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 36:
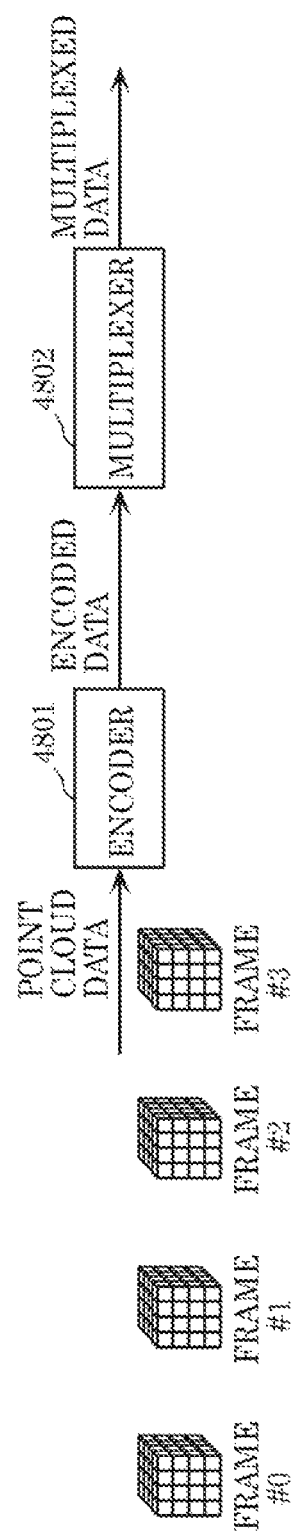
FIG. 36 is a diagram illustrating structures of an encoder and a multiplexer according to Embodiment 4.

FIG. 36 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 37:
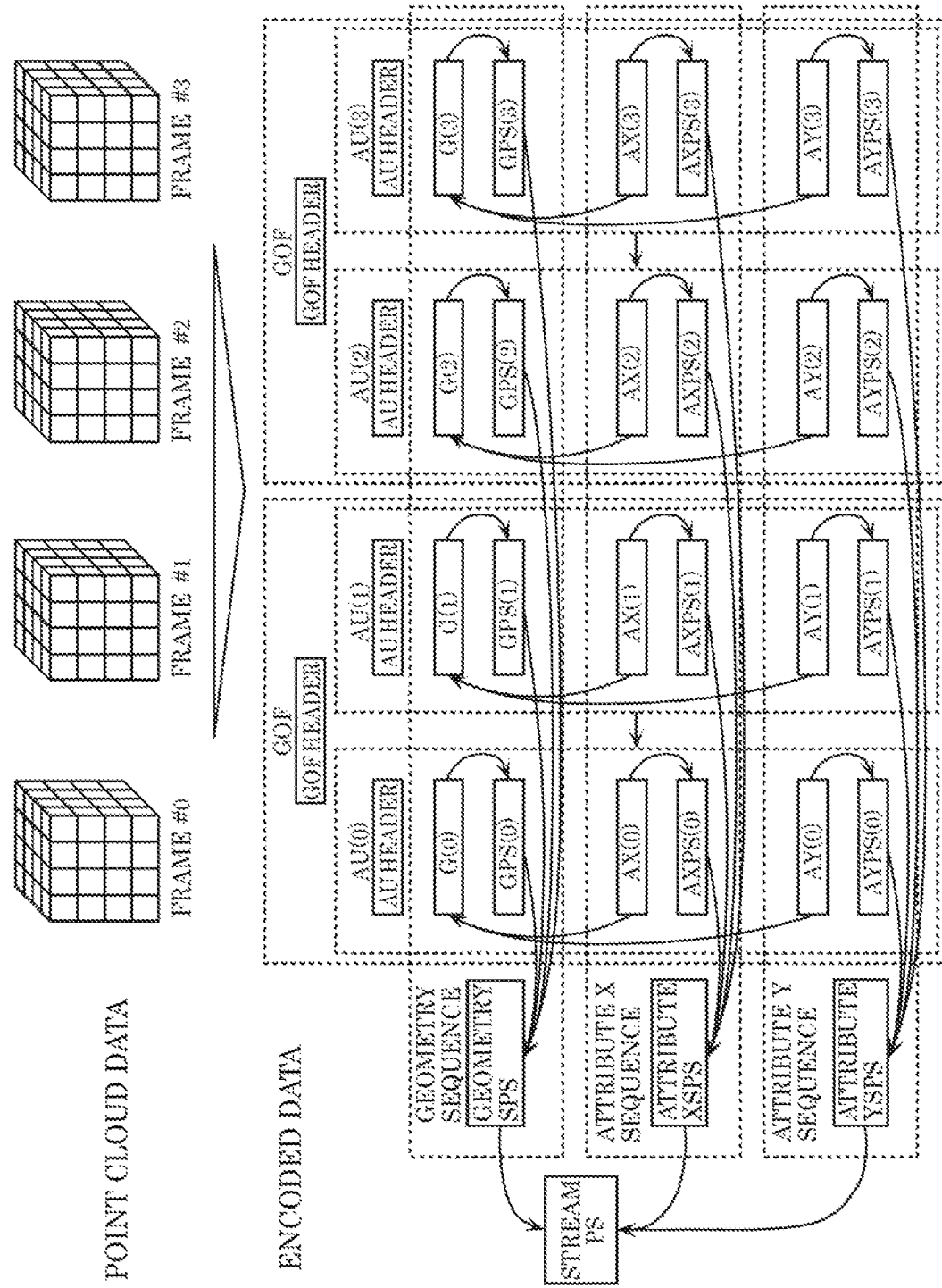
FIG. 37 is a diagram illustrating a structure example of encoded data according to Embodiment 4.

FIG. 37 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 37 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 37 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 37 shows an example in which there is one type of geometry information, and there are two types of attribute information, the present invention is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 38:
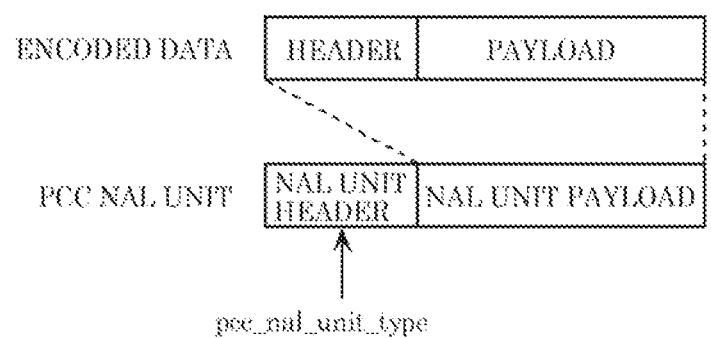
FIG. 38 is a diagram illustrating a structure example of encoded data and a NAL unit according to Embodiment 4.

For example, a data format is defined for each type of encoded data. FIG. 38 is a diagram showing an example of encoded data and a NAL unit.

For example, as shown in FIG. 38, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 39 is a diagram showing a semantics example of pcc_nal_unit_type.

As shown in FIG. 39, when pec_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pec_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 40:
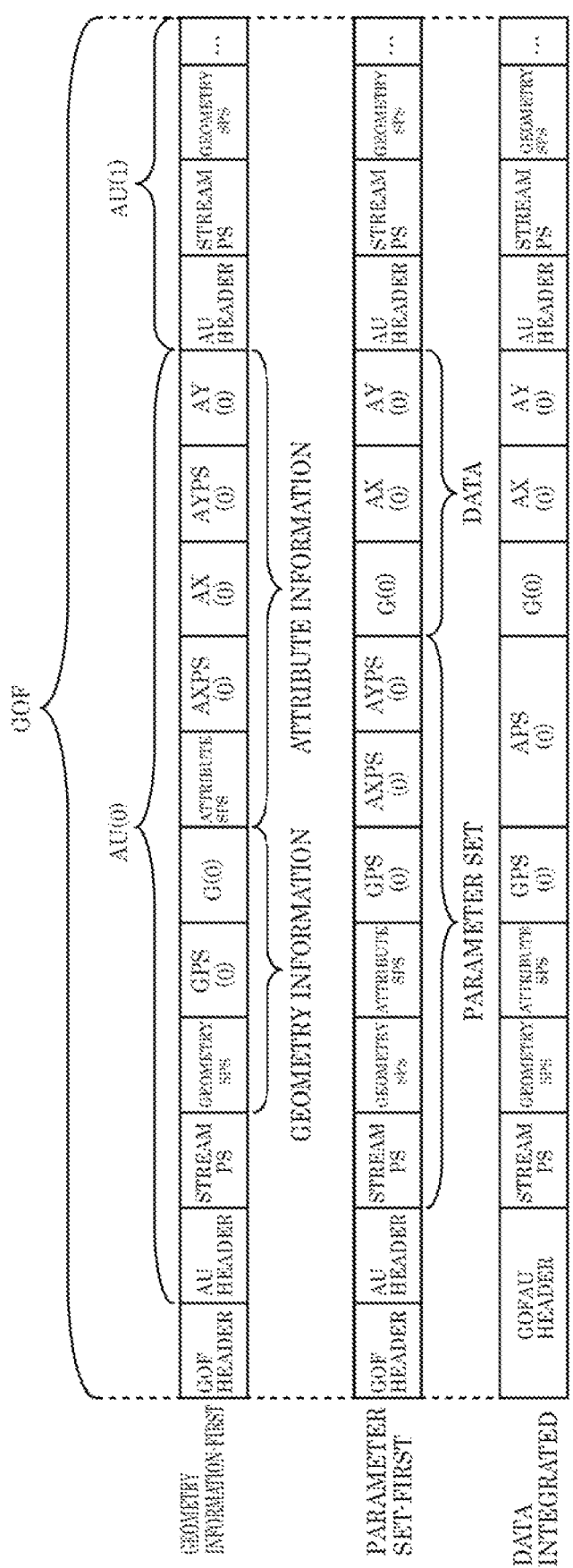
FIG. 40 is a diagram illustrating an example of a transmitting order of NAL units according to Embodiment 4.

FIG. 40 is a diagram showing examples of the order of transmission of NAL units. FIG. 40 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 40 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 40, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Figure 41:
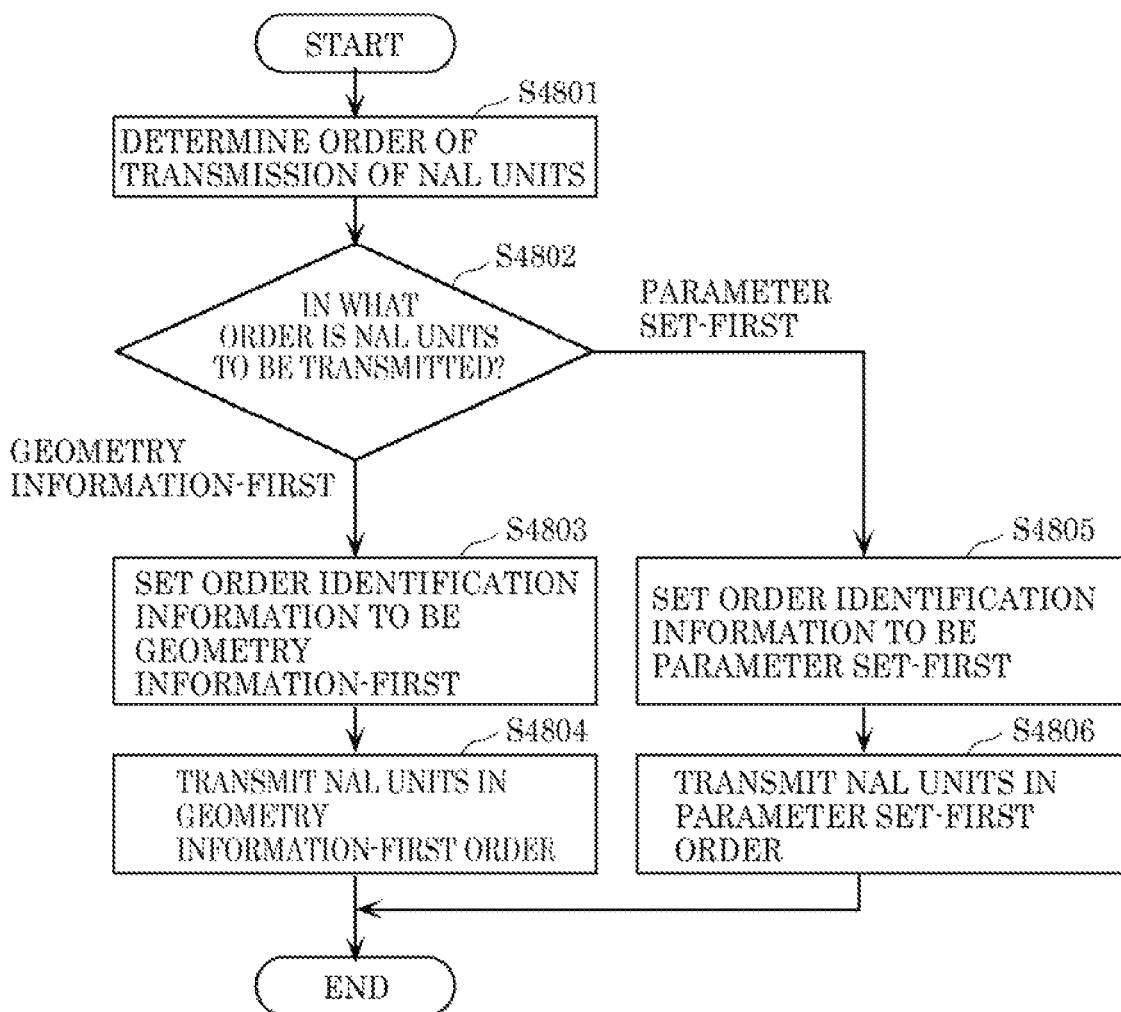
FIG. 41 is a flowchart of processing performed by a three-dimensional data encoding device according to Embodiment 4.

In the following, a process relating to order identification information will be described. FIG. 41 is a flowchart showing a process performed by the three-dimensional data encoding device (encoder 4801 and multiplexer 4802) that involves the order of transmission of NAL units.

First, the three-dimensional data encoding device determines the order of transmission of NAL units (geometry information-first or parameter set-first) (S4801). For example, the three-dimensional data encoding device determines the order of transmission based on a specification from a user or an external device (the three-dimensional data decoding device, for example).

If the determined order of transmission is geometry information-first (if "geometry information-first" in S4802), the three-dimensional data encoding device sets the order identification information included in the stream PS to geometry information-first (S4803). That is, in this case, the order identification information indicates that the NAL units are transmitted in the geometry information-first order. The three-dimensional data encoding device then transmits the NAL units in the geometry information-first order (S4804).

On the other hand, if the determined order of transmission is parameter set-first (if "parameter set-first" in S4802), the three-dimensional data encoding device sets the order identification information included in the stream PS to parameter set-first (S4805). That is, in this case, the order identification information indicates that the NAL units are transmitted in the parameter set-first order. The three-dimensional data encoding device then transmits the NAL units in the parameter set-first order (S4806).

Figure 42:
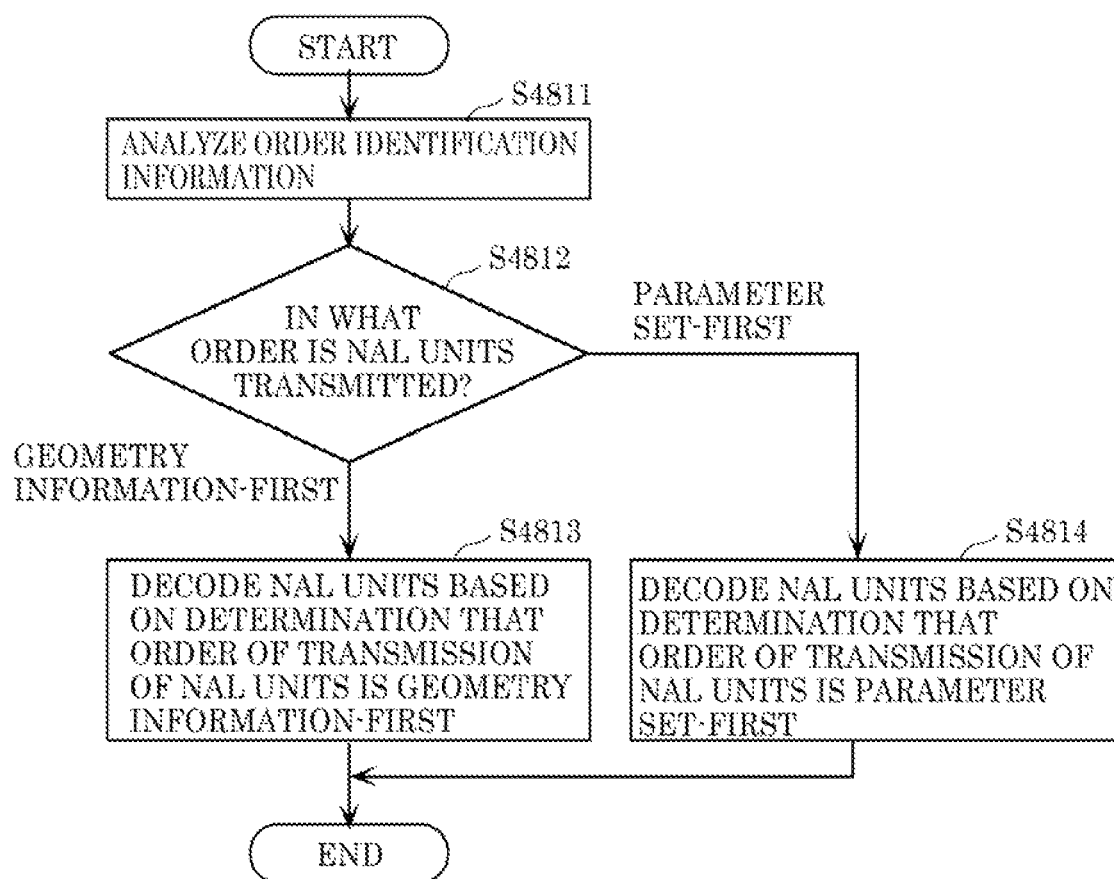
FIG. 42 is a flowchart of processing performed by a three-dimensional data decoding device according to Embodiment 4.

FIG. 42 is a flowchart showing a process performed by the three-dimensional data decoding device that involves the order of transmission of NAL units. First, the three-dimensional data decoding device analyzes the order identification information included in the stream PS (S4811).

If the order of transmission indicated by the order identification information is geometry information-first (if "geometry information-first" in S4812), the three-dimensional data decoding device decodes the NAL units based on the determination that the order of transmission of the NAL units is geometry information-first (S4813).

On the other hand, if the order of transmission indicated by the order identification information is parameter set-first (if "parameter set-first" in S4812), the three-dimensional data decoding device decodes the NAL units based on the determination that the order of transmission of the NAL units is parameter set-first (S4814).

For example, if the three-dimensional data decoding device does not decode attribute information, in step S4813, the three-dimensional data decoding device does not obtain the entire NAL units but can obtain a part of a NAL unit relating to the geometry information and decode the obtained NAL unit to obtain the geometry information.

Figure 43:
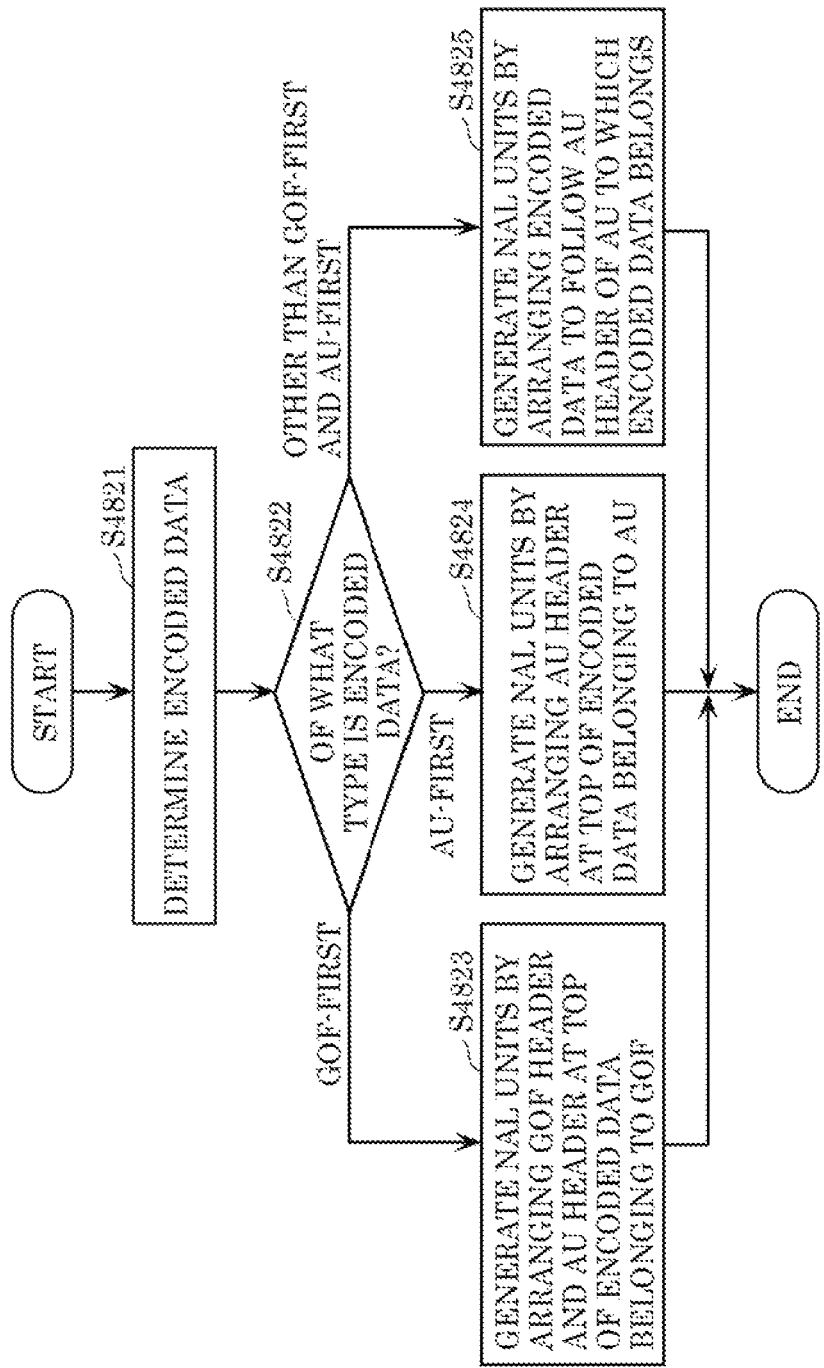
FIG. 43 is a flowchart of multiplexing processing according to Embodiment 4.

Next, a process relating to generation of an AU and a GOF will be described. FIG. 43 is a flowchart showing a process performed by the three-dimensional data encoding device (multiplexer 4802) that relates to generation of an AU and a GOF in multiplexing of NAL units.

First, the three-dimensional data encoding device determines the type of the encoded data (S4821). Specifically, the three-dimensional data encoding device determines whether the encoded data to be processed is AU-first data, GOF-first data, or other data.

If the encoded data is GOF-first data (if "GOF-first" in S4822), the three-dimensional data encoding device generates NAL units by arranging a GOF header and an AU header at the top of the encoded data belonging to the GOF (S4823).

If the encoded data is AU-first data (if "AU-first" in S4822), the three-dimensional data encoding device generates NAL units by arranging an AU header at the top of the encoded data belonging to the AU (S4824).

If the encoded data is neither GOF-first data nor AU-first data (if "other than GOF-first and AU-first" in S4822), the three-dimensional data encoding device generates NAL units by arranging the encoded data to follow the AU header of the AU to which the encoded data belongs (S4825).

Figure 44:
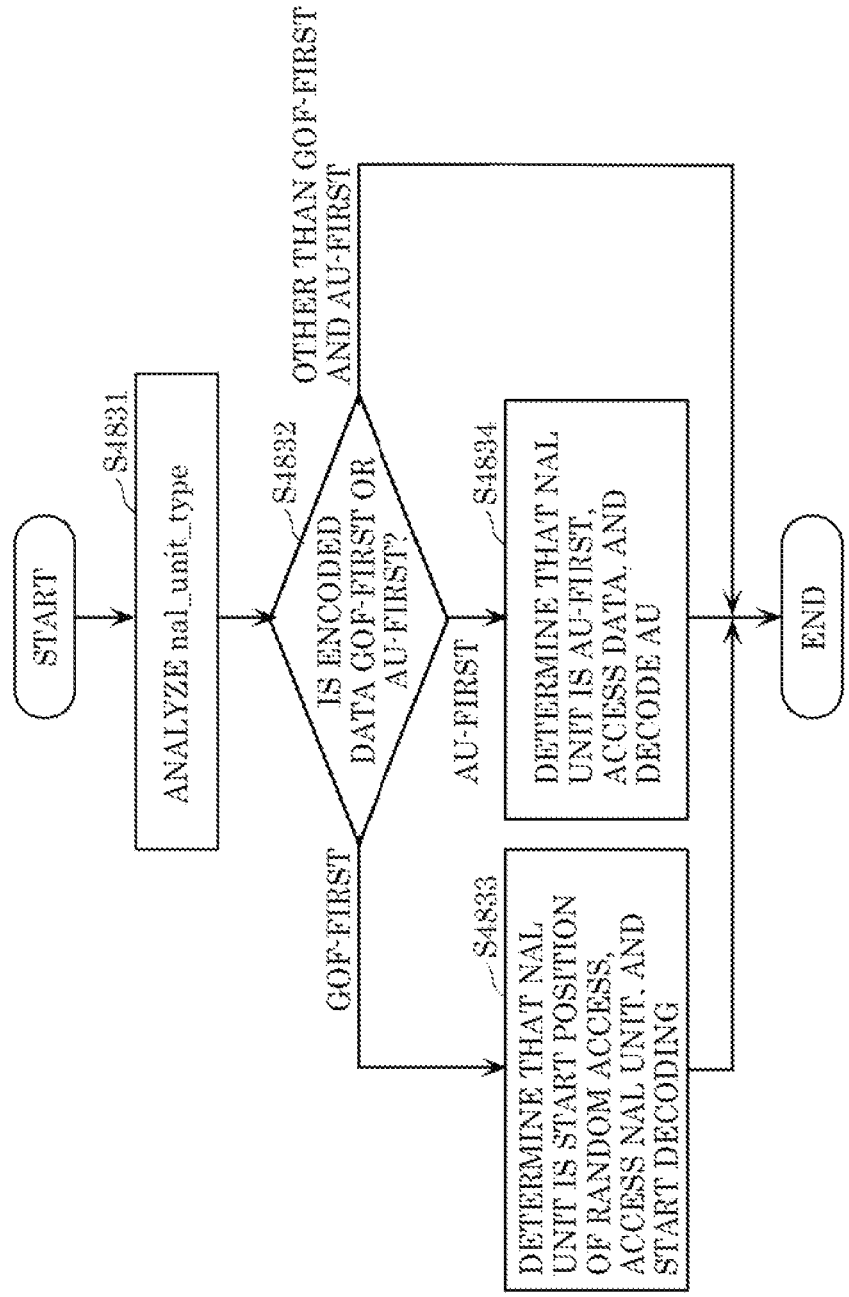
FIG. 44 is a flowchart of demultiplexing processing according to Embodiment 4.

Next, a process relating to access to an AU and a GOF will be described. FIG. 44 is a flowchart showing a process performed by the three-dimensional data decoding device that involves accessing to an AU and a GOF in demultiplexing of a NAL unit.

First, the three-dimensional data decoding device determines the type of the encoded data included in the NAL unit by analyzing nal_unit_type in the NAL unit (S4831). Specifically, the three-dimensional data decoding device determines whether the encoded data included in the NAL unit is AU-first data, GOF-first data, or other data.

If the encoded data included in the NAL unit is GOF-first data (if "GOF-first" in S4832), the three-dimensional data decoding device determines that the NAL unit is a start position of random access, accesses the NAL unit, and starts the decoding process (S4833).

If the encoded data included in the NAL unit is AU-first data (if "AU-first" in S4832), the three-dimensional data decoding device determines that the NAL unit is AU-first, accesses the data included in the NAL unit, and decodes the AU (S4834).

If the encoded data included in the NAL unit is neither GOF-first data nor AU-first data (if "other than GOF-first and AU-first" in S4832), the three-dimensional data decoding device does not process the NAL unit.

Figure 45:
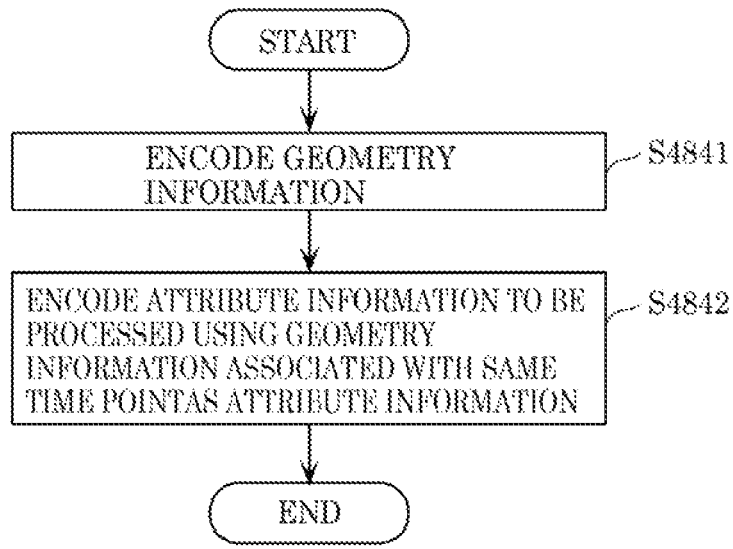
FIG. 45 is a flowchart of processing performed by a three-dimensional data encoding device according to Embodiment 4.

As described above, the three-dimensional data encoding device performs the process shown in FIG. 45. The three-dimensional data encoding device encodes time-series three-dimensional data (point cloud data on a dynamic object, for example). The three-dimensional data includes geometry information and attribute information associated with each time point.

First, the three-dimensional data encoding device encodes the geometry information (S4841). The three-dimensional data encoding device then encodes the attribute information to be processed by referring to the geometry information associated with the same time point as the attribute information to be processed (S4842). Here, as shown in FIG. 37, the geometry information and the attribute information associated with the same time point form an access unit (AU). That is, the three-dimensional data encoding device encodes the attribute information to be processed by referring to the geometry information included in the same access unit as the attribute information to be processed.

In this way, the three-dimensional data encoding device can take advantage of the access unit to facilitate control of reference in encoding. Therefore, the three-dimensional data encoding device can reduce the processing amount of the encoding process.

For example, the three-dimensional data encoding device generates a bitstream including the encoded geometry information (encoded geometry data), the encoded attribute information (encoded attribute data), and information indicating the geometry information of the entity to be referred to when encoding the attribute information to be processed.

For example, the bitstream includes a geometry parameter set (geometry PS) that includes control information for the geometry information associated with each time point and an attribute parameter set (attribute PS) that includes control information for the attribute information associated with each time point.

For example, the bitstream includes a geometry sequence parameter set (geometry SPS) that includes control information that is common to a plurality of pieces of geometry information associated with different time points and attribute sequence parameter set (attribute SPS) that includes control information that is common to a plurality of pieces of attribute information associated with different time points.

For example, the bitstream includes a stream parameter set (stream PS) that includes control information that is common to a plurality of pieces of geometry information associated with different time points and a plurality of pieces of attribute information associated with different time points.

For example, the bitstream includes an access unit header (AU header) that includes control information that is common in an access unit.

For example, the three-dimensional data encoding device performs encoding in such a manner that groups of frames (GOFs) formed by one or more access units can be independently decoded. That is, the GOF is a random access unit.

For example, the bitstream includes a GOF header that includes control information that is common in a GOF.

For example, the three-dimensional data encoding device includes a processor and a memory, and the processor performs the processes described above using the memory.

Figure 46:
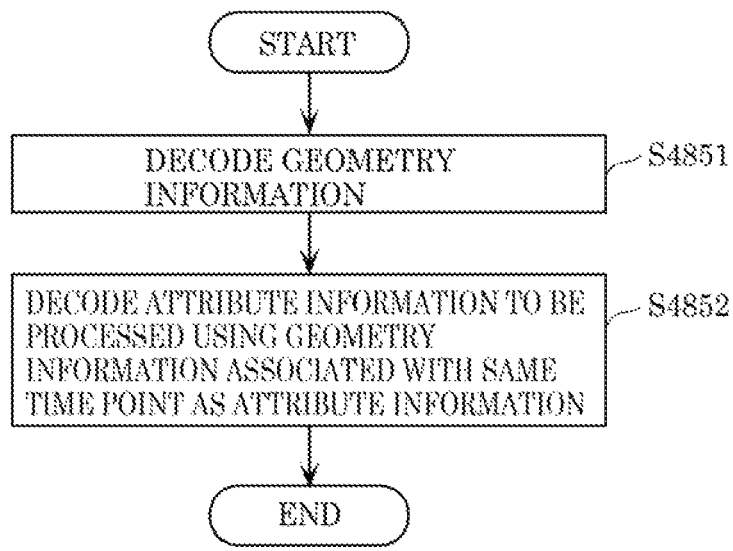
FIG. 46 is a flowchart of processing performed by a three-dimensional data decoding device according to Embodiment 4.

As described above, the three-dimensional data decoding device performs the process shown in FIG. 46. The three-dimensional data decoding device decodes time-series three-dimensional data (point cloud data on a dynamic object, for example). The three-dimensional data includes geometry information and attribute information associated with each time point. The geometry information and the attribute information associated with the same time point forms an access unit (AU).

First, the three-dimensional data decoding device decodes the bitstream to obtain the geometry information (S4851). That is, the three-dimensional data decoding device generates the geometry information by decoding the encoded geometry information (encoded geometry data) included in the bitstream.

The three-dimensional data decoding device then decodes the bitstream to obtain the attribute information to be processed by referring to the geometry information associated with the same time point as the attribute information to be processed (S4852). That is, the three-dimensional data decoding device generates the attribute information by decoding the encoded attribute information (encoded attribute data) included in the bitstream. In this process, the three-dimensional data decoding device refers to the decoded geometry information included in the access unit as the attribute information.

In this way, the three-dimensional data decoding device can take advantage of the access unit to facilitate control of reference in decoding. Therefore, the three-dimensional data decoding device can reduce the processing amount of the decoding process.

For example, the three-dimensional data decoding device obtains, from the bitstream, information indicating the geometry information of the entity to be referred to when decoding the attribute information to be processed, and decodes the attribute information to be processed by referring to the geometry information of the entity to be referred to indicated by the obtained information.

For example, the bitstream includes a geometry parameter set (geometry PS) that includes control information for the geometry information associated with each time point and an attribute parameter set (attribute PS) that includes control information for the attribute information associated with each time point. That is, the three-dimensional data decoding device uses the control information included in the geometry parameter set associated with the time point to be intended for processing to decode the geometry information associated with the time point intended for processing, and uses the control information included in the attribute parameter set associated with the time point intended for processing to decode the attribute information associated with the time point intended for processing.

For example, the bitstream includes a geometry sequence parameter set (geometry SPS) that includes control information that is common to a plurality of pieces of geometry information associated with different time points and an attribute sequence parameter set (attribute SPS) that includes control information that is common to a plurality of pieces of attribute information associated with different time points. That is, the three-dimensional data decoding device uses the control information included in the geometry sequence parameter set to decode a plurality of pieces of geometry information associated with different time points, and uses the control information included in the attribute sequence parameter set to decode a plurality of pieces of attribute information associated with different time points.

For example, the bitstream includes a stream parameter set (stream PS) that includes control information that is common to a plurality of pieces of geometry information associated with different time points and a plurality of pieces of attribute information associated with different time points. That is, the three-dimensional data decoding device uses the control information included in the stream parameter set to decode a plurality of pieces of geometry information associated with different time points and a plurality of pieces of attribute information associated with different time points.

For example, the bitstream includes an access unit header (AU header) that includes control information that is common in an access unit. That is, the three-dimensional data decoding device uses the control information included in the access unit header to decode the geometry information and the attribute information included in the access unit.

For example, the three-dimensional data decoding device independently decodes groups of frames (GOFs) formed by one or more access units. That is, the GOF is a random access unit.

For example, the bitstream includes a GOF header that includes control information that is common in a GOF. That is, the three-dimensional data decoding device decodes the geometry information and the attribute information included in the GOF using the control information included in the GOF header.

For example, the three-dimensional data decoding device includes a processor and a memory, and the processor performs the processes described above using the memory.

Embodiment 5

Figure 47:
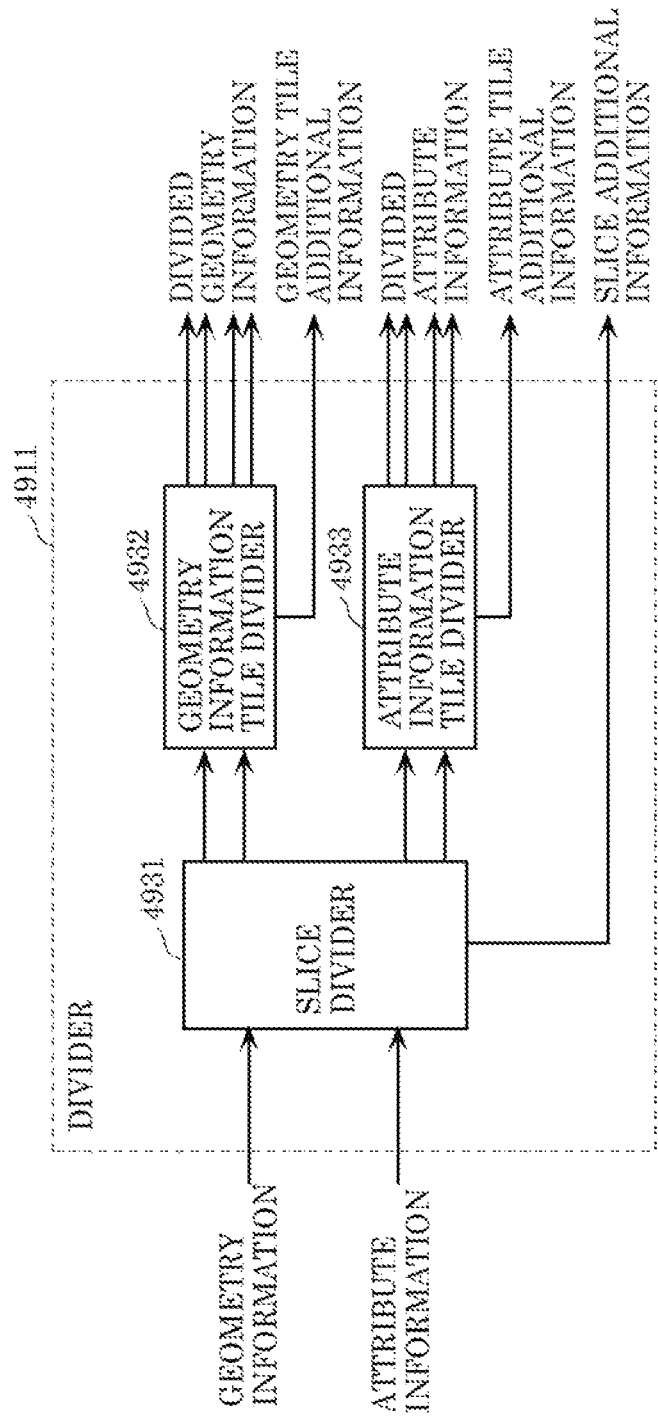
FIG. 47 is a block diagram illustrating a divider according to Embodiment 5.

Next, a configuration of divider 4911 will be described. FIG. 47 is a block diagram illustrating divider 4911. Divider 4911 includes slice divider 4931, geometry information tile divider (geometry tile divider) 4932, and attribute information tile divider (attribute tile divider) 4933.

Slice divider 4931 generates a plurality of pieces of slice geometry information by dividing geometry information (position (geometry)) into slices. Slice divider 4931 also generates a plurality of pieces of slice attribute information by dividing attribute information (attribute) into slices. Slice divider 4931 also outputs slice additional information (slice MetaData) including information concerning the slice division and information generated in the slice division.

Geometry information tile divider 4932 generates a plurality of pieces of divisional geometry information (a plurality of pieces of tile geometry information) by dividing a plurality of pieces of slice geometry information into tiles. Geometry information tile divider 4932 also outputs geometry tile additional information (geometry tile MetaData) including information concerning the tile division of geometry information and information generated in the tile division of geometry information.

Attribute information tile divider 4933 generates a plurality of pieces of divisional attribute information (a plurality of pieces of tile attribute information) by dividing a plurality of pieces of slice attribute information into tiles. Attribute information tile divider 4933 also outputs attribute tile additional information (attribute tile MetaData) including information concerning the tile division of attribute information and information generated in the tile division of attribute information.

Note that the number of slices or tiles generated by division is equal to or greater than 1. That is, the slice division or tile division may not be performed.

Although an example in which tile division is performed after slice division has been shown here, slice division may be performed after tile division. Alternatively, other units of division may be defined in addition to slice and tile, and the division may be performed based on three or more units of division.

Figure 48:
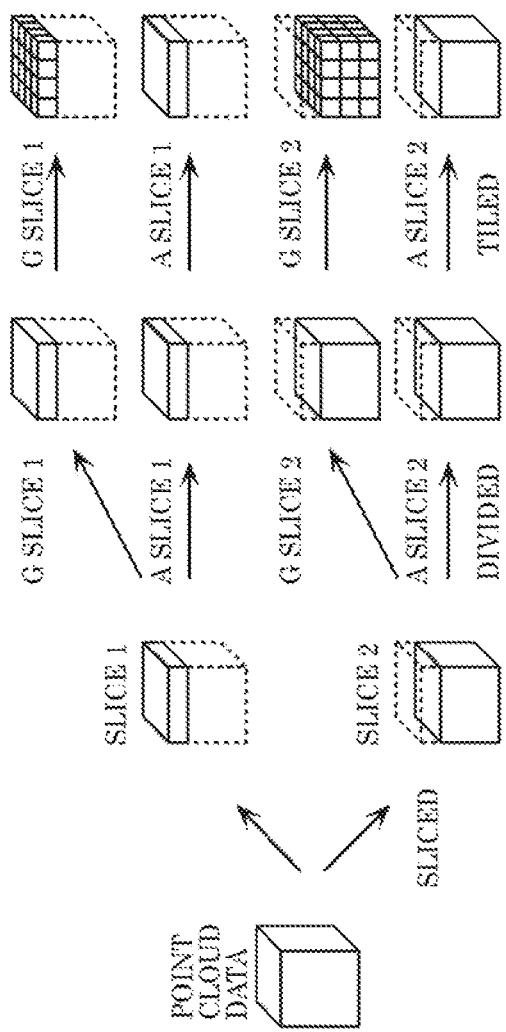
FIG. 48 is a diagram illustrating an example of slice division and tile division according to Embodiment 5.

In the following, a method of dividing point cloud data will be described. FIG. 48 is a diagram illustrating an example of slice division and tile division.

First, a method of slice division will be described. Divider 4911 divides three-dimensional point cloud data into arbitrary point clouds in units of slices. In the slice division, divider 4911 does not separate geometry information and attribute information on a point and collectively divides geometry information and attribute information on a point into slices. That is, divider 4911 performs the slice division in such a manner that the geometry information and the attribute information on any point belong to the same slice. Note that the point cloud data can be divided in any number of slices in any manner as far as this requirement is satisfied. The minimum unit of the division is a point. For example, the geometry information and the attribute information are divided into the same number of slices. For example, after the slice division, geometry information corresponding to a three-dimensional point and attribute information corresponding to the three-dimensional point are included in the same slice.

In the slice division, divider 4911 also generates slice additional information, which is additional information concerning the number of slices and the division method. The slice additional information is common to the geometry information and the attribute information. For example, the slice additional information includes information indicating the reference coordinate position or size or the length of a side of a bounding box after the division. The slice additional information also includes information indicating the number of slices, the type of division and the like.

Next, a method of tile division will be described. Divider 4911 divides data resulting from the slice division into slice geometry information (G slice) and slice attribute information (A slice), and divides each of the slice geometry information and the slice attribute information into tiles.

Note that although FIG. 48 shows an example in which an octree structure is used for the division, the point cloud data may be divided into any number of slices or tiles in any division method.

Divider 4911 may divide the geometry information and the attribute information in different division methods or in the same division method. Divider 4911 may divide a plurality of slices into tiles in different division methods or in the same division method.

In the tile division, divider 4911 also generates tile additional information concerning the number of tiles and the division method. The tile additional information is different between the geometry information and the attribute information (there are geometry tile additional information and attribute tile additional information). For example, the tile additional information includes information indicating the reference coordinate position or size or the length of a side of a bounding box after the division. The tile additional information also includes information indicating the number of tiles, the type of division and the like.

Next, an example of the method of dividing point cloud data into slices or tiles will be described. As a method of slice or tile division, divider 4911 may use a predetermined method or adaptively change the method to be used depending on the point cloud data.

In the slice division, divider 4911 divides a three-dimensional space without separating the geometry information and the attribute information. For example, divider 4911 determines the shape of an object and divides the three-dimensional space into slices based on the shape of the object. For example, divider 4911 extracts an object, such as a tree or a building, and performs the division on an object basis. For example, divider 4911 performs the slice division in such a manner that the whole of one or more objects is included in one slice. Alternatively, divider 4911 may divide one object into a plurality of slices.

In this case, the encoding device may use a different encoding method for each slice. For example, the encoding device may use a high-quality compression method for a particular object or some particular objects. In that case, the encoding device may store information indicating the encoding method for each slice in the additional information (metadata).

Divider 4911 may also perform the slice division in such a manner that each slice corresponds to a predetermined coordinate space, based on map information or the geometry information.

In the tile division, divider 4911 independently divides the geometry information and the attribute information. For example, divider 4911 divides a slice into tiles depending on the data amount or processing amount. For example, divider 4911 determines whether the data amount of a slice (the number of three-dimensional points included in a slice, for example) is greater than a predetermined threshold. If the data amount of the slice is greater than the threshold, divider 4911 divides the slice into tiles. If the data amount of the slice is smaller than the threshold, divider 4911 does not divide the slice into tiles.

For example, divider 4911 divides a slice into tiles in such a manner that the processing amount or processing time of the decoding device falls within a predetermined range (that is, is equal to or less than a predetermined value). In this way, the processing amount for each tile of the decoding device is made constant, and the distributed processing in the decoding device is facilitated.

When the processing amount for the geometry information and the processing amount for the attribute information are different, for example, the processing amount for the geometry information is greater than the processing amount for the attribute information, divider 4911 divides the geometry information into more tiles than the attribute information.

Depending on the content, if the decoding device can decode and display the geometry information before decoding and displaying the attribute information, for example, divider 4911 may divide the geometry information into more tiles than the attribute information. In that case, the decoding device can increase the parallelism of the processing of the geometry information compared with the processing of the attribute information, and therefore can more quickly process the geometry information than the attribute information.

Note that the decoding device does not have to process the slices or tiles of data in parallel, and may determine whether to process the slices or tiles of data in parallel or not based on the number or capacity of the decoding processors.

By performing the divisions as described above, adaptive encoding can be realized depending on the content or object. In addition, a parallel decoding process can be realized. In this way, the flexibility of the point cloud data encoding system or point cloud data decoding system is improved.

Figure 49:
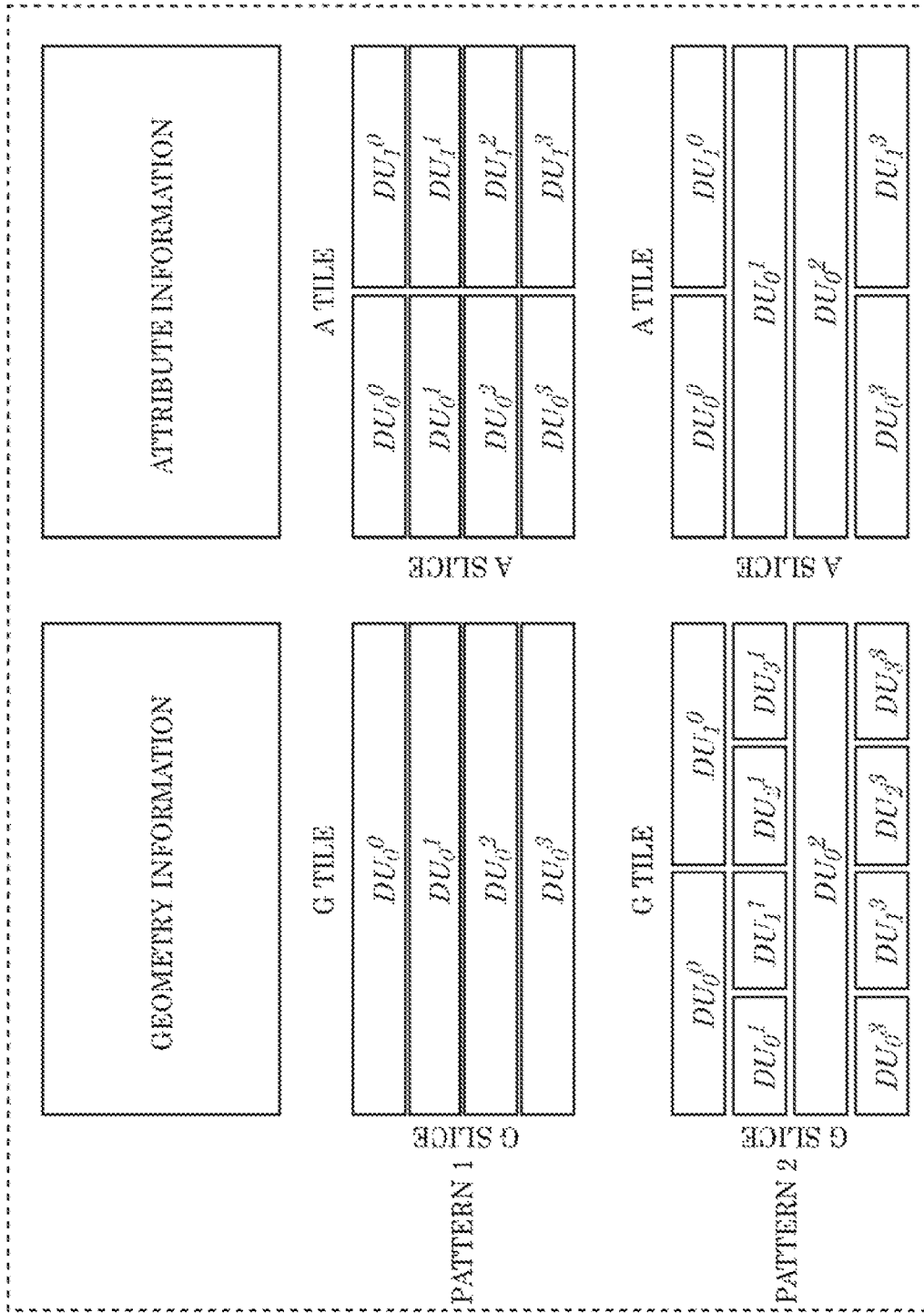
FIG. 49 is a diagram illustrating an example of a slice division pattern and a tile division pattern according to Embodiment 5.

FIG. 49 is a diagram illustrating an example of a slice division pattern and a tile division pattern. In the drawing, DU represents a data unit (DataUnit), and shows a tile or slice of data. Each DU includes a slice index (SliceIndex) and a tile index (TileIndex). In the drawing, a superscript of DU indicates a slice index, and a subscript of DU indicates a tile index.

In pattern 1, in the slice division, the geometry information and the attribute information are divided into the same number of G slices and A slices in the same division method. In the tile division, the G slice and the A slice are divided into different numbers of tiles in different division methods. The plurality of G slices is divided into the same number of tiles in the same division method. The plurality of A slices is divided into the same number of tiles in the same division method.

In pattern 2, in the slice division, the geometry information and the attribute information are divided into the same number of G slices and A slices in the same division method. In the tile division, the G slice and the A slice are divided into different numbers of tiles in different division methods. The plurality of G slices are divided into different numbers of tiles in different division methods. The plurality of A slices are divided into different numbers of tiles in different division methods.

Embodiment 6

Hereinafter, an example of performing slice division after tile division will be described. An autonomous application for automated driving of a vehicle etc. requires not point cloud data of all areas but point cloud data of an area surrounding a vehicle or an area in a traveling direction of a vehicle. Here, tiles and slices can be used to selectively decode original point cloud data. It is possible to achieve the improvement of coding efficiency or parallel processing by dividing three-dimensional point cloud data into tiles and further dividing the tiles into slices. When data is divided, additional information (metadata) is generated, and the generated additional information is transmitted to a multiplexer.

Figure 50:
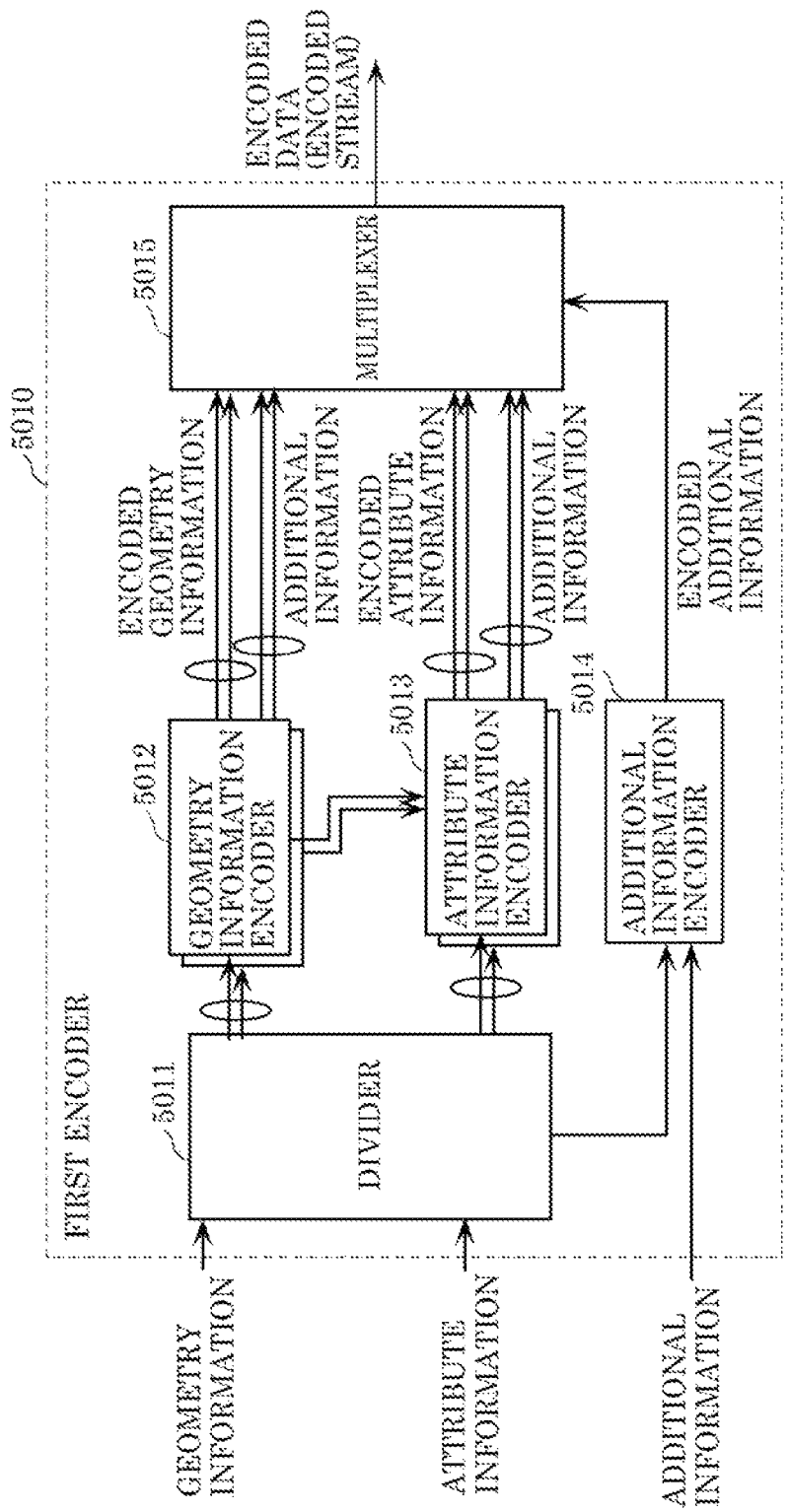
FIG. 50 is a block diagram of a first encoder according to Embodiment 6.

FIG. 50 is a block diagram illustrating a configuration of first encoder 5010 included in a three-dimensional data encoding device according to the present embodiment. First encoder 5010 generates encoded data (encoded stream) by encoding point cloud data using a first encoding method (geometry based PCC (GPCC)). First encoder 5010 includes divider 5011, geometry information encoders 5012, attribute information encoders 5013, additional information encoder 5014, and multiplexer 5015.

Divider 5011 generates pieces of divided data by dividing point cloud data. Specifically, divider 5011 generates pieces of divided data by dividing a space of point cloud data into subspaces. Here, a subspace is one of a tile and a slice, or a combination of a tile and a slice. More specifically, point cloud data includes geometry information, attribute information, and additional information. Divider 5011 divides geometry information into pieces of divided geometry information and attribute information into pieces of divided attribute information. In addition, divider 5011 generates additional information regarding division.

For example, first, divider 5011 divides a point cloud into tiles. Next, divider 5011 further divides the obtained tiles into slices.

Geometry information encoders 5012 generate pieces of encoded geometry information by encoding pieces of divided geometry information. For example, geometry information encoders 5012 process pieces of divided geometry information in parallel.

Attribute information encoders 5013 generate pieces of encoded attribute information by encoding pieces of divided attribute information. For example, attribute information encoders 5013 process pieces of divided geometry information in parallel.

Additional information encoder 5014 generates encoded additional information by encoding additional information included in point cloud data and additional information regarding data division generated at the time of dividing by divider 5011.

Multiplexer 5015 generates encoded data (encoded stream) by multiplexing pieces of encoded geometry information, pieces of encoded attribute information, and encoded additional information, and transmits the generated encoded data. The encoded additional information is also used at the time of decoding.

It should be noted that although FIG. 50 shows two geometry information encoders 5012 and two attribute information encoders 5013 as an example, the number of geometry information encoders 5012 and the number of attribute information encoders 5013 may be one or at least three. Moreover, pieces of divided data may be processed in parallel in identical chips, such as cores in a CPU, in a core of each of chips, or in cores of each of chips.

Figure 51:
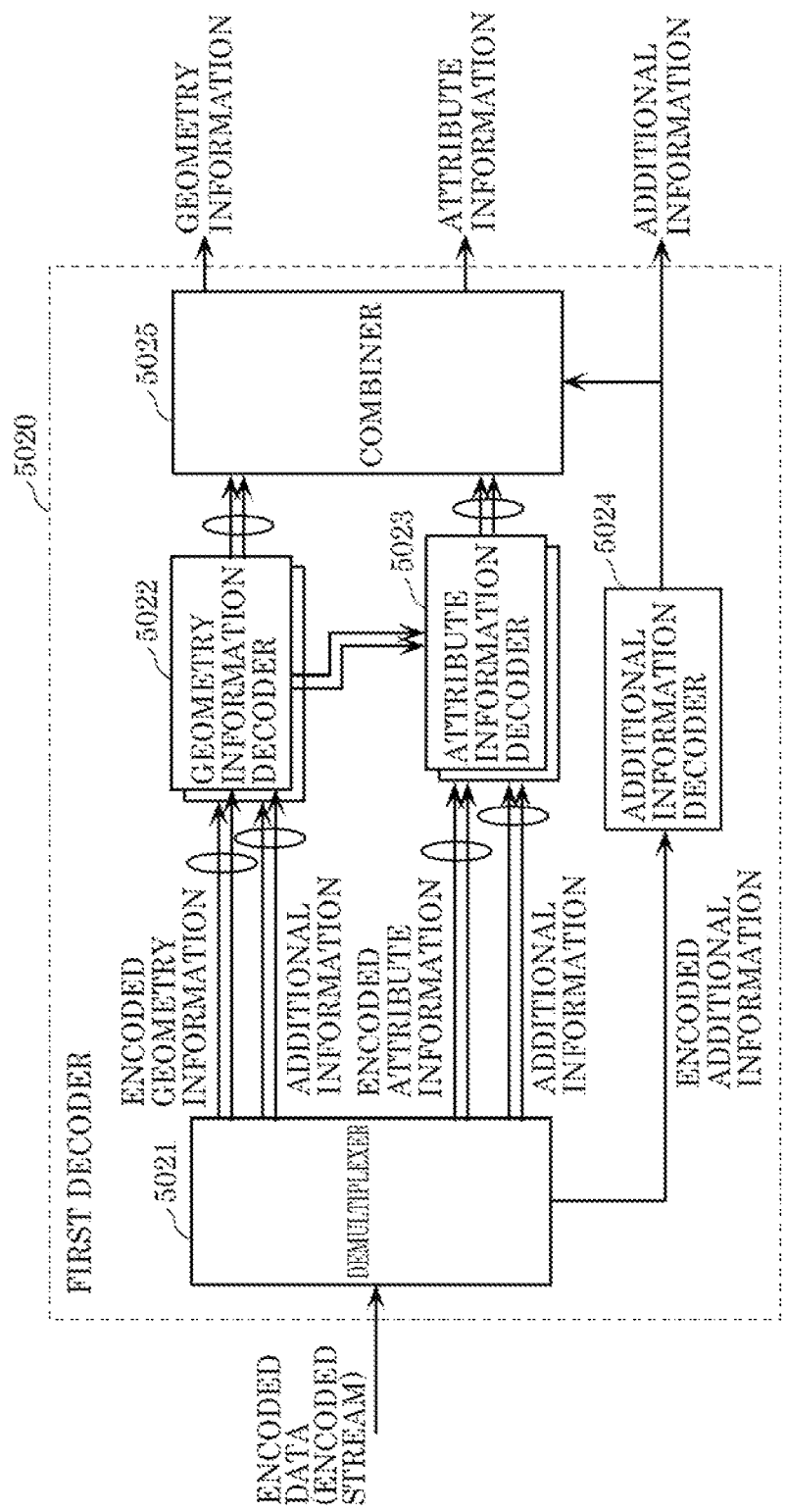
FIG. 51 is a block diagram of a first decoder according to Embodiment 6.

The following describes a decoding process. FIG. 51 is a block diagram illustrating a configuration of first decoder 5020. First decoder 5020 restores point cloud data by decoding encoded data (encoded stream) generated by encoding the point cloud data using the first encoding method (GPCC). First decoder 5020 includes demultiplexer 5021, geometry information decoders 5022, attribute information decoders 5023, additional information decoder 5024, and combiner 5025.

Demultiplexer 5021 generates pieces of encoded geometry information, pieces of encoded attribute information, and encoded additional information by demultiplexing encoded data (encoded stream).

Geometry information decoders 5022 generate pieces of divided geometry information by decoding pieces of encoded geometry information. For example, geometry information decoders 5022 process pieces of encoded geometry information in parallel.

Attribute information decoders 5023 generate pieces of divided attribute information by decoding pieces of encoded attribute information. For example, attribute information decoders 5023 process pieces of encoded attribute information in parallel.

Additional information decoder 5024 generates additional information by decoding encoded additional information.

Combiner 5025 generates geometry information by combining pieces of divided geometry information using additional information. Combiner 5025 also generates attribute information by combining pieces of divided attribute information using additional information. For example, first, combiner 5025 generates pieces of point cloud data corresponding to tiles by combing pieces of decoded point cloud data corresponding to slices using slice additional information. Next, combiner 5025 restores original point cloud data by combining pieces of point cloud data corresponding to the tiles using tile additional information.

It should be noted that although FIG. 50 shows two geometry information decoders 5022 and two attribute information decoders 5023 as an example, the number of geometry information decoders 5022 and the number of attribute information decoders 5023 may be one or at least three. Moreover, pieces of divided data may be processed in parallel in identical chips, such as cores in a CPU, in a core of each of chips, or in cores of each of chips.

The following describes a method of dividing point cloud data. An autonomous application for automated driving of a vehicle etc. requires not point cloud data of all areas but point cloud data of an area surrounding a vehicle or an area in a traveling direction of a vehicle.

Figure 52:
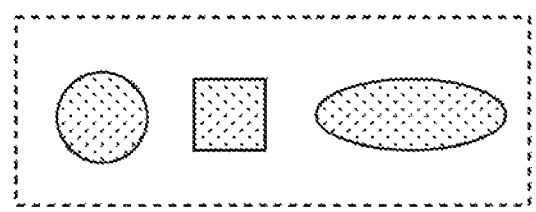
FIG. 52 is a diagram illustrating examples of a tile shape according to Embodiment 6.

FIG. 52 is a diagram illustrating examples of a tile shape. As shown in FIG. 52, examples of the tile shape may include various shapes such as a circle, a rectangle, or an ellipse.

Figure 53:
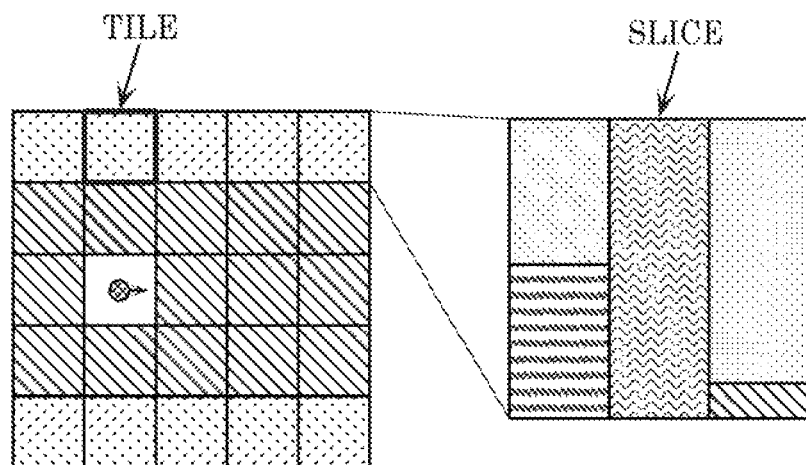
FIG. 53 is a diagram illustrating an example of tiles and slices according to Embodiment 6.

FIG. 53 is a diagram illustrating an example of tiles and slices. A composition of slices may differ between tiles. For example, a composition of tiles or slices may be optimized based on a data volume. Alternatively, a composition of tiles or slices may be optimized based on decoding speed.

Tile division may be performed based on geometry information. In this case, attribute information is divided in the same manner as corresponding geometry information.

Moreover, in slice division after tile division, geometry information and attribute information may be divided into slices using different methods. For example, a slice division method in each tile may be selected upon request from an application. A different slice division method or a different tile division method may be used based on a request from an application.

For example, divider 5011 divides three-dimensional point cloud data into one or more tiles in a two-dimensional shape obtained by seeing the three-dimensional point cloud data from top, based on position information such as map information. Divider 5011 divides each of the one or more tiles into one or more slices afterward.

It should be noted that divider 5011 may divide geometry information (geometry) and attribute information (attribute) into slices using the same method.

It should be noted that each of geometry information and attribute information may be of one type or two or more types. In addition, when point cloud data has no attribute information, attribute information may be unnecessary.

Figure 54:
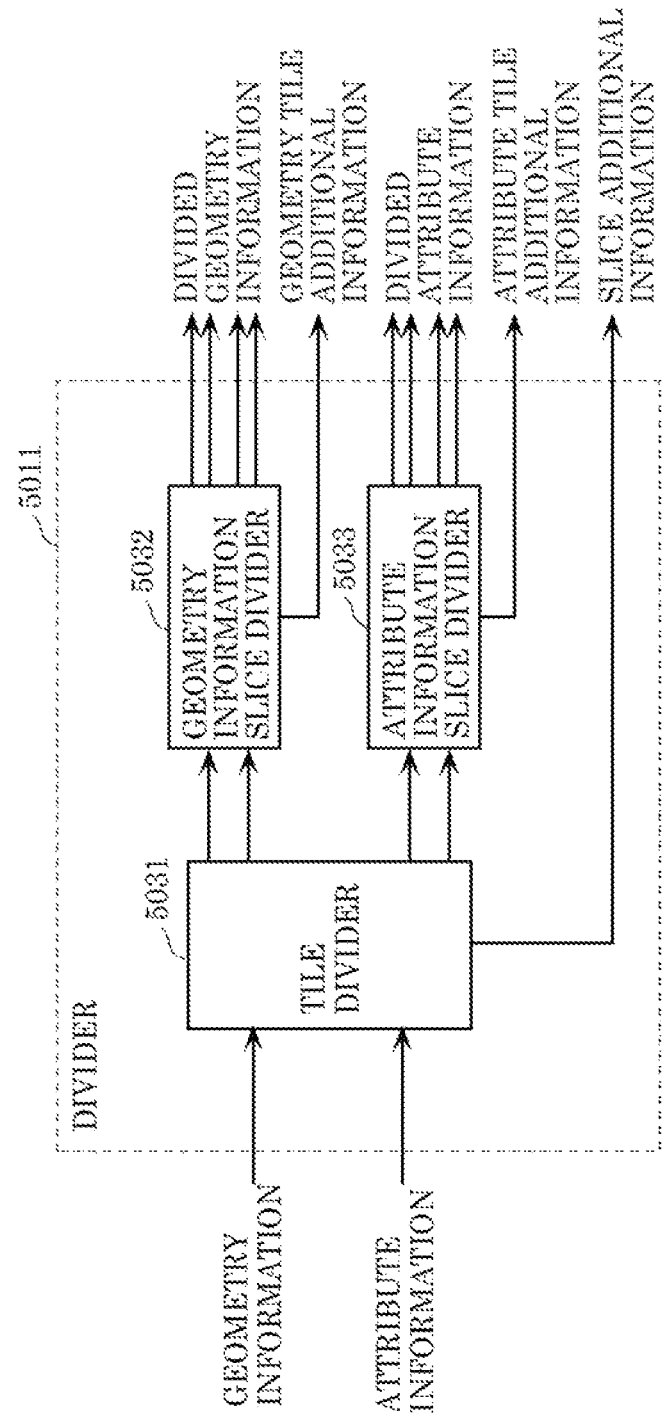
FIG. 54 is a block diagram of a divider according to Embodiment 6.

FIG. 54 is a block diagram of divider 5011. Divider 5011 includes tile divider 5031, geometry information slice divider (geometry slice divider) 5032, and attribute information slice divider (attribute slice divider) 5033.

Tile divider 5031 generates pieces of tile geometry information by dividing geometry information (position (geometry)) into tiles. In addition, tile divider 5031 generates pieces of tile attribute information by dividing attribute information (attribute) into tiles. Additionally, tile divider 5031 outputs tile additional information (tile metadata) including information regarding tile division and information generated in the tile division.

Geometry information slice divider 5032 generates pieces of divided geometry information (pieces of slice geometry information) by dividing pieces of tile geometry information into slices. In addition, geometry information slice divider 5032 outputs geometry slice additional information (geometry slice metadata) including information regarding slice division of geometry information and information generated in the slice division of the geometry information.

Attribute information slice divider 5033 generates pieces of divided attribute information (pieces of slice attribute information) by dividing pieces of tile attribute information into slices. In addition, attribute information slice divider 5033 outputs attribute slice additional information (attribute slice metadata) including information regarding slice division of attribute information and information generated in the slice division of the attribute information.

The following describes examples of a tile shape. An entire three-dimensional map (3D map) is divided into tiles. Data of the tiles are selectively transmitted to a three-dimensional data decoding device. Alternatively, the data of the tiles are transmitted to the three-dimensional data decoding device in decreasing order of importance. A tile shape may be selected from shapes according to a situation.

Figure 55:
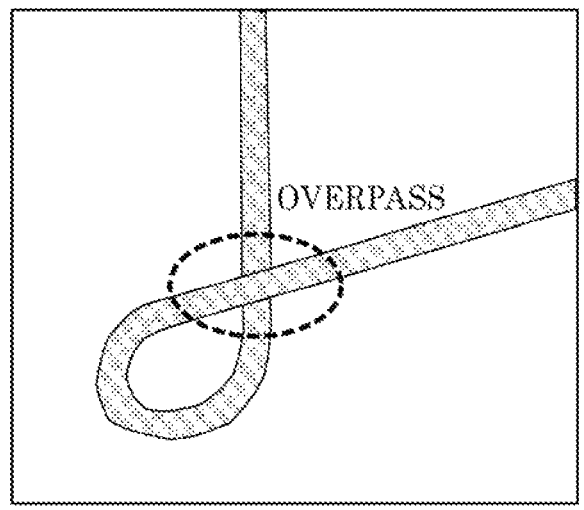
FIG. 55 is a diagram illustrating an example of a map in a top view of point cloud data according to Embodiment 6.

FIG. 55 is a diagram illustrating an example of a map in a top of view of point cloud data obtained by LiDAR. The example shown in FIG. 55 is point cloud data of a highway and includes an overpass (flyover).

Figure 56:
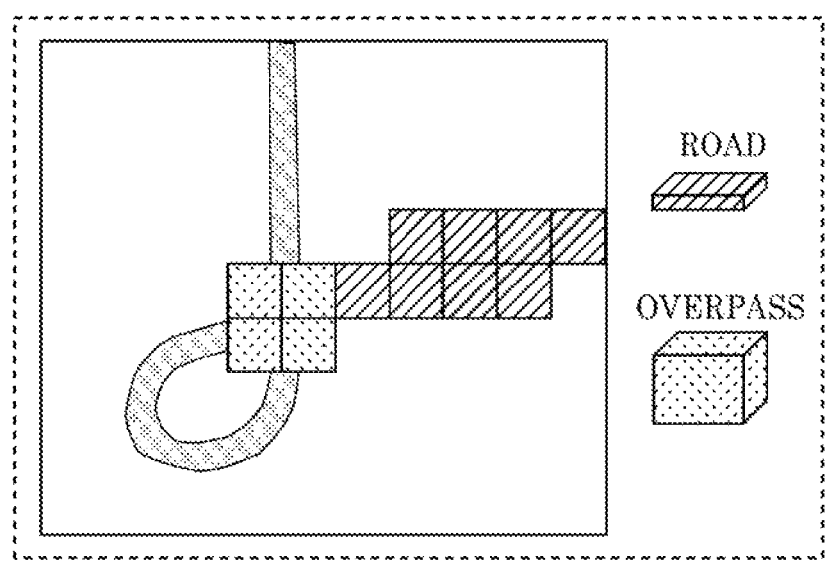
FIG. 56 is a diagram illustrating an example of tile division according to Embodiment 6.

FIG. 56 is a diagram illustrating an example of dividing the point cloud data shown in FIG. 55 into square tiles. It is easy to make such a division into squares in a map server. For a normal road, the height of a tile is set low. The height of tiles is set higher for an overpass than for the normal road so that the tiles contain the overpass.

Figure 57:
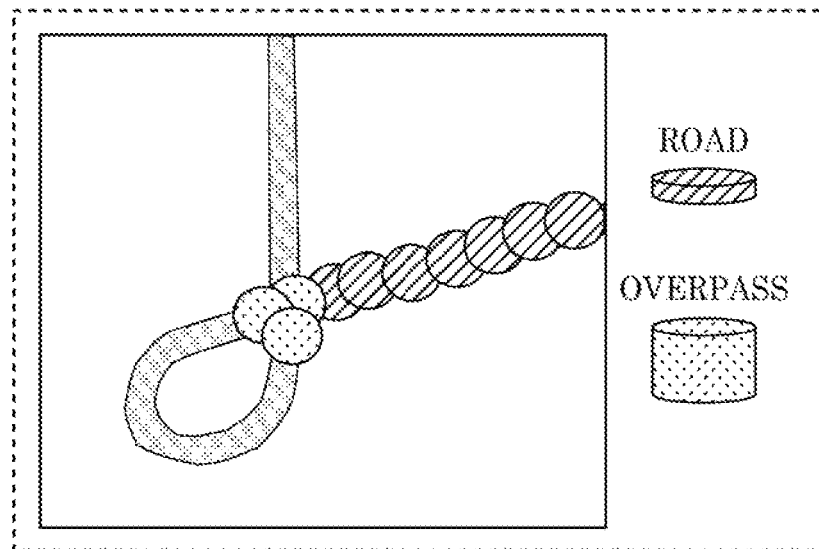
FIG. 57 is a diagram illustrating an example of tile division according to Embodiment 6.

FIG. 57 is a diagram illustrating an example of dividing the point cloud data shown in FIG. 55 into circular tiles. In this case, neighboring tiles may overlap each other in plan view. When a vehicle requires point cloud data of a surrounding area, the three-dimensional data encoding device transmits, to the vehicle, point cloud data of an area including columns (circles in top view) surrounding the vehicle.

As with the example shown in FIG. 56, for a normal road, the height of a tile is set low. The height of tiles is set higher for an overpass than for the normal road so that the tiles contain the overpass.

The three-dimensional data encoding device may change the height of a tile according to, for example, the shape or height of a road or building. In addition, the three-dimensional data encoding device may change the height of a tile according to position information or area information. Additionally, the three-dimensional data encoding device may change the height of each tile. Alternatively, the three-dimensional data encoding device may change the height of tiles for each zone including the tiles. To put it another way, the three-dimensional data encoding device may set tiles in a zone to the same height. Moreover, tiles having different heights may overlap each other in top view.

Figure 58:
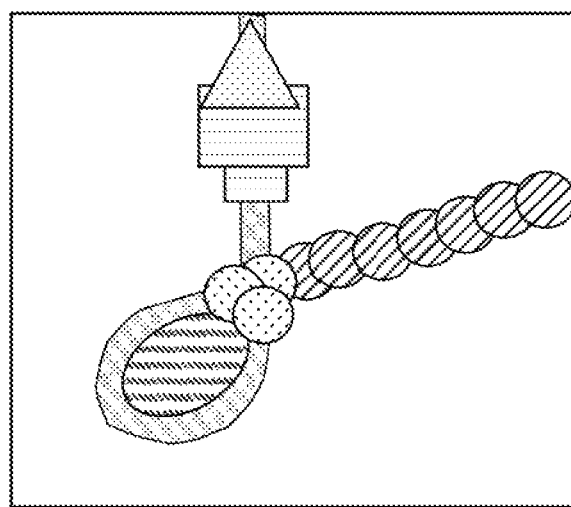
FIG. 58 is a diagram illustrating an example of tile division according to Embodiment 6.

FIG. 58 is a diagram illustrating an example of tile division when tiles having various shapes, sizes, and heights are used. Any tile may have any shape or size, or a combination of these.

For example, in addition to making a division into non-overlapping square tiles and making a division into overlapping circular tiles as described above, the three-dimensional data encoding device may make a division into overlapping square tiles. Moreover, the tile shape need not be a square or a circle, and may be a polygon having three or more vertices, or a shape having no vertices.

Furthermore, a tile shape may be of two or more types, and tiles having different shapes may overlap each other. In addition, a tile shape may be of one or more types; and when the same shape is used for divided tiles, the same shape may include shapes different in size or such shapes may overlap each other.

For example, a tile to be used is larger for an area including no object such as a road than for an area including an object. Moreover, the three-dimensional data encoding device may adaptively change a tile shape or size according to an object.

Furthermore, for example, the three-dimensional data encoding device may set tiles in a traveling direction of an automobile (a vehicle) to a large size because reading of tiles at a great distance ahead of the automobile in the traveling direction is likely to be needed; and set tiles in a side lateral to the automobile to a smaller size than the tiles in the traveling direction because the automobile is less likely to move to the side.

Figure 59:
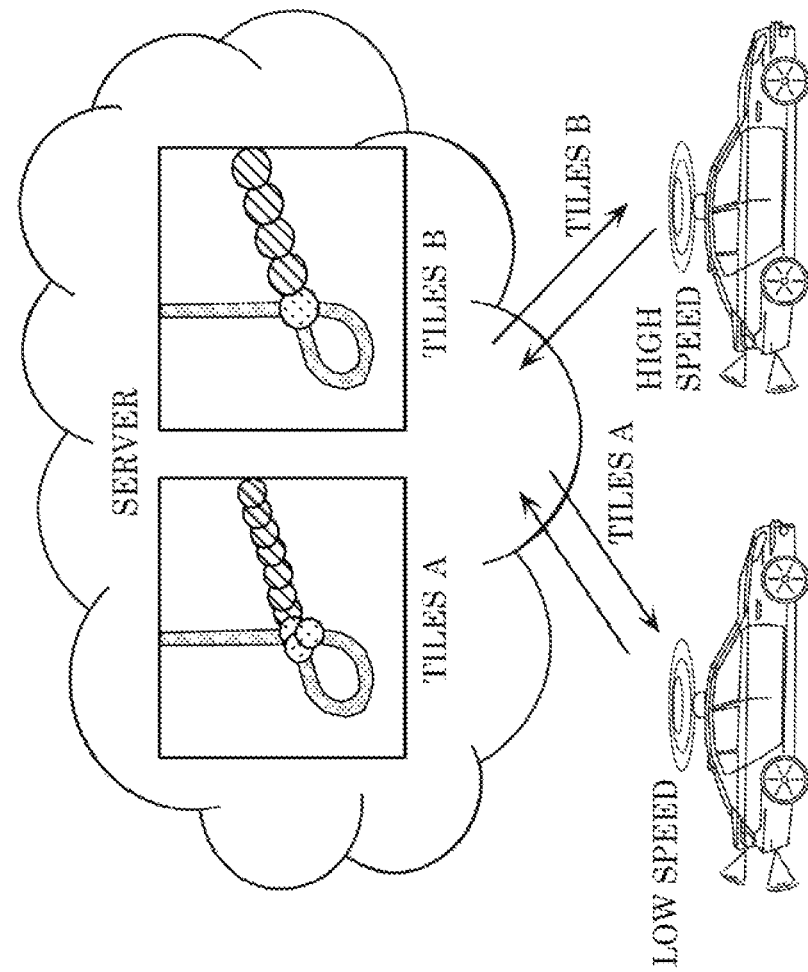
FIG. 59 is a diagram illustrating an example of data of tiles stored in a server according to Embodiment 6.

FIG. 59 is a diagram illustrating an example of data of tiles stored in a server. For example, point cloud data is divided into tiles and encoded in advance, and the obtained encoded data is stored in a server. A user obtains the data of desired tiles from the server when necessary. Alternatively, the server (the three-dimensional data encoding device) may perform tile division and encoding so that tiles include data desired by the user, in response to an instruction from the user.

For example, when a movable body (a vehicle) travels at a high speed, it is conceivable that more extensive point cloud data is needed. For this reason, the server may determine a tile shape and size based on a pre-estimated vehicular speed (e.g., a legal speed on a road, a vehicular speed estimated from the width or shape of a road, or a statistical vehicular speed), and perform tile division. Alternatively, as shown in FIG. 59, the server may encode tiles having a shape or size in advance, and store the obtained data. The movable body may obtain data of tiles having an appropriate shape or size according to the traveling direction and speed of the movable body.

Figure 60:
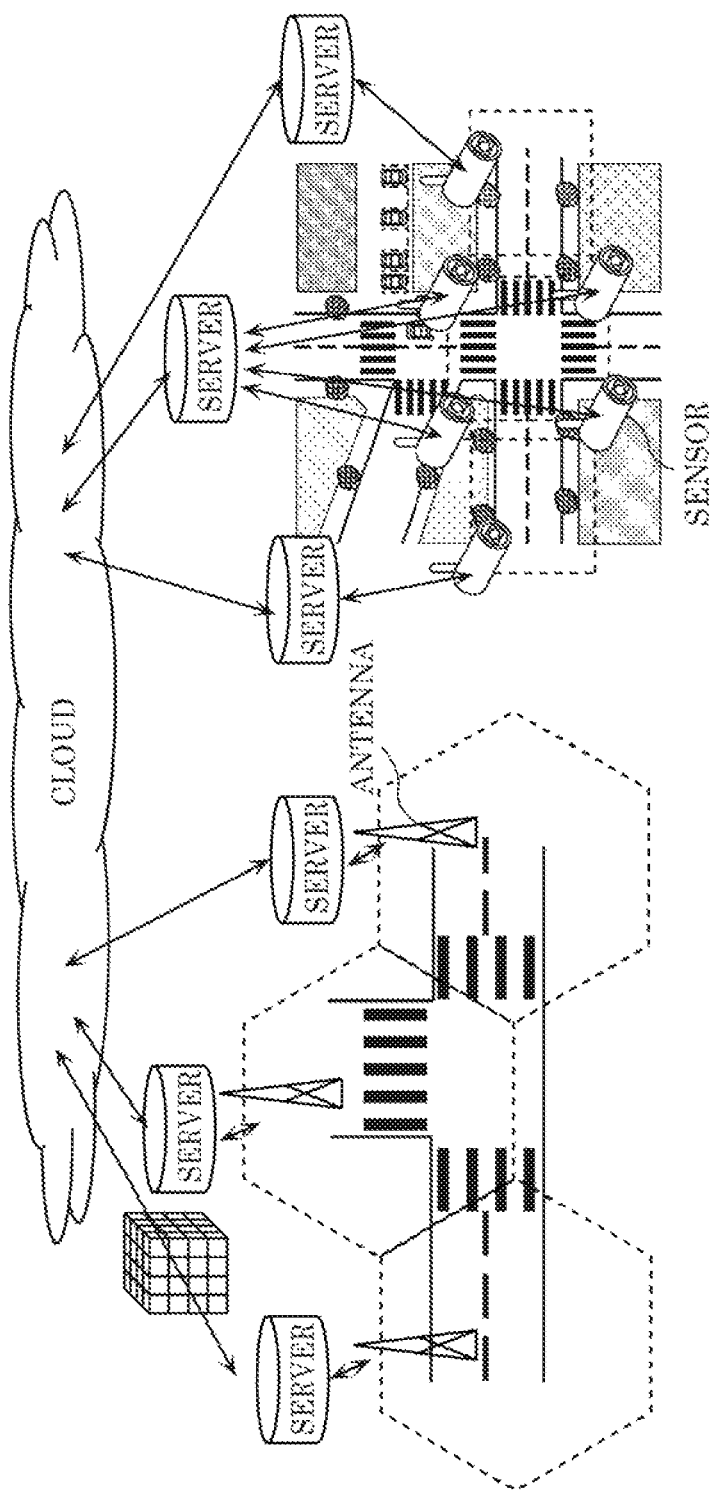
FIG. 60 is a diagram illustrating a system regarding tile division according to Embodiment 6.

FIG. 60 is a diagram illustrating an example of a system regarding tile division. As shown in FIG. 60, a tile shape and an area may be determined based on the location of an antenna (a base station) that is a means of communication transmitting point cloud data, or on a communication area supported by an antenna. Alternatively, when point cloud data is generated by a sensor such as a camera, a tile shape and an area may be determined based on the location or a target range (a detection range) of the sensor.

One tile may be assigned to one antenna or one sensor, or one tile may be assigned to antennas or sensors. In addition, tiles may be assigned to one antenna or one sensor. An antenna or a sensor may be fixed or movable.

For example, encoded data divided into tiles may be managed by a server connected to an antenna or a sensor for an area assigned to the tiles. The server may manage the encoded data of the area and tile information of a neighboring area. Pieces of encoded data of tiles may be managed in a centralized server (a cloud) that manages servers each corresponding to a different one of the tiles. Alternatively, instead of providing the servers each corresponding to the different one of the tiles, antennas or sensors may be directly connected to the centralized server.

It should be noted that the target range of an antenna or a sensor may change depending on the power of radio waves, differences between devices, and installation conditions, and a tile shape and size may change in conformity with these. Instead of a tile, a slice or a PCC frame may be assigned based on the target range of the antenna or the sensor.

The following describes a method of dividing a tile into slices. It is possible to improve the coding efficiency by assigning similar objects to the same slice.

For example, the three-dimensional data encoding device may recognize objects (e.g., a road, a building, a tree) using features of point cloud data, and perform slice division by clustering point clouds for each of the objects.

Alternatively, the three-dimensional data encoding device may classify objects having the same attribute into groups, and perform slice division by assigning a slice to each of the groups. Here, an attribute is, for example, information regarding motion. Objects are classified into groups according to dynamic information about pedestrians, cars, etc., quasi-dynamic information about accidents, congestion, etc., quasi-static information about traffic controls, roadwork, etc., and static information about road surfaces, structures, etc.

It should be noted that slices may have overlapping data. For example, when slice division is performed for each object group, any object may belong to one object group or two or more object groups.

Figure 61:
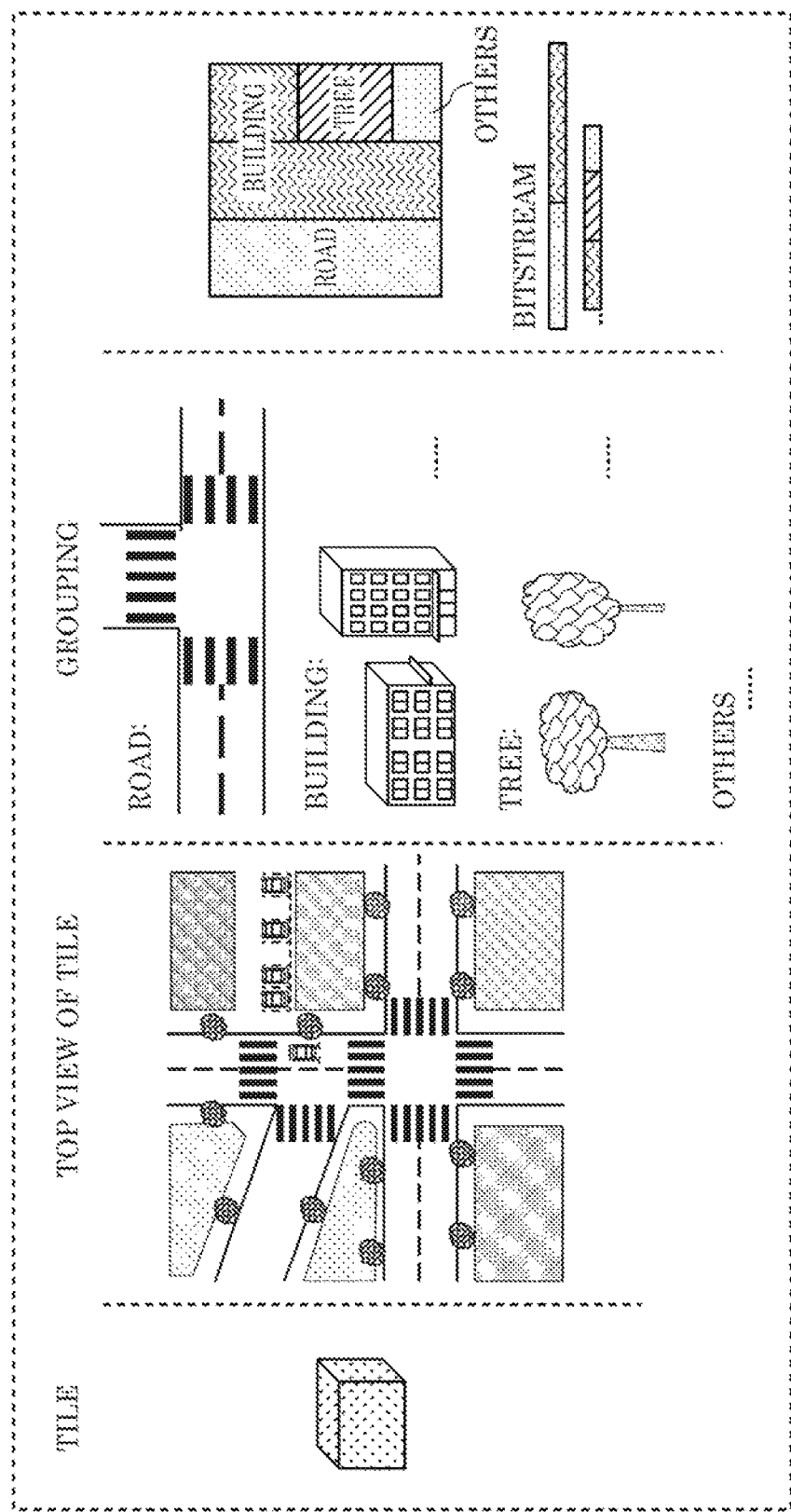
FIG. 61 is a diagram illustrating an example of slice division according to Embodiment 6.

FIG. 61 is a diagram illustrating an example of this slice division. For example, a tile is a cuboid in the example shown in FIG. 61. It should be noted that a tile may be columnar or have another shape.

Point clouds included in a tile are classified into object groups such as road, building, and tree. Then, slice division is performed so that each object group is included in a different one of slices. Subsequently, the slices are encoded separately.

The following describes a method of encoding divided data. The three-dimensional data encoding device (first encoder 5010) encodes each divided data. When the three-dimensional data encoding device encodes attribute information, the three-dimensional data encoding device generates, as additional information, dependency relationship information indicating based on which composition information (geometry information, additional information, or another attribute information) encoding has been performed. In other words, dependency relationship information indicates, for example, composition information of a reference destination (a dependee). In this case, the three-dimensional data encoding device generates dependency relationship information based on composition information corresponding to a divided shape for attribute information. It should be noted that the three-dimensional data encoding device may generate dependency relationship information based on composition information corresponding to divided shapes.

Dependency relationship information may be generated by the three-dimensional data encoding device, and the generated dependency relationship information may be transmitted to the three-dimensional data decoding device. Alternatively, the three-dimensional data decoding device may generate dependency relationship information, and the three-dimensional data encoding device need not transmit dependency relationship information. In addition, a dependency relationship to be used by the three-dimensional data encoding device may be determined in advance, and the three-dimensional data encoding device need not transmit dependency relationship information.

Figure 62:
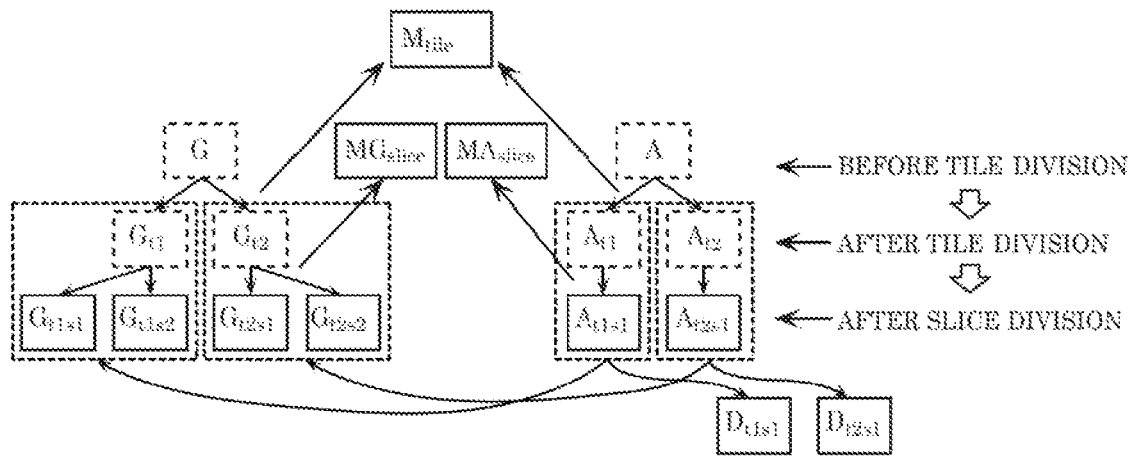
FIG. 62 is a diagram illustrating an example of dependency relationships according to Embodiment 6.

FIG. 62 is a diagram illustrating an example of a dependency relationship of each data. The pointed end of an arrow in the figure indicates a dependee, and the other end of the arrow indicates a depender. The three-dimensional data decoding device decodes data in order from dependee to depender. Data indicated by a solid line in the figure is data actually transmitted, and data indicated by a broken line is data not transmitted.

In the figure, G denotes geometry information, and A denotes attribute information. Gt1 denotes geometry information for tile number 1, and Gt2 denotes geometry information for tile number 2. Gt1s1 denotes geometry information for tile number 1 and slice number 1, Gt1s2 denotes geometry information for tile number 1 and slice number 2, Gt2s1 denotes geometry information for tile number 2 and slice number 1, and Gt2s2 denotes geometry information for tile number 2 and slice number 2. Likewise, At1 denotes attribute information for tile number 1, and At2 denotes attribute information for tile number 2. At1s1 denotes attribute information for tile number 1 and slice number 1, At1s2 denotes attribute information for tile number 1 and slice number 2, At2s1 denotes attribute information for tile number 2 and slice number 1, and At2s2 denotes attribute information for tile number 2 and slice number 2.

Mtile denotes tile additional information, MGslice denotes geometry slice additional information, and MAslice denotes attribute slice additional information. Dt1s1 denotes dependency relationship information of attribute information At1s1, and Dt2s1 denotes dependency relationship information of attribute information At2s1.

It should be noted that a different structure resulting from tile division or slice division may be used according to an application etc.

The three-dimensional data encoding device may rearrange data in decoding order so that the three-dimensional data decoding device need not rearrange data. It should be noted that the three-dimensional data decoding device may rearrange data, or both the three-dimensional data encoding device and the three-dimensional data decoding device may rearrange data.

Figure 63:
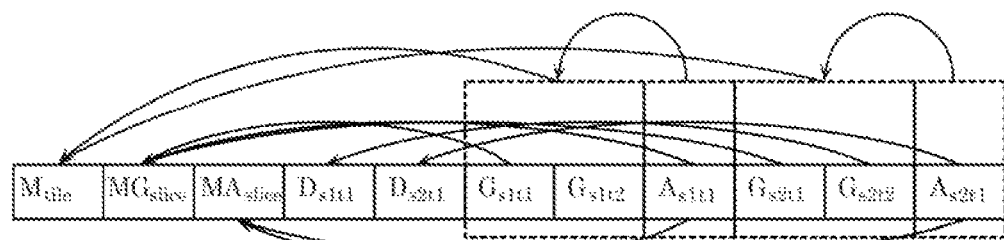
FIG. 63 is a diagram illustrating an example of decoding order of data according to Embodiment 6.

FIG. 63 is a diagram illustrating an example of decoding order of data. In the example shown in FIG. 63, data are decoded in order from the left. The three-dimensional data decoding device decodes, out of data having a dependency relationship with each other, data of a dependee first. For example, the three-dimensional data encoding device rearranges data in this order and transmits the data. It should be noted that any order may be used as long as data of a dependee takes precedence. Moreover, the three-dimensional data encoding device may transmit additional information and dependency relationship information before data.

Figure 64:
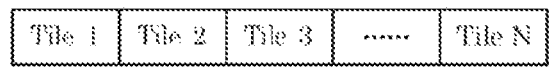
FIG. 64 is a diagram illustrating an example of encoded data of tiles according to Embodiment 6.

Furthermore, the three-dimensional data decoding device may selectively decode tiles based on a request from an application and information obtained from a NAL unit header. FIG. 64 is a diagram illustrating an example of encoded data of tiles. For example, decoding order of tiles is optional. In other words, tiles need not have a dependency relationship with each other.

Figure 65:
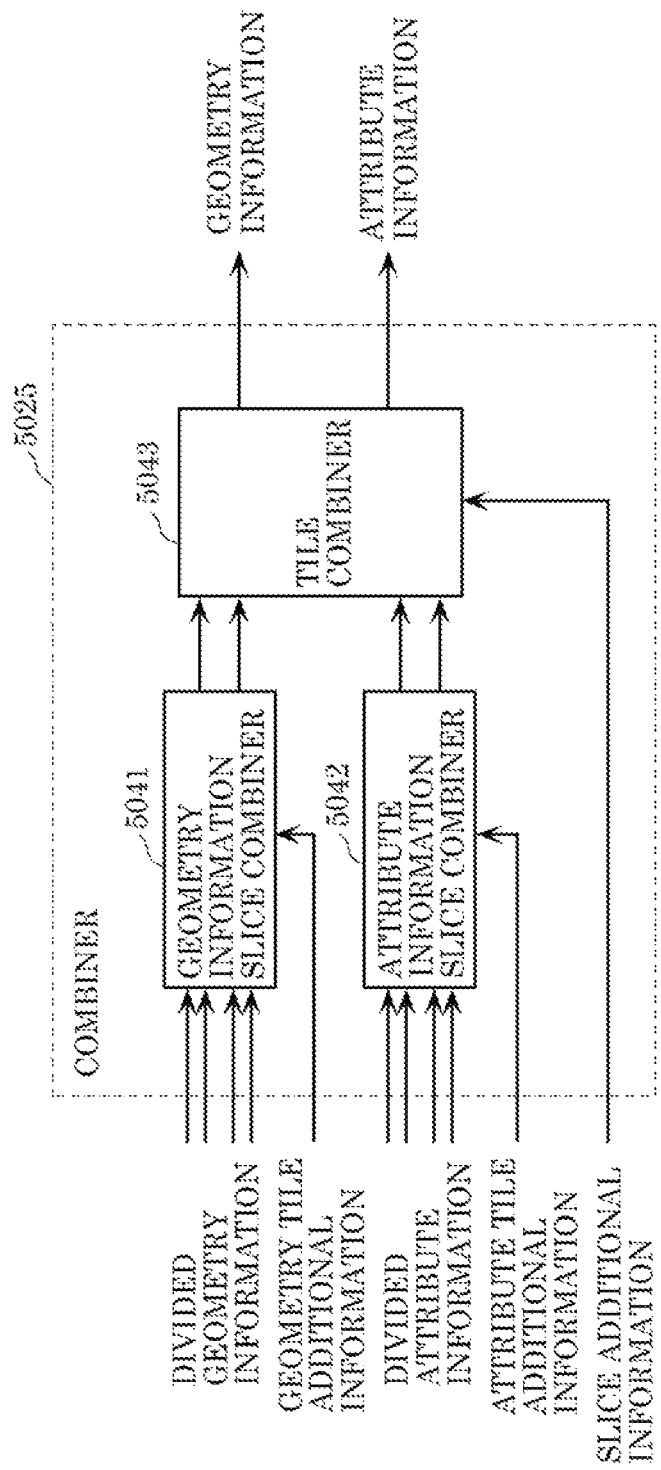
FIG. 65 is a block diagram of a combiner according to Embodiment 6.

The following describes a configuration of combiner 5025 included in first decoder 5020. FIG. 65 is a block diagram illustrating a configuration of combiner 5025. Combiner 5025 includes geometry information slice combiner (geometry slice combiner) 5041, attribute information slice combiner (attribute slice combiner) 5042, and tile combiner 5043.

Geometry information slice combiner 5041 generates pieces of tile geometry information by combining pieces of divided geometry information using geometry slice additional information. Attribute information slice combiner 5042 generates pieces of tile attribute information by combining pieces of divided attribute information using attribute slice additional information.

Tile combiner 5043 generates geometry information by combining pieces of tile geometry information using tile additional information. Besides, tile combiner 5043 generates attribute information by combining pieces of tile attribute information using tile additional information.

It should be noted that the number of divided slices or tiles is at least one. In other words, slice division or tile division need not be performed.

Figure 66:
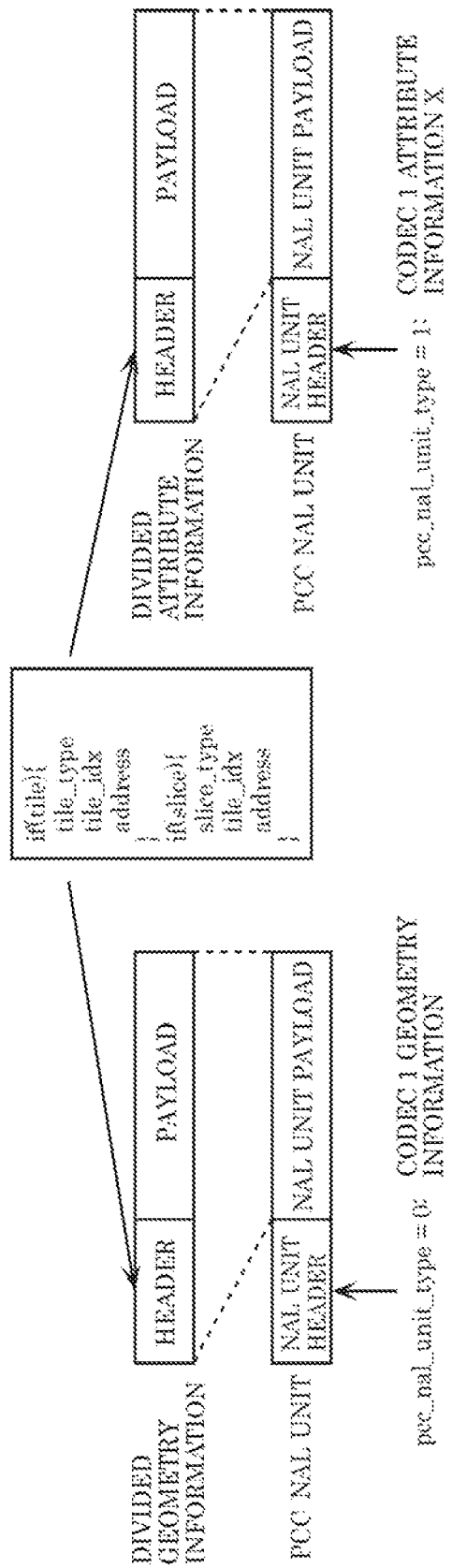
FIG. 66 is a diagram illustrating a structural example of encoded data and NAL units according to Embodiment 6.

The following describes a structure of encoded data subjected to slice division or tile division, and a method of storing encoded data in a NAL unit (a multiplexing method). FIG. 66 is a diagram illustrating a structure of encoded data and a method of storing encoded data in a NAL unit.

Encoded data (divided geometry information or divided attribute information) is stored in a NAL unit payload.

Encoded data includes a header and a payload. The header includes identification information for identifying data included in the payload. Examples of the identification information include a type of slice division or tile division (slice_type, tile_type), index information for identifying a slice or a tile (slice_idx, tile_idx), geometry information of data (a slice or tile), or an address of data (address). Index information for identifying a slice is also referred to as a slice index (SliceIndex). Index information for identifying a tile is also referred to as a tile index (TileIndex). A division type indicates, for example, a method based on an object shape as described above, a method based on map information or position information, or a method based on a data volume or an amount of processing.

Moreover, the header of the encoded data includes identification information indicating a dependency relationship. To put it another way, when data have a dependency relationship with each other, the header includes identification information for a depender to refer to a dependee. For example, the header of data of a dependee includes identification information for identifying the data. The header of data of a depender includes identification information indicating a dependee. It should be noted that when identification information for identifying data, additional information regarding slice division or tile division, and identification information indicating a dependency relationship are identifiable or derivable from other information, these pieces of information may be omitted.

Figure 67:
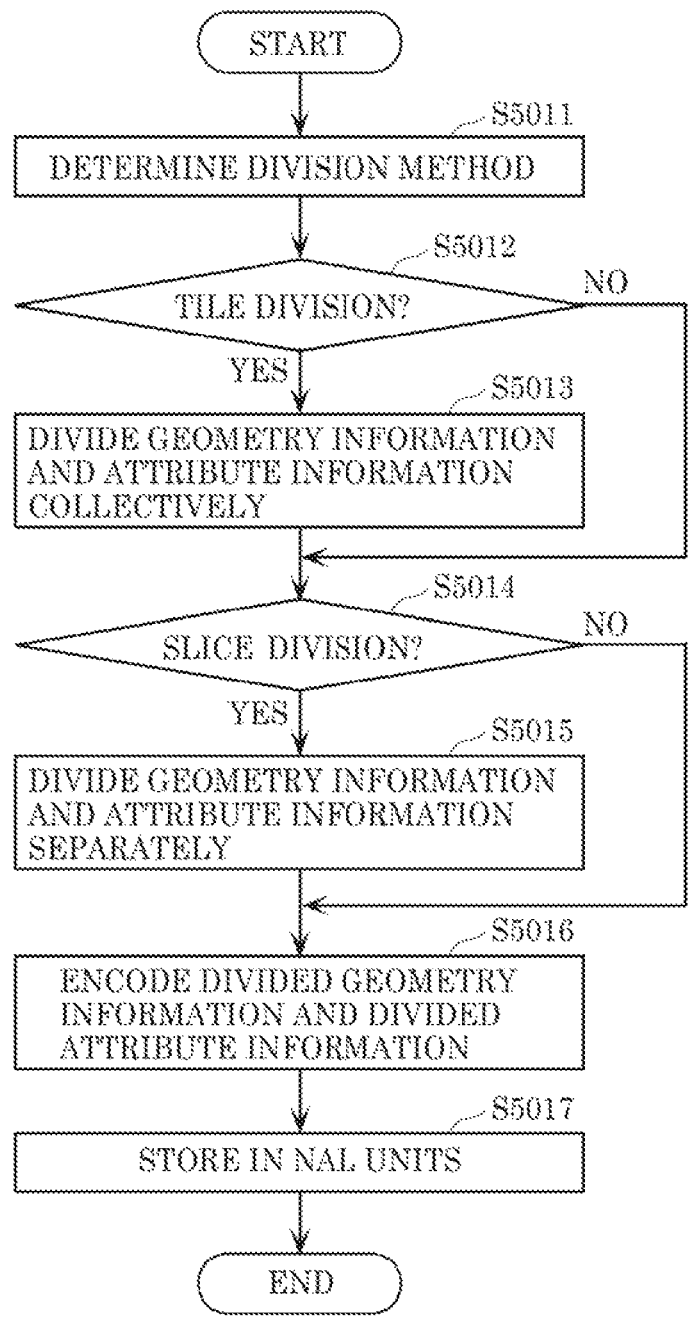
FIG. 67 is a flowchart of an encoding process according to Embodiment 6.

The following describes procedures of a point cloud data encoding process and a point cloud data decoding process according to the present embodiment. FIG. 67 is a flowchart of a point cloud data encoding process according to the present embodiment.

First, the three-dimensional data encoding device determines a division method to be used (S5011). Examples of the division method include tile division and slice division. A division method may include a division number, a division type, etc. when tile division or slice division is performed. A division type indicates, for example, a method based on an object shape as described above, a method based on map information or geometry information, or a method based on a data volume or an amount of processing. It should be noted that a division method may be determined in advance.

When tile division is performed (YES in S5012), the three-dimensional data encoding device generates pieces of tile geometry information and pieces of tile attribute information by dividing geometry information and attribute information collectively (S5013). Besides, the three-dimensional data encoding device generates tile additional information regarding the tile division. It should be noted that the three-dimensional data encoding device may divide geometry information and attribute information separately.

When slice division is performed (YES in S5014), the three-dimensional data encoding device generates pieces of divided geometry information and pieces of divided attribute information by dividing the pieces of tile geometry information and the pieces of tile attribute information (or the geometry information and the attribute information) separately (S5015). Also, the three-dimensional data encoding device generates geometry slice additional information and attribute slice additional information regarding the slice division. It should be noted that the three-dimensional data encoding device may divide tile geometry information and tile attribute information collectively.

Next, the three-dimensional data encoding device generates pieces of encoded geometry information and pieces of encoded attribute information by respectively encoding the pieces of divided geometry information and the pieces of divided attribute information (S5016). In addition, the three-dimensional data encoding device generates dependency relationship information.

Finally, the three-dimensional data encoding device generates encoded data (an encoded stream) by storing in NAL units (multiplexing) the pieces of encoded geometry information, the pieces of encoded attribute information, and additional information (S5017). Additionally, the three-dimensional data encoding device transmits the generated encoded data.

Figure 68:
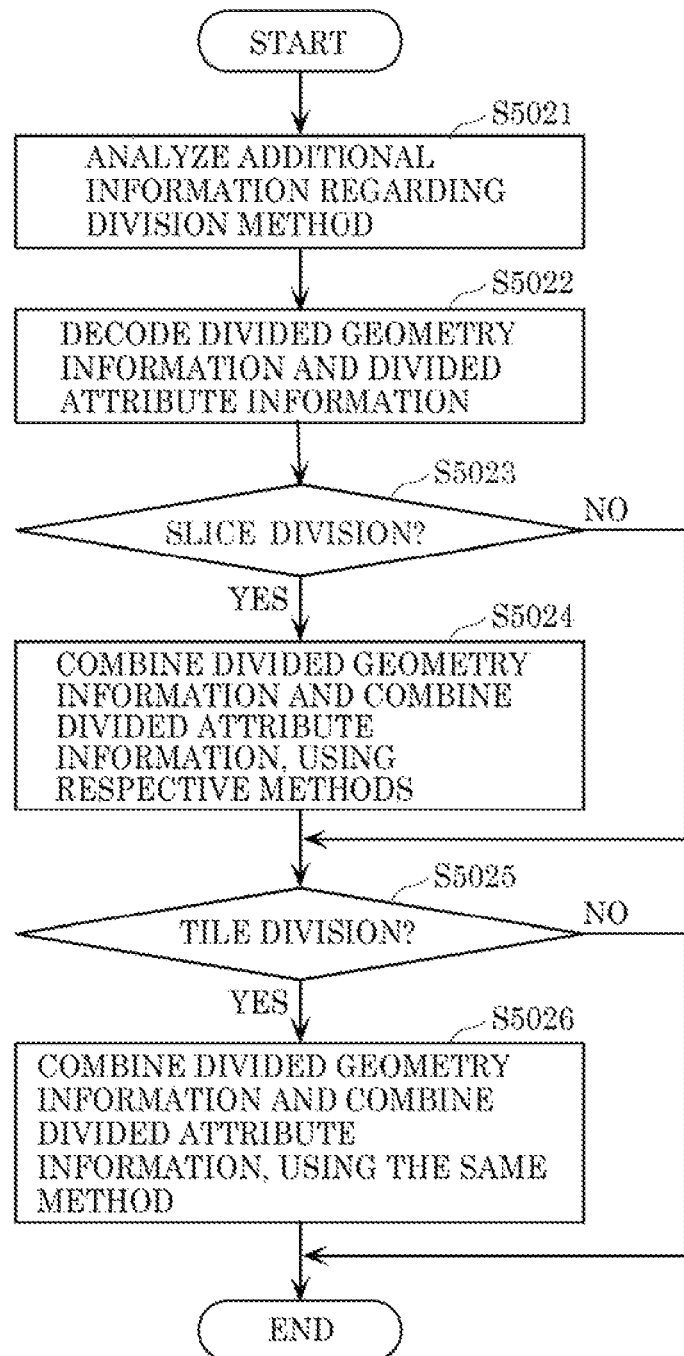
FIG. 68 is a flowchart of a decoding process according to Embodiment 6.

FIG. 68 is a flowchart of a point cloud data decoding process according to the present embodiment. First, the three-dimensional data decoding device determines a division method by analyzing additional information (tile additional information, geometry slice additional information, attribute slice additional information) regarding a division method included in encoded data (an encoded stream) (S5021). Examples of the division method include tile division and slice division. A division method may include a division number, a division type, etc. when tile division or slice division is performed.

Next, the three-dimensional data decoding device generates divided geometry information and divided attribute information by decoding pieces of encoded geometry information and pieces of encoded attribute information included in the encoded data, using dependency relationship information included in the encoded data (S5022).

When the additional information indicates that slice division has been performed (YES in S5023), the three-dimensional data decoding device generates pieces of tile geometry information and pieces of tile attribute information by combining pieces of divided geometry information and combining pieces of divided attribute information, using respective methods, based on the geometry slice additional information and the attribute slice additional information (S5024). It should be noted that the three-dimensional data decoding device may combine the pieces of divided geometry information and combine the pieces of divided attribute information, using the same method.

When the additional information indicates that tile division has been performed (YES in S5025), the three-dimensional data decoding device generates geometry information and attribute information by combining the pieces of tile geometry information (the pieces of divided geometry information) and combining the pieces of tile attribute information (the pieces of divided attribute information), using the same method, based on tile additional information (S5026). It should be noted that the three-dimensional data decoding device may combine the pieces of tile geometry information and combine the pieces of tile attribute information, using respective methods.

The following describes tile additional information. The three-dimensional data encoding device generates tile additional information that is metadata regarding a tile division method, and transmits the generated tile additional information to the three-dimensional data decoding device.

FIG. 69 is a diagram illustrating an example of syntax of tile additional information (TileMetaData). As shown in FIG. 69, for example, tile additional information includes division method information (type_of_divide), shape information (topview_shape), an overlap flag (tile_overlap_flag), overlap information (type_of_overlap), height information (tile_height), a tile number (tile_number), and tile position information (global_position, relative_position).

Division method information (type_of_divide) indicates a tile division method. For example, division method information indicates whether a tile division method is division based on map information, that is, division based on top view (top_view) or another division (other).

Shape information (topview_shape) is included in tile additional information when a tile division method is, for example, division based on top view. Shape information indicates a shape in top view of a tile. Examples of the shape include a square and a circle. Moreover, the examples of the shape may include an ellipse, a rectangle, or a polygon other than a quadrangle, or may include a shape other than these. It should be noted that shape information may indicate not only a shape in top view of a tile but also a three-dimensional shape (e.g., a cube, a round column) of a tile.

An overlap flag (tile_overlap_flag) indicates whether tiles overlap each other. For example, an overlap flag is included in tile additional information when a tile division method is division based on top view. In this case, the overlap flag indicates whether tiles overlap each other in top view. It should be noted that an overlap flag may indicate whether tiles overlap each other in a three-dimensional space.

Overlap information (type_of_overlap) is included in tile additional information when, for example, tiles overlap each other. Overlap information indicates, for example, how tiles overlap each other. For example, overlap information indicates the size of an overlapping region.

Height information (tile_height) indicates the height of a tile. It should be noted that height information may include information indicating a tile shape. For example, when the shape of a tile in top view is a rectangle, the information may indicate the length of a side (a vertical length, a horizontal length) of the rectangle. When the shape of a tile in top view is a circle, the information may indicate the diameter or radius of the circle.

Moreover, height information may indicate the height of each tile or a height common to tiles. In addition, height types such as roads and overpasses may be set in advance, and height information may indicate the height of each of the height types and a height type of each tile. Alternatively, a height of each height type may be specified in advance, and height information may indicate a height type of each tile. In other words, height information need not indicate a height of each height type.

A tile number (tile_number) indicates the number of tiles. It should be noted that tile additional information may include information indicating an interval between tiles.

Tile position information (global_position, relative_position) is information for identifying the position of each tile. For example, tile position information indicates the absolute coordinates or relative coordinates of each tile.

It should be noted that part or all of the above-mentioned information may be provided for each tile or each group of tiles (e.g., for each frame or group of frames).

The three-dimensional data encoding device may include tile additional information in supplemental enhancement information (SEI) and transmit the SEI. Alternatively, the three-dimensional data encoding device may store tile additional information in an existing parameter set (PPS, GPS, or APS, etc.) and transmit the parameter set.

For example, when tile additional information changes for each frame, the tile additional information may be stored in a parameter set for each frame (GPS or APS etc.). When tile additional information does not change in a sequence, the tile additional information may be stored in a parameter set for sequence (geometry SPS or attribute SPS). Further, when the same tile division information is used for geometry information and attribute information, tile additional information may be stored in a parameter set for a PCC stream (a stream PS).

Moreover, tile additional information may be stored in any one of the above-mentioned parameter sets or in parameter sets. In addition, tile additional information may be stored in the header of encoded data. Additionally, tile additional information may be stored in the header of a NAL unit.

Furthermore, part or all of tile additional information may be stored in one of the header of divided geometry information and the header of divided attribute information, and need not be stored in the other. For example, when the same tile additional information is used for geometry information and attribute information, the tile additional information may be included in the header of one of the geometry information and the attribute information. For example, when attribute information depends on geometry information, the geometry information is processed first. For this reason, the tile additional information may be included in the header of the geometry information, and need not be included in the header of the attribute information. In this case, for example, the three-dimensional data decoding device determines that the attribute information of the depender belongs to the same tile as a tile having the geometry information of the dependee.

The three-dimensional data decoding device reconstructs point cloud data subjected to tile division, based on tile additional information. When there are pieces of overlapping point cloud data, the three-dimensional data decoding device specifies the pieces of overlapping point cloud data and selects one of the pieces of overlapping point cloud data or merges pieces of point cloud data.

Moreover, the three-dimensional data decoding device may perform decoding using tile additional information. For example, when tiles overlap each other, the three-dimensional data decoding device may perform decoding for each tile, perform processing (e.g., smoothing or filtering) using the pieces of decoded data, and generate point cloud data. This makes it possible to perform highly accurate decoding.

FIG. 70 is a diagram illustrating a configuration example of a system including the three-dimensional data encoding device and the three-dimensional data decoding device. Tile divider 5051 divides point cloud data including geometry information and attribute information into a first tile and a second tile. In addition, tile divider 5051 transmits tile additional information regarding tile division to decoder 5053 and tile combiner 5054.

Encoder 5052 generates encoded data by encoding the first tile and the second tile.

Decoder 5053 restores the first tile and the second tile by decoding the encoded data generated by encoder 5052. Tile combiner 5054 restores the point cloud data (the geometry information and the attribute information) by combining the first tile and the second tile using the tile additional information.

The following describes slice additional information. The three-dimensional data encoding device generates slice additional information that is metadata regarding a slice division method, and transmits the generated slice additional information to the three-dimensional data decoding device.

FIG. 71 is a diagram illustrating an example of syntax of slice additional information (SliceMetaData). As shown in FIG. 71, for example, slice additional information includes division method information (type_of_divide), an overlap flag (slice_overlap_flag), overlap information (type_of_overlap), a slice number (slice_number), slice position information (global_position, relative_position), and slice size information (slice_bounding_box_size).

Division method information (type_of_divide) indicates a slice division method. For example, division method information indicates whether a slice division method is division based on information about an object (object) as shown in FIG. 61. It should be noted that slice additional information may include information indicating an object division method. For example, this information indicates whether one object is to be divided into slices or assigned to one slice. In addition, the information may indicate, for example, a division number when one object is divided into slices.

An overlap flag (slice_overlap_flag) indicates whether slices overlap each other. Overlap information (type_of_overlap) is included in slice additional information when, for example, slices overlap each other. Overlap information indicates, for example, how slices overlap each other. For example, overlap information indicates the size of an overlapping region.

A slice number (slice_number) indicates the number of slices.

Slice position information (global_position, relative_position) and slice size information (slice_bounding_box_size) are information about a region of a slice. Slice position information is information for identifying the position of each slice. For example, slice position information indicates the absolute coordinates or relative coordinates of each slice. Slice size information (slice_bounding_box_size) indicates the size of each slice. For example, slice size information indicates the size of a bounding box of each slice.

The three-dimensional data encoding device may include slice additional information in SEI and transmit the SEI. Alternatively, the three-dimensional data encoding device may store slice additional information in an existing parameter set (PPS, GPS, or APS, etc.) and transmit the parameter set.

For example, when slice additional information changes for each frame, the slice additional information may be stored in a parameter set for each frame (GPS or APS etc.). When slice additional information does not change in a sequence, the slice additional information may be stored in a parameter set for sequence (geometry SPS or attribute SPS). Further, when the same slice division information is used for geometry information and attribute information, slice additional information may be stored in a parameter set for a PCC stream (a stream PS).

Moreover, slice additional information may be stored in any one of the above-mentioned parameter sets or in parameter sets. In addition, slice additional information may be stored in the header of encoded data. Additionally, slice additional information may be stored in the header of a NAL unit.

Furthermore, part or all of slice additional information may be stored in one of the header of divided geometry information and the header of divided attribute information, and need not be stored in the other. For example, when the same slice additional information is used for geometry information and attribute information, the slice additional information may be included in the header of one of the geometry information and the attribute information. For example, when attribute information depends on geometry information, the geometry information is processed first. For this reason, the slice additional information may be included in the header of the geometry information, and need not be included in the header of the attribute information. In this case, for example, the three-dimensional data decoding device determines that the attribute information of the depender belongs to the same slice as a slice having the geometry information of the dependee.

The three-dimensional data decoding device reconstructs point cloud data subjected to slice division, based on slice additional information. When there are pieces of overlapping point cloud data, the three-dimensional data decoding device specifies the pieces of overlapping point cloud data and selects one of the pieces of overlapping point cloud data or merges pieces of point cloud data.

Moreover, the three-dimensional data decoding device may perform decoding using slice additional information. For example, when slices overlap each other, the three-dimensional data decoding device may perform decoding for each slice, perform processing (e.g., smoothing or filtering) using the pieces of decoded data, and generate point cloud data. This makes it possible to perform highly accurate decoding.

Figure 72:
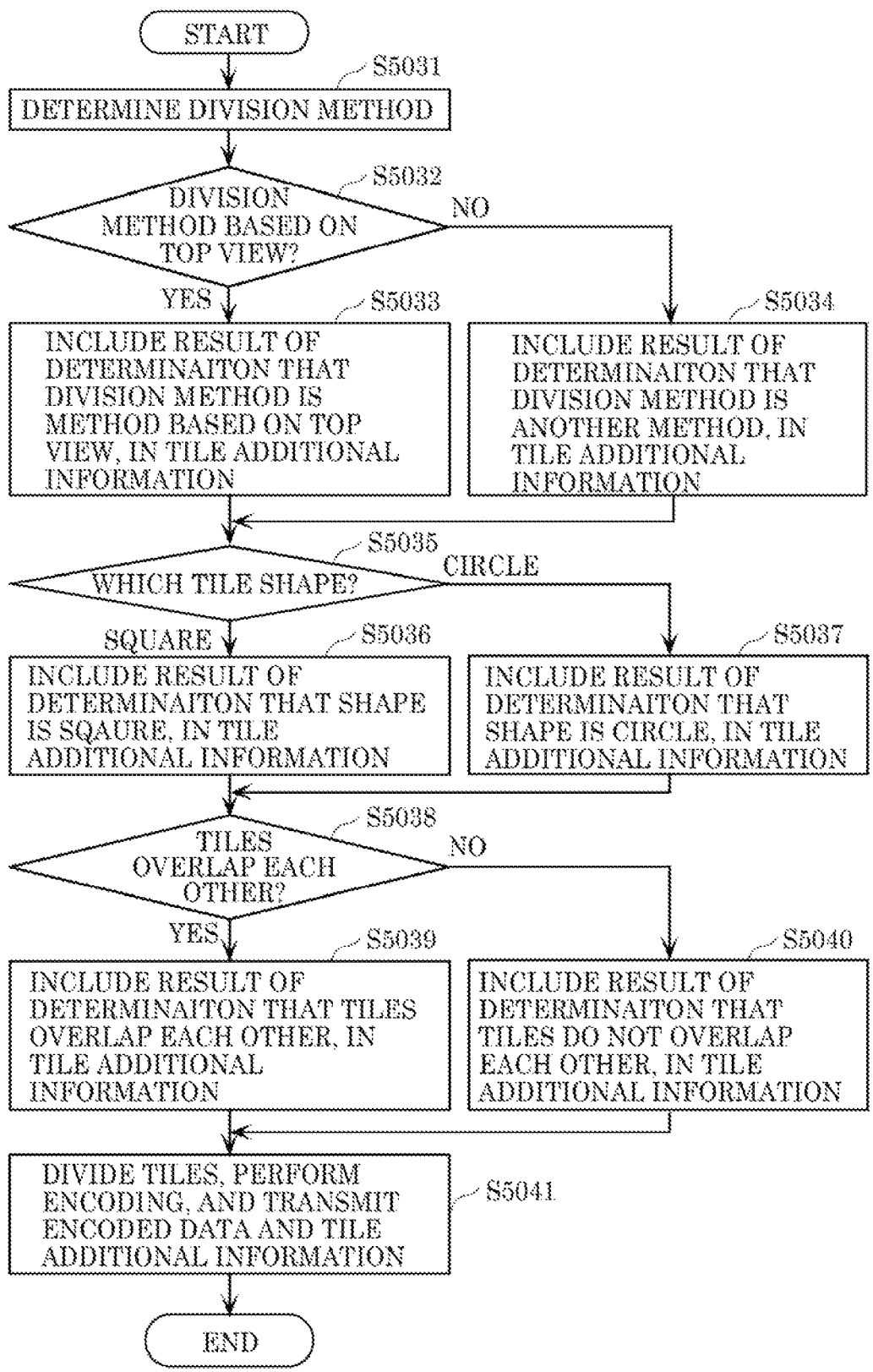
FIG. 72 is a flowchart of an encoding process according to Embodiment 6.

FIG. 72 is a flowchart of a three-dimensional data encoding process including a tile additional information generation process performed by the three-dimensional data encoding device according to the present embodiment.

First, the three-dimensional data encoding device determines a division method to be used (S5031). Specifically, the three-dimensional data encoding device determines whether a division method based on top view (top_view) or another method (other) is to be used as a tile division method. In addition, the three-dimensional data encoding device determines a tile shape when the division method based on top view is used. Additionally, the three-dimensional data encoding device determines whether tiles overlap with other tiles.

When the tile division method determined in step S5031 is the division method based on top view (YES in S5032), the three-dimensional data encoding device includes a result of the determination that the tile division method is the division method based on top view (top_view), in tile additional information (S5033).

On the other hand, when the tile division method determined in step S5031 is a method other than the division method based on top view (NO in S5032), the three-dimensional data encoding device includes a result of the determination that the tile division method is the method other than the division method based on top view (top_view), in tile additional information (S5034).

Moreover, when a shape in top view of a tile determined in step S5031 is a square (SQUARE in S5035), the three-dimensional data encoding device includes a result of the determination that the shape in top view of the tile is the square, in the tile additional information (S5036). In contrast, when a shape in top view of a tile determined in step S5031 is a circle (CIRCLE in S5035), the three-dimensional data encoding device includes a result of the determination that the shape in top view of the tile is the circle, in the tile additional information (S5037).

Next, the three-dimensional data encoding device determines whether tiles overlap with other tiles (S5038). When the tiles overlap with the other tiles (YES in S5038), the three-dimensional data encoding device includes a result of the determination that the tiles overlap with the other tiles, in the tile additional information (S5039). On the other hand, when the tiles do not overlap with other tiles (NO in S5038), the three-dimensional data encoding device includes a result of the determination that the tiles do not overlap with the other tiles, in the tile additional information (S5040).

Finally, the three-dimensional data encoding device divides the tiles based on the tile division method determined in step S5031, encodes each of the tiles, and transmits the generated encoded data and the tile additional information (S5041).

Figure 73:
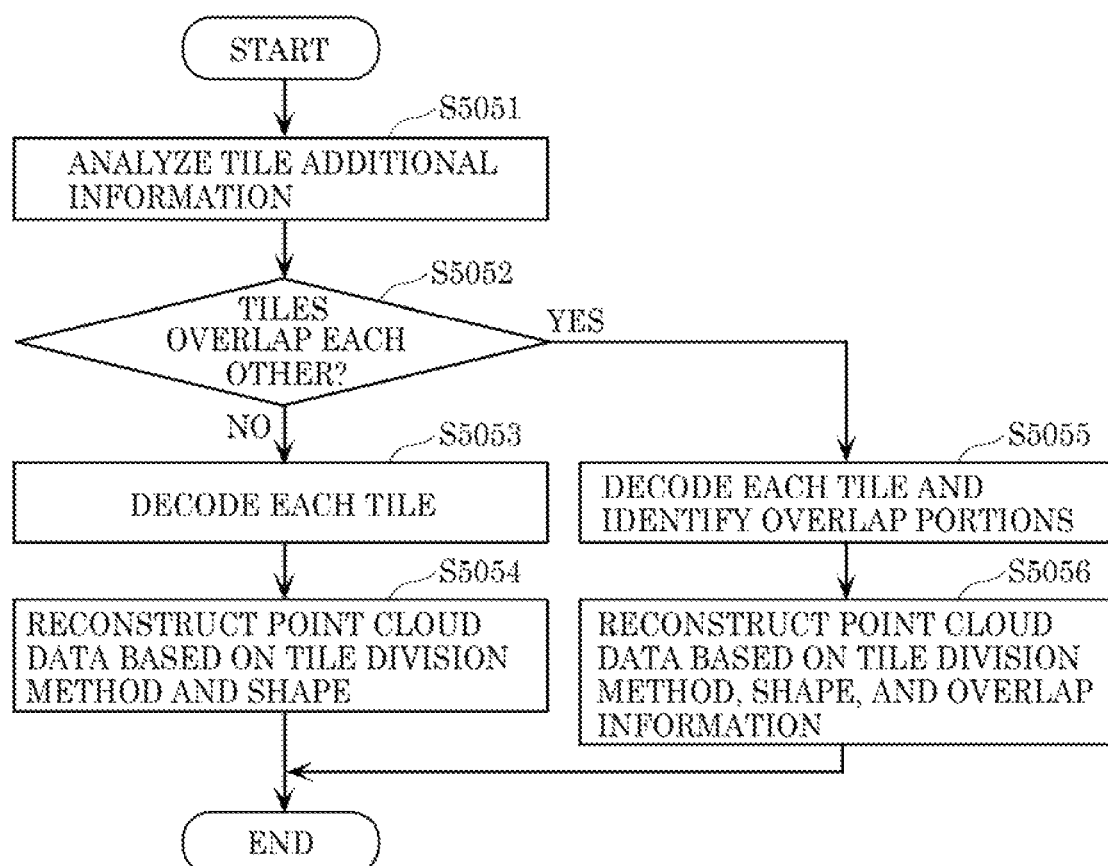
FIG. 73 is a flowchart of a decoding process according to Embodiment 6.

FIG. 73 is a flowchart of a three-dimensional data decoding process performed by the three-dimensional data decoding device according to the present embodiment using tile additional information.

First, the three-dimensional data decoding device analyzes tile additional information included in a bitstream (S5051).

When the tile additional information indicates that tiles do not overlap with other tiles (NO in S5052), the three-dimensional data decoding device generates point cloud data of each tile by decoding the tile (S5053). Finally, the three-dimensional data decoding device reconstructs point cloud data from the point cloud data of each tile, based on a tile division method and a tile shape indicated by the tile additional information (S5054).

In contrast, when the tile additional information indicates that tiles overlap with other tiles (YES in S5052), the three-dimensional data decoding device generates point cloud data of each tile by decoding the tile. In addition, the three-dimensional data decoding device identifies overlap portions of the tiles based on the tile additional information (S5055). It should be noted that, regarding the overlap portions, the three-dimensional data decoding device may perform decoding using pieces of overlapping information. Finally, the three-dimensional data decoding device reconstructs point cloud data from the point cloud data of each tile, based on a tile division method, a tile shape, and overlap information indicated by the tile additional information (S5056).

The following describes, for example, variations regarding slice. The three-dimensional data encoding device may transmit, as additional information, information indicating a type (a road, a building, a tree, etc.) or attribute (dynamic information, static information, etc.) of an object. Alternatively, a coding parameter may be predetermined according to an object, and the three-dimensional data encoding device may notify the coding parameter to the three-dimensional data decoding device by transmitting a type or attribute of the object.

The following methods may be used regarding slice data encoding order and transmitting order. For example, the three-dimensional data encoding device may encode slice data in decreasing order of ease of object recognition or clustering. Alternatively, the three-dimensional data encoding device may encode slice data in the order in which clustering is completed. Moreover, the three-dimensional data encoding device may transmit slice data in the order in which the slice data is encoded. Alternatively, the three-dimensional data encoding device may transmit slice data in decreasing order of priority for decoding in an application. For example, when dynamic information has high priority for decoding, the three-dimensional data encoding device may transmit slice data in the order in which slices are grouped using the dynamic information.

Furthermore, when encoded data order is different from the order of priority for decoding, the three-dimensional data encoding device may transmit encoded data after rearranging the encoded data. In addition, when storing encoded data, the three-dimensional data encoding device may store encoded data after rearranging the encoded data.

An application (the three-dimensional data decoding device) requests a server (the three-dimensional data encoding device) to transmit slices including desired data. The server may transmit slice data required by the application, and need not transmit slice data unnecessary for the application.

An application requests a server to transmit a tile including desired data. The server may transmit tile data required by the application, and need not transmit tile data unnecessary for the application.

Figure 74:
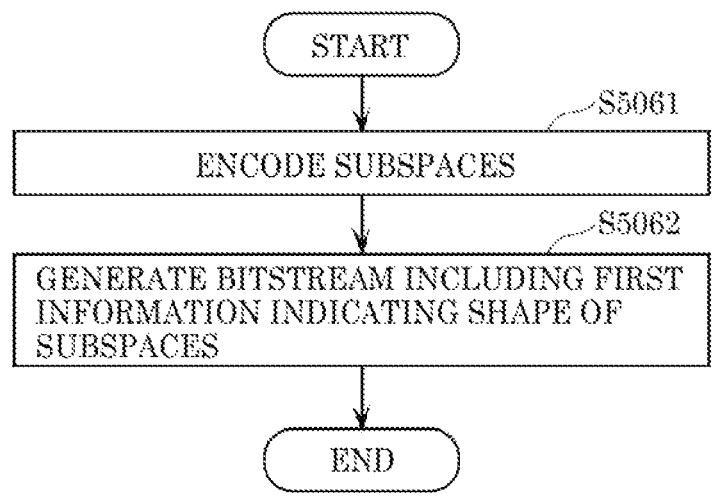
FIG. 74 is a flowchart of an encoding process according to Embodiment 6.

As stated above, the three-dimensional data encoding device according to the present embodiment performs the process shown in FIG. 74. First, the three-dimensional data encoding device encodes subspaces (e.g., tiles) obtained by dividing a current space which includes three-dimensional points, to generate pieces of encoded data (S5061). The three-dimensional data encoding device generates a bitstream including the pieces of encoded data and first information (e.g., topview_shape) indicating a shape of each of the subspaces (S5062).

Accordingly, since the three-dimensional data encoding device can select any shape from various types of shapes of subspaces, the three-dimensional data encoding device can improve the coding efficiency.

For example, the shape is a two-dimensional shape or a three-dimensional shape of each of the subspaces. For example, the shape is a shape in a top view of the subspace. To put it another way, the first information indicates a shape of the subspace viewed from a specific direction (e.g., an upper direction). In short, the first information indicates a shape in an overhead view of the subspace. For example, the shape is rectangular or circular.

For example, the bitstream includes second information (e.g., tile_overlap_flag) indicating whether the subspaces overlap.

Accordingly, since the three-dimensional data encoding device allows subspaces to overlap, the three-dimensional data encoding device can generate the subspaces without making a shape of each of the subspaces complex.

For example, the bitstream includes third information (e.g., type_of_divide) indicating whether a division method used to obtain the subspaces is a division method using a top view.

For example, the bitstream includes fourth information (e.g., tile_height) indicating at least one of a height, a width, a depth, or a radius of each of the subspaces.

For example, the bitstream includes fifth information (e.g., global_position or relative_position) indicating a position of each of the subspaces.

For example, the bitstream includes sixth information (e.g., tile_number) indicating a total number of the subspaces.

For example, the bitstream includes seventh information indicating an interval between the subspaces.

For example, the three-dimensional data encoding device includes a processor and memory, and the processor performs the above process using the memory.

Figure 75:
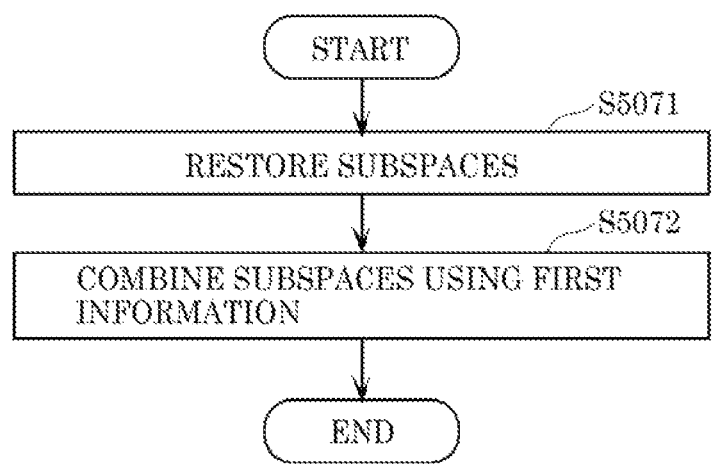
FIG. 75 is a flowchart of a decoding process according to Embodiment 6.

Moreover, the three-dimensional data decoding device according to the present embodiment performs the process shown in FIG. 75. First, the three-dimensional data decoding device decodes pieces of encoded data included in a bitstream and generated by encoding subspaces (e.g., tiles) obtained by dividing a current space which includes three-dimensional points, to restore the subspaces (S5071). The three-dimensional data decoding device restores the current space by combining the subspaces using first information (e.g., topview_shape) which is included in the bitstream and indicates a shape of each of the subspaces (S5072). For example, the three-dimensional data decoding device can determine a position and a range of each of subspaces in a current space by recognizing a shape of the subspace using the first information. The three-dimensional data decoding device can combine the subspaces based on the determined positions and ranges of the subspaces. Accordingly, the three-dimensional data decoding device can combine the subspaces correctly.

For example, the shape is a two-dimensional shape or a three-dimensional shape of each of the subspaces. For example, the shape is rectangular or circular.

For example, the bitstream includes second information (e.g., tile_overlap_flag) indicating whether the subspaces overlap. In the restoring of the current space, the three-dimensional data decoding device combines the subspaces by further using the second information. For example, the three-dimensional data decoding device determines whether subspaces overlap, using the second information. When the subspaces overlap, the three-dimensional data decoding device identifies overlap regions and performs a predetermined process on the identified regions.

For example, the bitstream includes third information (e.g., type_of_divide) indicating whether a division method used to obtain the subspaces is a division method using a top view. In the restoring of the current space, when the third information indicates that the division method used to obtain the subspaces is the division method using the top view, the three-dimensional data decoding device combines the subspaces using the first information.

For example, the bitstream includes fourth information (e.g., tile_height) indicating at least one of a height, a width, a depth, or a radius of each of the subspaces. In the restoring of the current space, the three-dimensional data decoding device combines the subspaces by further using the fourth information. For example, the three-dimensional data decoding device can determine a position and a range of each of subspaces in a current space by recognizing a height of the subspace using the fourth information. The three-dimensional data decoding device can combine the subspaces based on the determined positions and ranges of the subspaces.

For example, the bitstream includes fifth information (e.g., global_position or relative_position) indicating a position of each of the subspaces. In the restoring of the current space, the three-dimensional data decoding device combines the subspaces by further using the fifth information. For example, the three-dimensional data decoding device can determine a position of each of subspaces in a current space by recognizing a position of the subspace using the fifth information. The three-dimensional data decoding device can combine the subspaces based on the determined positions of the subspaces.

For example, the bitstream includes sixth information (e.g., tile_number) indicating a total number of the subspaces. In the restoring of the current space, the three-dimensional data decoding device combines the subspaces by further using the sixth information.

For example, the bitstream includes seventh information indicating an interval between the subspaces. In the restoring of the current space, the three-dimensional data decoding device combines the subspaces by further using the seventh information. For example, the three-dimensional data decoding device can determine a position and a range of each of subspaces in a current space by recognizing an interval between the subspaces using the seventh information. The three-dimensional data decoding device can combine the subspaces based on the determined positions and ranges of the subspaces.

For example, the three-dimensional data decoding device includes a processor and memory, and the processor performs the above process using the memory.

Embodiment 7

In order to divide point cloud data into tiles and slices and efficiently encode or decode the divisional data, an appropriate control is needed on the encoder side and the decoder side. By making the encoding and decoding of each piece of divisional data independent, rather than dependent, from the other pieces of divisional data, a multi-thread or multi-core processor can be used to process the pieces of divisional data in the respective threads/cores in parallel, and the performance is improved.

There are various methods of dividing point cloud data into tiles and slices. For example, there is a method of dividing point cloud data based on an attribute of an object, such as a road surface, of point cloud data or a characteristic, such as color information such as green, of point cloud data.

CABAC is an abbreviation of context-based adaptive binary arithmetic coding, which is an encoding method that realizes an arithmetic encoding (entropy encoding) with high compression ratio by increasing the probability precision by successively updating a context (a model for estimating the probability of occurrence of an input binary symbol) based on the encoded information.

In order to process pieces of divisional data such as tiles or slices in parallel, each piece of divisional data needs to be independently encoded or decoded. In order to make CABAC for the pieces of divisional data independent from each other, CABAC needs to be initialized at the top of each piece of divisional data. However, there is no mechanism therefor.

A CABAC initialization flag is used to initialize CABAC in CABAC encoding and decoding.

Figure 76:
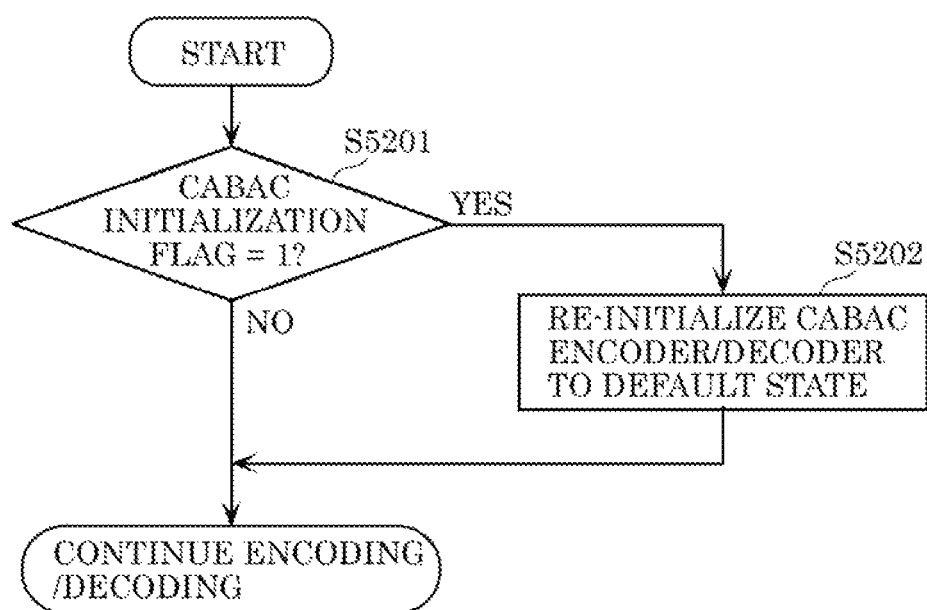
FIG. 76 is a flowchart of a process of re-initializing a CABAC encoding/decoding engine in response to a CABAC initialization flag in encoding or decoding according to Embodiment 7.

FIG. 76 is a flowchart of a process of initializing CABAC in response to a CABAC initialization flag.

The three-dimensional data encoding device or three-dimensional data decoding device determines whether the CABAC initialization flag is 1 or not in encoding or decoding (S5201).

When the CABAC initialization flag is 1 (if Yes in S5201), the three-dimensional data encoding device or three-dimensional data decoding device initializes a CABAC encoder/decoder to a default state (S5202), and continues the encoding or decoding.

When the CABAC initialization flag is not 1 (if No in S5201), the three-dimensional data encoding device or three-dimensional data decoding device does not perform the initialization, and continues the encoding or decoding.

That is, when initializing CABAC, cabac_init_flag is set to 1, and the CABAC encoder or CABAC decoder is initialized or re-initialized. When initializing CABAC, an initial value (default state) of a context used for the CABAC process is set.

Figure 77:
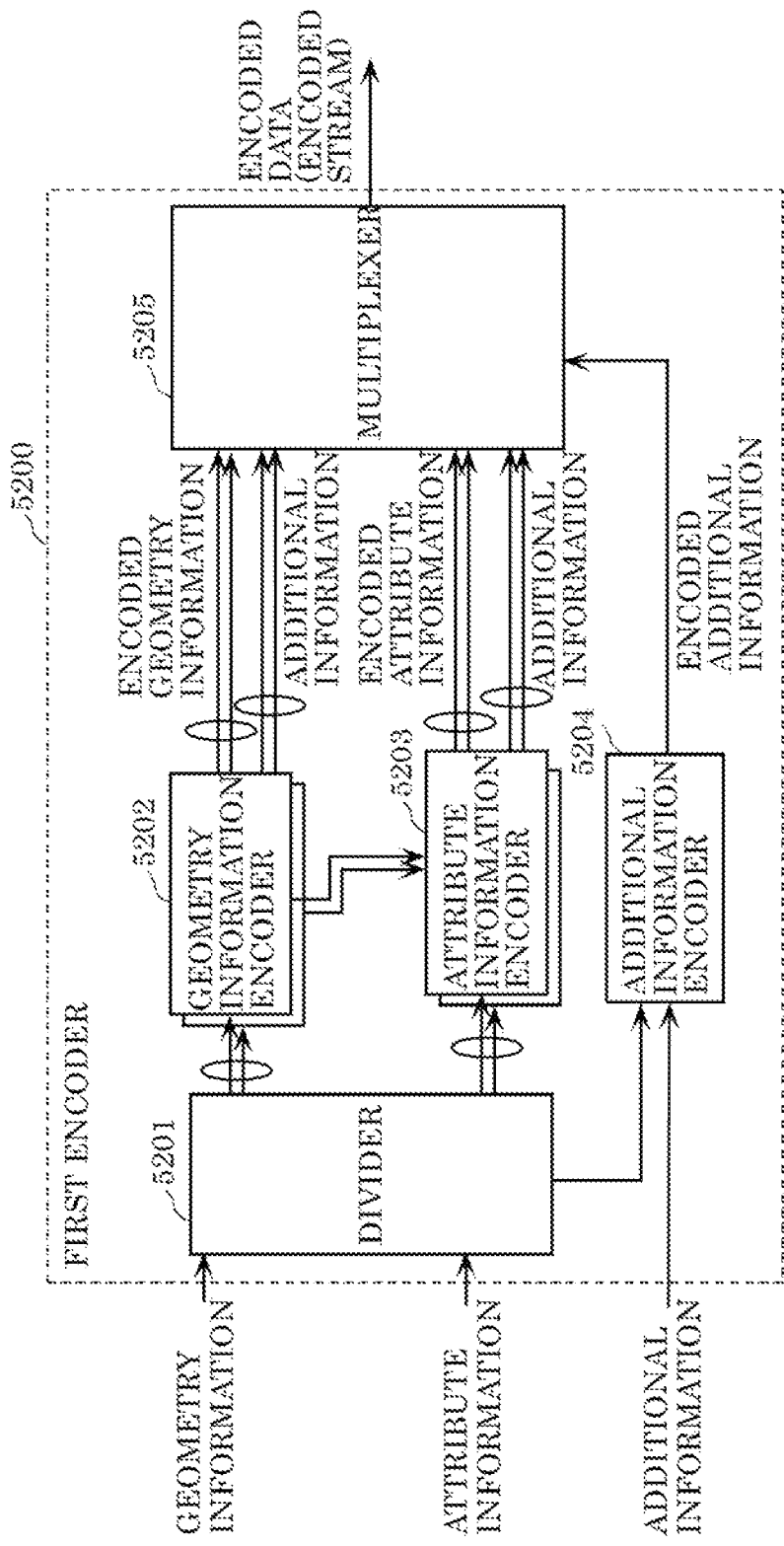
FIG. 77 is a block diagram illustrating a configuration of first encoder included in a three-dimensional data encoding device according to Embodiment 7.
Figure 78:
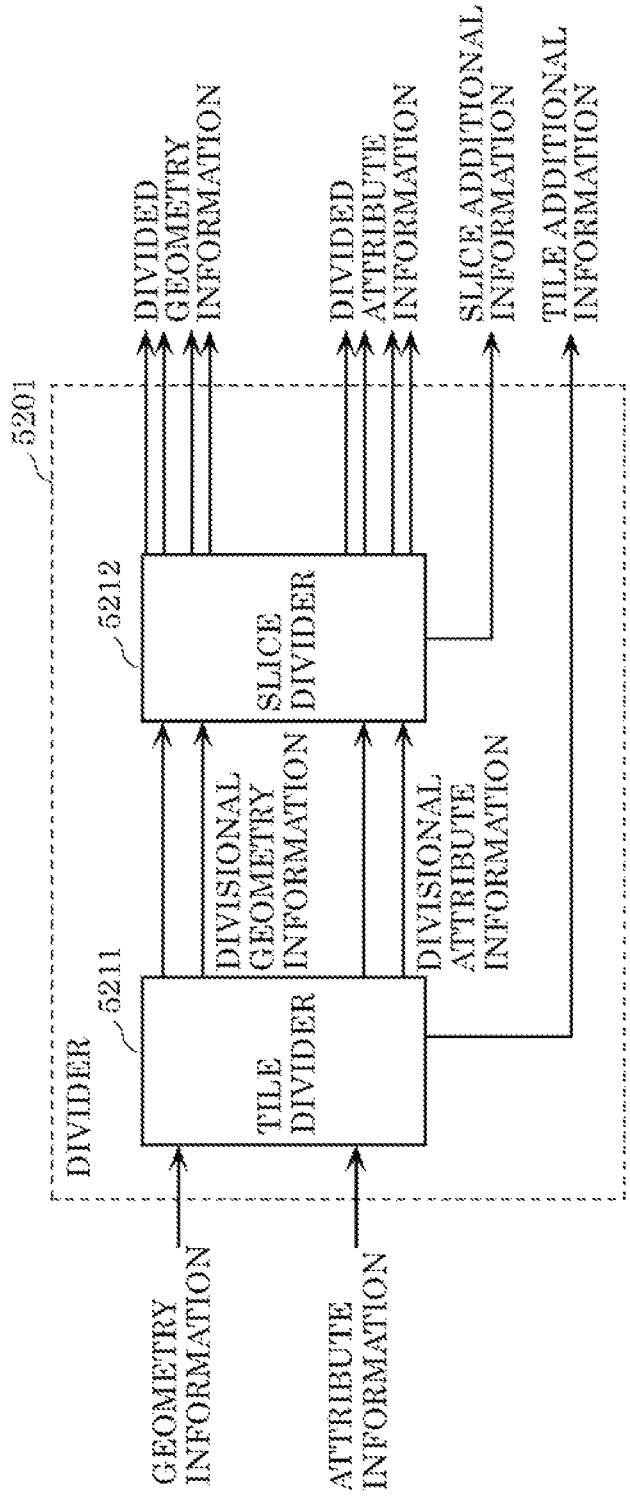
FIG. 78 is a block diagram illustrating a configuration of a divider according to Embodiment 7.
Figure 79:
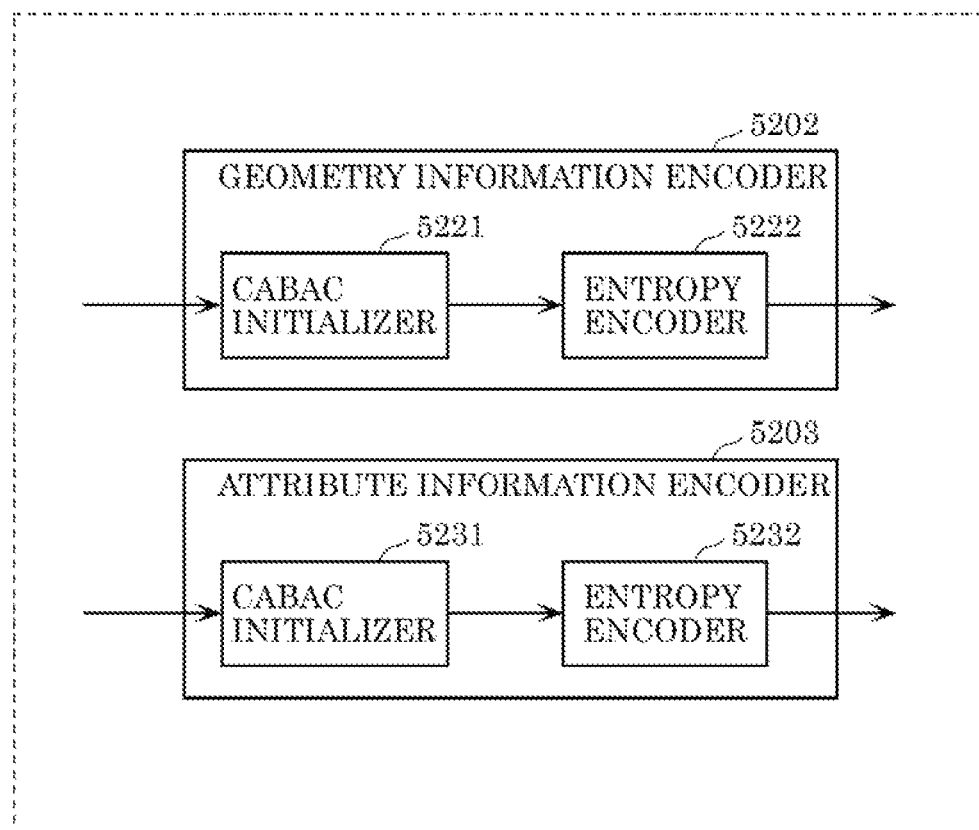
FIG. 79 is a block diagram illustrating a configuration of a geometry information encoder and an attribute information encoder according to Embodiment 7.

An encoding process will be described. FIG. 77 is a block diagram illustrating a configuration of first encoder 5200 included in the three-dimensional data encoding device according to this embodiment. FIG. 78 is a block diagram illustrating a configuration of divider 5201 according to this embodiment. FIG. 79 is a block diagram illustrating a configuration of geometry information encoder 5202 and attribute information encoder 5203 according to this embodiment.

First encoder 5200 generates encoded data (encoded stream) by encoding point cloud data in a first encoding method (geometry-based PCC (GPCC)). First encoder 5200 includes divider 5201, a plurality of geometry information encoders 5202, a plurality of attribute information encoders 5203, additional information encoder 5204, and multiplexer 5205.

Divider 5201 generates a plurality of pieces of divisional data by dividing point cloud data. Specifically, divider 5201 generates a plurality of pieces of divisional data by dividing a space of point cloud data into a plurality of subspaces. Here, a subspace is a combination of tiles or slices or a combination of tiles and slices. More specifically, point cloud data includes geometry information, attribute information, and additional information. Divider 5201 divides geometry information into a plurality of pieces of divisional geometry information, and divides attribute information into a plurality of pieces of divisional attribute information. Divider 5201 also generates additional information concerning the division.

As illustrated in FIG. 78, divider 5201 includes tile divider 5211 and slice divider 5212. For example, tile divider 5211 divides a point cloud into tiles. Tile divider 5211 may determine a quantization value used for each divisional tile as tile additional information.

Slice divider 5212 further divides a tile obtained by tile divider 5211 into slices. Slice divider 5212 may determine a quantization value used for each divisional slice as slice additional information.

The plurality of geometry information encoders 5202 generate a plurality of pieces of encoded geometry information by encoding a plurality of pieces of divisional geometry information. For example, the plurality of geometry information encoders 5202 processes a plurality of pieces of divisional geometry information in parallel.

As illustrated in FIG. 79, geometry information encoder 5202 includes CABAC initializer 5221 and entropy encoder 5222. CABAC initializer 5221 initializes or re-initializes CABAC in response to a CABAC initialization flag. Entropy encoder 5222 encodes divisional geometry information according to CABAC.

The plurality of attribute information encoders 5203 generate a plurality of pieces of encoded attribute information by encoding a plurality of pieces of divisional attribute information. For example, the plurality of attribute information encoders 5203 process a plurality of pieces of divisional attribute information in parallel.

As illustrated in FIG. 79, attribute information encoder 5203 includes CABAC initializer 5231 and entropy encoder 5232. CABAC initializer 5231 initializes or re-initializes CABAC in response to a CABAC initialization flag. Entropy encoder 5232 encodes divisional attribute information according to CABAC.

Additional information encoder 5204 generates encoded additional information by encoding additional information included in the point cloud data and additional information concerning the data division generated in the division by divider 5201.

Multiplexer 5205 generates encoded data (encoded stream) by multiplexing a plurality of pieces of encoded geometry information, a plurality of pieces of encoded attribute information, and encoded additional information, and transmits the generated encoded data. The encoded additional information is used for decoding.

Note that, although FIG. 77 shows an example in which there are two geometry information encoders 5202 and two attribute information encoders 5203, the number of geometry information encoders 5202 and the number of attribute information encoders 5203 may be one, or three or more. The plurality of pieces of divisional data may be processed in parallel in the same chip, such as by a plurality of cores of a CPU, processed in parallel by cores of a plurality of chips, or processed in parallel by a plurality of cores of a plurality of chips.

Figure 80:
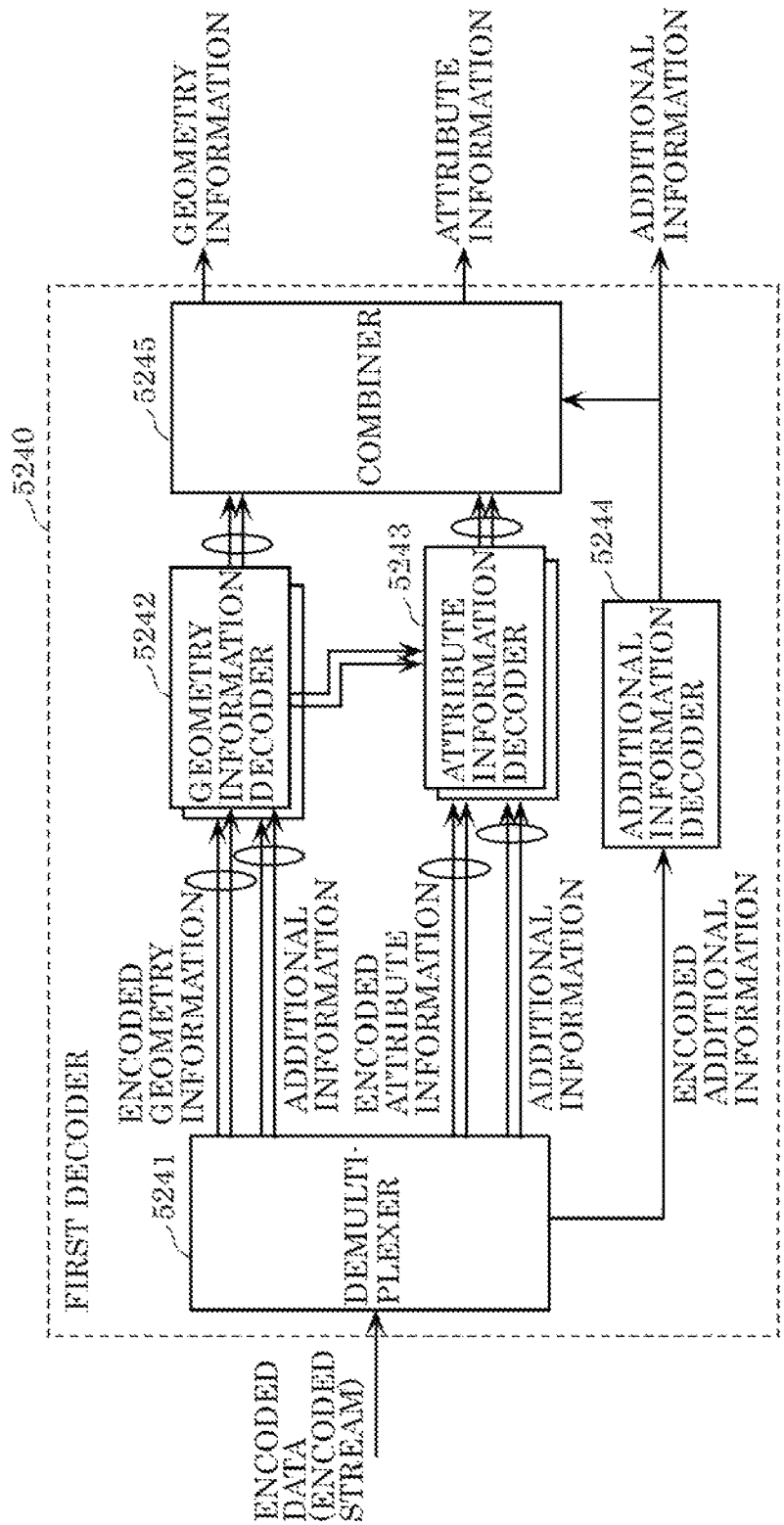
FIG. 80 is a block diagram illustrating a configuration of a first decoder according to Embodiment 7.
Figure 81:
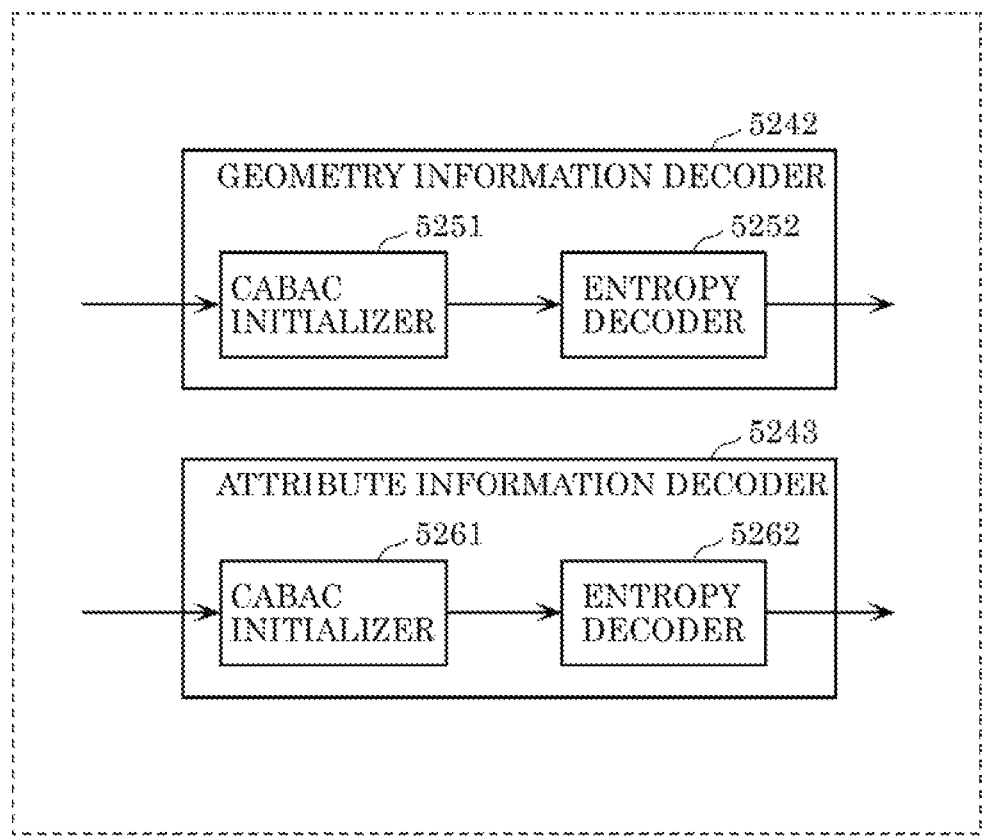
FIG. 81 is a block diagram illustrating a configuration of a geometry information decoder and an attribute information decoder according to Embodiment 7.

Next, a decoding process will be described. FIG. 80 is a block diagram illustrating a configuration of first decoder 5240. FIG. 81 is a block diagram illustrating a configuration of geometry information decoder 5242 and attribute information decoder 5243.

First decoder 5240 reproduces point cloud data by decoding encoded data (encoded stream) generated by encoding the point cloud data in the first encoding method (GPCC). First decoder 5240 includes demultiplexer 5241, a plurality of geometry information decoders 5242, a plurality of attribute information decoders 5243, additional information decoder 5244, and combiner 5245.

Demultiplexer 5241 generates a plurality of pieces of encoded geometry information, a plurality of pieces of encoded attribute information, and encoded additional information by demultiplexing encoded data (encoded stream).

The plurality of geometry information decoders 5242 generates a plurality of pieces of quantized geometry information by decoding a plurality of pieces of encoded geometry information. For example, the plurality of geometry information decoders 5242 process a plurality of pieces of encoded geometry information in parallel.

As illustrated in FIG. 81, geometry information decoder 5242 includes CABAC initializer 5251 and entropy decoder 5252. CABAC initializer 5251 initializes or re-initializes CABAC in response to a CABAC initialization flag. Entropy decoder 5252 decodes geometry information according to CABAC.

The plurality of attribute information decoders 5243 generate a plurality of pieces of divisional attribute information by decoding a plurality of pieces of encoded attribute information. For example, the plurality of attribute information decoders 5243 process a plurality of pieces of encoded attribute information in parallel.

As illustrated in FIG. 81, attribute information decoder 5243 includes CABAC initializer 5261 and entropy decoder 5262. CABAC initializer 5261 initializes or re-initializes CABAC in response to a CABAC initialization flag. Entropy decoder 5262 decodes attribute information according to CABAC.

The plurality of additional information decoders 5244 generate additional information by decoding encoded additional information.

Combiner 5245 generates geometry information by combining a plurality of pieces of divisional geometry information using additional information. Combiner 5245 generates attribute information by combining a plurality of pieces of divisional attribute information using additional information. For example, combiner 5245 first generates point cloud data associated with a tile by combining decoded point cloud data associated with slices using slice additional information. Combiner 5245 then reproduces the original point cloud data by combining point cloud data associated with tiles using tile additional information.

Note that, although FIG. 80 shows an example in which there are two geometry information decoders 5242 and two attribute information decoders 5243, the number of geometry information decoders 5242 and the number of attribute information decoders 5243 may be one, or three or more. The plurality of pieces of divisional data may be processed in parallel in the same chip, such as by a plurality of cores of a CPU, processed in parallel by cores of a plurality of chips, or processed in parallel by a plurality of cores of a plurality of chips.

Figure 82:
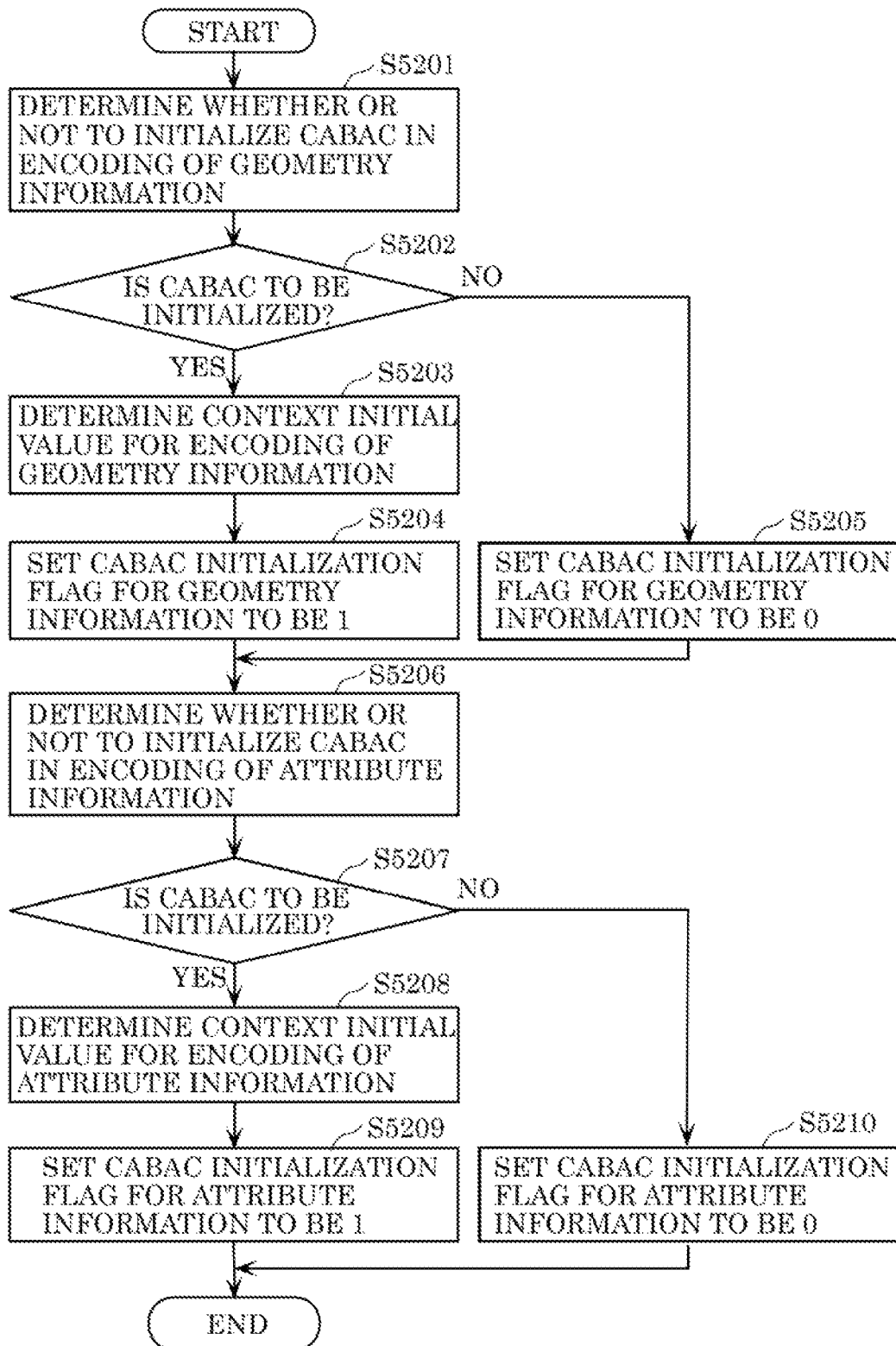
FIG. 82 is a flowchart illustrating an example of a process associated with the initialization of CABAC in the encoding of geometry information or the encoding of attribute information according to Embodiment 7.

FIG. 82 is a flowchart illustrating an example of a process associated with the initialization of CABAC in the encoding of geometry information or the encoding of attribute information.

First, the three-dimensional data encoding device determines, for each slice, whether or not to initialize CABAC in the encoding of geometry information for the slice based on a predetermined condition (S5201).

When it is determined to initialize CABAC (if Yes in S5202), the three-dimensional data encoding device determines a context initial value used for the encoding of geometry information (S5203). The context initial value is set by considering encoding characteristics. The initial value may be a predetermined value or may be adaptively determined depending on the characteristics of data in the slice.

The three-dimensional data encoding device then sets the CABAC initialization flag for geometry information to be 1, and sets the context initial value (S5204). When initializing CABAC, the initialization process is performed using the context initial value in the encoding of geometry information.

On the other hand, when it is determined not to initialize CABAC (if No in S5202), the three-dimensional data encoding device sets the CABAC initialization flag for geometry information to be 0 (S5205).

The three-dimensional data encoding device then determines, for each slice, whether or not to initialize CABAC in the encoding of attribute information for the slice based on a predetermined condition (S5206).

When it is determined to initialize CABAC (if Yes in S5207), the three-dimensional data encoding device determines a context initial value used for the encoding of attribute information (S5208). The context initial value is set by considering encoding characteristics. The initial value may be a predetermined value or may be adaptively determined depending on the characteristics of data in the slice.

The three-dimensional data encoding device then sets the CABAC initialization flag for attribute information to be 1, and sets the context initial value (S5209). When initializing CABAC, the initialization process is performed using the context initial value in the encoding of attribute information.

On the other hand, when it is determined not to initialize CABAC (if No in S5207), the three-dimensional data encoding device sets the CABAC initialization flag for attribute information to be 0 (S5210).

Note that, in the flowchart of FIG. 82, the processing concerning geometry information and the processing concerning attribute information may be performed in reverse order or in parallel.

Note that, although the flowchart of FIG. 82 shows a slice-based process as an example, a tile-based process or a process on a basis of other data units can be performed in the same manner as the slice-based process. That is, slice in the flowchart of FIG. 82 can be replaced with tile or other data units.

The predetermined condition for the geometry information and the predetermined condition for the attribute information may be the same condition or different conditions.

Figure 83:
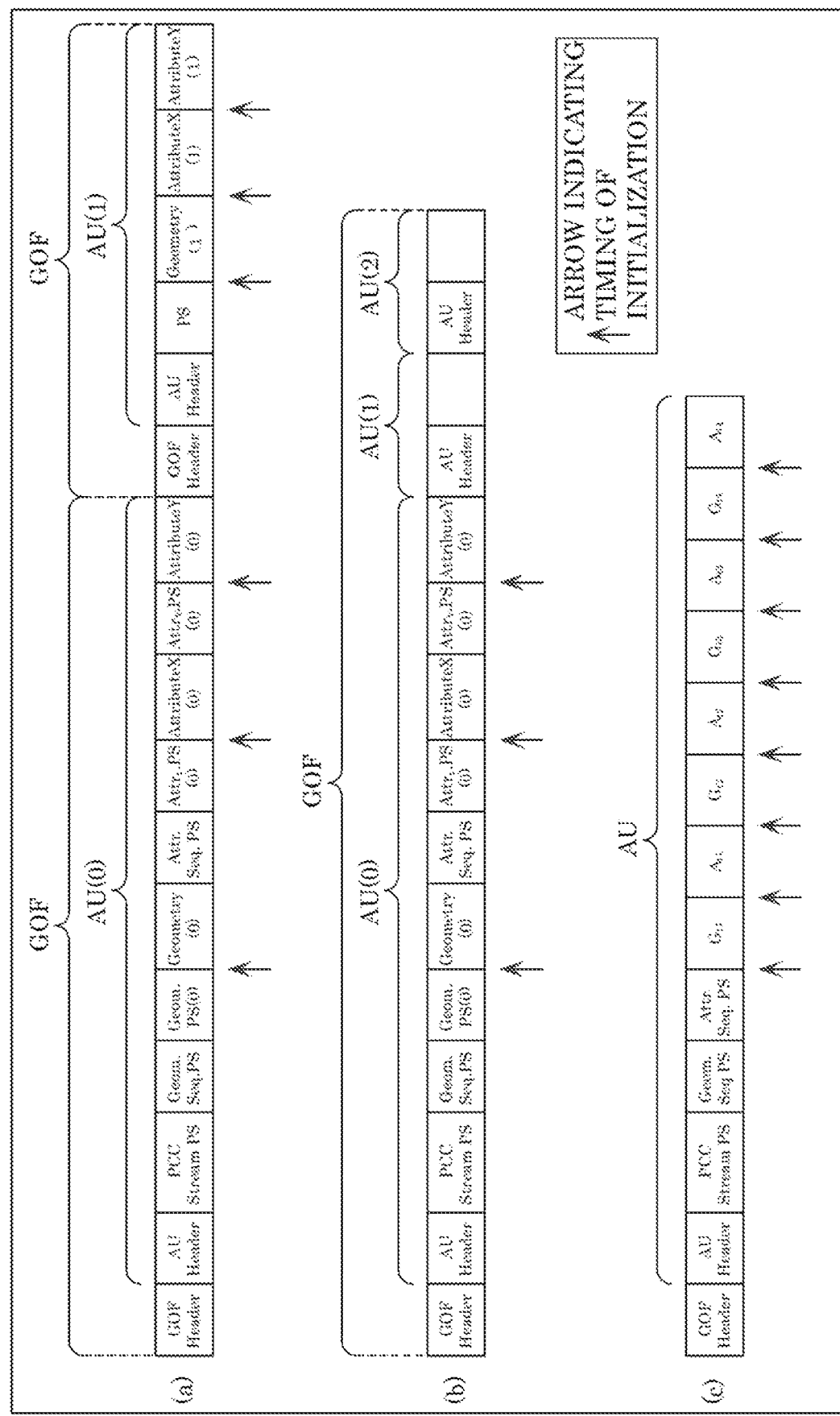
FIG. 83 is a diagram illustrating an example of timings of CABAC initialization for point cloud data in the form of a bitstream according to Embodiment 7.

FIG. 83 is a diagram illustrating an example of timings of CABAC initialization for point cloud data in the form of a bitstream.

Point cloud data includes geometry information and zero or more pieces of attribute information. That is, point cloud data may include no attribute information or include a plurality of pieces of attribute information.

For example, as attribute information on a three-dimensional point, point cloud data may include color information, may include color information and reflection information, or may include one or more pieces of color information each linked to one or more pieces of point-of-view information.

In any configuration, the method described in this embodiment can be applied.

Next, a condition for determination of whether to initialize CABAC will be described.

It may be determined to initialize CABAC in the encoding of geometry information or attribute information when any of the conditions described below is satisfied.

For example, CABAC may be initialized at the leading data of geometry information or attribute information (each piece of attribute information if there is a plurality of pieces of attribute information). For example, CABAC may be initialized at the top of data forming a PCC frame that can be singly decoded. That is, as illustrated in part (a) of FIG. 83, if PCC frames may be decoded on a frame basis, CABAC can be initialized at the leading data of a PCC frame.

For example, as illustrated in part (b) of FIG. 83, if frames cannot be singly decoded, such as when an inter-prediction is used between PCC frames, CABAC may be initialized at the leading data of a random access unit (GOF, for example).

For example, as illustrated in part (c) of FIG. 83, CABAC may be initialized at the top of one or more pieces of divisional slice data, at the top of one or more pieces of divisional tile data, or at the top of other divisional data.

Although part (c) of FIG. 83 shows tiles as an example, this description holds true for slices. CABAC may be always initialized at the top of a tile or slice or may not be always initialized at the top of a tile or slice.

Figure 84:
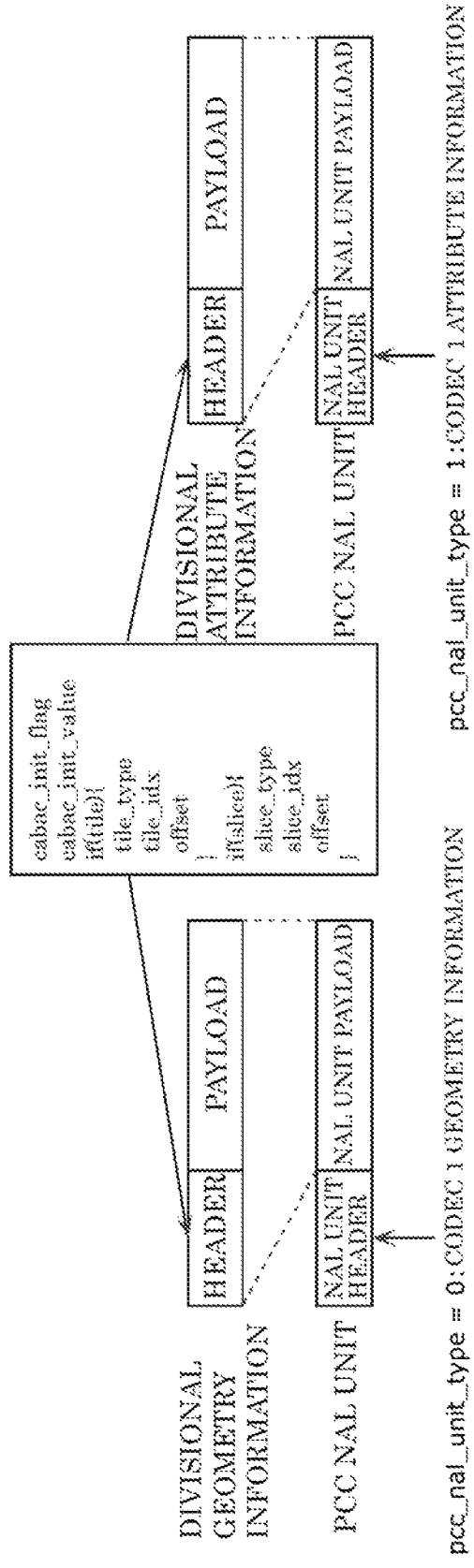
FIG. 84 is a diagram illustrating a configuration of encoded data and a method of storing the encoded data into a NAL unit according to Embodiment 7.

FIG. 84 is a diagram illustrating a configuration of encoded data and a method of storing the encoded data into a NAL unit.

Initialization information may be stored in a header of encoded data or in metadata. The initialization information may also be stored in both the header and the metadata. The initialization information is cabac_init_flag, a CABAC initial value, or an index of a table capable of identifying an initial value.

In this embodiment, "metadata" in a description that something is stored in metadata can be replaced with "header of encoded data" or vice versa.

When the initialization information is stored in the header of encoded data, the initialization information may be stored in the first NAL unit in the encoded data, for example. Initialization information on the encoding of geometry information is stored in geometry information, and initialization information on the encoding of attribute information is stored in attribute information.

cabac_init_flag for the encoding of attribute information and cabac_init_flag for the encoding of geometry information may be set to be the same value or different values. When the flags are set to be the same value, cabac_init_flag may be shared for geometry information and attribute information. When the flags are set to be different values, cabac_init_flag for geometry information and cabac_init_flag for attribute information indicate different values.

The initialization information for geometry information and the initialization information for attribute information may be stored in common metadata, at least one of individual metadata of geometry information and individual metadata of attribute information, or both the common metadata and the individual metadata. A flag may be used which indicates in which of the individual metadata for geometry information, the individual metadata for attribute information, and the common metadata the initialization information is stored.

Figure 85:
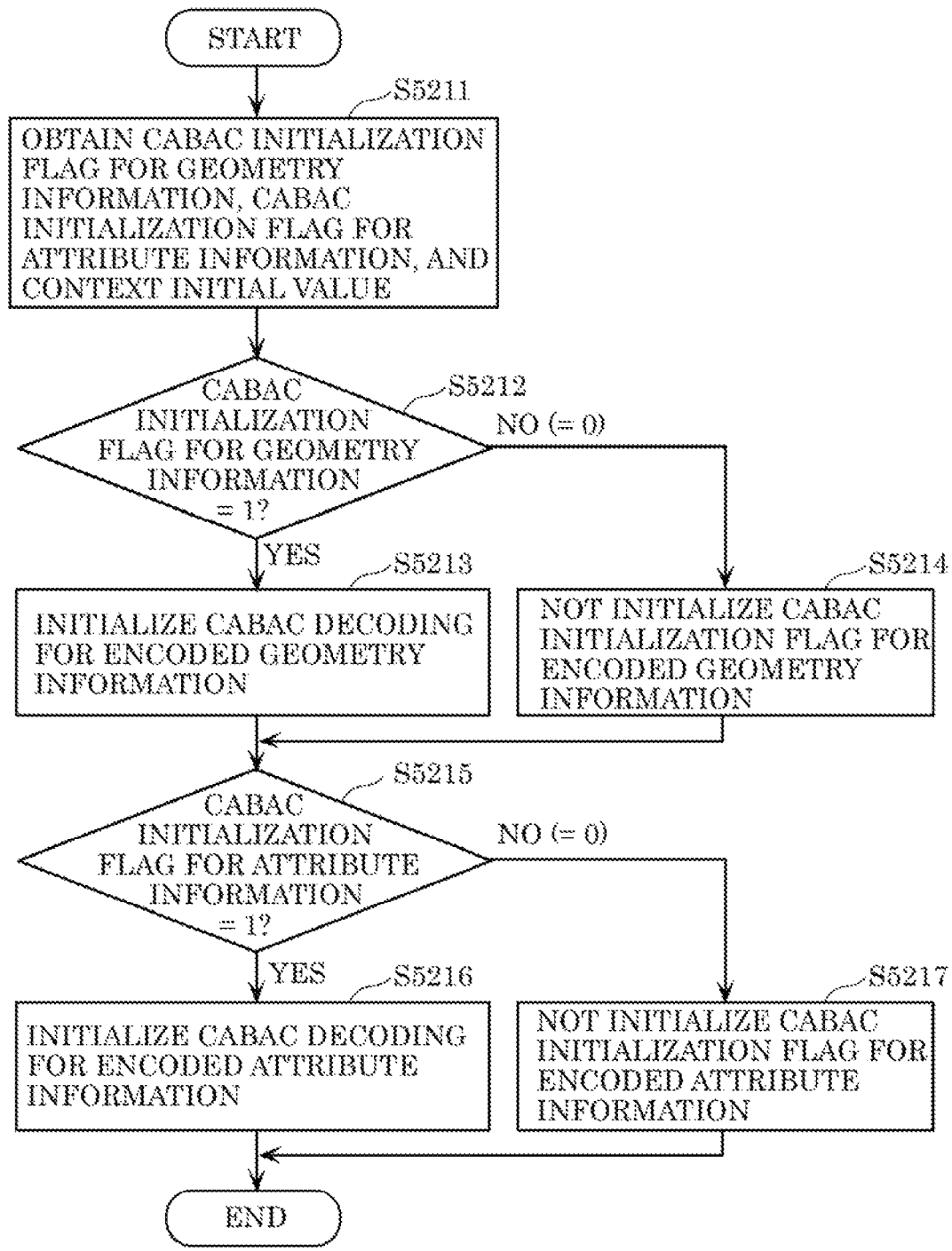
FIG. 85 is a flowchart illustrating an example of a process associated with the initialization of CABAC in the decoding of geometry information or the decoding of attribute information according to Embodiment 7.

FIG. 85 is a flowchart illustrating an example of a process associated with the initialization of CABAC in the decoding of geometry information or the decoding of attribute information.

The three-dimensional data decoding device analyzes encoded data to obtain a CABAC initialization flag for geometry information, a CABAC initialization flag for attribute information, and a context initial value (S5211).

The three-dimensional data decoding device then determines whether the CABAC initialization flag for geometry information is 1 or not (S5512).

When the CABAC initialization flag for geometry information is 1 (if Yes in S5212), the three-dimensional data decoding device initializes the CABAC decoding for the encoded geometry information using the context initial value in the encoding of the geometry information (S5213).

On the other hand, when the CABAC initialization flag for geometry information is 0 (if No in S5212), the three-dimensional data decoding device does not initialize the CABAC decoding for the encoded geometry information (S5214).

The three-dimensional data decoding device then determines whether the CABAC initialization flag for attribute information is 1 or not (S5215).

When the CABAC initialization flag for attribute information is 1 (if Yes in S5215), the three-dimensional data decoding device initializes the CABAC decoding for the encoded attribute information using the context initial value in the encoding of the attribute information (S5216).

On the other hand, when the CABAC initialization flag for attribute information is 0 (if No in S5215), the three-dimensional data decoding device does not initialize the CABAC decoding for the encoded attribute information (S5217).

Note that, in the flowchart of FIG. 85, the processing concerning geometry information and the processing concerning attribute information may be performed in reverse order or in parallel.

Note that the flowchart of FIG. 85 can be applied to any of the case of slice division and the case of tile division.

Figure 86:
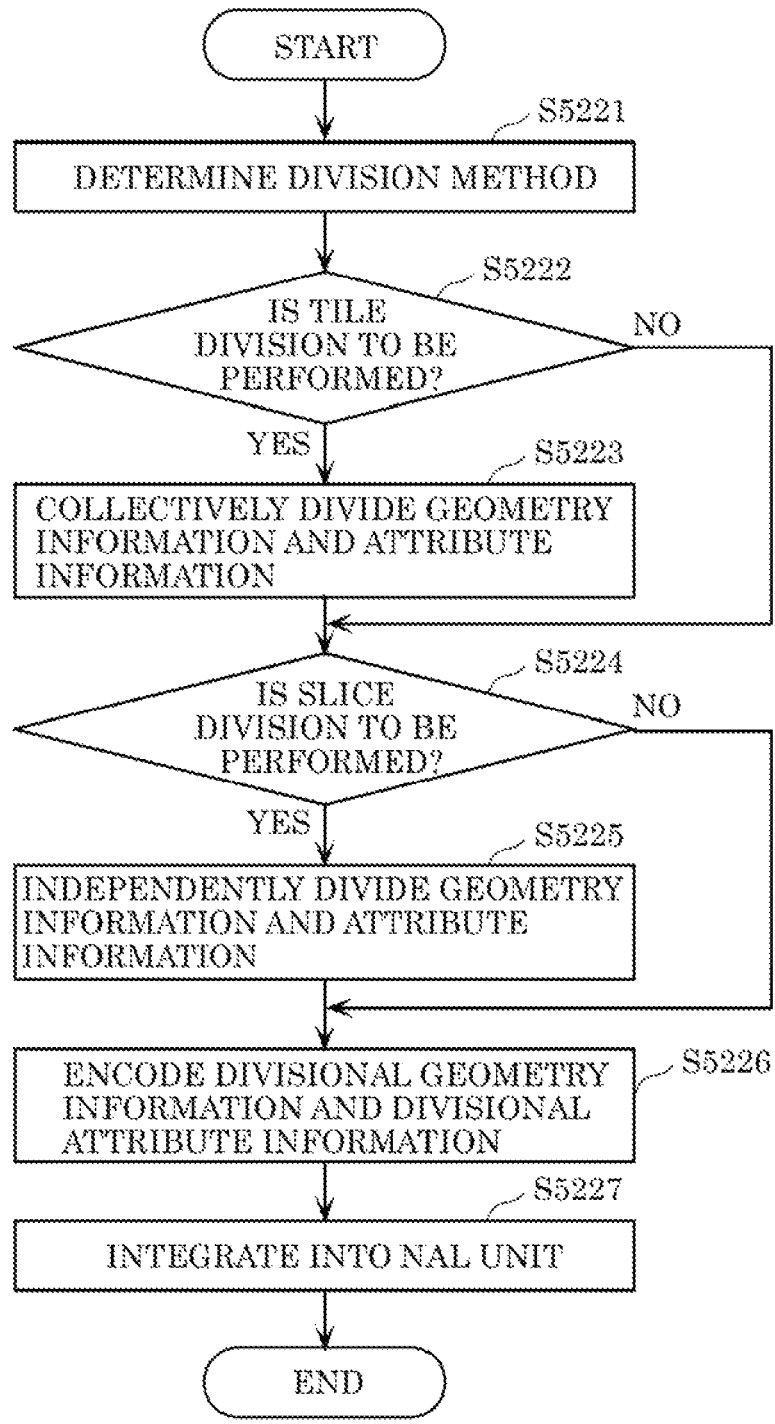
FIG. 86 is a flowchart of a process of encoding point cloud data according to Embodiment 7.

Next, a flow of a process of encoding point cloud data and a flow of a process of decoding point cloud data according to this embodiment will be described. FIG. 86 is a flowchart of a process of encoding point cloud data according to this embodiment.

First, the three-dimensional data encoding device determines a division method to be used (S5221). The division method includes a determination of whether to perform tile division or not and a determination of whether to perform slice division or not. The division method may include the number of tiles or slices in the case where tile division or slice division is performed, and the type of division, for example. The type of division is a scheme based on an object shape, a scheme based on map information or geometry information, or a scheme based on a data amount or processing amount, for example. The division method may be determined in advance.

When tile division is to be performed (if Yes in S5222), the three-dimensional data encoding device generates a plurality of pieces of tile geometry information and a plurality of pieces of tile attribute information by dividing the geometry information and the attribute information on a tile basis (S5223). The three-dimensional data encoding device also generates tile additional information concerning the tile division.

When slice division is to be performed (if Yes in S5224), the three-dimensional data encoding device generates a plurality of pieces of divisional geometry information and a plurality of pieces of divisional attribute information by dividing the plurality of pieces of tile geometry information and the plurality of pieces of tile attribute information (or the geometry information and the attribute information) (S5225). The three-dimensional data encoding device also generates geometry slice additional information and attribute slice additional information concerning the slice division.

The three-dimensional data encoding device then generates a plurality of pieces of encoded geometry information and a plurality of pieces of encoded attribute information by encoding each of the plurality of pieces of divisional geometry information and the plurality of pieces of divisional attribute information (S5226). The three-dimensional data encoding device also generates dependency information.

The three-dimensional data encoding device then generates encoded data (encoded stream) by integrating (multiplexing) the plurality of pieces of encoded geometry information, the plurality of pieces of encoded attribute information and the additional information into a NAL unit (S5227). The three-dimensional data encoding device also transmits the generated encoded data.

Figure 87:
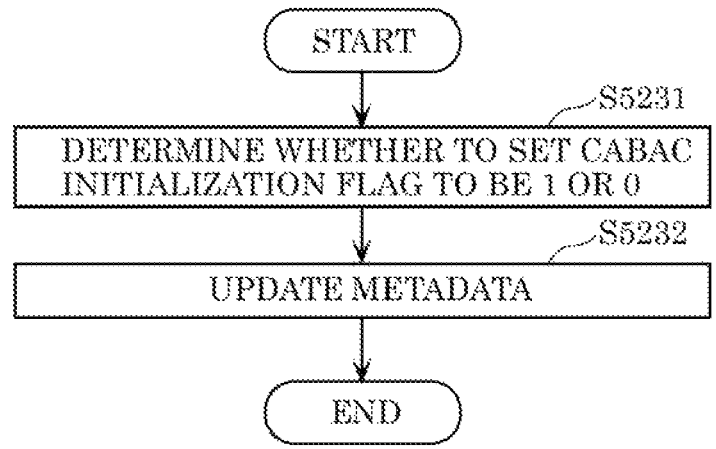
FIG. 87 is a flowchart of a process of updating additional information according to Embodiment 7.

FIG. 87 is a flowchart illustrating an example of a process of determining the value of the CABAC initialization flag and updating additional information in the tile division (S5223) and the slice division (S5525).

In steps S5223 and S5225, tile geometry information and tile attribute information and/or slice geometry information and slice attribute information may be independently divided in respective manners, or may be collectively divided in a common manner. In this way, additional information divided on a tile basis and/or on a slice basis is generated.

In these steps, the three-dimensional data encoding device determines whether to set the CABAC initialization flag to 1 or 0 (S5231).

The three-dimensional data encoding device then updates the additional information to include the determined CABAC initialization flag (S5232).

Figure 88:
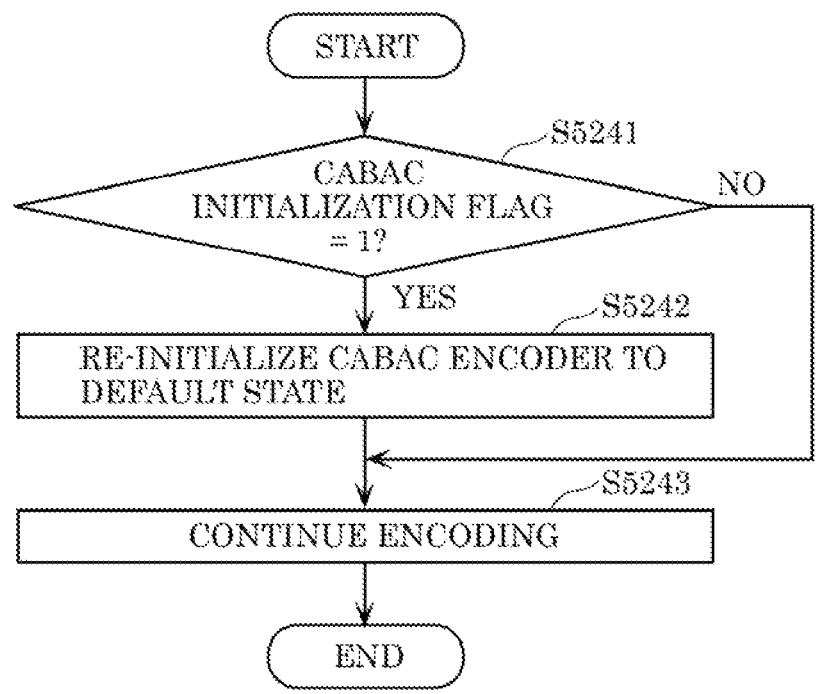
FIG. 88 is a flowchart illustrating an example of a process of initializing CABAC according to Embodiment 7.

FIG. 88 is a flowchart illustrating an example of a process of initializing CABAC in the processing of encoding (S5226).

The three-dimensional data encoding device determines whether the CABAC initialization flag is 1 or not (S5241).

When the CABAC initialization flag is 1 (if Yes in S5241), the three-dimensional data encoding device re-initializes the CABAC encoder to the default state (S5242).

The three-dimensional data encoding device then continues the encoding process until a condition for stopping the encoding process is satisfied, such as until there is no data to be encoded (S5243).

Figure 89:
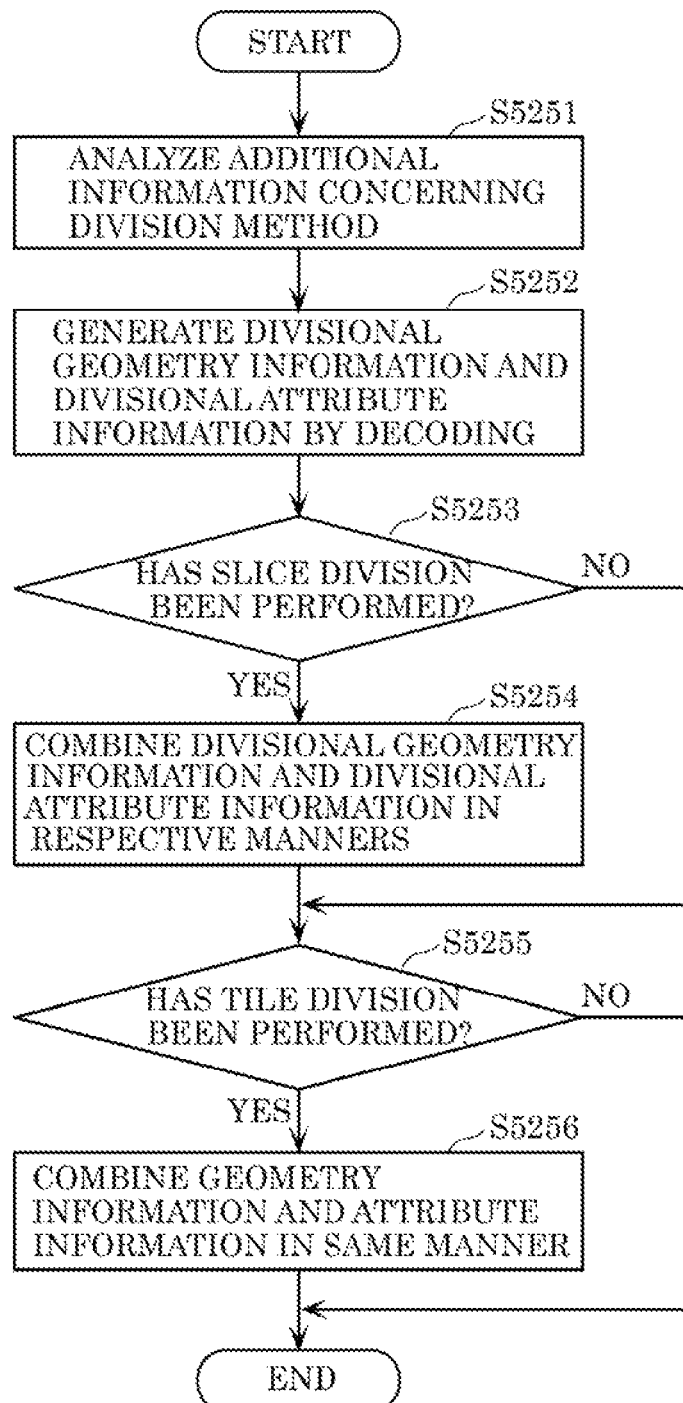
FIG. 89 is a flowchart illustrating a process of decoding point cloud data according to Embodiment 7.

FIG. 89 is a flowchart illustrating a process of decoding point cloud data according to this embodiment. First, the three-dimensional data decoding device determines the division method by analyzing additional information (tile additional information, geometry slice additional information, and attribute slice additional information) concerning the division method included in encoded data (encoded stream) (S5251). The division method includes a determination of whether to perform tile division or not and a determination of whether to perform slice division or not. The division method may include, for example, the number of tiles or slices and the type of division in the case where tile division or slice division is performed.

The three-dimensional data decoding device then generates divisional geometry information and divisional attribute information by decoding a plurality of pieces of encoded geometry information and a plurality of pieces of encoded attribute information included in the encoded data using dependency information included in the encoded data (S5252).

If the additional information indicates that slice division has been performed (if Yes in S5253), the three-dimensional data decoding device generates a plurality of pieces of tile geometry information and a plurality of pieces of tile attribute information by combining the plurality of pieces of divisional geometry information and the plurality of pieces of divisional attribute information based on the geometry slice additional information and the attribute slice additional information (S5254).

If the additional information indicates that tile division has been performed (if Yes in S5255), the three-dimensional data decoding device generates geometry information and attribute information by combining the plurality of pieces of tile geometry information and the plurality of pieces of tile attribute information (the plurality of pieces of divisional geometry information and the plurality of pieces of divisional attribute information) based on the tile additional information (S5256).

Figure 90:
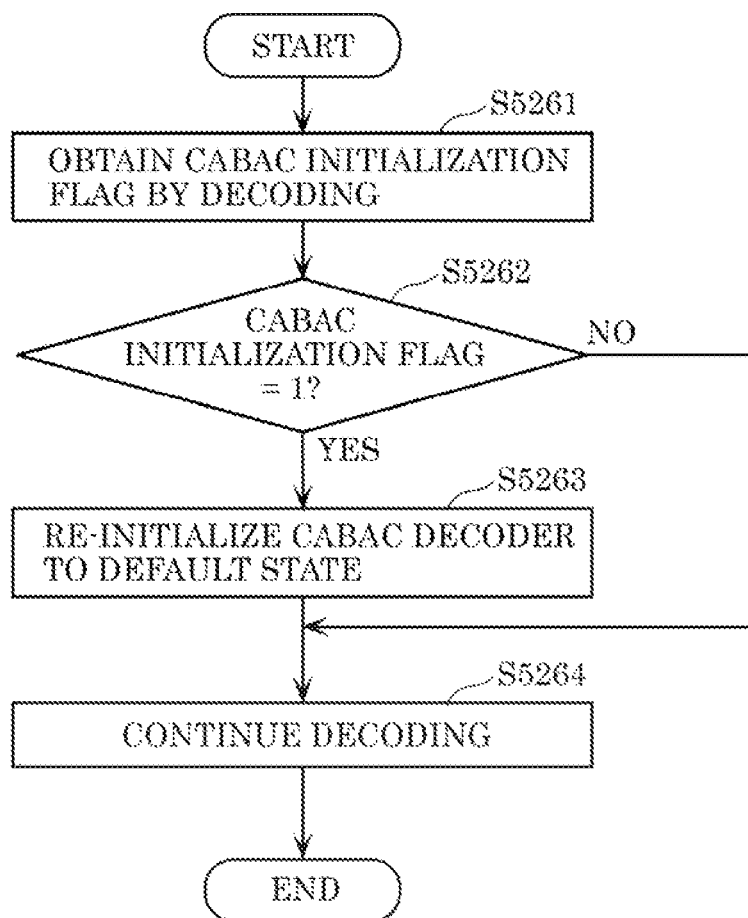
FIG. 90 is a flowchart illustrating an example of a process of initializing a CABAC decoder according to Embodiment 7.

FIG. 90 is a flowchart illustrating an example of a process of initializing the CABAC decoder in the combining (S5254) of information divided into slices and the combining (S5256) of information divided into tiles.

Pieces of slice geometry information and pieces of slice attribute information or pieces of tile geometry information or pieces of tile attribute information may be combined in respective manners or in the same manner.

The three-dimensional data decoding device obtains the CABAC initialization flag by decoding the additional information in the encoded stream.

The three-dimensional data decoding device then determines whether the CABAC initialization flag is 1 or not (S5262).

When the CABAC initialization flag is 1 (if Yes in S5262), the three-dimensional data decoding device re-initializes the CABAC decoder to the default state (S5263).

On the other hand, when the CABAC initialization flag is not 1 (if No in S5262), the three-dimensional data decoding device does not re-initialize the CABAC decoder and proceeds to step S5264.

The three-dimensional data decoding device then continues the decoding process until a condition for stopping the decoding process is satisfied, such as until there is no data to be decoded (S5264).

Next, other conditions concerning the determination of whether to initialize CABAC will be described.

Whether to initialize the encoding of geometry information or the encoding of attribute information may be determined by considering the coding efficiency on a basis of data units, such as tiles or slices. In that case, CABAC may be initialized at the leading data of a tile or slice that satisfies a predetermined condition.

Next, conditions concerning the determination of whether to initialize CABAC in the encoding of geometry information will be described.

For example, the three-dimensional data encoding device may determine the density of point cloud data for each slice, that is, the number of points per unit area belonging to each slice, compare the data density of the slice with the data density of another slice, and determine that the coding efficiency is better when CABAC is not initialized and determine not to initialize CABAC if the variation of the data density satisfies a predetermined condition. On the other hand, if the variation of the data density does not satisfy the predetermined condition, the three-dimensional data encoding device may determine that the coding efficiency is better when CABAC is initialized, and determine to initialize CABAC.

Here, "another slice" may be the preceding slice in the decoding order or a spatially neighboring slice, for example. The three-dimensional data encoding device may not perform the comparison of the data density with that of another slice and may determine whether to initialize CABAC based on whether the data density of the slice is a predetermined data density or not.

When it is determined to initialize CABAC, the three-dimensional data encoding device determines the context initial value used for the encoding of geometry information. The context initial value is set at a value that provides good encoding characteristics in response to the data density. The three-dimensional data encoding device may retain an initial value table for the data density in advance and selects an optimal initial value from the table.

Note that the three-dimensional data encoding device may determine whether to initialize CABAC based on the number of points, the distribution of points, or the imbalance of points, for example, rather than based on the density of a slice described above as an example. Alternatively, the three-dimensional data encoding device may determine whether to initialize CABAC based on a feature quantity or the number of feature points obtained from information on points or based on a recognized object. In that case, a determination criterion may be retained in a memory in the form of a table that associates the determination criterion with a feature quantity or the number of feature points obtained from information on points or an object recognized based on information on points.

For example, the three-dimensional data encoding device may determine an object associated with geometry information of map information and determine whether to initialize CABAC based on the object based on the geometry information. Alternatively, the three-dimensional data encoding device may determine whether to initialize CABAC based on information or a feature quantity obtained by projecting three-dimensional data onto a two-dimensional plane.

Next, conditions concerning the determination of whether to initialize CABAC in the encoding of attribute information will be described.

For example, the three-dimensional data encoding device may compare a color characteristic of the relevant slice with the color characteristic of the preceding slice, and determine that the coding efficiency is better when CABAC is not initialized and determine not to initialize CABAC if the variation of the color characteristic satisfies a predetermined condition. On the other hand, if the variation of the color characteristic does not satisfy the predetermined condition, the three-dimensional data encoding device may determine that the coding efficiency is better when CABAC is initialized, and determine to initialize CABAC. The color characteristic is luminance, chromaticity, or chroma, a histogram thereof, or color continuity, for example.

Here, "another slice" may be the preceding slice in the decoding order or a spatially neighboring slice, for example. The three-dimensional data encoding device may not perform the comparison of the data density with that of another slice and may determine whether to initialize CABAC based on whether the data density of the slice is a predetermined data density or not.

When it is determined to initialize CABAC, the three-dimensional data encoding device determines the context initial value used for the encoding of attribute information. The context initial value is set at a value that provides good encoding characteristics in response to the data density. The three-dimensional data encoding device may retain an initial value table for the data density in advance and select an optimal initial value from the table.

When the attribute information is reflectance, the three-dimensional data encoding device may determine whether to initialize CABAC based on reflectance-based information.

When a three-dimensional point has a plurality of pieces of attribute information, the three-dimensional data encoding device may independently determine initialization information for each piece of attribute information based on the piece of attribute information, may determine initialization information for the plurality of pieces of attribute information based on one of the pieces of attribute information, or may determine initialization information for the plurality of pieces of attribute information using a plurality of pieces of attribute information.

Although an example has been described in which the initialization information for geometry information is determined based on the geometry information, and the initialization information for attribute information is determined based on the attribute information, the initialization information for geometry information and attribute information may be determined based on the geometry information, based on the attribute information, or based on both the geometry information and the attribute information.

The three-dimensional data encoding device may determine initialization information based on a result of simulation of the coding efficiency performed by turning on and off cabac_init_flag or selecting one or more initial values from an initial value table, for example.

When the data division method into tiles, slices or the like is determined based on geometry information or attribute information, the three-dimensional data encoding device may determine initialization information based on the same information as information based on the determination of the division method.

Figure 91:
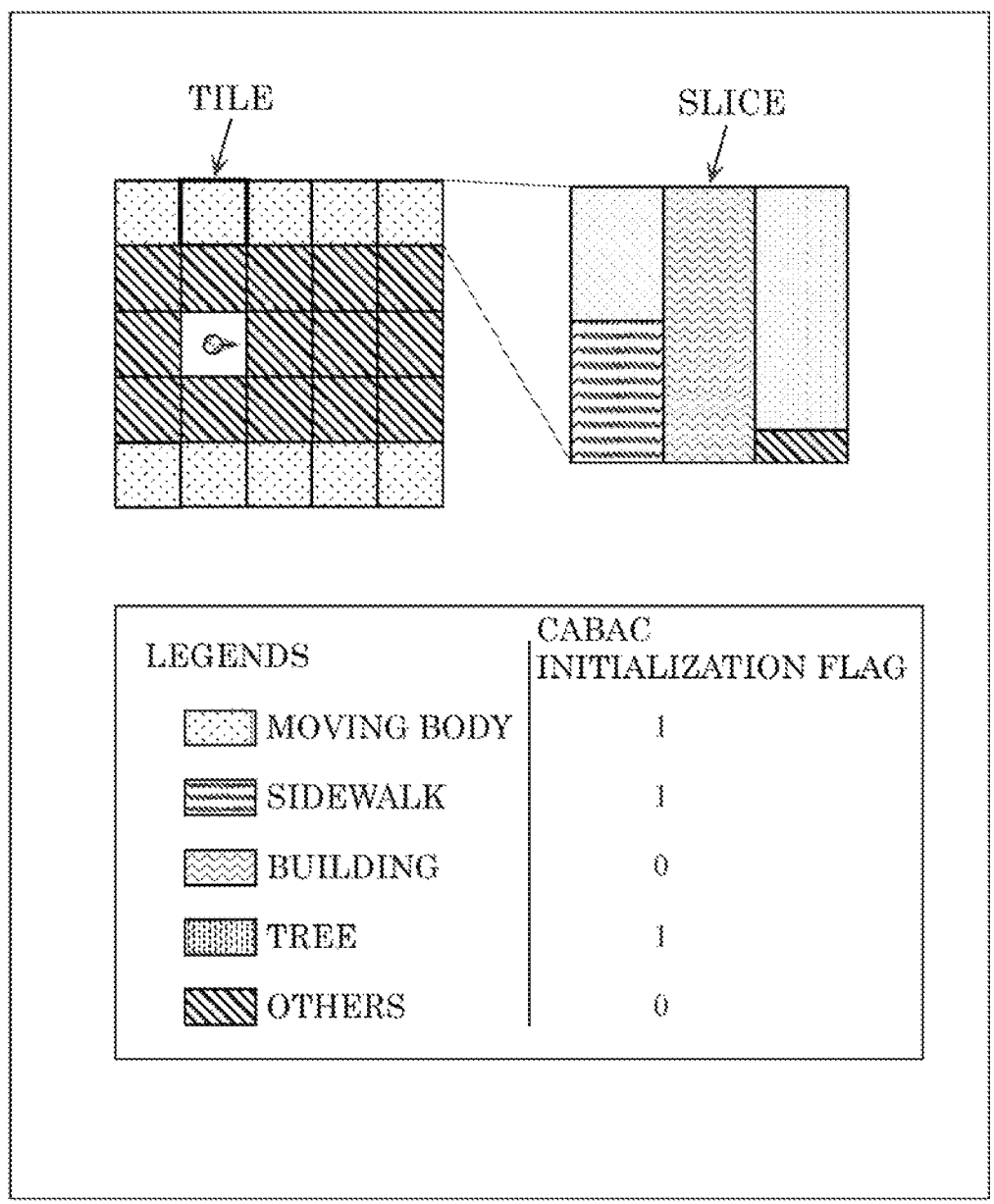
FIG. 91 is a diagram illustrating an example of tiles and slices according to Embodiment 7.

FIG. 91 is a diagram illustrating an example of tiles and slices.

For example, slices in one tile having part of PCC data are recognized as indicated by legends. The CABAC initialization flag can be used to determine whether re-initialization of a context is needed or not in successive slices. For example, in FIG. 91, when one tile includes slice data divided on a basis of objects (such as a moving body, a sidewalk, a building, a tree or other objects), the CABAC initialization flags for slices of a moving body, a sidewalk, and a tree are set to be 1, and the CABAC initialization flags for slices of a building and other objects are set to be 0. This means that, if the sidewalk and the building may be both dense permanent structures and have similar coding efficiencies, the coding efficiency may be able to be improved by avoiding re-initialization of CABAC between the slices for the sidewalk and the building. On the other hand, if the building and the tree may be significantly different in density and coding efficiency, the coding efficiency may be able to be improved by initializing CABAC between the slices for the building and the tree.

Figure 92:
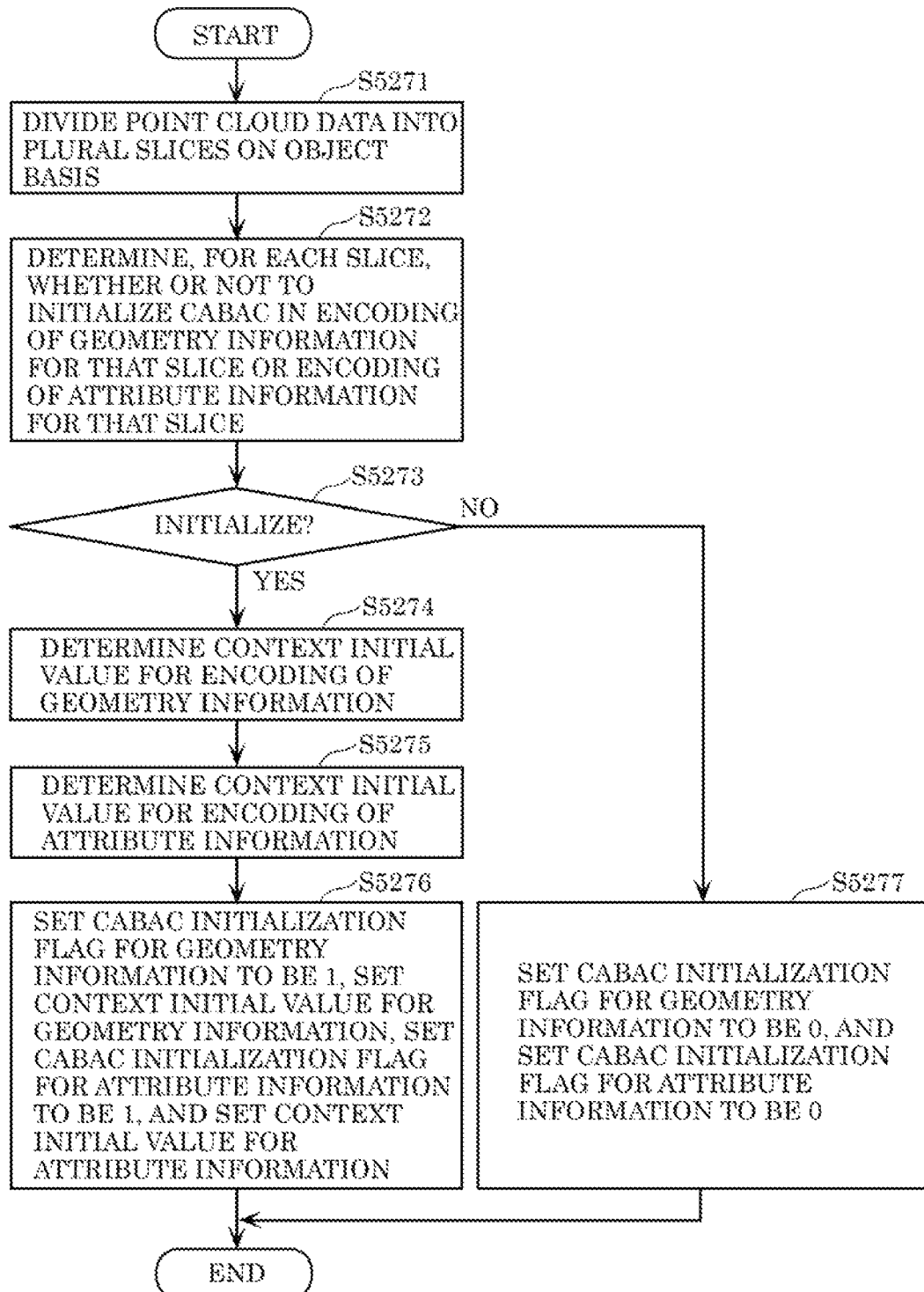
FIG. 92 is a flowchart illustrating an example of a method of determining whether to initialize CABAC and determining a context initial value according to Embodiment 7.

FIG. 92 is a flowchart illustrating an example of the method of determining whether to initialize CABAC and determining a context initial value.

First, the three-dimensional data encoding device divides point cloud data into slices based on an object determined from geometry information (S5271).

The three-dimensional data encoding device then determines, for each slice, whether to initialize CABAC for the encoding of geometry information and the encoding of attribute information based on the data density of the object of the slice (S5272). In other words, the three-dimensional data encoding device determines CABAC initialization information (CABAC initialization flag) for the encoding of geometry information and the encoding of attribute information based on the geometry information. The three-dimensional data encoding device determines an initialization with high coding efficiency based on the point cloud data density, for example. The CABAC initialization information may be indicated by cabac_init_flag that is common to the geometry information and the attribute information.

When it is determined to initialize CABAC (if Yes in S5273), the three-dimensional data encoding device determines a context initial value for the encoding of geometry information (S5274).

The three-dimensional data encoding device then determines a context initial value for the encoding of attribute information (S5275).

The three-dimensional data encoding device then sets the CABAC initialization flag for geometry information to be 1, sets the context initial value for geometry information, sets the CABAC initialization flag for attribute information to be 1, and sets the context initial value for attribute information (S5276). Note that when initializing CABAC, the three-dimensional data encoding device performs the initialization process using a context initial value in each of the encoding of geometry information and the encoding of attribute information.

On the other hand, when it is determined not to initialize CABAC (if No in S5273), the three-dimensional data encoding device sets the CABAC initialization flag for geometry information to be 0, and sets the CABAC initialization flag for attribute information to be 0 (S5277).

Figure 93:
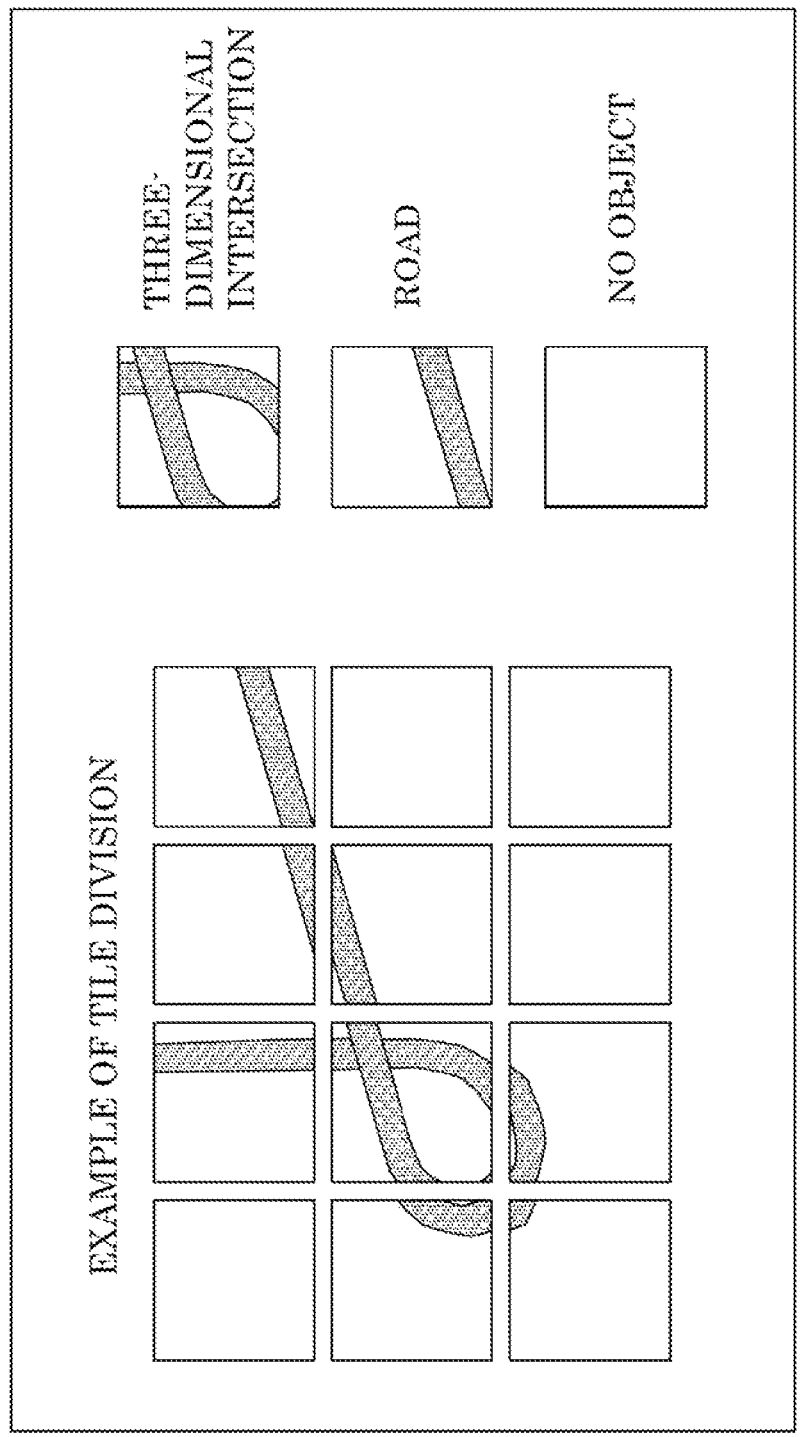
FIG. 93 is a diagram illustrating an example of a case where a map, which is a top view of point cloud data obtained by LiDAR, is divided into tiles according to Embodiment 7.
Figure 94:
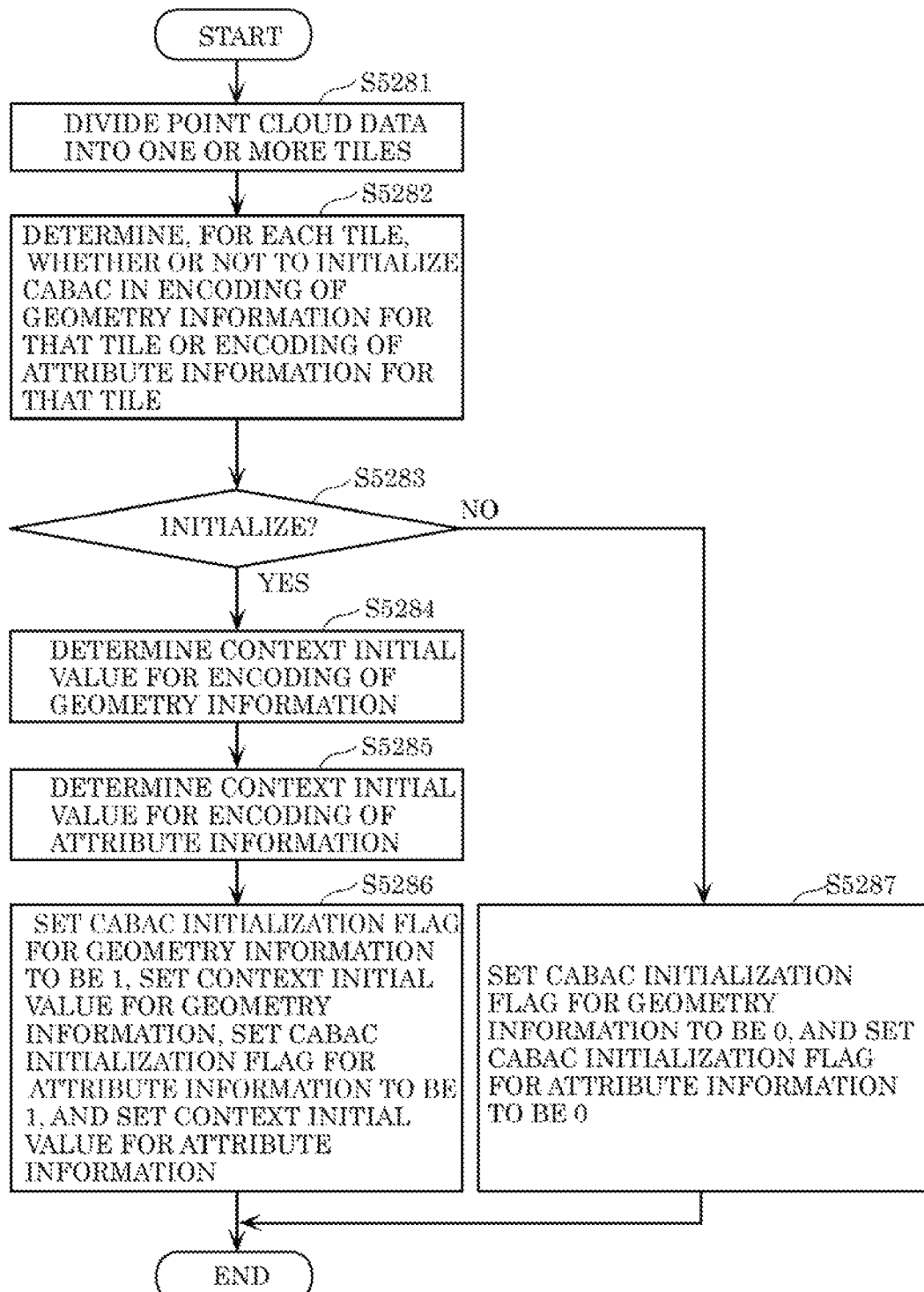
FIG. 94 is a flowchart illustrating another example of the method of determining whether to initialize CABAC and determining a context initial value according to Embodiment 7.

FIG. 93 is a diagram illustrating an example of a case where a map, which is a top view of point cloud data obtained by LiDAR, is divided into tiles. FIG. 94 is a flowchart illustrating another example of the method of determining whether to initialize CABAC and determining a context initial value.

In large-scale map data, the three-dimensional data encoding device divides point cloud data into one or more tiles based on geometry information in a two-dimensional top-view division manner (S5281). The three-dimensional data encoding device may divide point cloud data into square areas as illustrated in FIG. 93, for example. The three-dimensional data encoding device may also divide point cloud data into tiles of different shapes or sizes. The division into tiles may be performed in one or more methods determined in advance or may be adaptively performed.

The three-dimensional data encoding device then determines an object in each tile, and determines whether to initialize CABAC in the encoding of geometry information for the tile or the encoding of attribute information for the tile (S5282). Note that, in the division into slices, the three-dimensional data encoding device recognizes an object (a tree, a human being, a moving body, or a building), and determines whether to perform the slice division and determine an initial value based on the object.

When it is determined to initialize CABAC (if Yes in S5283), the three-dimensional data encoding device determines a context initial value for the encoding of geometry information (S5284).

The three-dimensional data encoding device then determines a context initial value for the encoding of attribute information (S5285).

In steps S5284 and S5285, an initial value for a tile having particular encoding characteristics may be stored as the initial value and used as an initial value for a tile having the same encoding characteristics.

The three-dimensional data encoding device then sets the CABAC initialization flag for geometry information to be 1, sets the context initial value for geometry information, sets the CABAC initialization flag for attribute information to be 1, and sets the context initial value for attribute information (S5286). Note that when initializing CABAC, the three-dimensional data encoding device performs the initialization process using a context initial value in each of the encoding of geometry information and the encoding of attribute information.

On the other hand, when it is determined not to initialize CABAC (if No in S5283), the three-dimensional data encoding device sets the CABAC initialization flag for geometry information to be 0, and sets the CABAC initialization flag for attribute information to be 0 (S5287).

Embodiment 8

Next, a quantization parameter will be described.

In order to divide point cloud data based on characteristics and positions concerning the point cloud data, a slice and a tile are used. Here, a different quality may be required for each of the pieces of divisional point cloud data, because of hardware restrictions or requirements for real-time processing, for example. For example, when encoding point cloud data by dividing the point cloud data into slices on an object basis, slice data including a plant is less important, so that the resolution (quality) of the slice data can be decreased by quantization. On the other hand, the resolution (quality) of important slice data can be increased by setting the quantization value at a lower value. A quantization parameter is used to enable such a control of quantization value.

Here, data to be quantized, a scale used for the quantization, and quantized data, which is the result of calculation by the quantization, are expressed by Equations G1 and G2 below.

$$\text{quantized data} = \text{data}/\text{scale} \quad \text{(Equation G1)}$$

$$\text{data} = \text{quantized data} * \text{scale} \quad \text{(Equation G2)}$$

Figure 95:
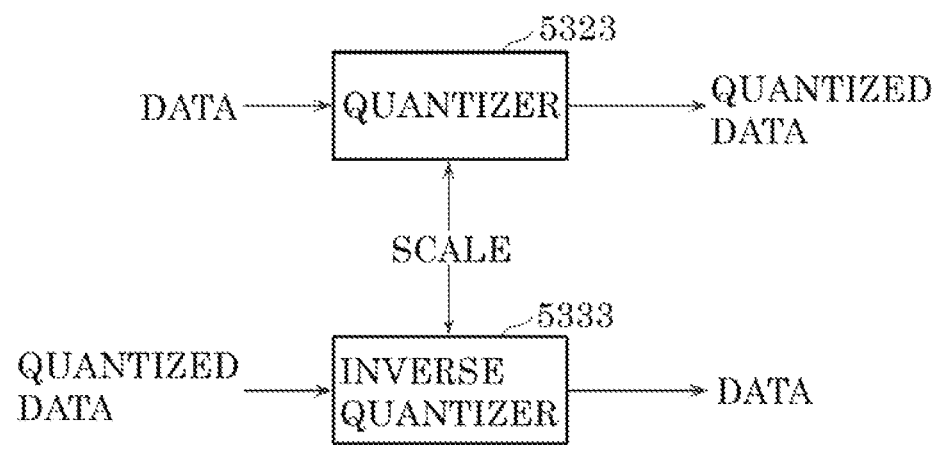
FIG. 95 is a diagram for describing a process performed by a quantizer and an inverse quantizer according to Embodiment 8.

FIG. 95 is a diagram for describing a process performed by quantizer 5323 that quantizes data and inverse quantizer 5333 that inverse-quantizes quantized data.

Quantizer 5323 quantizes data using a scale. That is, quantizer 5323 calculates quantized data, which is data quantized, by performing a process according to Equation G1.

Inverse quantizer 5333 inverse-quantizes quantized data using the scale. That is, inverse quantizer calculates inverse-quantized quantized data by performing a process according to Equation G2.

The scale and the quantization value (quantization parameter (QP) value) are expressed by Equation G3 below.

$$\text{quantization value(QP value)} = \log(\text{scale}) \quad \text{(Equation G3)}$$

$$\text{quantization value(QP value)} = \text{default value(reference value)} + \text{quantization delta(difference information)} \quad \text{(Equation G4)}$$

These parameters are generically referred to as a quantization parameter.

Figure 96:
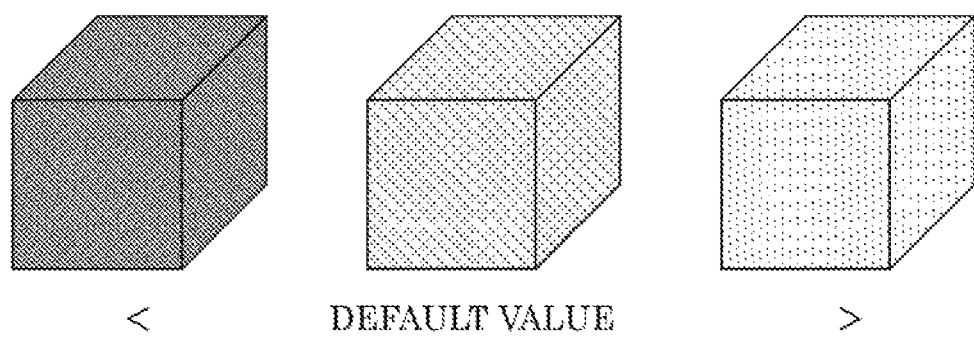
FIG. 96 is a diagram for describing a default value and a quantization delta of a quantization value according to Embodiment 8.

For example, as illustrated in FIG. 96, a quantization value is a value with respect to a default value, and is calculated by adding a quantization delta to the default value. If the quantization value is smaller than the default value, the quantization delta is a negative value. If the quantization value is greater than the default value, the quantization delta is a positive value. If the quantization value is equal to the default value, the quantization delta is 0. When the quantization delta is 0, the quantization delta can be omitted.

Figure 97:
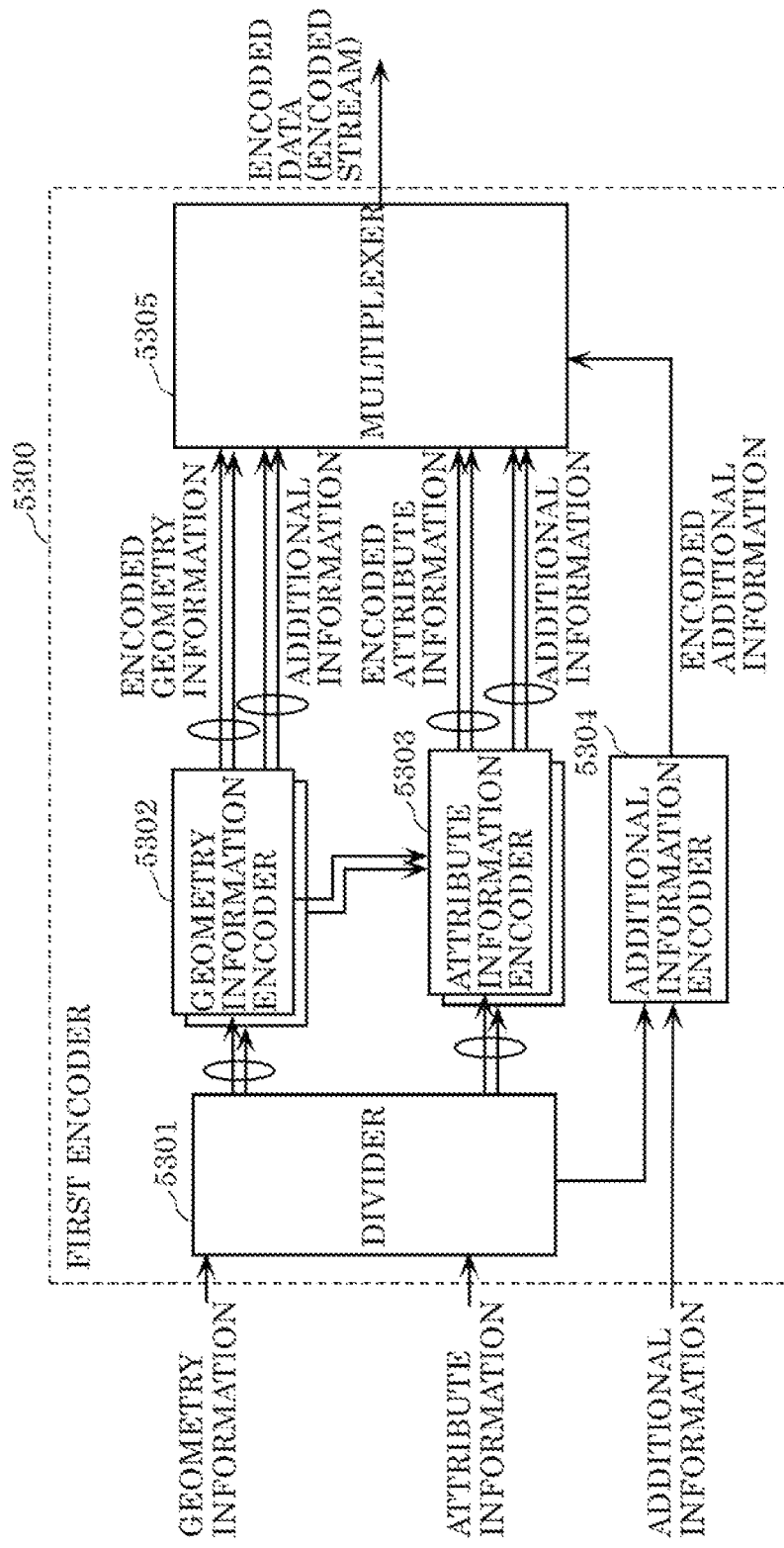
FIG. 97 is a block diagram illustrating a configuration of a first encoder included in a three-dimensional data encoding device according to Embodiment 8.
Figure 98:
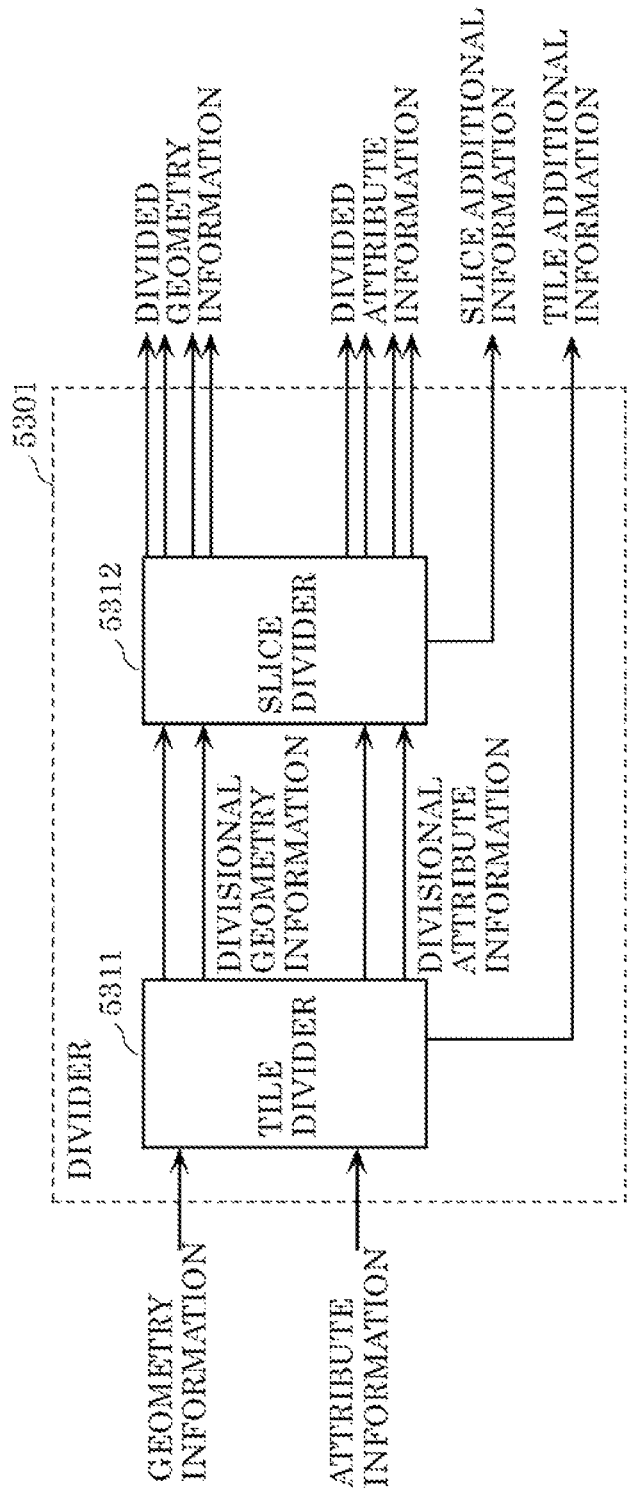
FIG. 98 is a block diagram illustrating a configuration of a divider according to Embodiment 8.
Figure 99:
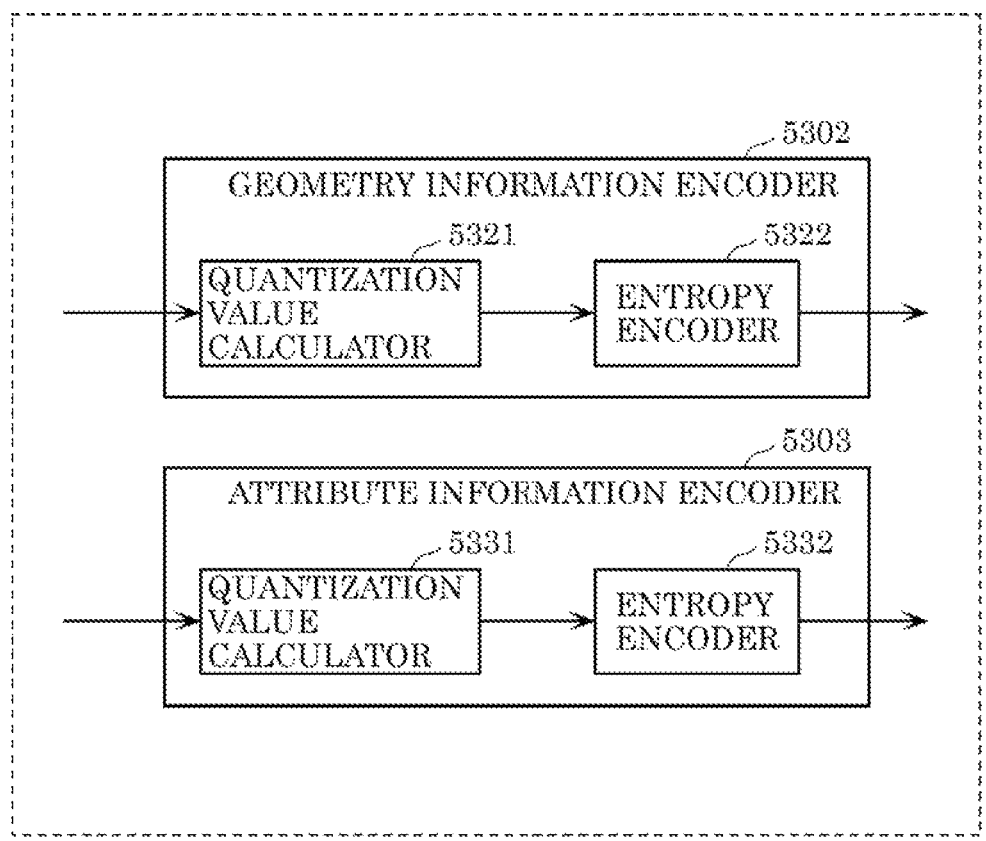
FIG. 99 is a block diagram illustrating a configuration of a geometry information encoder and an attribute information encoder according to Embodiment 8.

An encoding process will be described. FIG. 97 is a block diagram illustrating a configuration of first encoder 5300 included in the three-dimensional data encoding device according to this embodiment. FIG. 98 is a block diagram illustrating a configuration of divider 5301 according to this embodiment. FIG. 99 is a block diagram illustrating a configuration of geometry information encoder 5302 and attribute information encoder 5303 according to this embodiment.

First encoder 5300 generates encoded data (encoded stream) by encoding point cloud data in a first encoding method (geometry-based PCC (GPCC)). First encoder 5300 includes divider 5301, a plurality of geometry information encoders 5302, a plurality of attribute information encoders 5303, additional information encoder 5304, and multiplexer 5305.

Divider 5301 generates a plurality of pieces of divisional data by dividing point cloud data. Specifically, divider 5301 generates a plurality of pieces of divisional data by dividing a space of point cloud data into a plurality of subspaces. Here, a subspace is a combination of tiles or slices, or a combination of tiles and slices. More specifically, point cloud data includes geometry information, attribute information, and additional information. Divider 5301 divides geometry information into a plurality of pieces of divisional geometry information, and divides attribute information into a plurality of pieces of divisional attribute information. Divider 5301 also generates additional information concerning the division.

As illustrated in FIG. 98, divider 5301 includes tile divider 5311 and slice divider 5312. For example, tile divider 5311 divides a point cloud into tiles. Tile divider 5311 may determine a quantization value used for each divisional tile as tile additional information.

Slice divider 5312 further divides a tile obtained by tile divider 5311 into slices. Slice divider 5312 may determine a quantization value used for each divisional slice as slice additional information.

The plurality of geometry information encoders 5302 generate a plurality of pieces of encoded geometry information by encoding a plurality of pieces of divisional geometry information. For example, the plurality of geometry information encoders 5302 process a plurality of pieces of divisional geometry information in parallel.

As illustrated in FIG. 99, geometry information encoder 5302 includes quantization value calculator 5321 and entropy encoder 5322. Quantization value calculator 5321 generates a quantization value (quantization parameter) of divisional geometry information to be encoded. Entropy encoder 5322 calculates quantized geometry information by quantizing the divisional geometry information using the quantization value (quantization parameter) generated by quantization value calculator 5321.

The plurality of attribute information encoders 5303 generate a plurality of pieces of encoded attribute information by encoding a plurality of pieces of divisional attribute information. For example, the plurality of attribute information encoders 5303 process a plurality of pieces of divisional attribute information in parallel.

As illustrated in FIG. 99, attribute information encoder 5303 includes quantization value calculator 5331 and entropy encoder 5332. Quantization value calculator 5321 generates a quantization value (quantization parameter) of divisional attribute information to be encoded. Entropy encoder 5332 calculates quantized attribute information by quantizing the divisional attribute information using the quantization value (quantization parameter) generated by quantization value calculator 5331.

Additional information encoder 5304 generates encoded additional information by encoding additional information included in the point cloud data and additional information concerning the data division generated in the division by divider 5301.

Multiplexer 5305 generates encoded data (encoded stream) by multiplexing a plurality of pieces of encoded geometry information, a plurality of pieces of encoded attribute information, and encoded additional information, and transmits the generated encoded data. The encoded additional information is used for decoding.

Note that, although FIG. 97 shows an example in which there are two geometry information encoders 5302 and two attribute information encoders 5303, the number of geometry information encoders 5302 and the number of attribute information encoders 5303 may be one, or three or more. The plurality of pieces of divisional data may be processed in parallel in the same chip, such as by a plurality of cores of a CPU, processed in parallel by cores of a plurality of chips, or processed in parallel by a plurality of cores of a plurality of chips.

Figure 100:
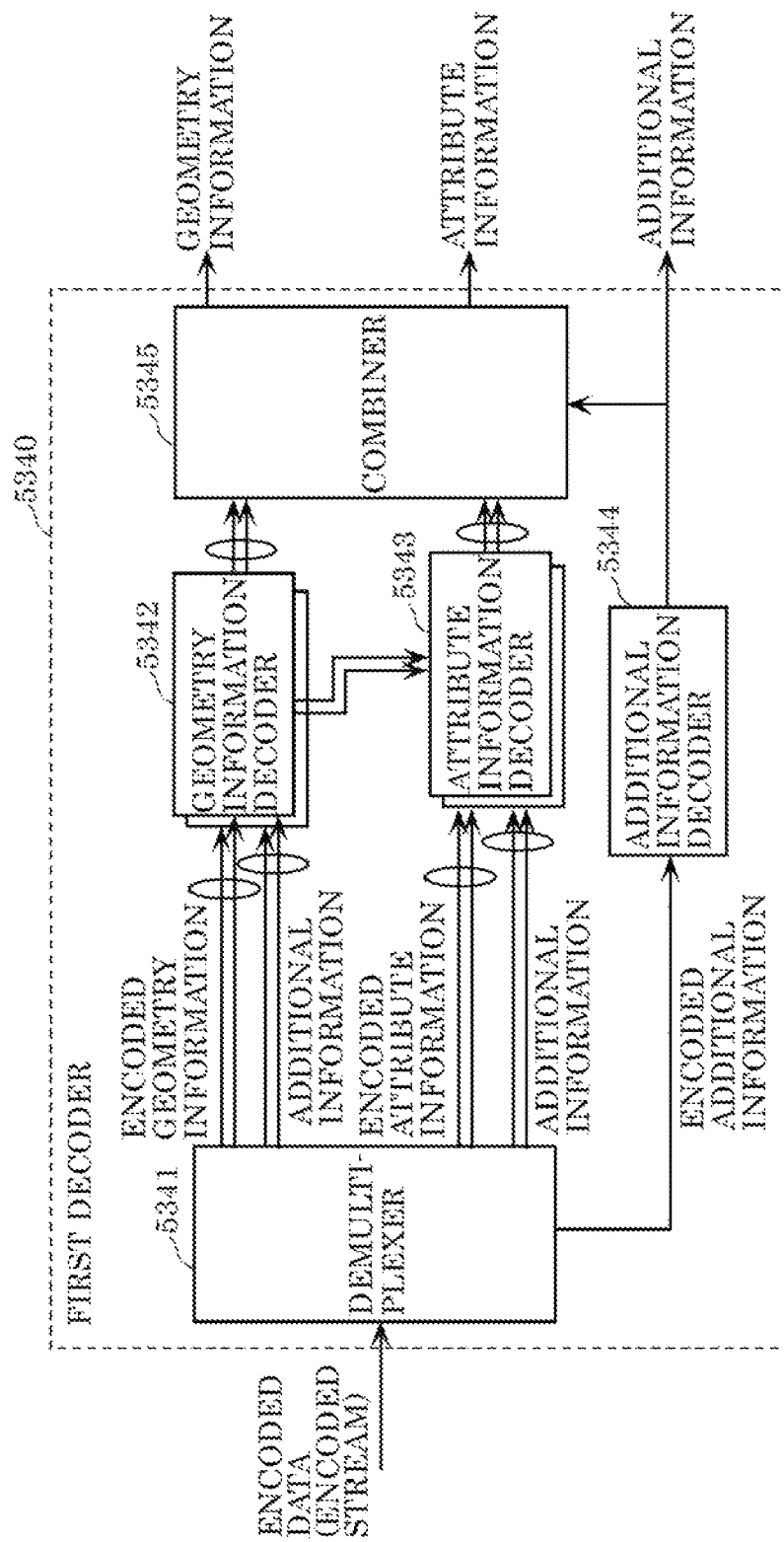
FIG. 100 is a block diagram illustrating a configuration of a first decoder according to Embodiment 8.
Figure 101:
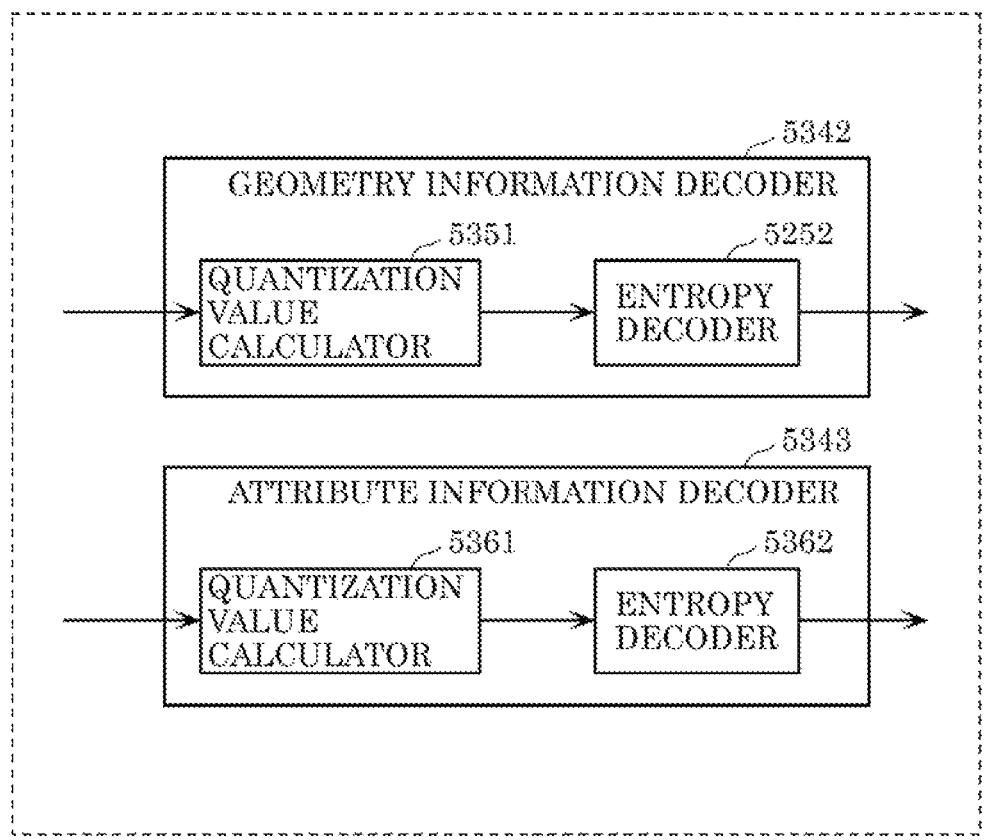
FIG. 101 is a block diagram illustrating a configuration of a geometry information decoder and an attribute information decoder according to Embodiment 8.

Next, a decoding process will be described. FIG. 100 is a block diagram illustrating a configuration of first decoder 5340. FIG. 101 is a block diagram illustrating a configuration of geometry information decoder 5342 and attribute information decoder 5343.

First decoder 5340 reproduces point cloud data by decoding encoded data (encoded stream) generated by encoding the point cloud data in the first encoding method (GPCC). First decoder 5340 includes demultiplexer 5341, a plurality of geometry information decoders 5342, a plurality of attribute information decoders 5343, additional information decoder 5344, and combiner 5345.

Demultiplexer 5341 generates a plurality of pieces of encoded geometry information, a plurality of pieces of encoded attribute information, and encoded additional information by demultiplexing encoded data (encoded stream).

The plurality of geometry information decoders 5342 generate a plurality of pieces of quantized geometry information by decoding a plurality of pieces of encoded geometry information. For example, the plurality of geometry information decoders 5342 process a plurality of pieces of encoded geometry information in parallel.

As illustrated in FIG. 101, geometry information decoder 5342 includes quantization value calculator 5351 and entropy decoder 5352. Quantization value calculator 5351 generates a quantization value of quantized geometry information. Entropy decoder 5352 calculates geometry information by inverse-quantizing the quantized geometry information using the quantization value generated by quantization value calculator 5351.

The plurality of attribute information decoders 5343 generate a plurality of pieces of divisional attribute information by decoding a plurality of pieces of encoded attribute information. For example, the plurality of attribute information decoders 5343 process a plurality of pieces of encoded attribute information in parallel.

As illustrated in FIG. 101, attribute information decoder 5343 includes quantization value calculator 5361 and entropy decoder 5362. Quantization value calculator 5361 generates a quantization value of quantized attribute information. Entropy decoder 5362 calculates attribute information by inverse-quantizing the quantized attribute information using the quantization value generated by quantization value calculator 5361.

The plurality of additional information decoders 5344 generate additional information by decoding encoded additional information.

Combiner 5345 generates geometry information by combining a plurality of pieces of divisional geometry information using additional information. Combiner 5345 generates attribute information by combining a plurality of pieces of divisional attribute information using additional information. For example, combiner 5345 first generates point cloud data associated with a tile by combining decoded point cloud data associated with slices using slice additional information. Combiner 5345 then reproduces the original point cloud data by combining point cloud data associated with tiles using tile additional information.

Note that, although FIG. 100 shows an example in which there are two geometry information decoders 5342 and two attribute information decoders 5343, the number of geometry information decoders 5342 and the number of attribute information decoders 5343 may be one, or three or more. The plurality of pieces of divisional data may be processed in parallel in the same chip, such as by a plurality of cores of a CPU, processed in parallel by cores of a plurality of chips, or processed in parallel by a plurality of cores of a plurality of chips.

[Method of Determining Quantization Parameter]

Figure 102:
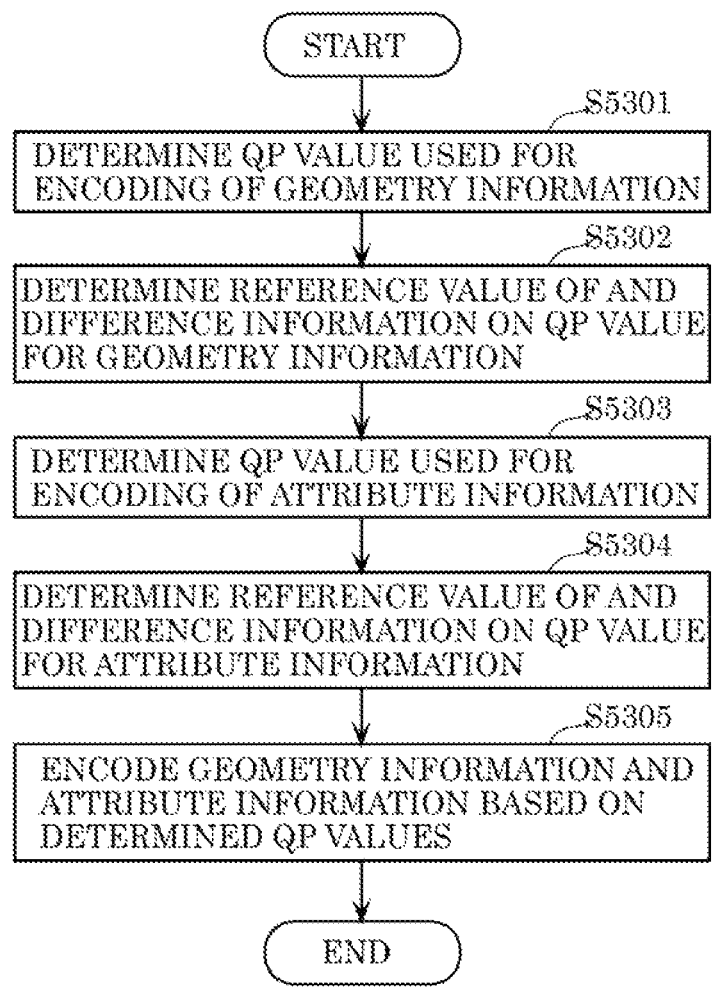
FIG. 102 is a flowchart illustrating an example of a process concerning determination of a quantization value in the encoding of geometry information or the encoding of attribute information according to Embodiment 8.

FIG. 102 is a flowchart illustrating an example of a process concerning determination of a quantization value (quantization parameter value: QP value) in the encoding of geometry information (geometry) or the encoding of attribute information (attribute).

A QP value is determined by considering the coding efficiency on a basis of data units of geometry information or attribute information forming a PCC frame, for example. When the data unit is a tile or slice resulting from division, the QP value is determined on a basis of divisional data units by considering the coding efficiency of the divisional data units. The QP value may be determined on a basis of data units before division.

As illustrated in FIG. 102, the three-dimensional data encoding device determines a QP value used for the encoding of geometry information (S5301). The three-dimensional data encoding device may determine the QP value for each of a plurality of divisional slices in a predetermined manner. Specifically, the three-dimensional data encoding device determines the QP value based on the characteristics or quality of the data of the geometry information. For example, the three-dimensional data encoding device may determine the density of point cloud data for each data unit, that is, the number of points per unit area belonging to each slice, and determine a value corresponding to the density of point cloud data as the QP value. Alternatively, the three-dimensional data encoding device may determine, as the QP value, any of the following values corresponding to geometry information: the number of points of point cloud data, the distribution of points of point cloud data, the imbalance of points of point cloud data, a feature quantity obtained from information on points, the number of feature points, or a recognized object. The three-dimensional data encoding device may also determine an object associated with geometry information of a map and determine the QP value based on the object based on the geometry information, or may determine the QP value based on information or a feature quantity obtained by projecting three-dimensional point cloud onto a two-dimensional plane. The corresponding QP value may be stored in a memory in advance in the form of a table that associates the QP value with the density, the number of points, the distribution of points, or the imbalance of points of point cloud data. The corresponding QP value may also be stored in a memory in advance in the form of a table that associates the QP value with a feature quantity or the number of feature points obtained from information on points or an object recognized based on the information on points. The corresponding QP value may be determined based on a result of simulation of the coding efficiency or the like using various QP values in the encoding of the geometry information concerning point cloud data.

The three-dimensional data encoding device then determines a reference value (default value) of and difference information (quantization delta) on the QP value for geometry information (S5302). Specifically, the three-dimensional data encoding device determines a reference value and difference information to be transmitted using the determined QP value in a predetermined manner, and sets (adds) the determined reference value and difference information in at least one of the additional information or the header of the data.

The three-dimensional data encoding device then determines a QP value used for the encoding of attribute information (S5303). The three-dimensional data encoding device may determine the QP value for each of a plurality of divisional slices in a predetermined manner. Specifically, the three-dimensional data encoding device determines the QP value based on the characteristics or quality of the data of the attribute information. For example, the three-dimensional data encoding device may determine the QP value on a basis of data units based on the characteristics of the attribute information. Color characteristics include luminance, chromaticity, and chroma, a histogram thereof, and color continuity, for example. When the attribute information is reflectance, the QP value may be determined based on information based on the reflectance. For example, when a face is detected as an object from point cloud data, the three-dimensional data encoding device may determine a high-quality QP value for the point cloud data forming the object detected as a face. In this way, the three-dimensional data encoding device may determine the QP value for the point cloud data forming an object depending on the type of the object.

When a three-dimensional point has a plurality of pieces of attribute information, the three-dimensional data encoding device may determine a different QP value for each piece of attribute information based on the piece of attribute information. Alternatively, the three-dimensional data encoding device may determine a QP value for the plurality of pieces of attribute information based on any one of the pieces of attribute information, or determine a QP value for the plurality of pieces of attribute information based on a plurality of pieces of attribute information.

The three-dimensional data encoding device then determines a reference value (default value) of and difference information (quantization delta) on the QP value for attribute information (S5304). Specifically, the three-dimensional data encoding device determines a reference value and difference information to be transmitted using the determined QP value in a predetermined manner, and sets (adds) the determined reference value and difference information in at least one of the additional information or the header of the data.

The three-dimensional data encoding device then quantizes and encodes the geometry information and the attribute information based on the determined QP values for geometry information and attribute information, respectively (S5305).

Note that although an example has been described in which the QP value for geometry information is determined based on the geometry information, and the QP value for attribute information is determined based on the attribute information, the present disclosure is not limited thereto. For example, the QP values for geometry information and attribute information may be determined based on the geometry information, based on the attribute information, or based on the geometry information and the attribute information.

Note that the QP values for geometry information and attribute information may be adjusted by considering the balance between the quality of the geometry information and the quality of the attribute information in the point cloud data. For example, the QP values for geometry information and attribute information may be set in such a manner that the quality of the geometry information is high, and the quality of the attribute information is lower than the quality of the geometry information. For example, the QP value for attribute information may be determined under a restriction that the QP value for attribute information is equal to or higher than the QP value for geometry information.

The QP value may be adjusted so that encoded data is generated within a predetermined range of rate. For example, when the code amount of the encoding of the preceding data unit is expected to exceed a predetermined rate, that is, when the difference from a predetermined rate is less than a first difference, the QP value may be adjusted to decrease the coding quality so that the difference between the predetermined rate and the code amount of the data unit is less than the first difference. On the other hand, when the difference from the predetermined rate is greater than a second difference, which is greater than the first difference, and there is a substantial difference, the QP value may be adjusted to improve the coding quality of the data unit. The adjustment between data units may be made between PCC frames or between tiles or slices. The adjustment of the QP value for attribute information may be made based on the rate of encoding of geometry information.

Note that, in the flowchart of FIG. 102, the processing concerning geometry information and the processing concerning attribute information may be performed in reverse order or in parallel.

Note that, although the flowchart of FIG. 102 shows a slice-based process as an example, a tile-based process or a process on a basis of other data units can be performed in the same manner as the slice-based process. That is, slice in the flowchart of FIG. 102 can be replaced with tile or other data units.

Figure 103:
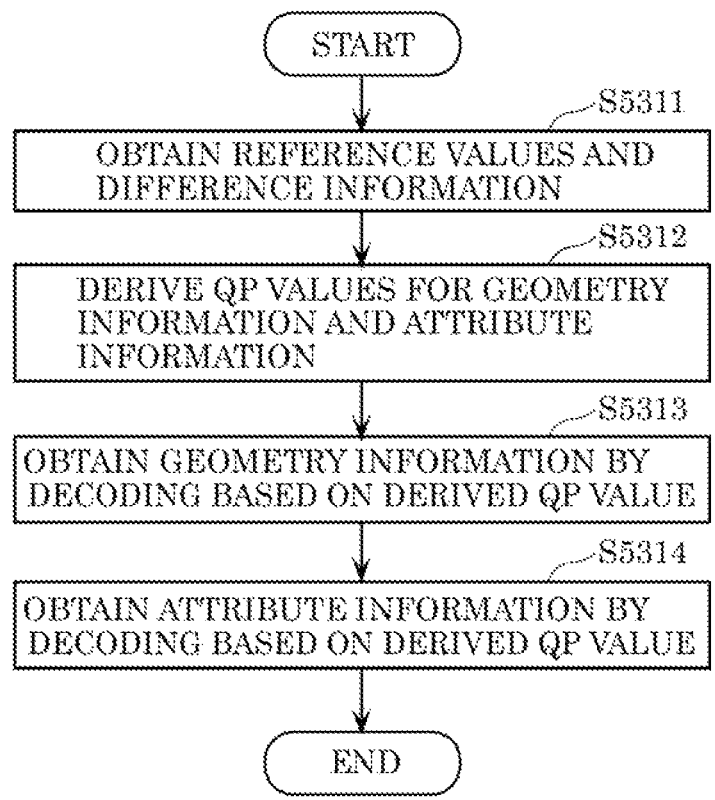
FIG. 103 is a flowchart illustrating an example of a process of decoding geometry information and attribute information according to Embodiment 8.

FIG. 103 is a flowchart illustrating an example of a process of decoding geometry information and attribute information.

As illustrated in FIG. 103, the three-dimensional data decoding device obtains a reference value and difference information that indicate a QP value for geometry information, and a reference value and difference information that indicate a QP value for attribute information (S5311). Specifically, the three-dimensional data decoding device analyzes one or both of the transmitted metadata or the header of the transmitted encoded data, and obtains reference values and difference information for deriving the QP values.

The three-dimensional data decoding device then derives the QP values using the obtained reference values and difference information in a predetermined manner.

The three-dimensional data decoding device then obtains quantized geometry information, and obtains geometry information by inverse-quantizing the quantized geometry information using the derived QP value (S5313).

The three-dimensional data decoding device then obtains quantized attribute information, and obtains attribute information by inverse-quantizing the quantized attribute information using the derived QP value (S5314).

Next, a method of transmitting a quantization parameter will be described.

Figure 104:
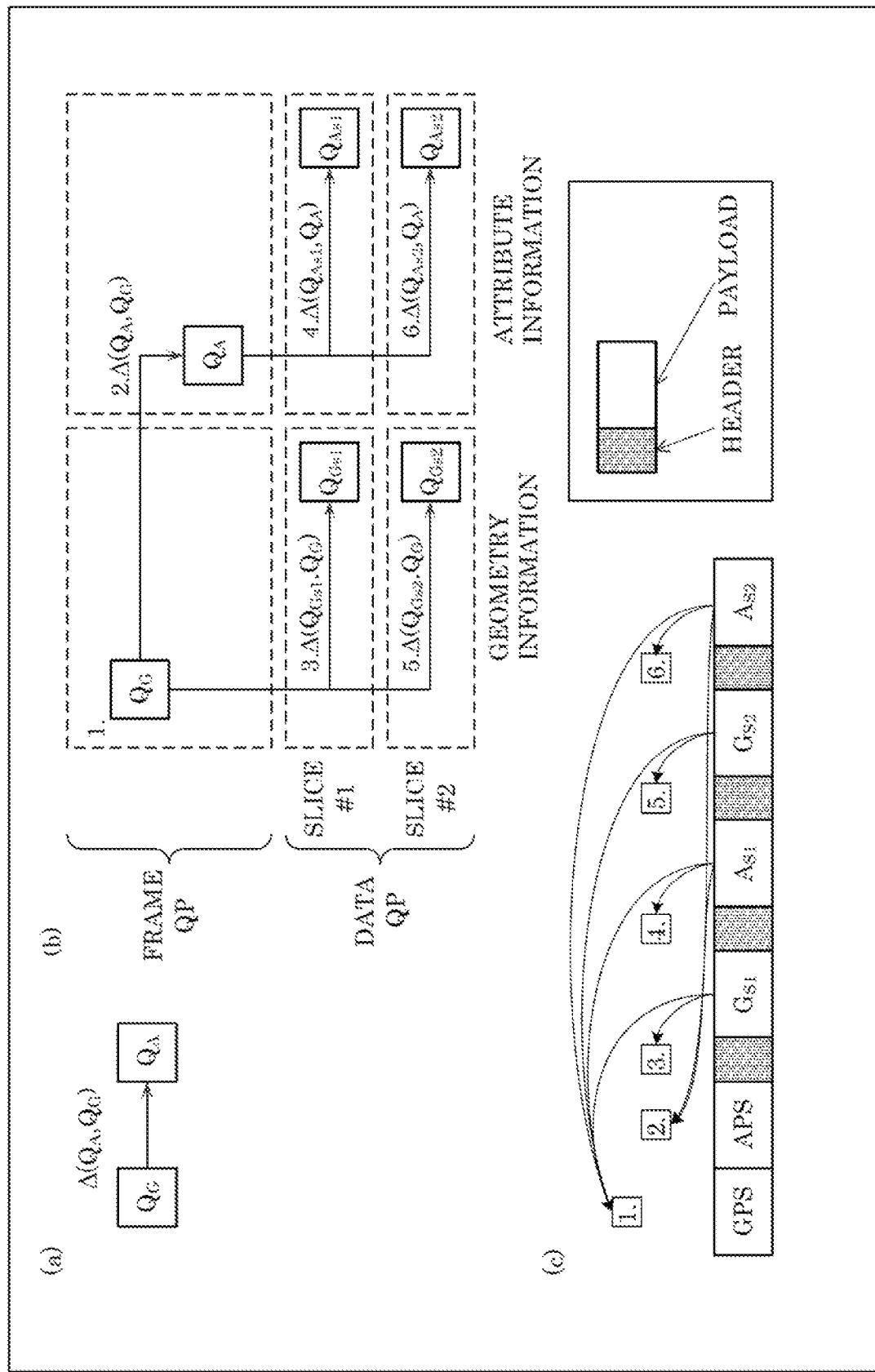
FIG. 104 is a diagram for describing a first example of a method of transmitting a quantization parameter according to Embodiment 8.

FIG. 104 is a diagram for describing a first example of the method of transmitting a quantization parameter. Part (a) of FIG. 104 shows an example of a relationship between QP values.

In FIG. 104, $Q_G$ and $Q_A$ denote an absolute value of a QP value used for the encoding of geometry information and an absolute value of a QP value used for the encoding of attribute information, respectively. $Q_G$ is an example of a first quantization parameter used for quantizing geometry information on each of a plurality of three-dimensional points. $\Delta(Q_A, Q_G)$ denotes difference information that indicates a difference between $Q_A$ and $Q_G$ used for deriving $Q_A$. That is, $Q_A$ is derived using $Q_G$ and $\Delta(Q_A, Q_G)$. In this way, a QP value is separated into a reference value (absolute value) and difference information (relative value) for transmission. In the decoding, a desired QP value is derived from the transmitted reference value and difference information.

For example, in part (a) of FIG. 104, the absolute value $Q_G$ and the difference information $\Delta(Q_A, Q_G)$ are transmitted, and in the decoding, $Q_A$ is derived by adding $\Delta(Q_A, Q_G)$ to $Q_G$ as shown by Equation G5 below.

$$Q_A = Q_G + \Delta(Q_A, Q_G) \tag{Equation G5}$$

With reference to parts (b) and (c) of FIG. 104, a method of transmitting QP values in a case where point cloud data including geometry information and attribute information is divided into slices will be described. Part (b) of FIG. 104 shows a first example of a relationship between a reference value and difference information for each QP value. Part (c) of FIG. 104 shows a first example of an order of transmission of QP values, geometry information, and attribute information.

For each piece of geometry information and each piece of attribute information, QP values are classified into QP values (frame QPs) in units of PCC frames and QP values (data QPs) in units of data units. The QP value used for the encoding determined in step S5301 in FIG. 102 is a QP value in units of data units.

Here, $Q_G$, which is a QP value used for the encoding of geometry information in units of PCC frames, is used as a reference value, and a QP value in units of data units is generated and transmitted as difference information that indicates the difference from $Q_G$.

$Q_G$: a QP value for the encoding of geometry information for a PCC frame, which is transmitted as a reference value "1." using GPS.

$Q_A$: a QP value for the encoding of attribute information for a PCC frame, which is transmitted as difference information "2." using APS.

$Q_{Gs1}$, $Q_{Gs2}$: QP values for the encoding of geometry information of slice data, which are transmitted as difference information "3." and "5." indicating a difference from $Q_G$, respectively, using the header of the encoded data of the geometry information.

$Q_{As1}$, $Q_{As2}$: QP values for the encoding of attribute information of slice data, which are transmitted as difference information "4." and "6." indicating a difference from $Q_A$, respectively, using the header of the encoded data of the attribute information.

Note that information used for deriving a frame QP is described in metadata (GPS, APS) associated with the frame, and information used for deriving a data QP is described in metadata (header of encoded data) associated with the data.

In this way, the data QP is generated and transmitted as difference information indicating a difference from the frame QP. Therefore, the data amount of the data QP can be reduced.

In each piece of encoded data, first decoder 5340 refers to metadata indicated by an arrow in part (c) of FIG. 104, and obtains a reference value and difference information associated with the encoded data. First decoder 5340 then derives a QP value corresponding to the encoded data to be decoded based on the obtained reference value and difference information.

For example, first decoder 5340 obtains the reference information "1." and the difference information "2." and "6." indicated by arrows in part (c) of FIG. 104 from the metadata or the header, and derives the QP value of $As_2$ by adding the difference information "2." and "6." to the reference information "1." as shown by Equation G6 below.

$$Q_{As2} = Q_G + \Delta(Q_A, Q_G) + \Delta(Q_{As2}, Q_A) \quad \text{(Equation G6)}$$

Point cloud data includes geometry information and zero or more pieces of attribute information. That is, point cloud data may include no attribute information or a plurality of pieces of attribute information.

For example, one three-dimensional point may have, as attribute information, color information, color information and reflectance information, or one or more pieces of color information linked to one or more pieces of point-of-view information.

Figure 105:
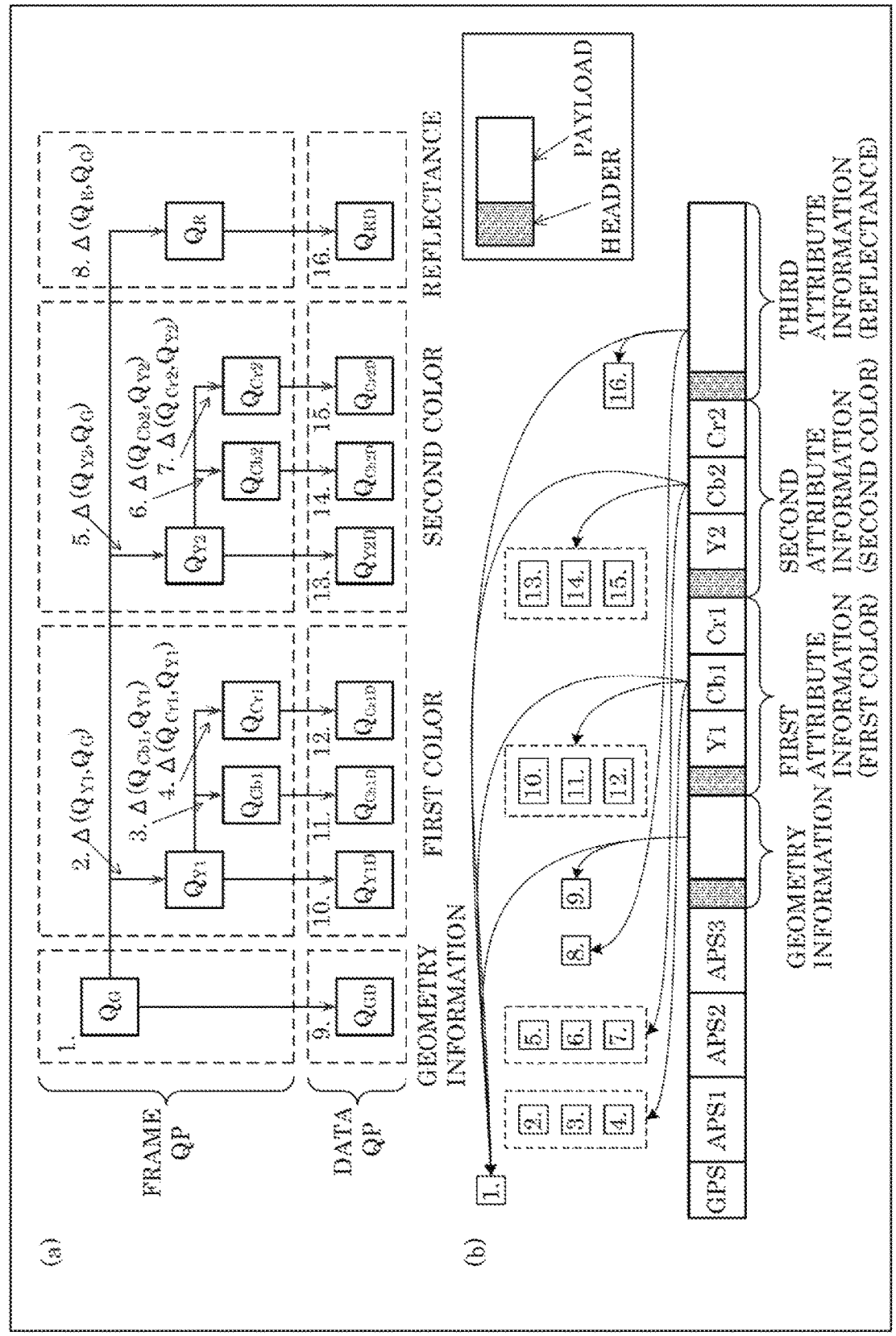
FIG. 105 is a diagram for describing a second example of the method of transmitting a quantization parameter according to Embodiment 8.

Here, an example of a case where one three-dimensional point has two pieces of color information and reflectance information will be described with reference to FIG. 105. FIG. 105 is a diagram for describing a second example of the method of transmitting a quantization parameter. Part (a) of FIG. 105 is a diagram illustrating a second example of the relationship between a reference value and difference information for each QP value. Part (b) of FIG. 105 is a diagram illustrating a second example of the order of transmission of QP values, geometry information, and attribute information.

$Q_G$ is an example of the first quantization parameter as in FIG. 104.

Two pieces of color information are indicated by luminance (luma) Y and chrominances (chroma) Cb, Cr, respectively. $Q_{Y1}$, which a QP value used for the encoding of luminance Y1 of a first color, is derived from $Q_G$, which is a reference value, and $\Delta(Q_{Y1}, Q_G)$, which indicates the difference between $Q_{Y1}$ and $Q_G$. Luminance Y1 is an example of a first luminance, and $Q_{Y1}$ is an example of a second quantization parameter used for quantizing luminance Y1 as the first luminance. $\Delta(Q_{Y1}, Q_G)$ is difference information "2.".

$Q_{Cb1}$ and $Q_{Cr1}$, which are QP values used for the encoding of chrominances Cb1 and Cr1 of the first color, are derived from $Q_{Y1}$ and $\Delta(Q_{Cb1}, Q_{Y1})$ and $\Delta(Q_{Cr1}, Q_{Y1})$, which indicate the difference between $Q_{Cb1}$ and $Q_{Y1}$ and the difference between $Q_{Cr1}$ and $Q_{Y1}$, respectively. Chrominances Cb1 and Cr1 are examples of a first chrominance, and $Q_{Cb1}$ and $Q_{Cr1}$ are examples of a third quantization parameter used for quantizing chrominances Cb1 and Cr1 as the first chrominance. $\Delta(Q_{Cb1}, Q_{Y1})$ is difference information "3.", and $\Delta(Q_{Cr1}, Q_{Y1})$ is difference information "4.". $\Delta(Q_{Cb1}, Q_{Y1})$ and $\Delta(Q_{Cr1}, Q_{Y1})$ are examples of a first difference.

Note that $Q_{Cb1}$ and $Q_{Cr1}$ may be identical values or a common value. When a common value is used, one of $Q_{Cb1}$ and $Q_{Cr1}$ can be used, and the other can be omitted.

$Q_{Y1D}$, which is a QP value used for the encoding of luminance Y1D of the first color in the slice data, is derived from $Q_{Y1}$ and $\Delta(Q_{Y1D}, Q_{Y1})$ indicating the difference between $Q_{Y1D}$ and $Q_{Y1}$. Luminance Y1D of the first color in the slice data is an example of the first luminance of one or more three-dimensional points included in the subspace, and $Q_{Y1D}$ is an example of a fifth quantization parameter used for quantizing luminance Y1D. $\Delta(Q_{Y1D}, Q_{Y1})$ is difference information "10.", and an example of a second difference.

Similarly, $Q_{Cb1D}$ and $Q_{Cr1D}$, which are QP values used for the encoding of chrominances Cb1D and Cr1D of the first color in the slice data, are derived from $Q_{Cb1}$ and $\Delta(Q_{Cb1D}, Q_{Cb1})$ indicating the difference between $Q_{Cb1D}$ and $Q_{Cb1}$ and $Q_{Cr1}$ and $\Delta(Q_{Cr1D}, Q_{Cr1})$ indicating the difference between $Q_{Cr1D}$ and $Q_{Cr1}$, respectively. Chrominances Cb1D and Cr1D of the first color in the slice data are examples of the first chrominance of one or more three-dimensional points included in the subspace, and $Q_{Cb1D}$ and $Q_{Cr1D}$ are examples of a sixth quantization parameter used for quantizing chrominances Cb1D and Cr1D. $\Delta(Q_{Cb1D}, Q_{Cb1})$ is difference information "11.", and $\Delta(Q_{Cr1D}, Q_{Cr1})$ is difference information "12.". $\Delta(Q_{Cb1D}, Q_{Cb1})$ and $\Delta(Q_{Cr1D}, Q_{Cr1})$ are examples of a third difference.

The relationship between QP values for the first color holds for a second color, so that redundant descriptions will be omitted.

QR, which is a QP value used for the encoding of reflectance R, is derived from $Q_G$, which is a reference value, and $\Delta(Q_R, Q_G)$, which indicates the difference between $Q_R$ and $Q_G$. $Q_R$ is an example of a fourth quantization parameter used for quantizing reflectance R. $\Delta(Q_R, Q_G)$ is difference information "8.".

$Q_{RD}$, which is a QP value used for the encoding of reflectance RD in the slice data, is derived from $Q_R$ and $\Delta(Q_{RD}, Q_R)$, which indicates the difference between $Q_{RD}$ and $Q_R$. $\Delta(Q_{RD}, Q_R)$ is difference information "16.".

As described above, difference information "9." to "16." indicates the difference between a data QP and a frame QP.

Note that when the values of the data QP and the frame QP are the same, for example, the difference information may be set at 0, or may not be transmitted, and the absence of the transmission may be regarded as difference information of 0.

When obtaining chrominance Cr2 of the second color by decoding, for example, first decoder 5340 obtains reference information "1." and difference information "5.", "7.", and "15." indicated by arrows in part (b) of FIG. 105 from the metadata or the header, and derives the QP value of chrominance Cr2 by adding difference information "5.", "7.", and "15." to reference information "1." as shown by Equation G7 below.

$$Q_{Cr2D}=Q_G+\Delta(Q_{Y2},Q_G)+\Delta(Q_{Cr2},Q_{Y2})+\Delta(Q_{Cr2D},Q_{Cr2}) \quad \text{(Equation G7)}$$

Figure 106:
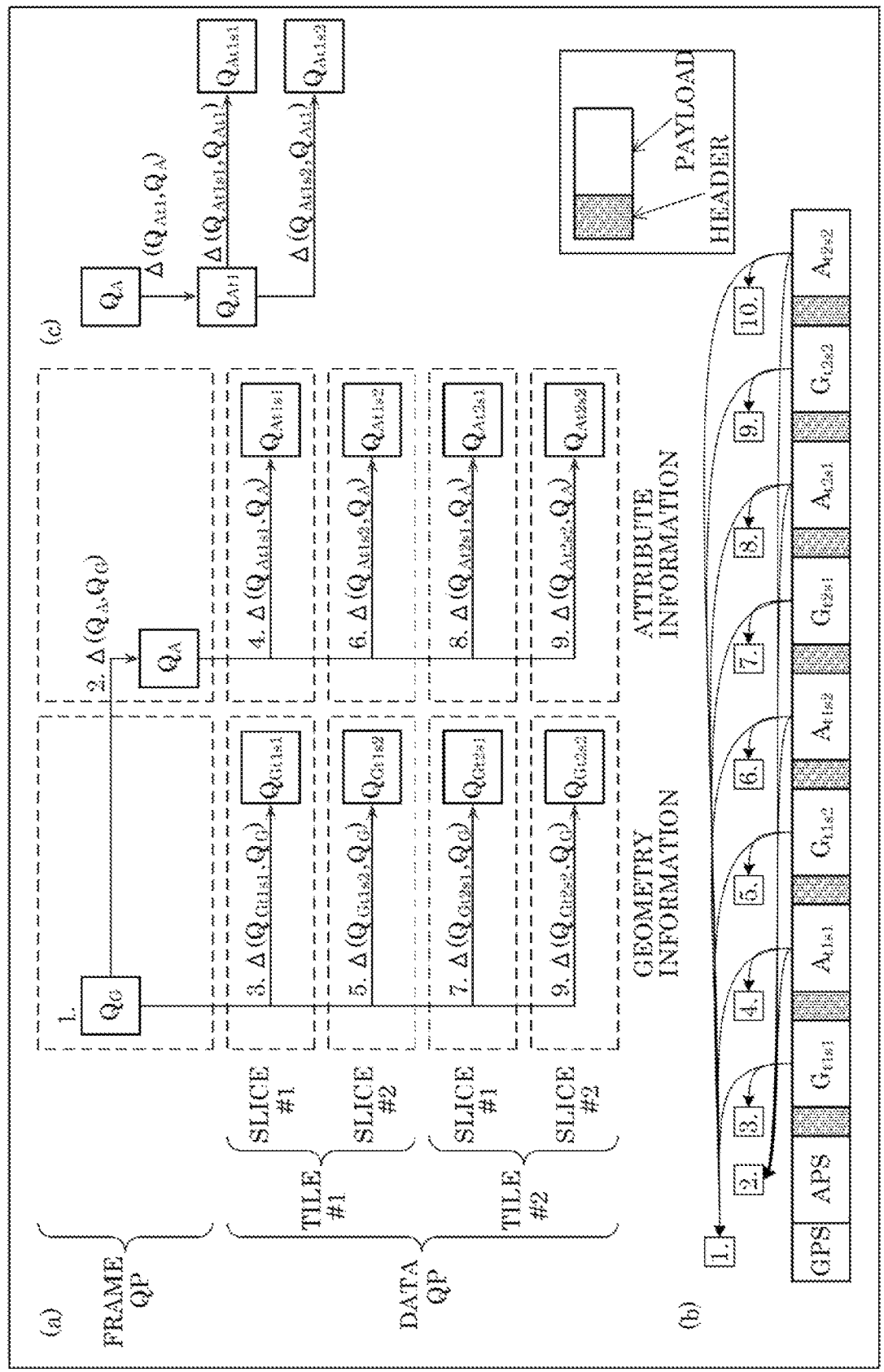
FIG. 106 is a diagram for describing a third example of the method of transmitting a quantization parameter according to Embodiment 8.

Next, an example of a case where geometry information and attribute information are divided into two tiles and then divided into two slices will be described with reference to FIG. 106. FIG. 106 is a diagram for describing a third example of the method of transmitting a quantization parameter. Part (a) of FIG. 106 shows a third example of the relationship between a reference value and difference information for each QP value. Part (b) of FIG. 106 shows a third example of the order of transmission of QP values, geometry information, and attribute information. Part (c) of FIG. 106 describes an intermediate generated value for difference information in the third example.

When geometry information and attribute information are divided into a plurality of tiles and then further divided into a plurality of slices, as illustrated in part (c) of FIG. 106, after the attribute information is divided into tiles, a QP value ($Q_{At1}$) and difference information $\Delta(Q_{At1}, Q_A)$ for each tile are generated as intermediate generated values. After the tile is divided into slices, QP values ($Q_{At1s1}$, $Q_{At1s2}$) and difference information ($\Delta(Q_{At1s1}, Q_{At1})$, $\Delta(Q_{At1s2}, Q_{At1})$) are generated for each slice.

In this case, difference information "4." in part (a) of FIG. 106 is derived according to Equation G8 below.

$$\Delta(Q_{At1s1},Q_A)=\Delta(Q_{At1},Q_A)+\Delta(Q_{At1s1},Q_{At1}) \quad \text{(Equation G8)}$$

When obtaining attribute information $A_{t2s1}$ for slice 1 in tile 2 by decoding, for example, first decoder 5340 obtains reference information "1." and difference information "2." and "8." indicated by arrows in part (b) of FIG. 106 from the metadata or the header, and derives the QP value of attribute information $At_2s_1$ by adding difference information "2." and "8." to reference information "1." as shown by Equation G9 below.

$$Q_{At2s1}=Q_G+\Delta(Q_{At2s1},Q_A)+\Delta(Q_A,Q_G) \quad \text{(Equation G9)}$$

Figure 107:
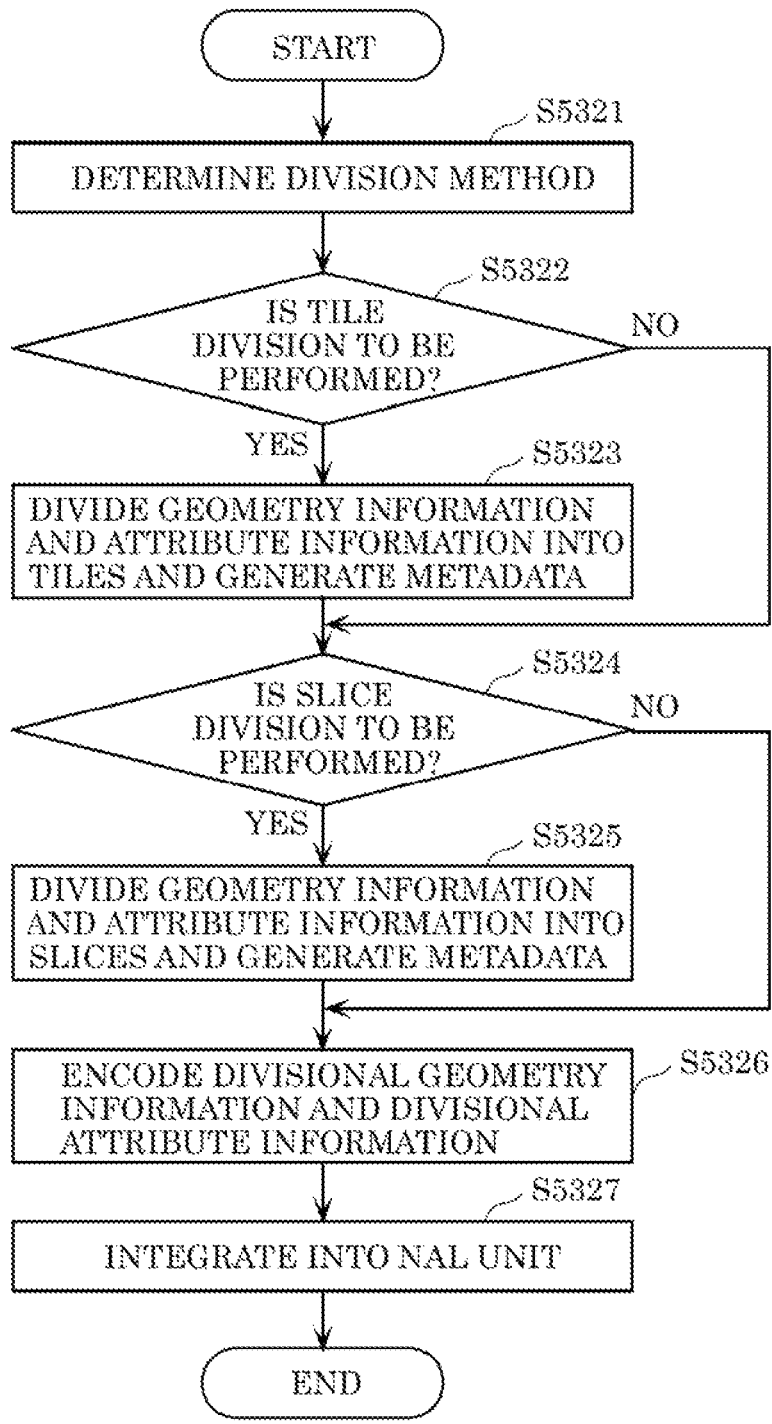
FIG. 107 is a flowchart of a process of encoding point cloud data according to Embodiment 8.

Next, a flow of a process of encoding point cloud data and a flow of a process of decoding point cloud data according to this embodiment will be described. FIG. 107 is a flowchart of a process of encoding point cloud data according to this embodiment.

First, the three-dimensional data encoding device determines a division method to be used (S5321). The division method includes a determination of whether to perform tile division or not and a determination of whether to perform slice division or not. The division method may include the number of tiles or slices in the case where tile division or slice division is performed, and the type of division, for example. The type of division is a scheme based on an object shape, a scheme based on map information or geometry information, or a scheme based on a data amount or processing amount, for example. Note that the division method may be determined in advance.

When tile division is to be performed (if Yes in S5322), the three-dimensional data encoding device generates a plurality of pieces of tile geometry information and a plurality of pieces of tile attribute information by dividing the geometry information and the attribute information on a tile basis (S5323). The three-dimensional data encoding device also generates tile additional information concerning the tile division.

When slice division is to be performed (if Yes in S5324), the three-dimensional data encoding device generates a plurality of pieces of divisional geometry information and a plurality of pieces of divisional attribute information by dividing the plurality of pieces of tile geometry information and the plurality of pieces of tile attribute information (or the geometry information and the attribute information) (S5325). The three-dimensional data encoding device also generates geometry slice additional information and attribute slice additional information concerning the slice division.

The three-dimensional data encoding device then generates a plurality of pieces of encoded geometry information and a plurality of pieces of encoded attribute information by encoding each of the plurality of pieces of divisional geometry information and the plurality of pieces of divisional attribute information (S5326). The three-dimensional data encoding device also generates dependency information.

The three-dimensional data encoding device then generates encoded data (encoded stream) by integrating (multiplexing) the plurality of pieces of encoded geometry information, the plurality of pieces of encoded attribute information and the additional information into a NAL unit (S5327). The three-dimensional data encoding device also transmits the generated encoded data.

Figure 108:
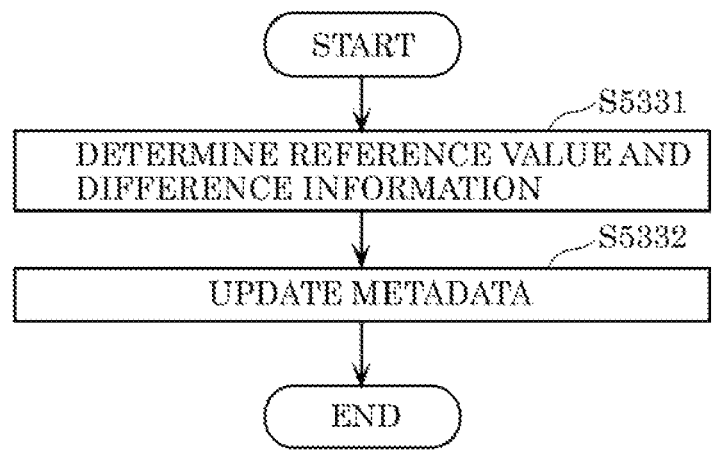
FIG. 108 is a flowchart illustrating an example of a process of determining a QP value and updating additional information according to Embodiment 8.

FIG. 108 is a flowchart illustrating an example of a process of determining a QP value and updating additional information in the tile division (S5323) and the slice division (S5325).

In steps S5323 and S5325, tile geometry information and tile attribute information and/or slice geometry information and slice attribute information may be independently divided in respective manners, or may be collectively divided in a common manner. In this way, additional information divided on a tile basis and/or on a slice basis is generated.

In these steps, the three-dimensional data encoding device determines a reference value and difference information for a QP value on a divisional tile basis and/or on a divisional slice basis (S5331). Specifically, the three-dimensional data encoding device determines reference value and difference information such as those illustrated in FIGS. 104 to 106.

The three-dimensional data encoding device then updates the additional information to include the determined reference value and difference information (S5332).

Figure 109:
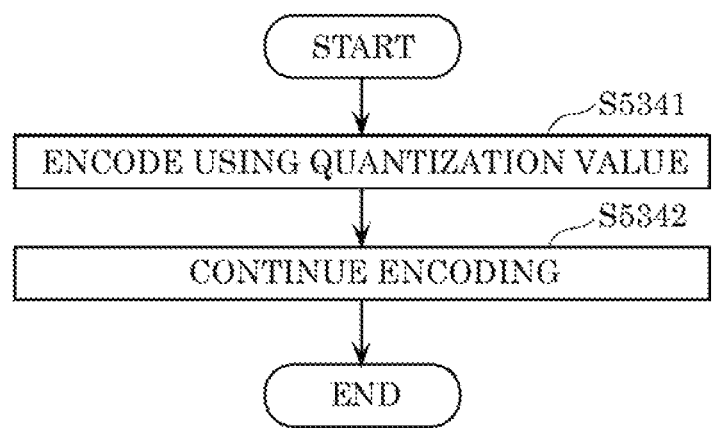
FIG. 109 is a flowchart illustrating an example of a process of encoding according to Embodiment 8.

FIG. 109 is a flowchart illustrating an example of a process in encoding (S5326).

The three-dimensional data encoding device encodes each of the plurality of pieces of divisional geometry information and the plurality of pieces of divisional attribute information (S5341). Specifically, the three-dimensional data encoding device encodes each of the plurality of pieces of divisional geometry information and the plurality of pieces of divisional attribute information using the determined QP value.

The three-dimensional data encoding device then continues the encoding process until a condition for stopping the encoding process is satisfied, such as until there is no data to be encoded (S5342).

Figure 110:
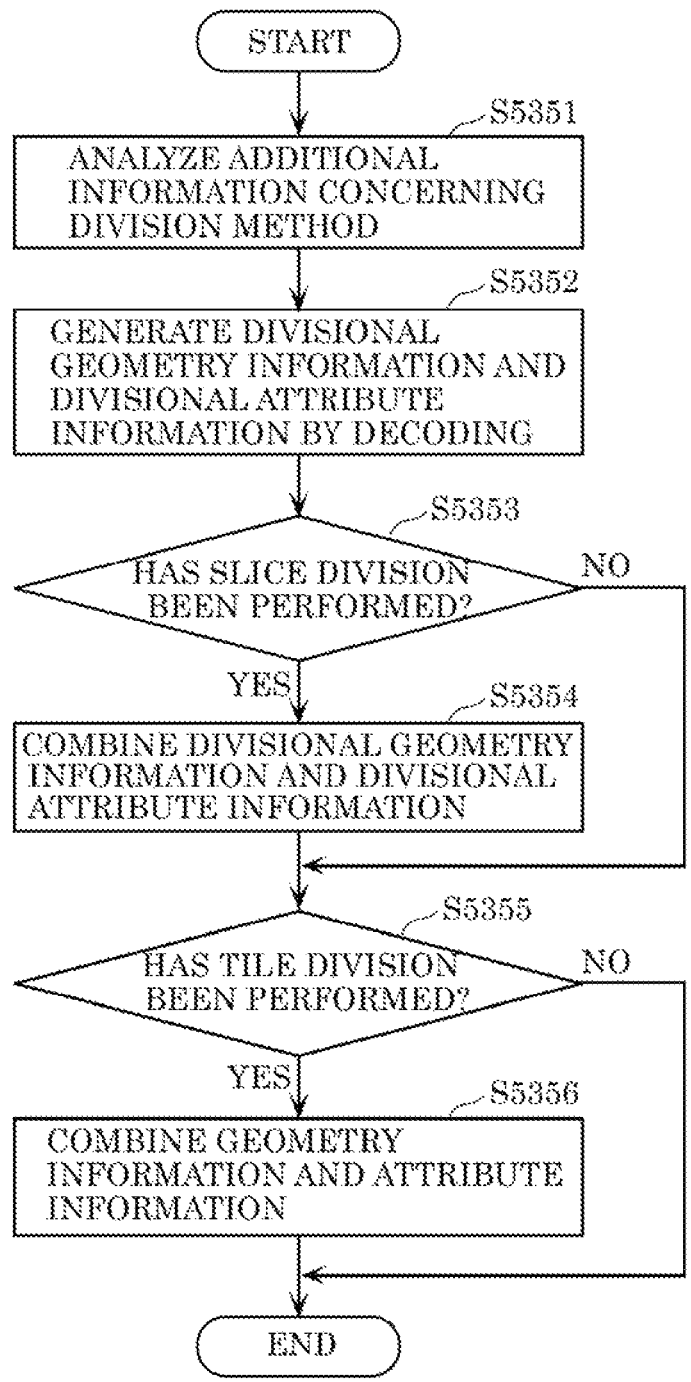
FIG. 110 is a flowchart illustrating a process of decoding point cloud data according to Embodiment 8.

FIG. 110 is a flowchart illustrating a process of decoding point cloud data according to this embodiment. First, the three-dimensional data decoding device determines the division method by analyzing additional information (tile additional information, geometry slice additional information, and attribute slice additional information) concerning the division method included in encoded data (encoded stream) (S5351). The division method includes a determination of whether to perform tile division or not and a determination of whether to perform slice division or not. The division method may include the number of tiles or slices in the case where tile division or slice division is performed, and the type of division, for example.

The three-dimensional data decoding device then generates divisional geometry information and divisional attribute information by decoding a plurality of pieces of encoded geometry information and a plurality of pieces of encoded attribute information included in the encoded data using dependency information included in the encoded data (S5352).

If the additional information indicates that slice division has been performed (if Yes in S5353), the three-dimensional data decoding device generates a plurality of pieces of tile geometry information and a plurality of pieces of tile attribute information by combining the plurality of pieces of divisional geometry information and the plurality of pieces of divisional attribute information based on the geometry slice additional information and the attribute slice additional information (S5354).

If the additional information indicates that tile division has been performed (if Yes in S5355), the three-dimensional data decoding device generates geometry information and attribute information by combining the plurality of pieces of tile geometry information and the plurality of pieces of tile attribute information (the plurality of pieces of divisional geometry information and the plurality of pieces of divisional attribute information) based on the tile additional information (S5356).

FIG. 111 is a flowchart illustrating an example of a process of obtaining QP values and decoding a QP value for a slice or tile in the combining of information divided into slices (S5354) and the combining of information divided into tiles (S5356).

Pieces of slice geometry information and pieces of slice attribute information or pieces of tile geometry information or pieces of tile attribute information may be combined in respective manners or in the same manner.

The three-dimensional data decoding device obtains the reference value and the difference information by decoding the additional information in the encoded stream(S5361).

The three-dimensional data decoding device then calculates a quantization value using the decoded reference value and difference information, and updates the QP value used for inverse quantization to the calculated QP value (S5362). In this way, a QP value for inverse quantization of quantized attribute information for each tile or slice can be derived.

The three-dimensional data decoding device then continues the decoding process until a condition for stopping the decoding process is satisfied, such as until there is no data to be decoded (S5363).

FIG. 112 is a diagram illustrating a syntax example of GPS. FIG. 113 is a diagram illustrating a syntax example of APS. FIG. 114 is a diagram illustrating a syntax example of a header of geometry information. FIG. 115 is a diagram illustrating a syntax example of a header of attribute information.

As illustrated in FIG. 112, for example, GPS, which is additional information of geometry information, includes QP_value, which indicates an absolute value used as a reference for deriving a QP value. QP_value corresponds to $Q_G$ illustrated in FIGS. 104 to 106.

As illustrated in FIG. 113, for example, when a three-dimensional point has a plurality of pieces of color information associated with a plurality of points of view, APS, which is additional information of attribute information, may define a default point of view, and a 0-th piece of attribute information may always describe information on the default point of view. For example, when decoding or displaying a single piece of color information, the three-dimensional data encoding device can decode or display the 0-th piece of attribute information.

APS includes QP_delta_Attribute_to_Geometry. QP_delta_Attribute_to_Geometry is difference information indicating the difference from the reference value (QP_value) described in GPS. The difference information indicates a difference in luminance when the attribute information is color information, for example.

GPS may include a flag that indicates whether or not Geometry_header (header of the geometry information) includes difference information used for calculating a QP value. APS may include a flag that indicates whether or not Attribute_header (header of the attribute information) includes difference information used for calculating a QP value. The flag may indicate whether or not the attribute information includes difference information indicating the difference of a data QP from a frame QP, which is used for calculating the data QP.

When a first color of attribute information is indicated by a first luminance and a first chrominance, in the quantization of the first luminance using a second quantization parameter and the quantization of the first chrominance using a third quantization parameter, if the quantizations are performed using a fifth quantization parameter and a sixth quantization parameter, the encoded stream may include identification information (flag) that indicates that the quantizations are performed using the fifth quantization parameter and the sixth quantization parameter.

As illustrated in FIG. 114, the header of the geometry information may include QP_delta_data_to_frame, which is difference information indicating the difference from the reference value (QP_value) described in GPS. The header of the geometry information may be divided into pieces of information associated with tiles and/or slices, and a QP value corresponding to each tile and/or slice may be indicated.

As illustrated in FIG. 115, the header of the attribute information may include QP_delta_data_to_frame, which is difference information indicating the difference from the QP value described in APS.

Although the reference value of a QP value has been described as being a QP value of geometry information for a PCC frame with reference to FIGS. 104 to 106, the present disclosure is not limited thereto, and other values may be used as a reference value.

Figure 116:
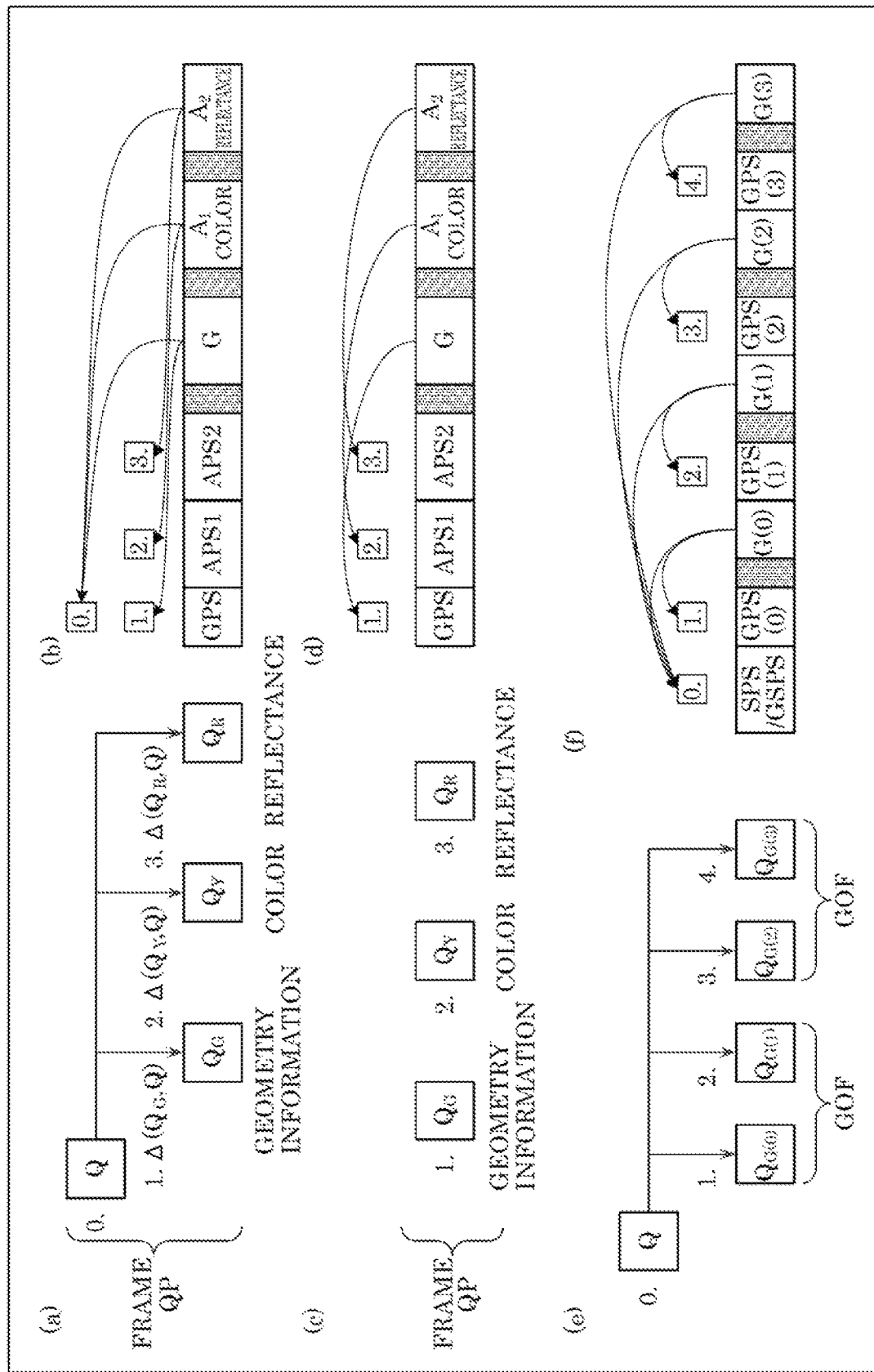
FIG. 116 is a diagram for describing another example of the method of transmitting a quantization parameter according to Embodiment 8.

FIG. 116 is a diagram for describing another example of the method of transmitting a quantization parameter.

Parts (a) and (b) of FIG. 116 illustrate a fourth example, in which common reference value Q is set based on QP values of geometry information and attribute information for a PCC frame. In the fourth example, reference value Q is stored in GPS, difference information indicating the difference of a QP value ($Q_G$) of geometry information from reference value Q is stored in GPS, and difference information indicating the differences of QP values ($Q_Y$ and $Q_R$) of attribute information from reference value Q is stored in APS. Note that reference value Q may be stored in SPS.

Parts (c) and (d) of FIG. 116 illustrate a fifth example, in which a different reference value is set for each of geometry information and attribute information. In the fifth example, reference QP values (absolute values) of geometry information and attribute information are stored in GPS and APS, respectively. That is, reference value $Q_G$ is set in geometry information, reference value $Q_Y$ is set in color information of attribute information, and reference value $Q_R$ is set as reflectance of attribute information. In this way, a reference value of a QP value may be set for each of geometry information and a plurality of kinds of attribute information. Note that the fifth example may be combined with another example. That is, $Q_A$ in the first example, or $Q_{Y1}$, $Q_{Y2}$, and $Q_R$ in the second example may be a reference value of a QP value.

Parts (e) and (f) of FIG. 116 illustrate a sixth example, in which when there is a plurality of PCC frames, a common reference value Q is set for the plurality of PCC frames. In the sixth example, reference value Q is stored in SPS or GPS, and difference information indicating the difference between the QP value of the geometry information and the reference value for each PCC frame is stored in GPS. Note that, within the range of a random access unit, such as GOF, for example, the leading frame of the random access unit may be designated as a reference value, and difference information $\Delta(Q_{G(1)}, Q_{G(0)})$ indicating the differences between the PCC frames may be transmitted.

Note that, even when a tile or a slice is further divided, difference information indicating the difference from the QP value of the unit of division is stored in the data header and transmitted in the same manner.

Figure 117:
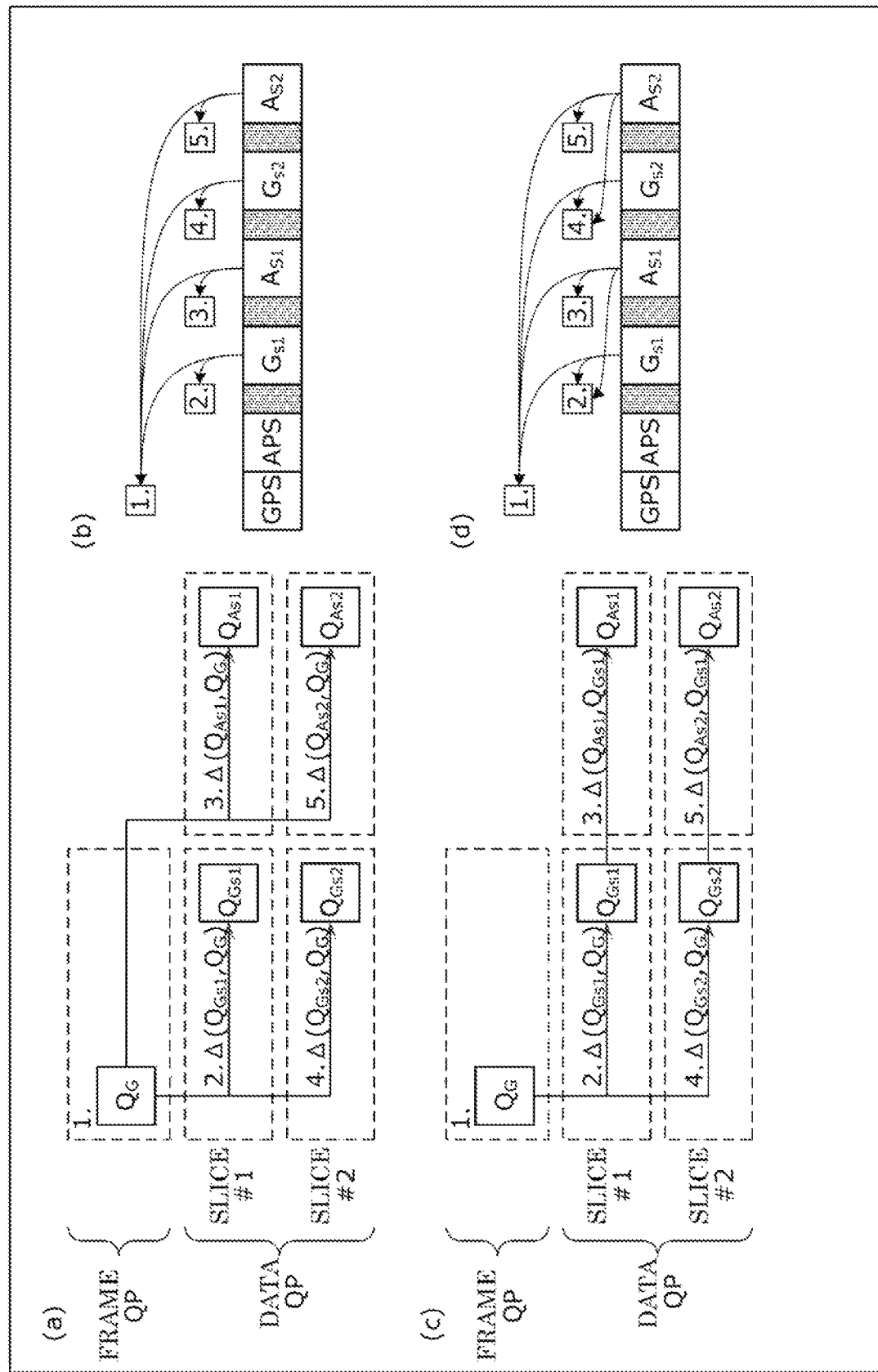
FIG. 117 is a diagram for describing another example of the method of transmitting a quantization parameter according to Embodiment 8.

FIG. 117 is a diagram for describing another example of the method of transmitting a quantization parameter.

Parts (a) and (b) of FIG. 117 illustrate a seventh example, in which common reference value $Q_G$ is set for geometry information and attribute information of a PCC frame. In the seventh example, reference value $Q_G$ is stored in GPS, and difference information indicating the differences from the geometry information or the attribute information is stored in the respective data headers. Reference value $Q_G$ may be stored in SPS.

Parts (c) and (d) of FIG. 117 shows an eighth example, in which a QP value of attribute information is indicated by difference information indicating the difference from a QP value of geometry information belonging to the same slice and tile. In the eighth example, reference value $Q_G$ may be stored in SPS.

Figure 118:
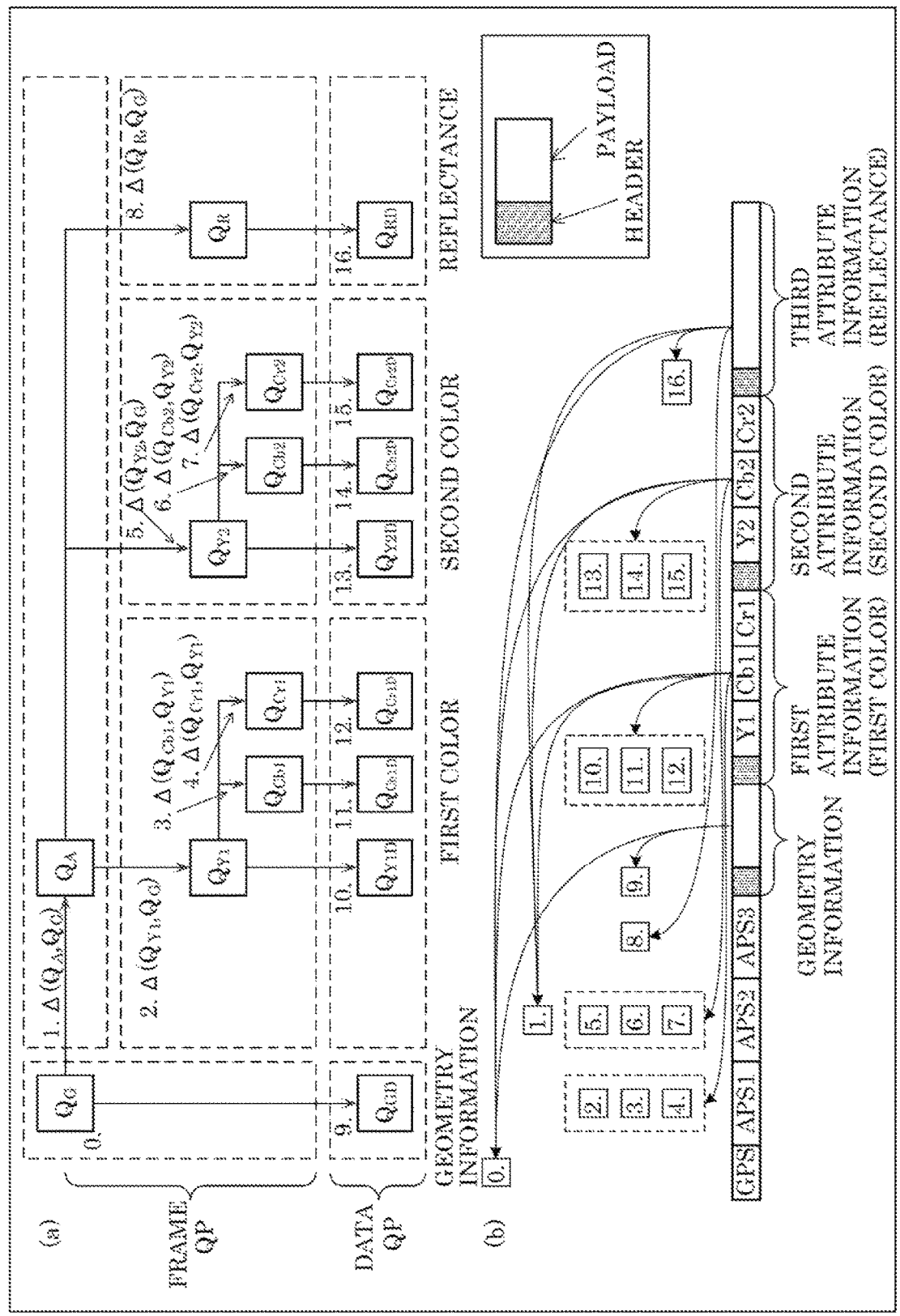
FIG. 118 is a diagram for describing a ninth example of the method of transmitting a quantization parameter according to Embodiment 8.

FIG. 118 is a diagram for describing a ninth example of the method of transmitting a quantization parameter.

Parts (a) and (b) illustrate the ninth example, in which a plurality of pieces of attribute information has a common QP value, and each piece of attribute information indicates difference information indicating the difference between the common QP value and the QP value of geometry information and difference information indicating the difference from the value of the attribute information and the common QP value.

Figure 119:
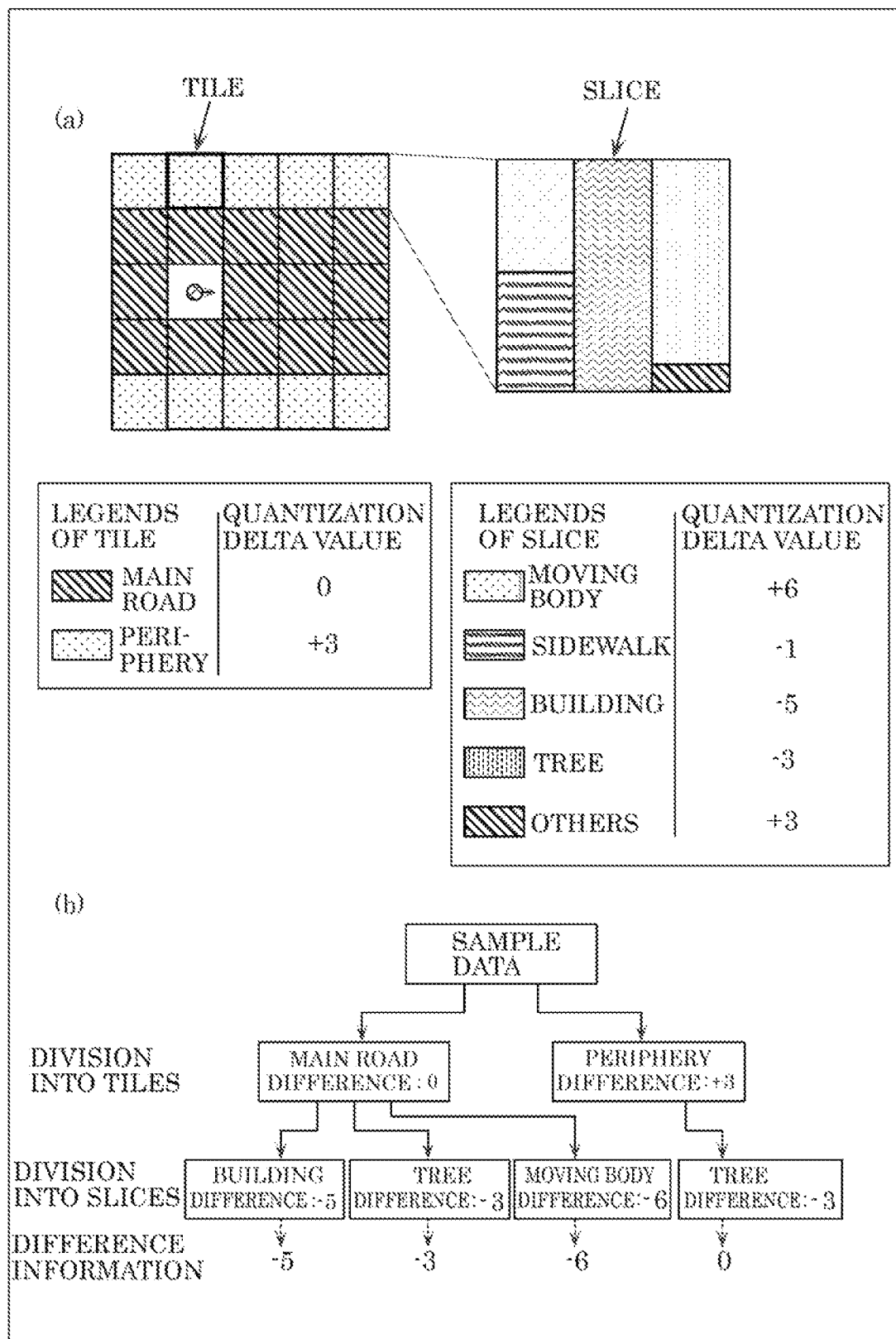

FIG. 119 is a diagram for describing an example of control of a QP value.

As the value of the quantization parameter decreases, the quality improves, while the coding efficiency decreases because more bits are required.

For example, when encoding three-dimensional point cloud data by dividing the three-dimensional point cloud data into tiles, if point cloud data included in a tile is a main road, the point cloud data is encoded using a previously defined QP value of attribute information. On the other hand, peripheral tiles do not include important information, and therefore, the coding efficiency may be able to be improved by setting the difference information of the QP value at a positive value to reduce the quality of the data.

Furthermore, when encoding the three-dimensional point cloud data divided into tiles by dividing the tiles into slices, a sidewalk, a tree, and a building are important for positional estimation (localization and mapping) in automatic driving, so that the QP value is set at a negative value. On the other hand, a moving body and other objects are less important, so that the QP value is set at a positive value.

Part (b) of FIG. 119 shows an example in which difference information is derived in a case where a quantization delta value is set in advance based on the object included in a tile or slice. For example, when divisional data is slice data on a "building" included in a tile of a "main road", the difference information is −5, which is derived by summing the quantization delta value of 0 of the tile of a "main road" and the quantization delta value of −5 of the slice data on a "building".

Figure 120:
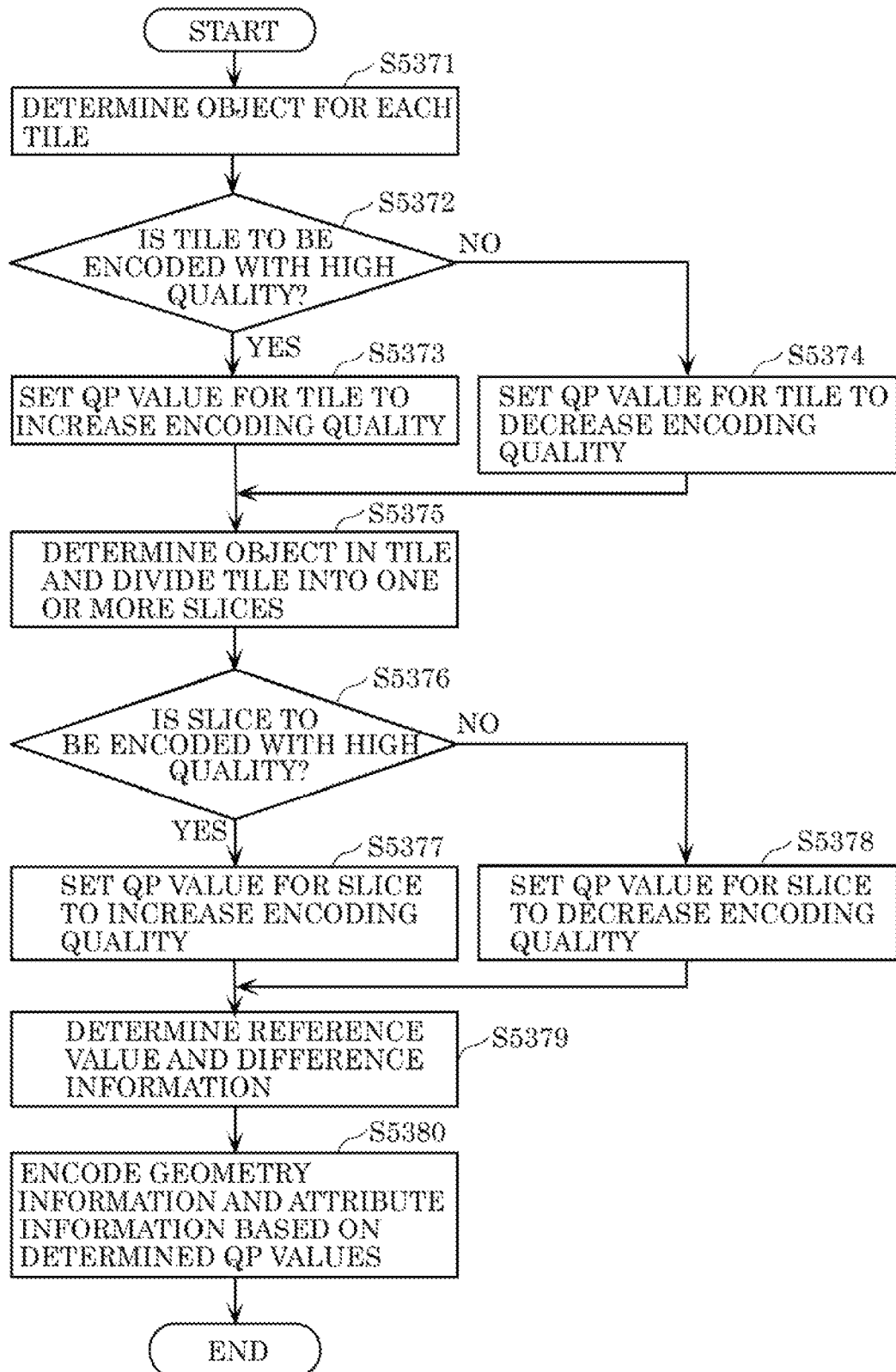

FIG. 120 is a flowchart illustrating an example of a method of determining a QP value based on the quality of an object.

The three-dimensional data encoding device divides point cloud data into one or more tiles based on map information, and determines an object included in the one or more tiles (S5371). Specifically, the three-dimensional data encoding device performs an object recognition process for recognizing what an object is using a leaning model obtained by machine learning, for example.

The three-dimensional data encoding device then determines whether to encode a tile to be processed with high quality or not (S5372). To encode with high quality means encoding at a bitrate higher than a predetermined rate, for example.

When the tile to be processed is to be encoded with high quality (if Yes in S5372), the three-dimensional data encoding device then sets the QP value of the tile so that the coding efficiency is high (S5373).

On the other hand, when the tile to be processed is not to be encoded with high quality (if No in S5372), the three-dimensional data encoding device sets the QP value of the tile so that the coding efficiency is low (S5374).

Following step S5373 or S5374, the three-dimensional data encoding device determines the object in the tile, and divides the tile into one or more slices (S5375).

The three-dimensional data encoding device then determines whether to encode a slice to be processed with high quality or not (S5376).

When the slice to be processed is to be encoded with high quality (if Yes in S5376), the three-dimensional data encoding device then sets the QP value of the slice so that the coding efficiency is high (S5377).

On the other hand, when the slice to be processed is not to be encoded with high quality (if No in S5376), the three-dimensional data encoding device sets the QP value of the slice so that the coding efficiency is low (S5378).

The three-dimensional data encoding device then determines a reference value and difference information to be transmitted based on the set QP value in a predetermined manner, and stores the determined reference value and difference information in at least one of the additional information and the header of the data (S5379).

The three-dimensional data encoding device then quantizes and encodes the geometry information and the attribute information based on the determined QP value (S5380).

Figure 121:
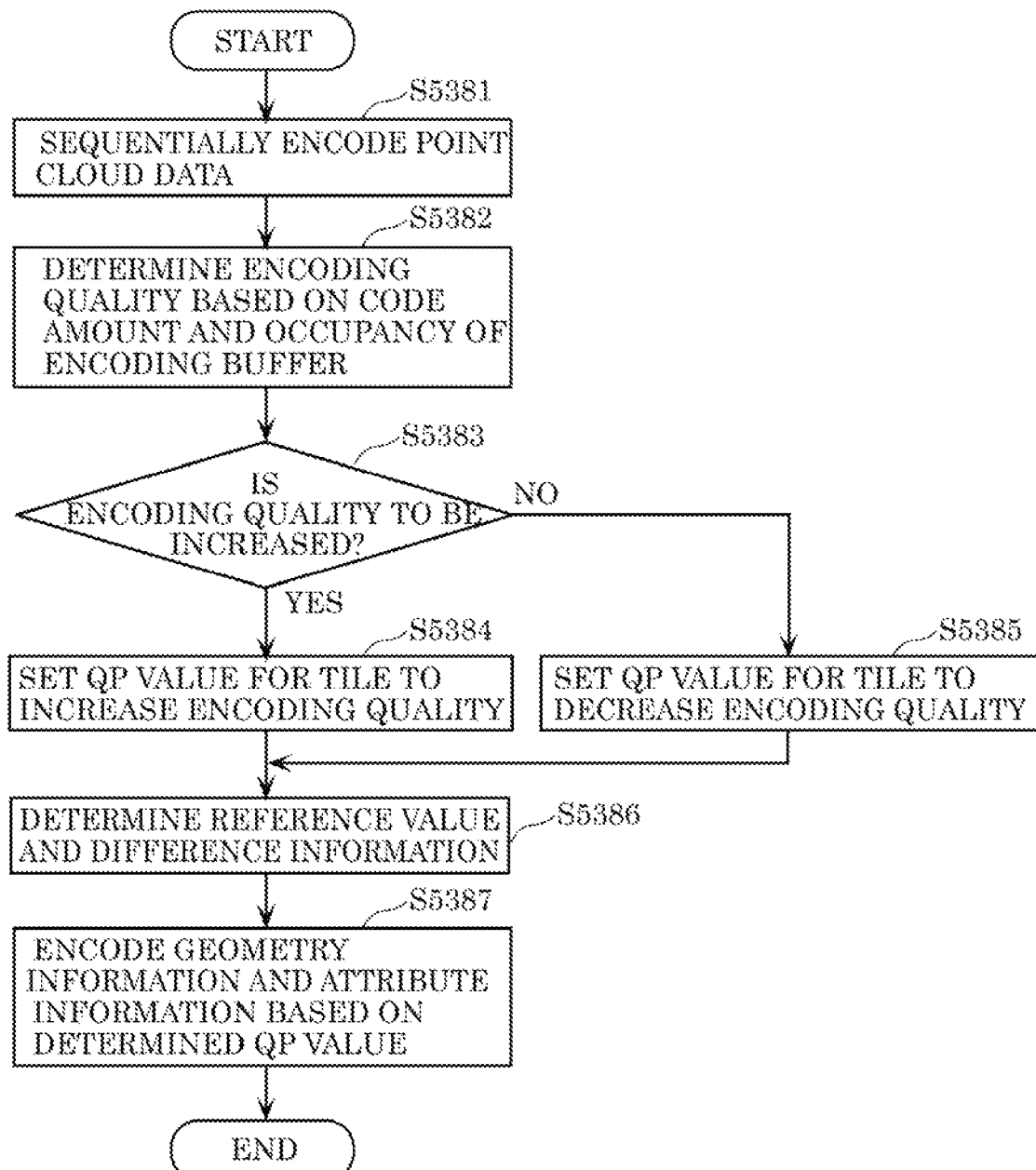

FIG. 121 is a flowchart illustrating an example of a method of determining a QP value based on a rate control.

The three-dimensional data encoding device sequentially encodes point cloud data (S5381).

The three-dimensional data encoding device then determines a rate control status concerning the encoding process from the code amount of the encoded data and the occupancy of an encoding buffer, and determines the quality of the subsequent encoding (S5382).

The three-dimensional data encoding device then determines whether or not to increase the encoding quality (S5383).

When the encoding quality is to be increased (if Yes in S5383), the three-dimensional data encoding device sets the QP value of the tile so that the encoding quality is higher (S5384).

On the other hand, when the encoding quality is not to be increased (if No in S5383), the three-dimensional data encoding device sets the QP value of the tile so that the encoding quality is lower (S5385).

The three-dimensional data encoding device then determines a reference value and difference information to be transmitted based on the set QP value in a predetermined manner, and stores the determined reference value and difference information in at least one of the additional information and the header of the data (S5386).

The three-dimensional data encoding device then quantizes and encodes the geometry information and the attribute information based on the determined QP value (S5387).

Figure 122:
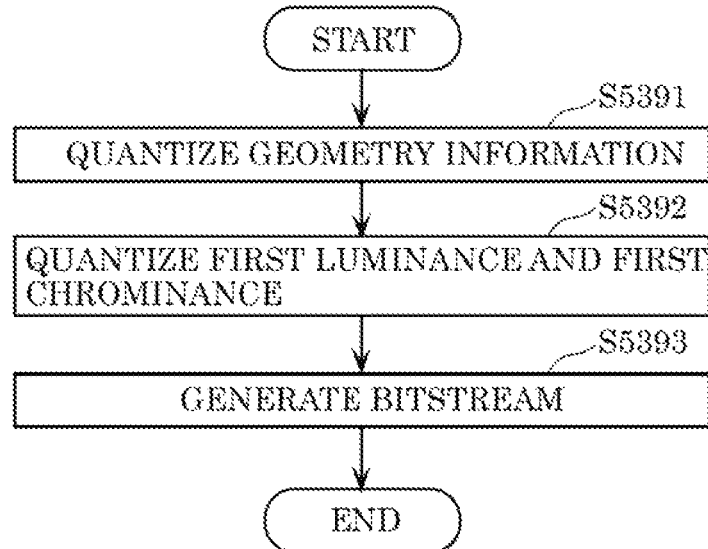

As described above, the three-dimensional data encoding device according to this embodiment performs the process illustrated in FIG. 122. First, the three-dimensional data encoding device quantizes geometry information on each of a plurality of three-dimensional points using a first quantization parameter (S5391). The three-dimensional data encoding device quantizes a first luminance using a second quantization parameter and quantizes a first chrominance using a third quantization parameter, the first luminance and the first chrominance indicating a first color among attribute information on each of the plurality of three-dimensional points (S5392). The three-dimensional data encoding device generates a bitstream including the quantized geometry information, the quantized first luminance, the quantized first chrominance, the first quantization parameter, the second quantization parameter, and a first difference between the second quantization parameter and the third quantization parameter (S5393).

With such a configuration, since the third quantization parameter is indicated by the first difference from the second quantization parameter in the bitstream, the coding efficiency can be improved.

For example, the three-dimensional data encoding device further quantizes a reflectance among the attribute information on each of the plurality of three-dimensional points using a fourth quantization parameter. Furthermore, in the generation described above, the bitstream generated further includes the quantized reflectance and the fourth quantization parameter.

For example, in the quantization using the second quantization parameter, for each of a plurality of subspaces obtained by dividing a current space including the plurality of three-dimensional points, the first luminance of one or more three-dimensional points included in the subspace is quantized further using a fifth quantization parameter. In the quantization using the third quantization parameter, the first chrominance of the one or more three-dimensional points is quantized further using a sixth quantization parameter. In the generation described above, the bitstream generated further includes a second difference between the second quantization parameter and the fifth quantization parameter and a third difference between the third quantization parameter and the sixth quantization parameter.

With such a configuration, since the fifth quantization parameter is indicated by the second difference from the second quantization parameter and the sixth quantization parameter is indicated by the third difference from the third quantization parameter in the bitstream, the coding efficiency can be improved.

For example, in the generating described above, the bitstream generated further includes identification information indicating that the fifth quantization parameter and the sixth quantization parameter have been used in the quantization using the second quantization parameter and the quantization using the third quantization parameter, respectively.

With such a configuration, the three-dimensional data decoding device having obtained the bitstream can determine from the identification information that the quantization using the fifth quantization parameter and the quantization using the sixth quantization parameter have been performed, so that the processing load of the decoding process can be reduced.

For example, the three-dimensional data encoding device further quantizes a second luminance using a seventh quantization parameter and quantizes a second chrominance using an eighth quantization parameter, the second luminance and the second chrominance indicating a second color among the attribute information of each of the plurality of three-dimensional points. In the generation described above, the bitstream generated further includes the quantized second luminance, the quantized second chrominance, the seventh quantization parameter, and a fourth difference between the seventh quantization parameter and the eighth quantization parameter.

With such a configuration, since the eighth quantization parameter is indicated by the fourth difference from the seventh quantization parameter in the bitstream, the coding efficiency can be improved. In addition, two types of color information can be included in the attribute information on a three-dimensional point.

For example, the three-dimensional data encoding device includes a processor and memory, and the processor performs the process described above using the memory.

Figure 123:
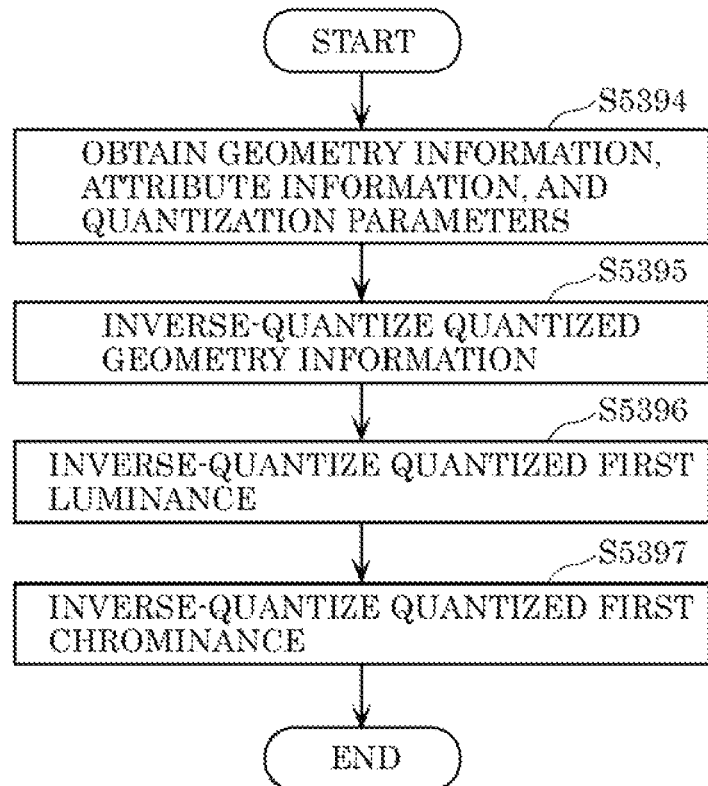

The three-dimensional data decoding device according to this embodiment performs the process illustrated in FIG. 123. First, the three-dimensional data decoding device obtains quantized geometry information, a quantized first luminance, a quantized first chrominance, a first quantization parameter, a second quantization parameter, and a first difference between the second quantization parameter and a third quantization parameter, by obtaining a bitstream (S5394). The three-dimensional data decoding device calculates geometry information on a plurality of three-dimensional points by inverse-quantizing the quantized geometry information using the first quantization information (S5395). Of a first luminance and a first chrominance indicating a first color of the plurality of three-dimensional points, the three-dimensional data decoding device calculates the first luminance by inverse-quantizing the quantized first luminance using the second quantization parameter (S5396). The three-dimensional data decoding device calculates the first chrominance by inverse-quantizing the quantized first chrominance using the third quantization parameter obtained from the second quantization parameter and the first difference (S5397).

In this way, the three-dimensional data decoding device can correctly decode geometry information and attribute information on a three-dimensional point.

For example, in the obtaining, a quantized reflectance and a fourth quantization parameter are further obtained by obtaining the bitstream. The three-dimensional data decoding device further calculates a reflectance of the plurality of three-dimensional points by inverse-quantizing the quantized reflectance using the fourth quantization parameter.

Therefore, the three-dimensional data decoding device can correctly decode the reflectance of a three-dimensional point.

For example, in the obtaining, a second difference between the second quantization parameter and a fifth quantization parameter and a third difference between the third quantization parameter and a sixth quantization parameter are further obtained by obtaining the bitstream. In the calculating of the first luminance, a first luminance of one or more three-dimensional points is calculated by inverse-quantizing the quantized first luminance using the second quantization parameter and the fifth quantization parameter obtained from the second difference, the one or more three-dimensional points being included in each subspace obtained by dividing a current space including the plurality of three-dimensional points, the quantized first luminance being the luminance obtained by quantizing the first luminance of the one or more three-dimensional points using the second quantization parameter and the fifth quantization parameter. In the calculation of the first chrominance, a first chrominance of the one or more three-dimensional points is calculated by inverse-quantizing the quantized first chrominance using the third quantization parameter and the sixth quantization parameter obtained from the third difference, the quantized first chrominance being the chrominance obtained by quantizing the first chrominance of the at least one three-dimensional point using the third quantization parameter and the sixth quantization parameter.

For example, in the obtaining, identification information indicating that the quantization using the fifth quantization parameter and the quantization using the sixth quantization parameter have been performed is further obtained by obtaining the bitstream. In the calculation of the first luminance, when the identification information indicates that the quantization using the fifth quantization parameter and the quantization using the sixth quantization parameter have been performed, the quantized first luminance is determined to be a luminance obtained by quantizing the first luminance of the one or more three-dimensional points. In the calculation of the first chrominance, when the identification information indicates that the quantization using the fifth quantization parameter and the quantization using the sixth quantization parameter have been performed, the quantized first chrominance is determined to be a chrominance obtained by quantizing the first chrominance of the one or more three-dimensional points.

With such a configuration, the three-dimensional data decoding device can determine from the identification information that the quantization using the fifth quantization parameter and the quantization using the sixth quantization parameter have been performed, so that the processing load of the decoding process can be reduced.

For example, in the obtaining, a quantized second luminance, a quantized second chrominance, a seventh quantization parameter, and a fourth difference between the seventh quantization parameter and an eighth quantization parameter is further obtained by obtaining the bitstream. Of a second luminance and a second chrominance that indicate a second color of the plurality of three-dimensional points, the three-dimensional data decoding device further calculates the second luminance by inverse-quantizing the quantized second luminance using the seventh quantization parameter. The three-dimensional data decoding device further calculates the second chrominance by inverse-quantizing the quantized second chrominance using the eighth quantization parameter obtained from the seventh quantization parameter and the fourth difference.

In this way, the three-dimensional data decoding device can correctly decode the second color of a three-dimensional point.

For example, the three-dimensional data decoding device includes a processor and memory, and the processor performs the process described above using the memory.

Embodiment 9

With the three-dimensional data encoding method, the three-dimensional data decoding method, the three-dimensional data encoding device, and the three-dimensional data decoding device described with regard to Embodiment 8, the processes according to this embodiment described below are also possible.

Figure 124:
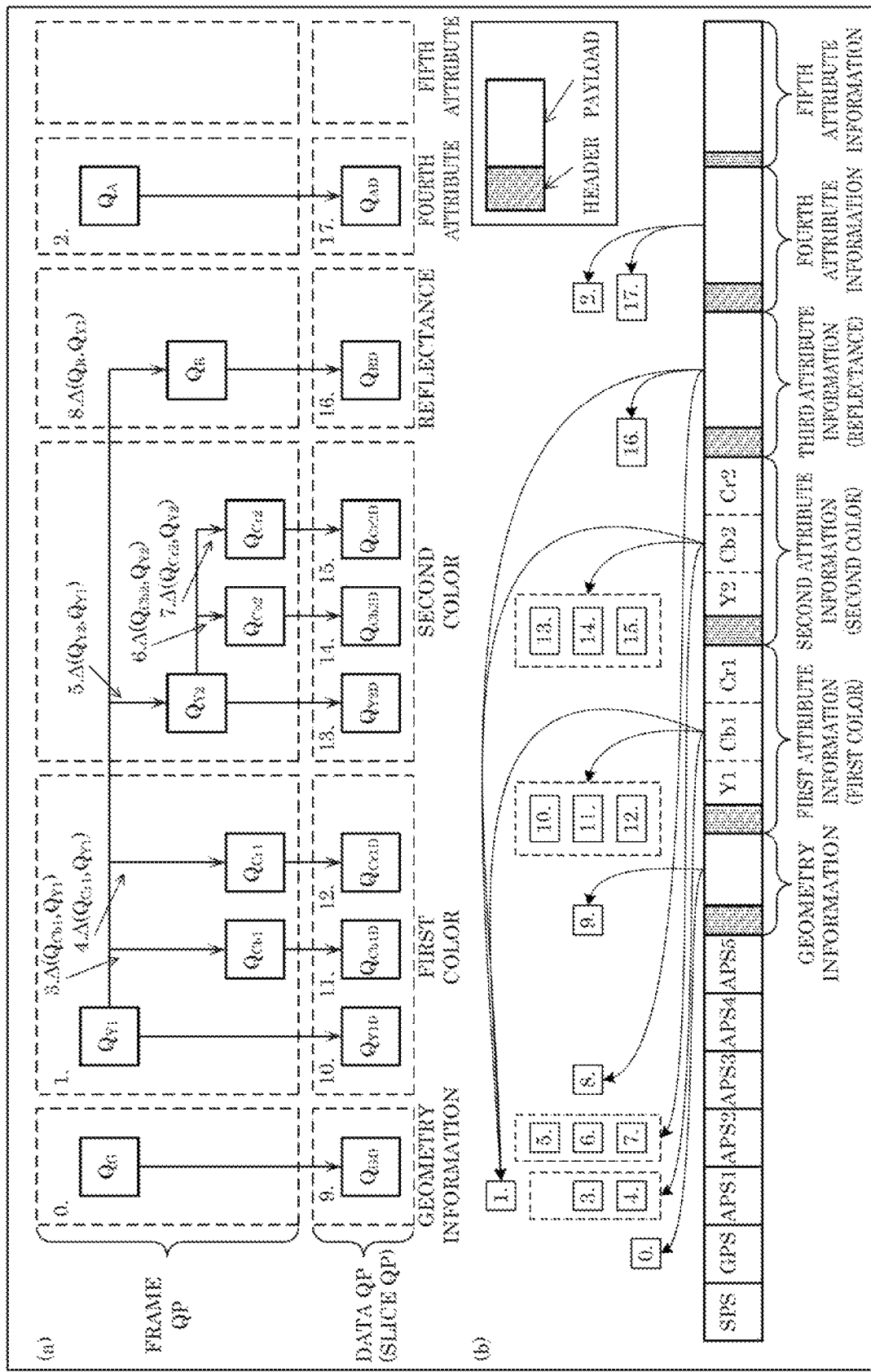

FIG. 124 is a diagram for illustrating an example of a quantization parameter transmission method according to Embodiment 9. Part (a) of FIG. 124 shows an example in which a reference value for the QP value is set for each of geometry information and attribute information. FIG. 124 mainly differs from FIG. 105 showing Embodiment 8 in that a reference value for the QP value is set not only for geometry information but also for attribute information. That is, a QP value for at least one of a plurality of pieces of attribute information including a first color, a second color, and a reflectance is designated as a reference value, and QP values for other attribute information are indicates as difference information with respect to the common reference value.

In FIG. 124, $Q_{Y1}$, which is a QP value used for encoding of luminance Y1 of the first color, is set as a common reference value for a plurality of pieces of attribute information including the first color, the second color, and the reflectance. $Q_{Y2}$, which is a reference value for the second color, is derived using common reference value $Q_{Y1}$ and $\Delta(Q_{Y2}, Q_{Y1})$, which is difference information "5." with respect to $Q_{Y1}$. $Q_R$, which is a reference value for reflectance, is derived using common reference value $Q_{Y1}$ and $\Delta(Q_R, Q_{Y1})$, which is difference information "8." with respect to $Q_{Y1}$. In this case, common reference value $Q_{Y1}$ is included in APS1, which is APS for the first color.

For a fourth attribute, a different reference value than common reference value $Q_{Y1}$ may be set. A fifth attribute may have no QP value. That is, the attribute information may include both attribute information that is quantized using a common reference value for deriving a plurality of QP values used for quantization of a plurality of pieces of attribute information and attribute information that is quantized using a different reference value than the common reference value. The attribute information may further include attribute information that is encoded without using a QP value.

Note that, although an example where the QP value used for quantization of the attribute information of the first color is a common reference value for deriving QP values used for quantization of a plurality of pieces of attribute information has been described with reference to FIG. 124, the common reference value may be determined according to the rules described below. For example, when all attribute information is described in control information such as SPS, the QP value included in the first attribute information indicated in SPS among all the attribute information may be designated as a common reference value. Alternatively, the control information such as SPS may indicate attribute information that is to be quantized using a QP value designated as a common reference value. Alternatively, in the control information such as SPS, the attribute information that is to be quantized using a QP value designated as a common reference value may be indicated first among the plurality of pieces of attribute information. In any case, by representing the QP value used for quantization of each of the plurality of pieces of attribute information as a combination of a reference value and difference information, the amount of encoded data can be reduced.

Note that different reference values $Q_{Y1}$, $Q_{Y2}$, and $Q_R$ for different pieces of attribute information may be indicated in APS, $Q_{Y1}$ may be used as a reference value for the QP value for the first color, $Q_{Y2}$ may be used as a reference value for the QP value for the second color, and $Q_R$ may be used as a reference value for the QP value for the reflectance. In that case, $Q_{Y2}$ and $Q_R$ are represented by an absolute value, as with $Q_{Y1}$.

A first example is a method of indicating a QP value for a plurality of pieces of attribute information when metadata for the plurality of pieces of attribute information is collectively described in one APS.

FIG. 125 is a diagram showing a first example of a syntax of APS and a syntax of a header of attribute information.

First, a syntax example of APS will be described.

aps_idx denotes an index number of APS. aps_idx indicates a correspondence between APS and a header of attribute information.

sps_idx denotes an index number of SPS to which APS corresponds.

num_of_attribute denotes the number of pieces of attribute information. Note that, when APS is set for each piece of attribute information, a field or loop of num_of_attribute need not be included in APS.

attribute_type denotes the type of attribute information or, in other words, the kind of attribute information. Note that, when the type of attribute information is described in corresponding SPS, information that allows reference to the type of attribute information described in SPS may be included in APS instead of attribute_type.

In FIG. 125, the if sentence enclosed by dashed line 6701 indicates a QP value depending on attribute_type. For example, when the type of attribute information is color, the QP value for the luminance (luma) represented by an absolute value is indicated as a reference value, and the QP values for the chrominance (chroma: Cb, Cr) are indicated as difference information with respect to the QP value for the luminance.

On the other hand, when the type of attribute information is reflectance, the QP value for the reflectance represented by an absolute value is indicated. As another example, when the type of attribute information has no QP value, no QP value is indicated.

When there are two or more pieces of attribute information, the reference value (QP_value_Luma or QP_value in this example) for a piece of attribute information may be indicated by the difference from the reference value for another piece of attribute information. For example, in the loop of num_of_attribute, a reference value for common attribute information may be indicated when i=0, and a difference value with respect to the common attribute information may be indicated when i=>1.

data_QP_delata_present_flag is a flag that indicates whether a QP value for each piece of data (slice) is present in the header of the attribute information. When the flag is 1, a QP value for each piece of data (slice) is indicated in the header of the attribute information.

Next, a syntax example of the header of the attribute information will be described.

The header of the attribute information also includes aps_idx. Therefore, a correspondence between APS and the header of the attribute information is indicated by APS and aps_idx included in the header of the attribute information. That is, the fact that APS and the header of the attribute information shares aps_idx indicates that there is a correspondence between APS and the header of the attribute information.

attribute_type indicates the type of attribute information (kind of attribute information). Note that when the type of attribute information is described in 8 he corresponding APS or SPS, information that allows reference to the type of attribute information described in APS or SPS may be included in the header of the attribute information, instead of attribute_type.

The QP values for the fields in the if sentence enclosed by dashed line 6702, specifically, QP_delata_data_to_frame, QP_delta1_to_frame, and QP_delta2_to_frame, are QP values for data corresponding to attribute_type. Each QP value indicates difference information with respect to the value described in APS.

A second example is a method of indicating a QP value for attribute information when metadata for one piece of attribute information is independently described in one APS. In the second example, various types (kinds) of attribute information have a common header structure, and therefore, a change of the syntax structure with the attribute information can be advantageously avoided.

FIG. 126 is a diagram showing a second example of the syntax of APS. FIG. 127 is a diagram showing a second example of the syntax of the header of attribute information.

APS includes a reference value and a difference value for a QP value of a frame. When data_QP_delta_present_flag of APS is 1, the header of the attribute information includes difference information with respect to the reference value for APS.

Here, the fields relating to QP values are always present, whether the type of attribute information is color, reflectance, or frame number, for example. APS has a first number of fields for storing N QP values (N is 2 or greater), regardless of the type of attribute information. Here, N is 3, for example.

When the type of attribute information is color, for example, QP_value in APS stores information that indicates a QP value for luma, and QP_delta1 and QP_delta2 store information that indicates QP values for chroma. For example, QP_value is a reference value, and QP_delta1 and QP_delta2 are difference information with respect to QP_value. That is, the QP value for luma is indicated by QP_value, and the QP values for chroma are indicated by a value obtained by adding QP_delta1 to QP_value and a value obtained by adding QP_delta2 to QP_value. In this way, APS includes a reference value for a quantization parameter for quantizing corresponding attribute information.

Similarly, QP_delta_data_to_frame in the header of attribute information stores difference information on the QP value for luma with respect to QP_value in corresponding APS. QP_delta1_to_frame and QP_delta2_to_frame may store difference information on QP values for chroma with respect to QP_delta1 and QP_delta2 in corresponding APS, respectively.

When the type of attribute information is reflectance, for example, QP_value in APS may store information that indicates a QP value for reflectance, and QP_delta1 and QP_delta2 may store information that always indicates 0 or invalidity. Similarly, QP_delta_data_to_frame in the header of attribute information may store information that indicates a QP value for reflectance, and QP_delta1_to_frame and QP_delta2_to_frame may store information that always indicates 0 or invalidity. In that case, the three-dimensional data decoding device need not use for decoding and may ignore the information stored in QP_delta1 and QP_delta2 storing information that indicates 0 or invalidity and QP_delta1_to_frame and QP_delta2_to_frame, regardless of the information.

As another example, when the type of attribute information has no QP value, all the fields in APS may store information that indicates 0 or invalidity. In that case, data_AP_delta_present_flag is also set at 0. In that case, the three-dimensional data decoding device need not use for decoding and may ignore the information stored in QP_delta1 and QP_delta2 storing information that indicates 0 or invalidity and QP_delta1_to_frame and QP_delta2_to_frame, regardless of the information. In this way, the three-dimensional data decoding device may ignore a parameter stored in a particular field of a plurality of fields in a header of particular attribute information that corresponds to a particular kind of attribute in the headers of a plurality of pieces of attribute information.

With such a configuration, QP values for different types of attribute information can be indicated by combinations of a reference value and difference information in a common syntax structure, so that the coding efficiency can be improved.

Note that when attribute information corresponding to one piece of geometry information includes two or more pieces of color information, the way of indicating the attribute information may be changed depending on the type of the attribute information. For example, the color information may be indicated by a common QP reference value and difference information, and a QP reference value for reflectance may be separately indicated in APS.

The present invention is not limited to the methods described with regard to Embodiments 8 and 9, and the reference value may be signaled separately from the difference information, or the difference information may be independently signaled as a reference value. For example, the combination of a reference value and difference information may be adaptively changed depending on the properties of data. For example, at least one reference value may be transmitted for a unit that need to be independently decoded, and difference information may be transmitted for a unit that need not be independently decoded. In this way, the functionality can be improved, and at the same time the code amount can be reduced.

Alternatively, the amount of information may be calculated for combinations of a reference value and difference information, and a combination of a reference value and difference information that has the minimum amount of information may be generated and delivered based on the result of the calculation. When adaptively changing the combination of a reference value and difference information, the meaning (semantics) of the field that indicates the reference value and the field that indicates the difference information may be adaptively changed. For example, the meaning of each field may be changed, such as by determining whether to set each field to be invalid or not according to the rules described above, or a flag that indicates to change the meaning of each field may be added. Alternatively, the reference destination for the reference value may be adaptively changed. In that case, a flag that indicates that the reference destination has been changed, or an Id or the like that allows identification of the reference destination may be indicated.

Figure 128:
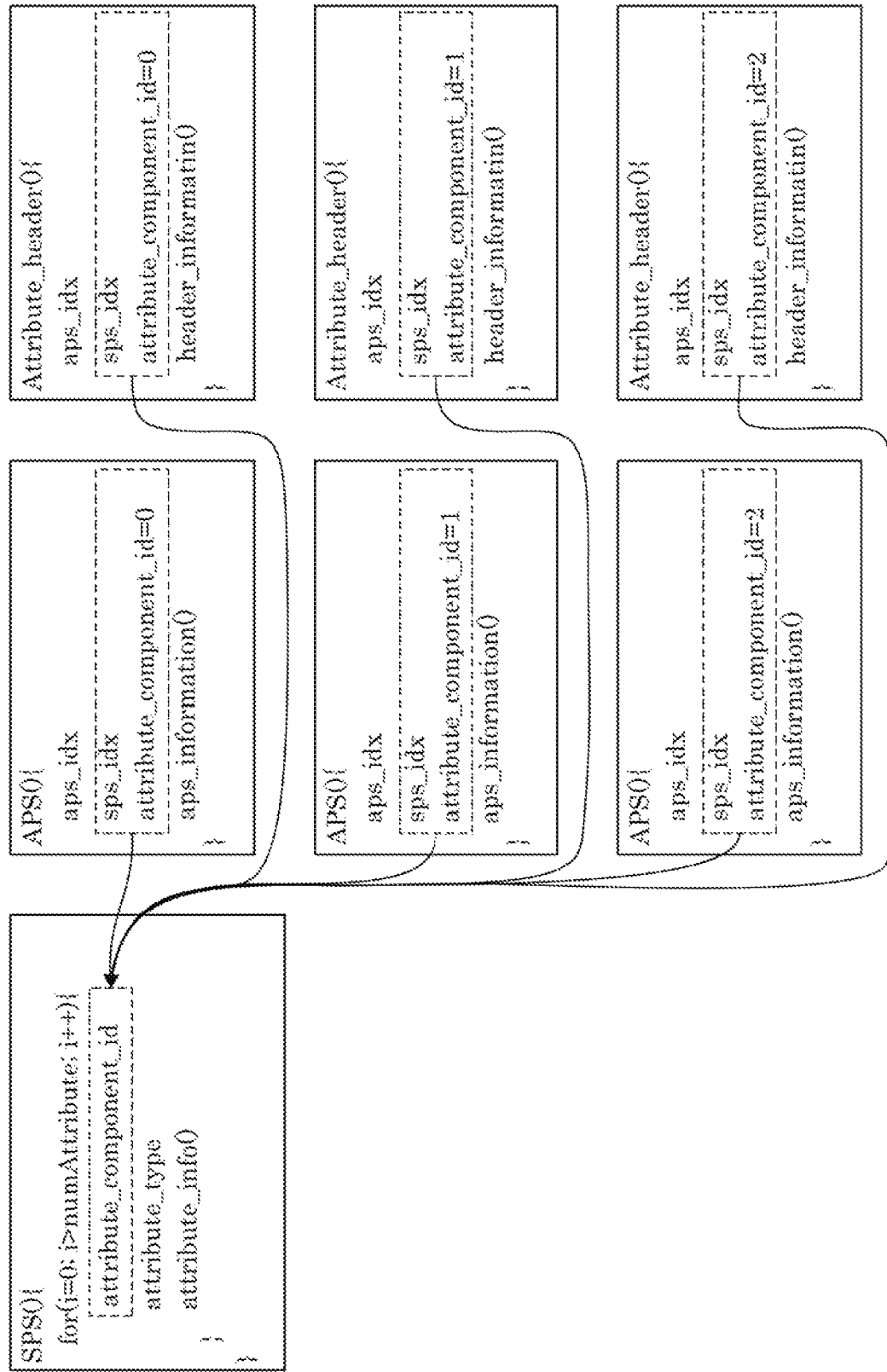

Next, with reference to FIG. 128, a method of indicating a relationship between attribute information described in SPS, APS, and Attribute_header (header of attribute information) by using attribute_component_id will be described. FIG. 128 is a diagram showing a relationship between SPS, APS, and a header of attribute information. Note that the destination of the arrows in FIG. 128 indicates the reference destination.

SPS includes information concerning the types of a plurality of pieces of attribute information. That is, SPS may correspond to a plurality of pieces of attribute information and include a plurality of pieces of information attribute_type each of which indicates a different kind of attribute information. SPS also includes, for each type of attribute information, attribute_component_id that indicates a number that allows identification of the type of attribute information. Note that SPS is an example of control information. attribute_type is an example of type information. attribute_component_id included in SPS is an example of first identification information that indicates that first attribute control information is associated with one of a plurality of pieces of type information.

APS or Attribute_header includes attribute_component_id that corresponds to attribute_component_id included in SPS. Note that APS is an example of second attribute control information. Attribute_header is an example of first attribute control information. attribute_component_id included in APS is an example of second identification information that indicates that first attribute control information is associated with one of a plurality of pieces of type information.

The three-dimensional data decoding device refers to SPS indicated by sps_idx included in APS or Attribute_header. The three-dimensional data decoding device then obtains the type of attribute information corresponding to attribute_component_id included in the APS or Attribute_header from the referred SPS as the type of attribute information to which the information included in the APS or Attribute_header corresponds. Note that one APS corresponds to one type of attribute information. The header of one piece of attribute information corresponds to one type of attribute information. Each of a plurality of APSs corresponds to the header(s) of one or more pieces of attribute information. That is, one APS corresponds to the header(s) of one or more pieces of attribute information other than the header(s) of one or more pieces of attribute information that correspond to another APS.

When attribute_component_id=0, for example, the three-dimensional data decoding device can obtain attribute information (such as attribute_type) that corresponds to attribute_component_id having the same value, that is, a value of 0, from SPS.

Note that, instead of attribute_component_id, the sequence of the pieces of attribute information described in SPS may be described in SPS. That is, type information that indicates a plurality of kinds of attribute information may be stored (described) in SPS in a predetermined sequence. In that case, attribute_component_id included in APS or Attribute_header indicates that the APS or Attribute_header including attribute_component_id is associated with type information at a position in the predetermined sequence.

Alternatively, the sequence of transmitted APSs or attribute information may be made to agree with the sequence of attribute information described in SPS, thereby allowing the three-dimensional data decoding device to derive the sequence of arrival of APSs or attribute information and refer to attribute information corresponding to the sequence of arrival. When point cloud data includes both attribute information whose APS or Attribute_header may or may not be present depending on the frame and attribute information whose APS or Attribute_header is always present regardless of the frame, the attribute information whose APS or Attribute_header is always present regardless of the frame may be first transmitted, and then the attribute information whose APS or Attribute_header may or may not be present depending on the frame may be transmitted.

Note that, although a plurality of APSs each of which corresponds to a plurality of pieces of attribute information is shown in one frame in FIGS. 124 and 128, one APS may be used, instead of the plurality of APSs. In that case, one APS includes attribute information-related information that corresponds to a plurality of pieces of attribute information.

aps_idx may include a sequence number that corresponds to a frame number. A correspondence between APS and Attribute_header may be indicated in this way. Note that aps_idx may have a function of attribute_component_id. This allows information on the whole sequence concerning one or more kinds of APSs or attribute information to be stored in SPS and to be referred to from each APS or Attribute_header.

Note that in order to allow determination of the kind (attribute_type) of the attribute information of APS or Attribute_header, attribute_type may be directly included in APS or Attribute_header, or may be included in a NAL unit header as a kind of the NAL unit.

In any case, the attribute information of APS or Attribute_header can be obtained, and the kind of the attribute of the attribute information can be determined.

Figure 129:
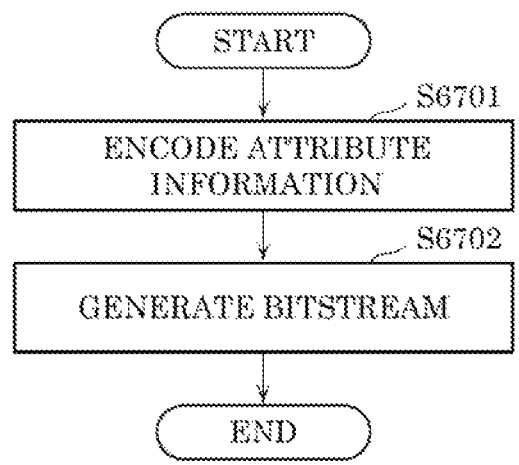

As stated above, the three-dimensional data encoding device according to the present embodiment performs the process shown by FIG. 129. First, the three-dimensional data encoding device encodes pieces of attribute information of respective three-dimensional points, using parameters (S6701). The three-dimensional data encoding device generates a bitstream including the pieces of attribute information encoded, control information, and pieces of first attribute control information (S6702). The control information corresponds to the pieces of attribute information and includes pieces of type information each indicating a type of different attribute information. Moreover, the pieces of first attribute control information correspond one-to-one with the pieces of attribute information. Each of the pieces of first attribute control information includes first identification information indicating that the first attribute control information is associated with one of the pieces of type information.

With such a configuration, since a bitstream including the first identification information for identifying the type of the attribute information to which the first attribute control information corresponds is generated, the three-dimensional data decoding device having received the bitstream can correctly and efficiently decode attribute information on a three-dimensional point.

For example, the pieces of type information are stored in the control information in a predetermined sequence. The first identification information indicates that first attribute control information including the first identification information is associated with one of the pieces of type information that has an order in the predetermined sequence.

With such a configuration, since type information is indicated in a predetermined sequence without information indicating the type information, the amount of data of the bitstream can be reduced, and the amount of the transmitted bitstream can be reduced.

For example, the bitstream further includes pieces of second attribute control information corresponding to the pieces of attribute information. Each of the pieces of second attribute control information includes a reference value of a parameter used for encoding a corresponding one of the pieces of attribute information.

With such a configuration, since each of a plurality of pieces of second attribute control information includes a reference value of a parameter, the attribute information to which the second attribute control information corresponds can be encoded using the reference value. With such a configuration, since the three-dimensional data decoding device having received the bitstream can identify the type of the second attribute information using the second identification information, the three-dimensional data decoding device can correctly and efficiently decode attribute information on a three-dimensional point.

For example, each of the pieces of first attribute control information includes difference information that is a difference from the reference value of the parameter. With such a configuration, the coding efficiency can be improved.

For example, the bitstream further includes pieces of second attribute control information corresponding to the pieces of attribute information. Each of the pieces of second attribute control information includes second identification information indicating that the second attribute control information is associated with one of the pieces of type information.

With such a configuration, since a bitstream including the second identification information for identifying the type of the attribute information to which the second attribute control information corresponds is generated, it is possible to generate the bitstream that can correctly and efficiently decode attribute information on a three-dimensional point.

For example, each of the pieces of first attribute control information includes N fields in which N parameters are stored, N being greater than or equal to 2. In specific first attribute control information among the pieces of first attribute control information, one of the N fields includes a value indicating invalidity, the specific first attribute control information corresponding to a specific type of an attribute.

With such a configuration, since the three-dimensional data decoding device having received the bitstream can identify the type of the first attribute information using the first identification information and omit the decoding process in the case of specific first attribute control information, the three-dimensional data decoding device can correctly and efficiently decode attribute information on a three-dimensional point.

For example, in the encoding, the pieces of attribute information are quantized using quantization parameters as the parameters.

With such a configuration, since a parameter is expressed using a difference from a reference value, it is possible to improve coding efficiency for quantization.

For example, the three-dimensional data encoding device includes a processor and memory, and the processor performs the above process using the memory.

Figure 130:
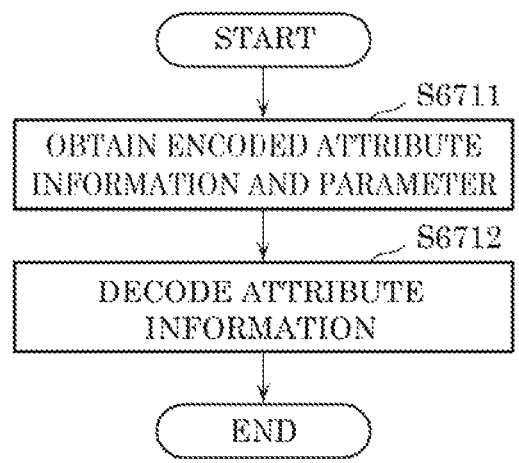

The three-dimensional data decoding device according to the present embodiment performs the process shown by FIG. 130. First, the three-dimensional data decoding device obtains pieces of attribute information encoded and parameters from a bitstream (S6711). The three-dimensional data decoding device decodes the pieces of attribute information encoded using the parameters, to generate pieces of attribute information of respective three-dimensional points (S6712). The bitstream includes control information and pieces of first attribute control information. The control information corresponds to the pieces of attribute information and includes pieces of type information each indicating a type of different attribute information. The pieces of first attribute control information correspond one-to-one with the pieces of attribute information. Each of the pieces of first attribute control information includes first identification information indicating that the first attribute control information is associated with one of the pieces of type information.

With such a configuration, since the three-dimensional data decoding device can identify the type of the attribute information corresponding to the first attribute control information using the first identification information, the three-dimensional data decoding device can correctly and efficiently decode attribute information on a three-dimensional point.

For example, the pieces of type information are stored in the control information in a predetermined sequence. The first identification information indicates that first attribute control information including the first identification information is associated with one of the pieces of type information that has an order in the predetermined sequence.

With such a configuration, since type information is indicated in a predetermined sequence without information indicating the type information, the amount of data of the bitstream can be reduced, and the amount of the transmitted bitstream can be reduced.

For example, the bitstream further includes pieces of second attribute control information corresponding to the pieces of attribute information. Each of the pieces of second attribute control information includes a reference value of a parameter used for encoding a corresponding one of the pieces of attribute information.

With such a configuration, since the three-dimensional data decoding device can decode the attribute information corresponding to the second attribute control information using a reference value, the three-dimensional data decoding device can correctly and efficiently decode attribute information on a three-dimensional point.

For example, each of the pieces of first attribute control information includes difference information that is a difference from the reference value of the parameter. With such a configuration, since it is possible to decode attribute information using a reference value and difference information, it is possible to correctly and efficiently decode attribute information on a three-dimensional point.

For example, the bitstream further includes pieces of second attribute control information corresponding to the pieces of attribute information. Each of the pieces of second attribute control information includes second identification information indicating that the second attribute control information is associated with one of the pieces of type information. With such a configuration, since it is possible to identify the type of the attribute information corresponding to the second attribute control information using the second identification information, it is possible to correctly and efficiently decode attribute information on a three-dimensional point.

Each of the pieces of first attribute control information includes fields in which parameters are stored. In the decoding, a parameter stored in a specific field among the fields of specific first attribute control information among the pieces of first attribute control information is ignored, the specific first attribute control information corresponding to a specific type of an attribute.

With such a configuration, since the three-dimensional data decoding device can identify the type of the first attribute information using the first identification information, the three-dimensional data decoding device can correctly and efficiently decode attribute information on a three-dimensional point.

For example, in the decoding, the pieces of attribute information encoded are inverse quantized using quantization parameters as the parameters.

With such a configuration, it is possible to correctly decode attribute information on a three-dimensional point.

For example, the three-dimensional data decoding device includes a processor and memory, and the processor performs the above process using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. An encoding method comprising:

encoding one or more data groups; and generating coded data, a first parameter set for the coded data, and a second parameter set, the coded data including one or more data units, the one or more data units each including a data unit header, wherein the first parameter set includes one or more data group parameters corresponding to the one or more data groups, respectively, the second parameter set includes a first parameter set index indicating the first parameter set corresponding to the second parameter set, and the data unit header of a first data unit includes (i) a second parameter set index indicating the second parameter set corresponding to the first data unit and (ii) a value indicating a data group parameter corresponding to the first data unit among the one or more data group parameters stored in the first parameter set.

2. An encoder comprising:

a processor; and a memory, wherein using the memory, the processor performs:

encoding one or more data groups; and generating coded data, a first parameter set for the coded data, and a second parameter set, the coded data including one or more data units, the one or more data units each including a data unit header, wherein the first parameter set includes one or more data group parameters corresponding to the one or more data groups, respectively, the second parameter set includes a first parameter set index indicating the first parameter set corresponding to the second parameter set, and the data unit header of a first data unit includes (i) a second parameter set index indicating the second parameter set corresponding to the first data unit and (ii) a value indicating a data group parameter corresponding to the first data unit among the one or more data group parameters stored in the first parameter set.

3. A decoding method comprising:

obtaining coded data, a first parameter set for the coded data, and a second parameter set, the coded data including one or more data units, the one or more data units each including a data unit header; and decoding the one or more data units based on the first parameter set, wherein the first parameter set includes one or more data group parameters corresponding to one or more data groups, respectively, the second parameter set includes a first parameter set index indicating the first parameter set corresponding to the second parameter set, and the data unit header of a first data unit includes (i) a second parameter set index indicating the second parameter set corresponding to the first data unit and (ii) a value indicating a data group parameter corresponding to the first data unit among the one or more data group parameters stored in the first parameter set.

4. A decoder comprising:

a processor; and a memory, wherein using the memory, the processor performs:

obtaining coded data, a first parameter set for the coded data, and a second parameter set, the coded data including one or more data units, the one or more data units each including a data unit header; and decoding the one or more data units based on the first parameter set, wherein the first parameter set includes one or more data group parameters corresponding to one or more data groups, respectively, the second parameter set includes a first parameter set index indicating the first parameter set corresponding to the second parameter set, and the data unit header of a first data unit includes (i) a second parameter set index indicating the second parameter set corresponding to the first data unit and (ii) a value indicating a data group parameter corresponding to the first data unit among the one or more data group parameters stored in the first parameter set.

* * * * *